US008113727B2

(12) United States Patent
Niwa et al.

(10) Patent No.: US 8,113,727 B2
(45) Date of Patent: Feb. 14, 2012

(54) APPARATUS FOR COMMUNICATING WITH A RFID TAG, TAPE CARTRIDGE AND TAG TAPE

(75) Inventors: Akihiko Niwa, Toki (JP); Tatsuhiro Ikedo, Ena (JP); Hideo Ueno, Nagoya (JP); Nobuhiko Funato, Gifu (JP); Kazunari Taki, Nagoya (JP); Tsuyoshi Ohashi, Hashima (JP); Takuya Nagai, Nagoya (JP); Mitsuo Hirota, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 891 days.

(21) Appl. No.: 11/875,735

(22) Filed: Oct. 19, 2007

(65) Prior Publication Data

US 2009/0002746 A1 Jan. 1, 2009

Related U.S. Application Data

(63) Continuation-in-part of application No. PCT/JP2006/308176, filed on Apr. 19, 2006.

(30) Foreign Application Priority Data

| | | |
|---|---|---|
| Apr. 19, 2005 | (JP) | 2005-121157 |
| Apr. 28, 2005 | (JP) | 2005-132175 |
| Jun. 20, 2005 | (JP) | 2005-178851 |
| Jun. 22, 2005 | (JP) | 2005-181465 |

(51) Int. Cl.

| | |
|---|---|
| ***B41J 29/38*** | (2006.01) |
| ***B41J 3/36*** | (2006.01) |
| ***G06F 3/12*** | (2006.01) |

(52) U.S. Cl. .............................. 400/76; 400/88; 400/613

(58) Field of Classification Search .................... 400/76, 400/613

See application file for complete search history.

(56) References Cited

U.S. PATENT DOCUMENTS

| | | | |
|---|---|---|---|
| 5,562,353 | A | 10/1996 | Handa et al. |
| 6,045,277 | A | 4/2000 | Kurashima et al. |

(Continued)

FOREIGN PATENT DOCUMENTS

| | | |
|---|---|---|
| JP | H07-069497 A | 3/1995 |

(Continued)

OTHER PUBLICATIONS

International Search Report for Int'l Patent Appl'n No. PCT/JP2006/308176 mailed Jul. 25, 2006.

(Continued)

*Primary Examiner* — Daniel J Colilla

(74) *Attorney, Agent, or Firm* — Baker Botts L.L.P.

(57) ABSTRACT

There are included an antenna transmitting and receiving information through a radio communication with a RFID circuit element, a signal processing circuit and a transmission portion of a radio frequency circuit configured to execute write or read of information with respect to an IC circuit part of the RFID circuit element, a tape-feeding-roller drive shaft for feeding out a base tape from a first roll, a cutter configured to cut the base tape fed out by this tape-feeding-roller drive shaft to a predetermined length to produce a RFID label, a print head making a print in a predetermined print region of the base tape, and a control circuit configured to control this print head so as to be capable of being switched between the print in a forward direction and the print in a rotation direction inverting this forward direction with respect to a predetermined print region.

52 Claims, 90 Drawing Sheets

U.S. PATENT DOCUMENTS

| | | | | |
|---|---|---|---|---|
| 7,223,030 | B2 * | 5/2007 | Fessler et al. | 400/76 |
| 2005/0058483 | A1 * | 3/2005 | Chapman et al. | 400/76 |
| 2005/0147441 | A1 * | 7/2005 | Van Bever | 400/70 |

FOREIGN PATENT DOCUMENTS

| | | | | |
|---|---|---|---|---|
| JP | H07-156499 | A | | 6/1995 |
| JP | H10-000818 | A | | 1/1998 |
| JP | H10-255441 | A | | 9/1998 |
| JP | 2000-185447 | A | | 7/2000 |
| JP | 2000-189650 | A | | 7/2000 |
| JP | 2000-251098 | A | | 9/2000 |
| JP | 2001088381 | A | * | 4/2001 |
| JP | 2001-180068 | A | | 7/2001 |
| JP | 2001-331768 | A | | 11/2001 |
| JP | 2003159838 | A | * | 6/2003 |
| JP | 2004-130673 | A | | 4/2004 |
| JP | 2004118625 | A | * | 4/2004 |
| JP | 2004-202894 | A | | 7/2004 |
| JP | 2004-330492 | A | | 11/2004 |
| JP | 2004-333651 | A | | 11/2004 |
| JP | 2005-047231 | A | | 2/2005 |
| JP | 2005-141407 | A | | 2/2005 |
| JP | 2005-108009 | A | | 4/2005 |
| JP | 2005-115862 | A | | 4/2005 |
| JP | 2005-149427 | A | | 6/2005 |
| JP | 2005-297348 | A | | 10/2005 |
| WO | 2005/034028 | A1 | | 4/2005 |

OTHER PUBLICATIONS

International Bureau of WIPO, International Preliminary Report on Patentability for International Patent Application No. PCT/JP2006/308176 mailed Nov. 1, 2007.

Japan Patent Office; Notice of Reasons for Rejection in Japanese Patent Application No. 2005-178851 mailed Apr. 30, 2010.

Japan Patent Office; Notice of Reasons for Rejection in Japanese Patent Application No. 2005-181465 mailed Apr. 30, 2010.

Japanese Patent Office, Notice of Reason for Rejection for Application No. JP2005-181465, dated Aug. 19, 2010.

Japanese Patent Office, Notice of Reason for Rejection for Application No. JP2005-178851, dated Aug. 19, 2010.

Japan Patent Office; Notice of Reason for Rejection for Patent Application No. JP2005-121157, dated Oct. 29, 2010.

Japan Patent Office; Notice of Reason for Rejection for Patent Application No. JP2005-132175, dated Nov. 10, 2010.

* cited by examiner

WHEN FORMING PRINT
AFTER CONSTRUCTION
(PRINT TO THE LEFT/ TAG TO THE LEFT)
(PRINT TO THE RIGHT/ TAG TO THE RIGHT)
(PRINT TO THE RIGHT/ TAG TO THE LEFT)
(PRINT TO THE LEFT/ TAG TO THE RIGHT)
30b
30c
S
L1
L2
A B C

WHEN FORMING PRINT
AFTER CONSTRUCTION
(PRINT ON UPPER SIDE/ LAYOUT ON UPPER SIDE)
(PRINT ON LOWER SIDE/ LAYOUT ON UPPER SIDE)
(PRINT ON LOWER SIDE/ LAYOUT ON LOWER SIDE)
(PRINT ON UPPER SIDE/ LAYOUT ON LOWER SIDE)
ABC
S
L1
L2
30b
30c

R
BL
XLVII
To
T1
A1
A2
AT
A3
A4
A5
ABCDE
ABCDE
BL
R

T2
ABCDEFGH

T3

T4

APPARATUS FOR COMMUNICATING WITH A RFID TAG, TAPE CARTRIDGE AND TAG TAPE

CROSS-REFERENCE TO RELATED APPLICATION

This application is a Continuation-in-Part application of International Patent Application No. PCT/JP2006/308176, filed Apr. 19, 2006, which was not published under PCT article 21(2) in English and claims the benefits of Japanese Patent Application No. 2005-181465 filed Jun. 22, 2005, No. 2005-121157 filed Apr. 19, 2005, No. 2005-132175 filed Apr. 28, 2005 and No. 2005-178851 filed Jun. 20, 2005, the disclosures of all of which are incorporated herein by reference.

BACKGROUND OF THE INVENTION

1. Field of the Invention

The present invention relates to an apparatus for communicating with a RFID tag configured to produce a RFID label with which an external radio communication of information can be performed, and a tape cartridge as well as tag tape for use therein.

2. Description of the Related Art

There has been known a RFID (Radio Frequency Identification) system configured to execute read/write of information contactlessly between a small-sized RFID tag and a reader (reading device)/writer (writing device). A RFID circuit element provided in the RFID tag includes an IC circuit part configured to store a predetermined RFID tag information, and an antenna connected to this IC circuit part to transmit and receive information, even in the case where the RFID tag becomes dirty, or in the case where it is disposed in a position out of sight, access (read/write of information) can be conducted from the reader/writer side with respect to the RFID tag information of the IC circuit part, and thus this RFID tag is expected to be in a practical use in various fields such as commodity management, inspection process and the like.

Such a RFID tag is normally formed by the provision of a RFID circuit element on a label-like material, and many these RFID labels are affixed to e.g., target objects, for example, for classifying and arranging a variety of documents and articles. Moreover, in respect of managing these RFID tags, it is very convenient that letter information is printed onto the tag itself as well. Accompanied thereby, conventionally, there has been proposed an apparatus for communicating with a RFID tag configured to function both to execute read/write of information with respect to the RFID tag, and to make a print onto the tag (for example, refer to 4 prior arts as described below).

In an apparatus for communicating with a RFID tag according to JP, A, 2004-202894, a RFID circuit element (RFID inlet) is mounted in a predetermined position of a tape (delayed tuck sheet), RFID tag information is transmitted and received with respect to this mounted RFID circuit element as well as a predetermined print is made in a predetermined position of the tape, and thereafter the RFID circuit element and the tape are bonded together, thereby producing a RFID label.

In an apparatus for communicating with a RFID tag according to JP, A, 10-255441, produced is a RFID label provided with a label main body that is constructed to be laminated of a base tape (polyimide substrate), a print-receiving sheet (coat sheet) to receive a print and the like, and that includes a RFID circuit element (IC); and a separation sheet that is bonded via an adhesive layer to the backside (base tape side) of this label main body, and that is printed with an identification mark (cut inhibiting mark) in a region corresponding to the region in which the RFID circuit element is disposed. With the arrangement, by the provision of an identification mark illustrating a layout region of the RFID circuit element on the separation sheet, when a user cuts an unnecessary portion to use a RFID label, an erroneous cut of the RFID circuit element can be prevented.

In an apparatus for communicating with a RFID tag according to JP, A, 2004-333651, when a strip-like tag tape in which RFID circuit elements (RFID tags), each including an IC circuit part and a tag antenna (antenna part) are disposed at regular intervals is fed out from a roll of tape with RFID tag, and fed in a transport path, a predetermined print information is printed on the surface of the label by printing device (thermal head), as well as a predetermined RFID tag information have been created on the apparatus side corresponding to the above-mentioned printed print information is transmitted with respect to the tag antenna of the RFID circuit element provided in the label, and sequentially written in the IC circuit part (IC chip) connected to the antenna. Thereafter, a RFID label tape with print with which the print and write of the RFID tag information has been ended is cut to a predetermined length, and then a RFID label with print will be completed.

In an apparatus for communicating with a RFID tag according to JP, A, 2004-330492, a cartridge provided with a roll (feed spool) wound with a base tape (strip-like tape) in which RFID circuit elements (antenna part and IC chip) are disposed substantially at equal intervals in a tape longitudinal direction is mounted; the above-mentioned tag tape is fed out from the above-mentioned roll of this cartridge to transmit and receive RFID tag information with respect to the RFID circuit element provided in this tag tape, as well as a predetermined print is made with a thermal head (print head) in a predetermined position of a print receiving tape (laminate) fed out from a roll (tape spool) different from the above-mentioned roll provided at the above-mentioned cartridge; and these tag tape and the print-receiving tape printed are bonded together to produce a RFID label with print.

In general, when adjusting the size of a RFID label, a user (operator), while looking at the surface side (printed sheet side) of the RFID label printed, cuts an unnecessary portion so as to balance the RFID label and the print region. Therefore, as is the RFID label of the prior art described in the above-mentioned JP, A, 10-255441, in the case where a cut inhibiting mark is provided on the separation sheet on the opposite side of the printed sheet side (that is, on the backside of the RFID label), a cut operation has to be done while alternately looking at the surface and the backside of the RFID label, resulting in the reduction in convenience.

Furthermore, recently, a RFID tag has been used for various purposes accompanied with enlargement of the use thereof, and a variety of RFID labels based on the application thereof. For example, as is the case where a print and a RFID circuit element are disposed being too far to one side in the longitudinal direction of the RFID label, and the RFID label, when being affixed to an object to be affixed, is made to protrude from the object to be affixed on one side in the label longitudinal direction (that is the portion at which the print and the RFID circuit element are provided), thus intending to easily make a visual recognition and a radio communication, or as is the case where the print and the RFID circuit element are disposed on the opposite sides in the longitudinal direction of the RFID label, when the RFID label is affixed with respect to the one in which a metal fitting is located in the proximity of the face to be affixed such as a back strip of binders, the print is located on the metal fitting side as well as the RFID circuit element is disposed being spaced apart from the metal fitting, and thus the radio communication intends not to be interrupted, there has been a need to produce a RFID label with the print and the layout aspect of a RFID circuit element varied.

However, in the prior art according to the above-mentioned JP, A, 2004-202894, since the layout position of a RFID circuit element and the layout position of a print in a RFID label produced are fixedly determined, in respect of these layout of the RFID circuit element and layout of the print, only the RFID label of a single layout aspect can be produced. As a result, the label of a layout aspect a user (operator) desires cannot be produced, and thus a variety of needs as described above cannot be met.

Whereas, in the prior art according to the above-mentioned JP, A, 2004-330492, there has been preliminarily prepared a plurality of cartridges, for example, with different tape widths of base tapes or different layout intervals of RFID circuit elements, and each of the cartridges is removed and replaced depending on the application, thereby enabling to produce a RFID label with the layout aspect of the RFID circuit element varied.

Here, it is very convenient that not only the layout aspect of a RFID circuit element is varied to produce a RFID label as mentioned above, but also a cartridge provided with a normal base tape with no RFID circuit element and a print-receiving tape can be mounted, and a normal (with print) label can be produced with the same apparatus. In the prior art according to the above-mentioned JP, A, 2004-330492, however, there is no special consideration in that a cartridge provided with the RFID circuit element in the base tape, and a normal cartridge provided with no RFID circuit element are removably replaced with each other, and thus both the RFID label with print (RFID circuit element is present) and the normal printed label (RFID circuit element is absent) can be produced by the same apparatus, as mentioned above.

Moreover, in the prior art according to the above-mentioned JP, A, 2004-330492, a print is not directly made onto a base tape provided with a RFID circuit element, but the print is made onto a print-receiving tape different from the base tape, and thereafter these print-receiving tape printed and base tape are bonded together to produce a RFID label. However, for example, for reasons of making the presence of the RFD circuit element obvious, there are some cases where the RFID circuit element is disposed not on the base tape side but on the print-receiving tape side. In this case, since the layout point of the RFID circuit element in the print-receiving tape will be in concavo-convex shape, there is a possibility that e.g., the fading of a print occurs, and thus a print quality comes to be poor. In addition, when a heat is applied to a layout point of the RFID circuit element by the print head, the soundness of the RFID circuit element may be decreased.

Furthermore, also in the prior art according to the above-mentioned JP, A, 2004-3333651, as with the above-mentioned JP, A, 2004-330492, a print-receiving tape different from a tag tape is printed, and thereafter this print-receiving tape printed and the tag tape are bonded together to produce a RFID label. Therefore, as is described above, in the case where the RFID circuit element is disposed on the print-receiving tape side, the layout point of the RFID circuit element comes to be in concavo-convex shape, thus e.g., the fade of a print occurs and a print quality becomes poor, and as a result, there is a possibility of leading to the reduction of the quality of a RFID label with print.

As mentioned above, in the prior arts as above-mentioned, since there is no consideration so as to make a print based on the presence or absence of the RFID circuit element or the layout of the RFID circuit element, various inconveniences occur, and thus the convenience of a user (operator) will be reduced.

SUMMARY OF THE INVENTION

A first object of the present invention is to provide an apparatus for communicating with a RFID tag, a tape cartridge and a tag tape, by making a print control based on the presence or absence of a RFID circuit element or the layout of the RFID circuit element, enabling to improve the convenience of a user (operator).

A second object of the present invention is to provide an apparatus for communicating with a RFID tag and a tag tape for use therein, by making a print control based on the presence or absence of a RFID circuit element or the layout of the RFID circuit element, enabling to produce various layout aspects of RFID labels meeting a wide range of needs of a user, and thus enabling to improve the convenience of a user (operator).

A third object of the present invention is to provide an apparatus for communicating with a RFID tag, by making a print control based on the presence or absence of a RFID circuit element or the layout of the RFID circuit element, enabling to produce a RFID label which unnecessary portions can be easily cut, and thus enabling to improve the convenience of a user (operator).

A fourth object of the present invention is to provide an apparatus for communicating with a RFID tag and a tag tape, by making a print control based on the presence or absence of a RFID circuit element or the layout of the RFID circuit element, enabling to prevent the reduction in quality of a RFID label with print, and thus enabling to improve the convenience of a user (operator).

A fifth object of the present invention is to provide an apparatus for communicating with a RFID tag and a tape cartridge for use therein, by making a print control based on the presence or absence of a RFID circuit element or the layout of the RFID circuit element, enabling to produce both the RFID label with print and a normal printed label with the same apparatus, as well as to improve a soundness and a print quality of the RFID label produced, thereby enabling to improve the convenience of a user (operator).

DETAILED DESCRIPTION OF THE PREFERRED EMBODIMENTS

Figure 1:
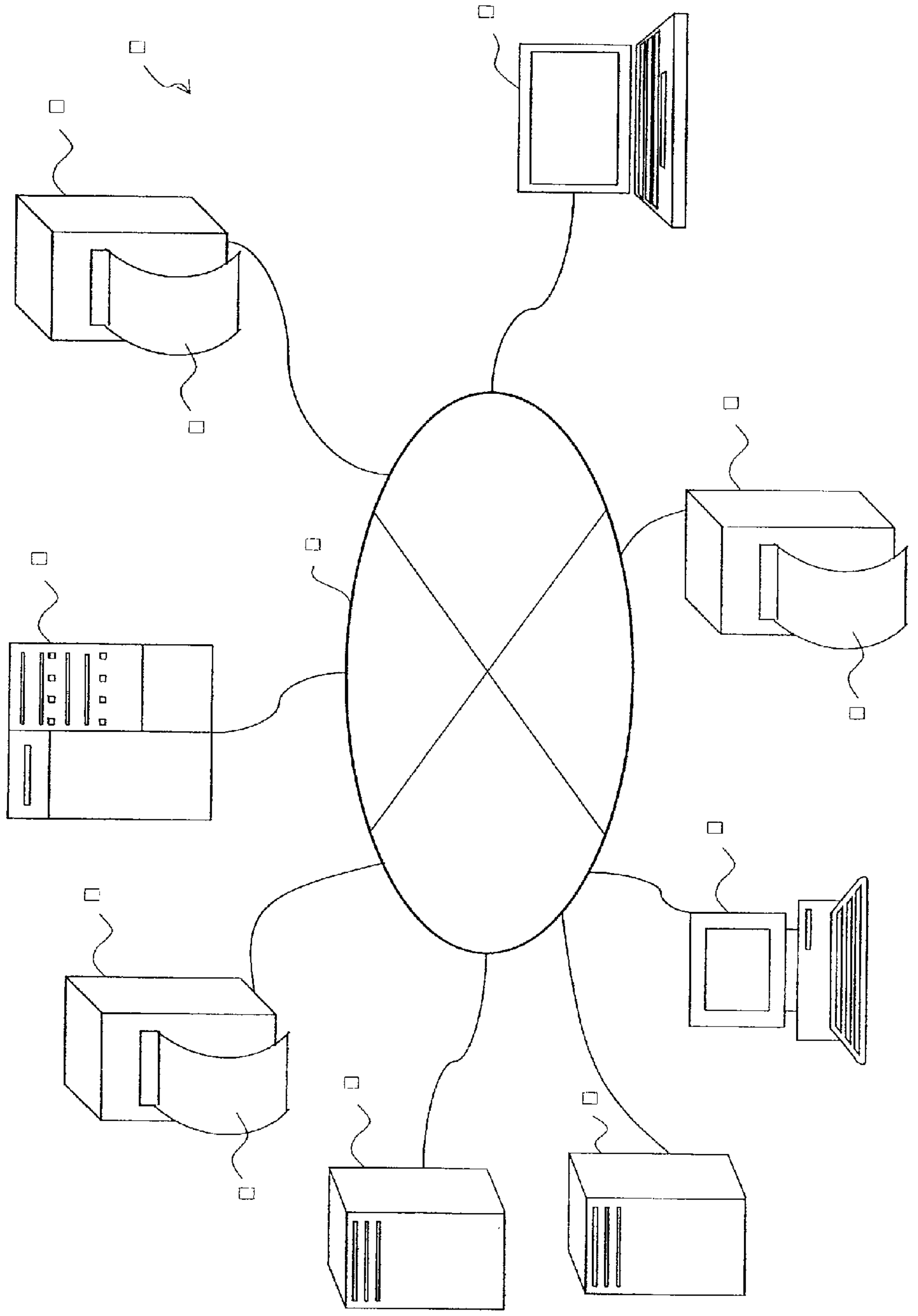
FIG. 1 is a system schematic diagram illustrating a RFID tag manufacturing system to which an apparatus for communicating with a RFID tag according to a first embodiment of the present invention is applied.

Hereinafter, an exemplary embodiment according to the present invention will be described referring to the drawings.

A first embodiment according to the present invention will be described with reference to FIGS. 1 to 25.

FIG. 1 is a system arrangement view illustrating a RFID tag manufacturing system to which an apparatus for communicating with a RFID tag according to this embodiment is applied. This embodiment is an embodiment in the case where the present invention is applied to a manufacturing system of a RFID tag capable of only being read (incapable of being written).

In a RFID tag manufacturing system 1 illustrated in FIG. 1, an apparatus 2 for communicating with a RFID tag according to this embodiment is connected to a route server 4, a terminal 5, a general purpose computer 6, and a plurality of information servers 7 via a wired or wireless communication line 3.

Figure 2:
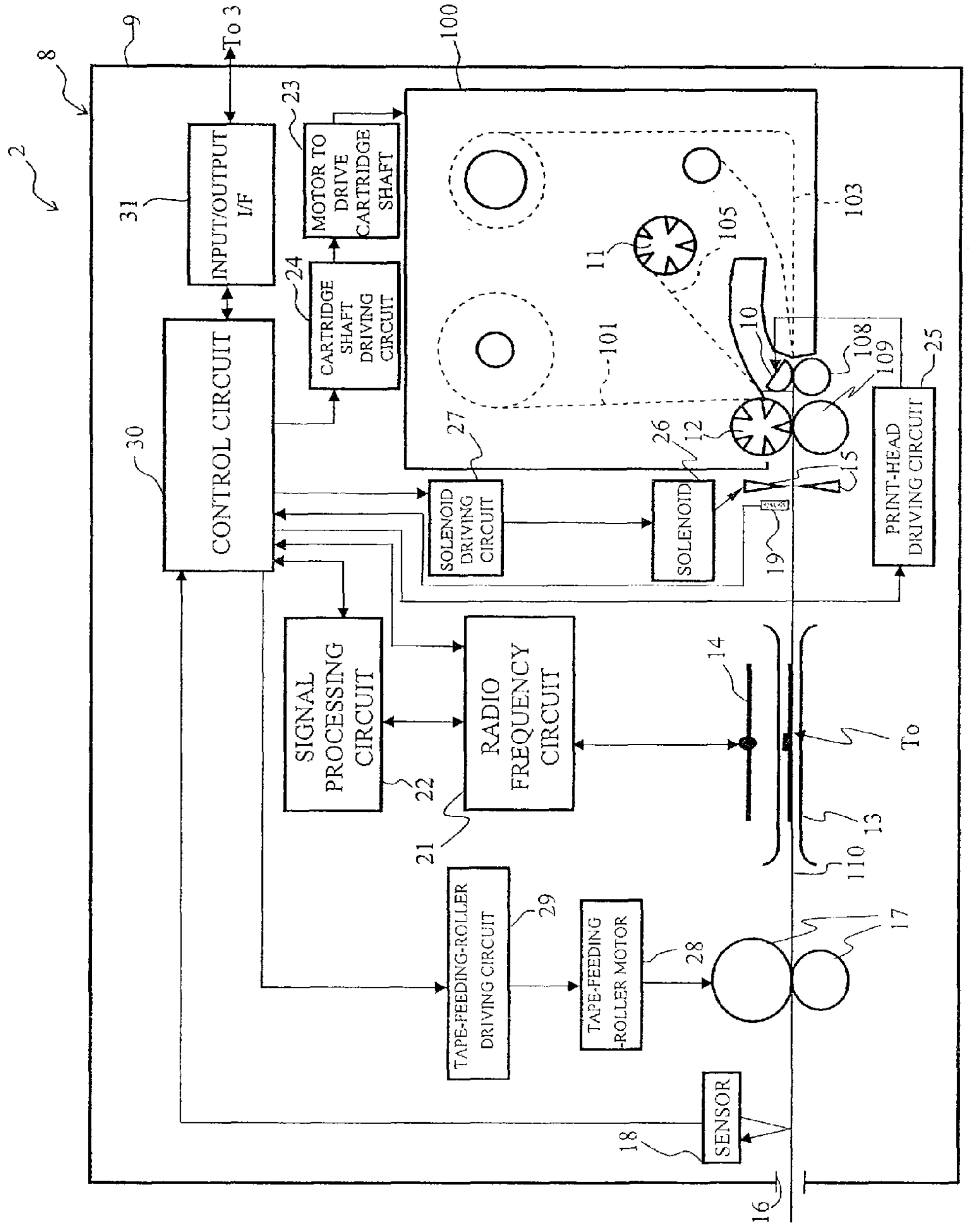
FIG. 2 is a schematic diagram illustrating a detailed structure of the apparatus for communicating with a RFID tag.

FIG. 2 is a schematic diagram illustrating a detailed structure of the above-mentioned apparatus 2 for communicating with a RFID tag.

In FIG. 2, in an apparatus main body 8 of the apparatus 2 for communicating with a RFID tag, there is provided a cartridge holder part (not illustrated) as a concavity, and a cartridge 100 is removably mounted at this holder part.

The apparatus main body 8 is provided with the above-mentioned cartridge holder part (roll of tape with RFID tag holder) to which the cartridge 100 is fitted, as well as includes a housing 9 configured to form a contour, a print head (in this example, a thermal head) 10 act as a printing device configured to make a predetermined print (printing) on a cover film 103, a ribbon take-up roller driving shaft 11 configured to drive an ink ribbon 105 with which the print onto the cover film 103 is ended, a tape feeding roller driving shaft 12 act as a driving device configured to bond a cover film (a second tape, a print-receiving tape) 103 and a base tape (a first tape, a tag tape) 101, as well as to feed out it as a tag label tape 110 with print, an antenna (apparatus-side antenna) 14 configured to transmit and receive a signal by a radio communication using appropriate frequencies such as UHF bands, microwave bands or short wave bands with a RFID circuit element To (details will be described later) provided in the tag label tape 110 with print, a cutter (cutting device) 15 configured to cut the above-mentioned tag label tape 110 with print to a predetermined length in a predetermined timing, and to produce a RFID label T in a label state (details will be described later), a pair of feeding guides 13 configured to set and to hold the RFID circuit element To in a predetermined access area opposed to the antenna 14 at the time of transmitting and receiving a signal through the above-mentioned radio communication, as well as guiding the tape 110 (=RFID label T) having been cut, a feeding roller 17 configured to feed and to carry-out the RFID label T guided to a carry-out exit 16, a tape-end sensor 18 configured to detect the presence or absence of the RFID label T at the carry-out exit 16, and a photo sensor (a first detecting device) 19 provided so as to face in a transport path (in a horizontal direction in FIG. 2) (in this example, so as to face a tape backside) on the downstream side of the cutter 15 in this transport direction of the above-mentioned tag label tape 110 with print, and configured to detect a cut mark PM, being an identifier provided at the below-described separation sheet 101*d* to input a predetermined detection signal to a control circuit 30.

On the other hand, the apparatus main body 8 also includes a radio frequency circuit 21 for accessing (executing read or write) to the above-mentioned RFID circuit element To via the above-mentioned antenna 14, a signal processing circuit 22 for processing a signal read out from the RFID circuit element To, a motor to drive cartridge shaft 23 configured to drive the above-described ribbon take-up roller driving shaft 11 and a feeding roller driving shaft 12, a cartridge shaft driving circuit 24 configured to control movement of this motor to drive cartridge shaft 23, a print-head driving circuit 25 configured to control energization to the above-mentioned print head 10, a solenoid 26 configured to drive the above-mentioned cutter 15 to operate cutting operation, a solenoid driving circuit 27 configured to control this solenoid 26, a tape-feeding-roller motor 28 configured to drive the above-mentioned feeding roller 17, a tape-feeding-roller driving circuit 29 configured to control this tape-feeding-roller motor 28, and the above-mentioned control circuit 30 configured to control the entire operation of the apparatus 2 for communicating with a RFID tag via the above-mentioned radio frequency circuit 21, signal processing circuit 22, cartridge shaft driving circuit 24, print-head driving circuit 25, solenoid driving circuit 27, tape-feeding-roller driving circuit 29 and the like.

The control circuit 30 is a so-called microcomputer, although a detailed illustration is omitted, formed of a CPU, being a central processing unit, ROM, RAM and the like, and is arranged to perform a signal processing according to a program having preliminarily been stored in the ROM while using a temporary storage function of the RAM. Furthermore, this control circuit 30 is connected to, for example, a communication line via an input/output interface 31 (operation signal input means), and can exchange information with the above-described route server 4, other terminal 5, general purpose computer 6, information server 7 and the like.

Figure 3:
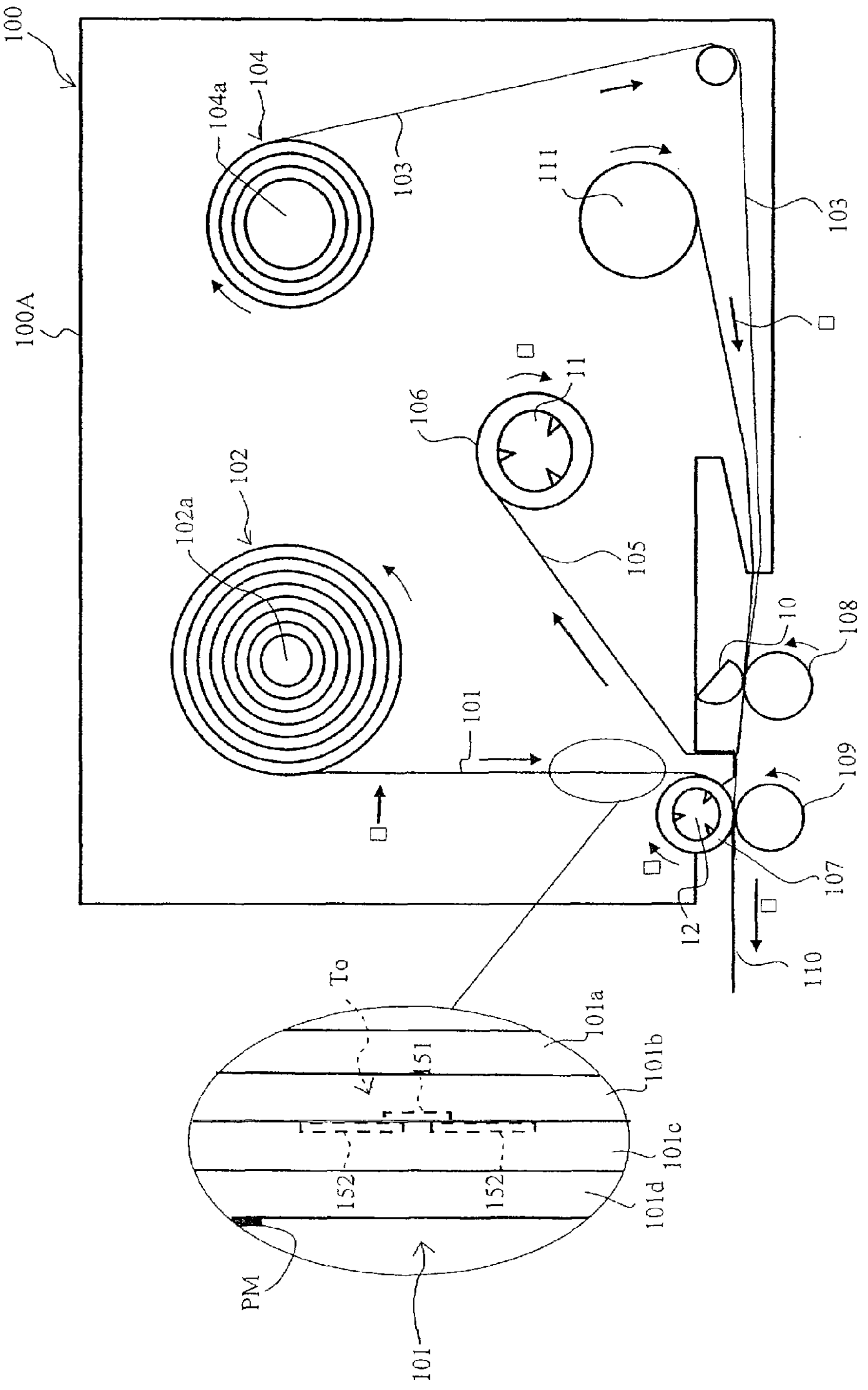
FIG. 3 is an explanatory view illustrating a detailed structure of a cartridge.

FIG. 3 is an explanatory view for illustrating a detailed structure of the cartridge 100.

In this FIG. 3, the cartridge 100 includes, a housing 100A, a first roll (roll of tape with RFID tag) 102 disposed in this housing 100A, and wound with the above-mentioned strip-like base tape 101, a second roll 104 wound with the above-mentioned transparent cover film 103 substantially of the same width as that of the above-mentioned base tape, a ribbon-supply-side roll 111 configured to feed out the above-mentioned ink ribbon 105 (thermal transfer ribbon, however, it is unnecessary in the case where the cover film is a thermal tape), a ribbon take-up roller 106 configured to take up the ribbon 105 having been used for printing, and a tape feeding roller 107 configured to press and bond the above-mentioned base tape 101 and the above-mentioned cover film 103 to form the above-mentioned tag label tape 110 with print, as well as feed it in a direction indicated by an arrow A (=configured to function as a feeding roller).

The first roll 102, around a reel member 102*a*, is wound with the above-mentioned base tape 101 in which a plurality of RFID circuit elements To is sequentially formed at predetermined equal intervals in a longitudinal direction.

The base tape 101, in this example, is in a four-layer structure (refer to a partially enlarged view in FIG. 3), and from the side of being wound inside (right side in FIG. 3) toward the opposite side thereof (left side in FIG. 3), constructed to be laminated in order of an adhesive layer 101*a* made of a proper adhesive material, a colored base film 101*b* made of e.g., PET (polyethylene terephthalate), an adhesive layer (affixing adhesive layer) 101*c* made of a proper adhesive material, and a separation sheet (separation material layer) 101*d*.

On the backside of the base film 101*b* (left side in FIG. 3), an antenna 152 configured to transmit/receive information is mounted integrally, and an IC circuit part 151 configured to store information upgradably (rewritably) is formed so as to be connected thereto, thus form the RFID circuit element To.

On the front side (right side in FIG. 3) of the base film 101*b*, the above-mentioned adhesive layer 101*a* for bonding the cover film 103 later; and on the backside (left side in FIG. 3) of the base film 101*b*, the above-mentioned separation sheet 101*d* is bonded to the base film 101*b* with the above-mentioned adhesive layer 101*c* provided so as to contain therein the RFID circuit element To. Incidentally, this separation sheet 101*d*, when a RFID label T having been finally completed in a label state is affixed to a predetermined article and the like, makes it possible to be affixed to this article and the like with the adhesive layer 101*c* by peeling off the separation sheet 101*d*.

The second roll 104 is wound with the above-mentioned cover film 103 around a reel member 104*a*. The cover film 103 fed out from the second roll 104 is arranged such that a ribbon 105 that is driven by the ribbon-supply-side roll 111 and the ribbon take-up roller 106 disposed on the backside thereof (that is, on the side to be bonded to the above-mentioned base tape 101) is pressed to the above-mentioned print head 10, thereby being brought in contact with the backside of this cover film 103.

The ribbon take-up roller 106 and the tape feeding roller 107 are driven to rotate by the transmission of a driving force of the above-mentioned motor to drive cartridge shaft 23 (refer to the above-described FIG. 2), being, for example, a pulse motor, provided outside of the cartridge 100 to the above-mentioned ribbon take-up roller driving shaft 11 and the above-mentioned feeding roller driving shaft 12.

In the cartridge 100 of the above-mentioned construction, the base tape 101 fed out from the above-mentioned first roll 102 is fed to the tape feeding roller 107. Whereas, the cover film 103 fed out from the second roll 104 is arranged such that the ink ribbon 105 that is driven by the ribbon-supply-side roll 111 and the ribbon take-up roller 106 disposed on the backside thereof (that is, on the side to be bonded to the above-mentioned base tape 101) is pressed to the above-mentioned print head 10, thereby being brought in contact with the backside of this cover film 103.

Then, when the cartridge 100 is mounted at the cartridge holder part of the above-mentioned apparatus main body 8, and a roll holder (not illustrated) is moved from the separation position to the contact position, the cover film 103 and the ink ribbon 105 are sandwiched between the print head 10 and the platen roller 108, as well as the base tape 101 and the cover film 103 are sandwiched between the tape feeding roller 107 and the sub roller 109. Subsequently, by a driving force of the motor to drive cartridge shaft 23, the ribbon take-up roller 106 and the tape feeding roller 107 are driven to rotate in synchronization in directions indicated by an arrow B and an arrow D respectively. At this time, the above-described feeding roller driving shaft 12, and the above-mentioned sub roller 109 and platen roller 108 are connected through a gear (not illustrated); the tape feeding roller 107, the sub roller 109 and the platen roller 108 are rotated accompanied by the movement of the feeding roller driving shaft 12; and the base tape 101 is fed out from the first roll 102, and fed to the tape feeding roller 107 as described above. On the other hand, the cover film 103 is fed out from the second roll 104, as well as a plurality of heater elements of the print head 10 is energized by the above-mentioned print-head driving circuit 25. As a result, a print R (refer to the below-described FIG. 7) is printed on the backside of the cover film 103. Then, the above-mentioned base tape 101 and the above-mentioned cover film 103 on which the above-mentioned printing has been ended, are bonded together to be in a single unit with the above-mentioned tape feeding roller 107 and sub roller 109, formed as the tag label tape 110 with print, and carried-out to the outside of the cartridge 100. Incidentally, when the ink ribbon 105 with which the print onto the cover film 103 has been ended, the ink ribbon 105 is wound around the ribbon take-up roller 106 driven by the ribbon take-up roller driving shaft 11.

Figure 4A:
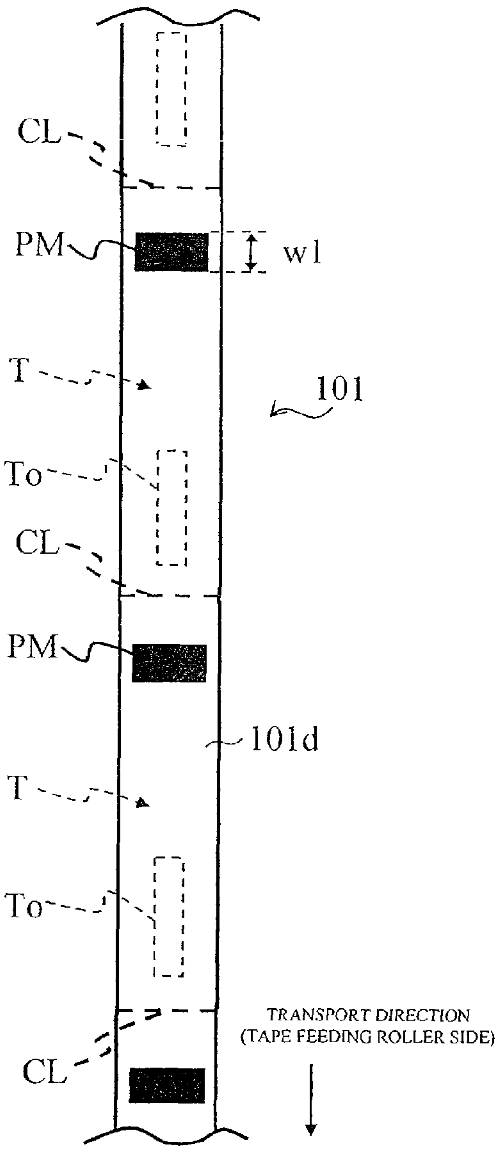
FIGS. 4A and 4B are fragmentary views of a base tape taken in a direction indicated by an arrow E in FIG. 3 illustrating a detailed structure viewed from the backside thereof.
Figure 4B:
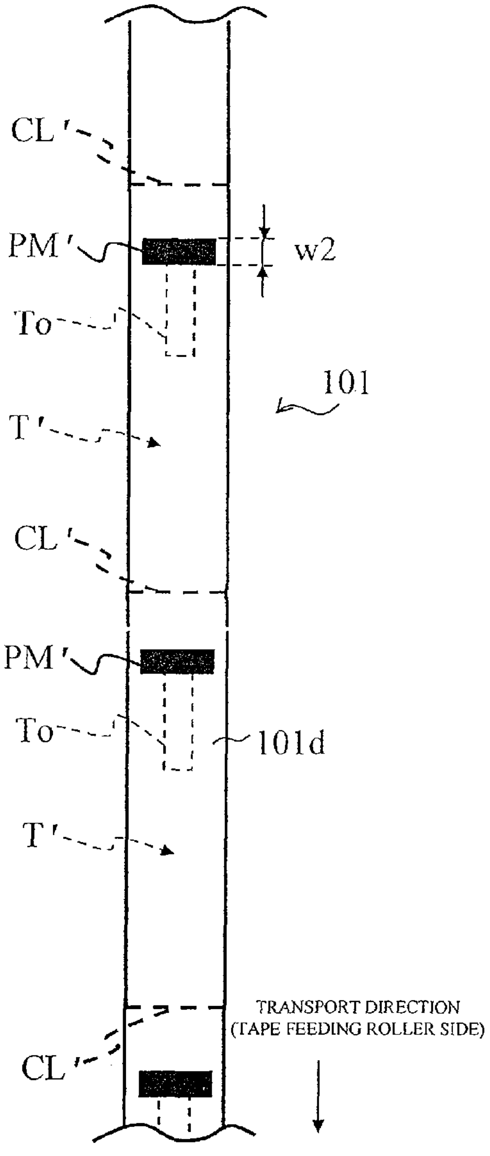

FIGS. 4A and 4B are fragmentary views taken in a direction indicated by an arrow E in FIG. 3 illustrating a detailed structure of the base tape 101 viewed from the face on one side thereof.

In FIGS. 4A and 4B, at the above-mentioned separation sheet 101*d* of each base tape 101, each cut mark (identifier) for positioning a cut position CL by means of the cutter 15 is provided in the proximity of an end on the upstream side in a transport direction in each RFID label T to be finally produced. This cut mark PM positions the cut position CL with a provision position thereof, as well as shows a label longitudinal layout position of the RFID circuit element To in the RFID label T with a mark width thereof. For example, in the case illustrated in FIG. 4A, with the cut mark PM, the cut position CL is positioned such that the RFID label T to be produced includes the RFID circuit element To on one side (on the lower side in FIG. 4A) in the label longitudinal direction, and the mark width at this time is w1. Furthermore, in the case illustrated in FIG. 4B, with a cut mark PM', a cut position CL' is positioned such that a RFID label T' to be produced includes the RFID circuit element To on the other side (on the upper side in FIG. 4B) in the label longitudinal direction, and the mark width at this time is w2. Further, the layout interval between the adjacent cut marks PM and PM' is substantially the same as the layout interval of the RFID circuit elements To, and as a result, the RFID label T, T' including the RFID circuit element To on one side or on the other side in the longitudinal direction is to be continuously produced. Incidentally, hereinafter, in this embodiment, as illustrated in FIG. 4A, described is the case where the width of the cut mark PM is w1, and the RFID label to be produced includes the RFID circuit element To on one side (on the lower side in FIG. 4A) in the longitudinal direction.

The above-described photo sensor 19 (refer to FIG. 2) functions to detect the cut mark PM, and as described below, detects the cut mark PM as the tag label tape 110 is conveyed and inputs a corresponding detection signal to the control circuit 30. At this time, the control circuit 30 to which the detection signal has been input is arranged so as to detect a mark width from a known feeding speed and a time period in which the cut mark PM is detected, thus enabling to detect the layout position of the above-mentioned RFID circuit element To.

Figure 5:
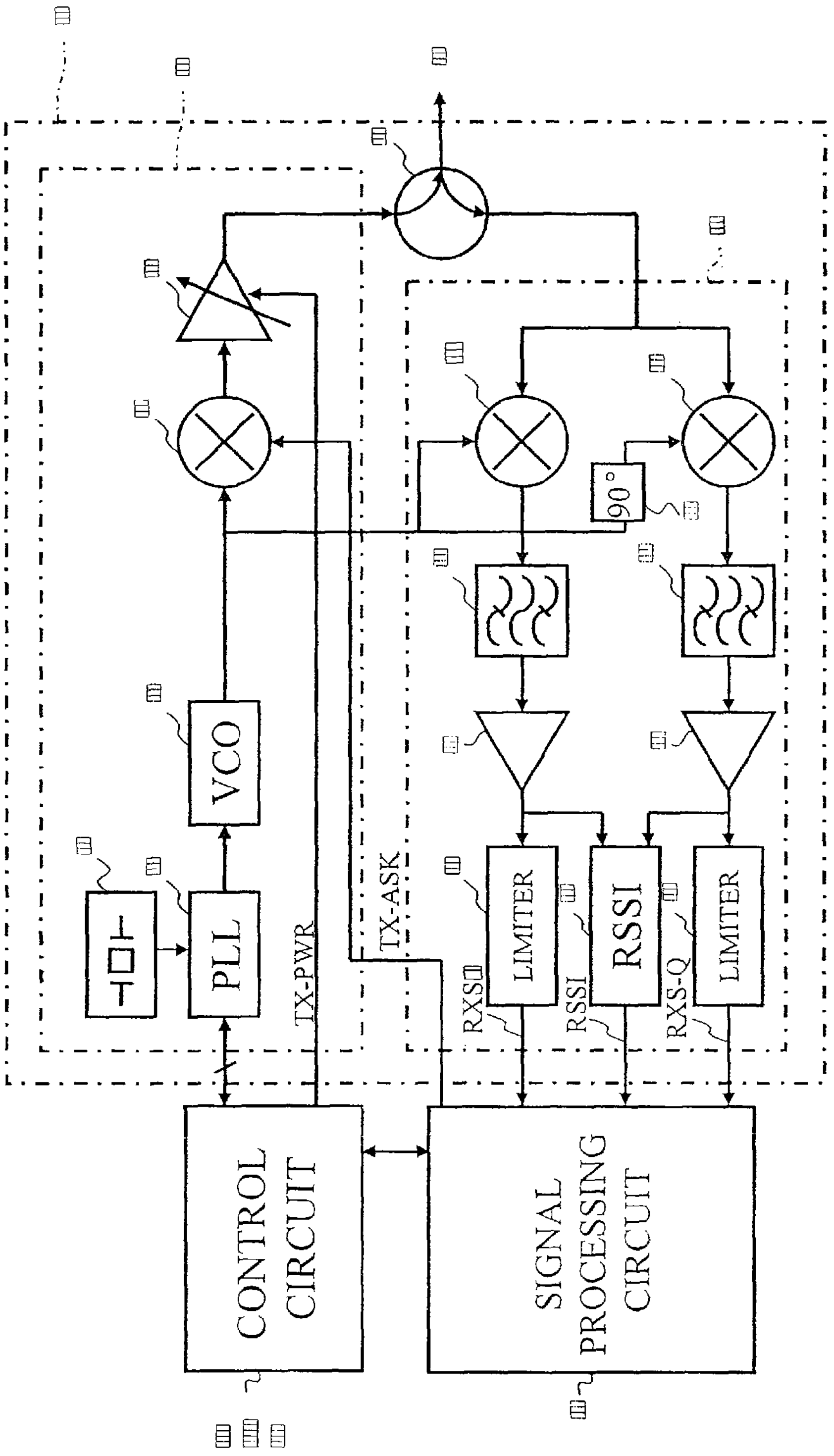
FIG. 5 is a functional block diagram illustrating a detailed function of a radio frequency circuit.

FIG. 5 is a functional block diagram showing a detailed function of the above-mentioned radio frequency circuit 21. In this FIG. 5, the radio frequency circuit 21 is formed of a transmitting portion 32 configured to transmit a signal to the RFID circuit element To via the antenna 14, a receiving portion 32 configured to input a reflected wave from the RFID circuit element To received by the antenna 14, and a transmit-receive splitter 34.

The transmitting portion 32 is provided with an crystal oscillator 35 configured to generate carrier wave for accessing (read in this example, and including write as well in the below-described variation) to RFID tag information of the IC circuit part 151 of the RFID circuit element To in response to a control signal (carrier wave generating instruction signal) from the control circuit 30 (incidentally, a control circuit 130 according to the below-described second embodiment is also illustrated together); PLL (Phase Locked Loop) 36; VCO (Voltage Controlled Oscillator) 37; a transmission multiplying circuit 38 of modulating (in this example, modulating an amplitude based on "TX_ASK" signal from the signal processing circuit 22) the above-mentioned carrier wave generated based on a signal to be supplied from the above-mentioned signal processing circuit 22 (however, in the case of amplitude modulation, e.g., an amplification factor-variable amplifier may be used); and a variable transmission amplifier 39 configured to determine an amplification factor with "TX_PWR" signal from the control circuit 30 and to amplify the modulated wave (RFID tag information) modulated by this transmission multiplying circuit 38. Moreover, the above-mentioned carrier wave to be generated preferably employs a frequency in UHF bands or microwave bands, and the output from the above-mentioned transmission amplifier 39 is transmitted to the antenna 14 via the transmit-receive splitter 34 to be fed to the IC circuit part 151 of the RFID circuit element To. Incidentally, the RFID tag information is not limited to a modulated signal as mentioned above, but may be only a mere carrier wave as well.

The receiving portion 33 is provided with a first receiving signal multiplying circuit 40 configured to multiply a reflected wave from the RFID circuit element To received by the antenna 14 by the above-mentioned generated carrier wave; a first band path filer 41 configured to take-in only a signal in a necessary band from outputs from this first receiving signal multiplying circuit 40; a first receiving signal amplifier 43 configured to amplify the output from this first band-pass filer 41; a first limiter configured to further amplify the output from this first receiving signal amplifier 43 to convert it into a digital signal; a second receiving signal multiplying circuit 44 configured to multiply the above-mentioned reflected wave from the RFID circuit element To received by the antenna 14 by the above-mentioned carrier wave obtained by delaying a phase 90° by using a phase shifter 49 after generated; a second band-pass filter 45 configured to take-in only a signal in a necessary band from outputs from this second receiving signal multiplying circuit 44; a second receiving signal amplifier 47 configured to amplify the output from this second band-pass filter 45; and a second limiter 46 configured to further amplify the output from this second receiving signal amplifier to convert it into a digital signal. Furthermore, a signal "RXS-I" to be output from the above-mentioned first limiter 42 and a signal "RXS-Q" to be output from the above-mentioned second limiter 46 are input to the above-mentioned signal processing circuit 22 to be processed.

In addition, the output from the first receiving signal amplifier 43 and the second receiving signal amplifier 47 are also input to a RSSI (Received Signal Strength Indicator) circuit 48, and a signal "RSSI" indicating the strength of these signals is to be input to the signal processing circuit 22. With the arrangement, in the apparatus 2 for communicating with a RFID tag according to this embodiment, demodulated is a reflected wave from the RFID circuit element To using an I-Q quadrature demodulation.

Figure 6:
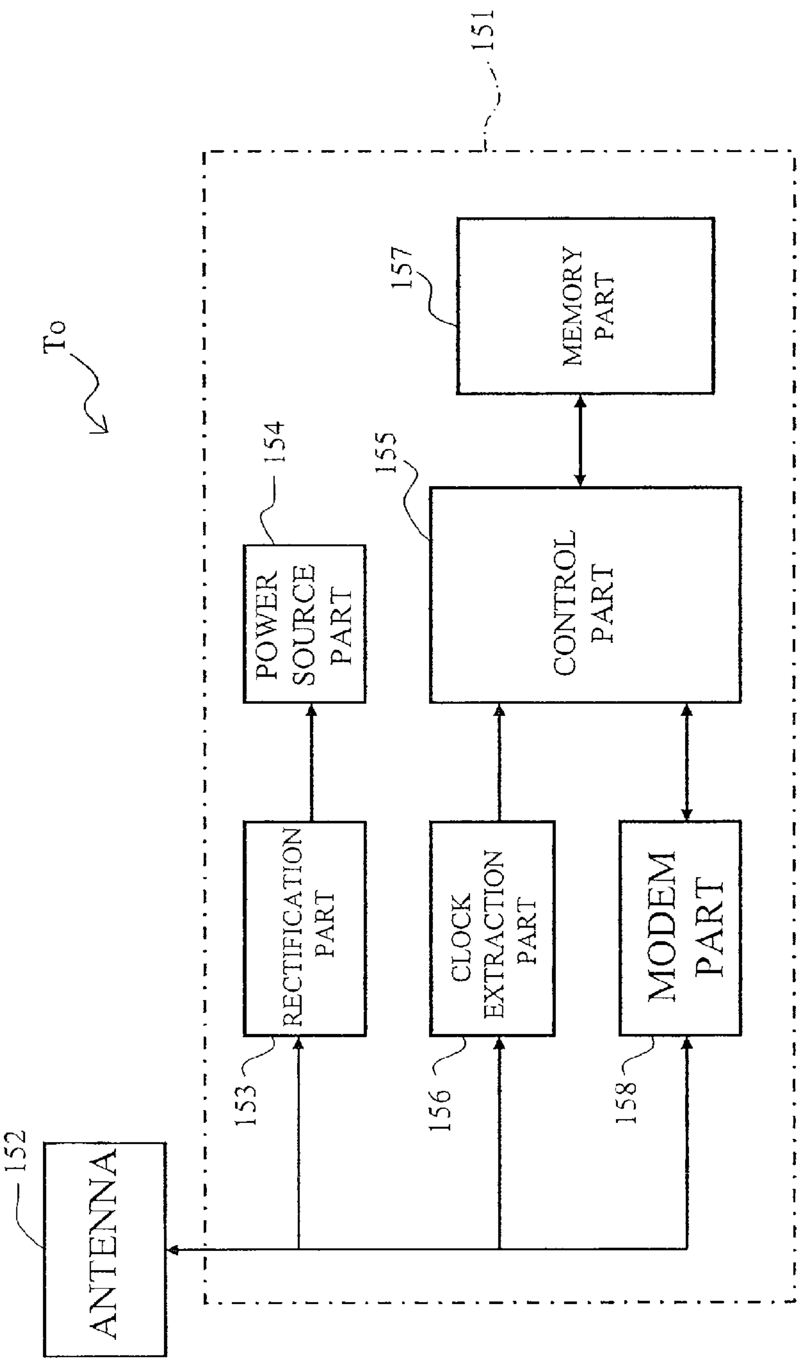
FIG. 6 is a functional block diagram illustrating a functional arrangement of a RFID circuit element.

FIG. 6 is a functional block diagram showing a functional arrangement of the above-mentioned RFID circuit element To. In this FIG. 6, the RFID circuit element To includes the above-mentioned antenna 152 configured to transmit/receive a signal contactlessly by using a radio frequency such as UHF bands with the antenna 14 on the apparatus 2 for communicating with a RFID tag side, and the above-mentioned IC circuit part 151 connected to this antenna 152.

The IC circuit part 151 is provided with a rectification part 153 configured to rectify a carrier wave received from the antenna 152, a power source part 154 configured to accumulate the energy of the carrier wave rectified at this rectification part 153 to let it be a driving power source; a clock extraction part 156 configured to take-in a clock signal from the carrier wave received by the above-mentioned antenna 152 to supply it to a control part 155; a memory part 157 in which a predetermined information signal can be stored; a modem part 158 connected to the above-mentioned antenna 152; and the above-mentioned control part 155 configured to control operation of the above-mentioned RFID circuit element To via the modem part 158, the rectification part 153, clock extraction part 156, modem part 158 and the like.

The modem part 158 demodulates a communication signal from the antenna 14 of the above-mentioned apparatus 2 for communicating with a RFID tag that is received by the antenna 152, as well as modulates and reflects the carrier wave received by the antenna 152 based on a response signal from the above-mentioned control part 155.

The control part 155 conducts basic controls such as the control of interpreting a receiving signal demodulated by the above-mentioned modem part 158, of generating a reply signal based on an information signal stored in the above-mentioned memory part 157, and of making a replay with the above-mentioned modem part 158.

Figure 7A:
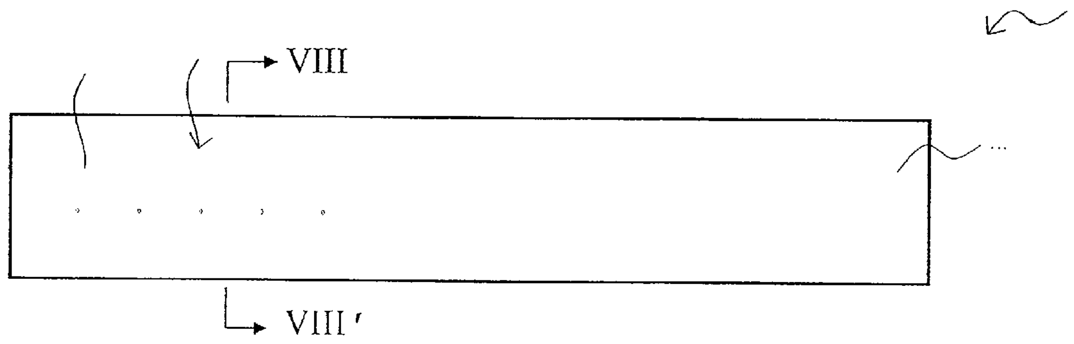
FIGS. 7A and 7B are a top view and a bottom view illustrating one example of an external appearance of the RFID label.
Figure 7B:
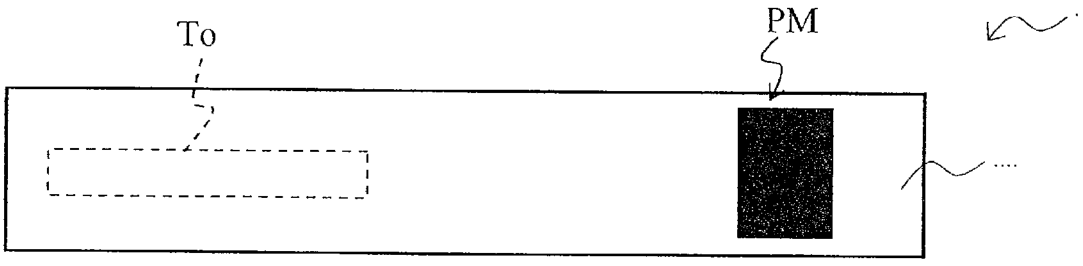

FIGS. 7A and 7B are views illustrating one example of an external appearance of a RFID label T formed by the completion of information write of the RFID circuit element To and cutting the tag label tape 110 with print as described above; and FIG. 7A is a top view (that is, a view taken from the cover film 103 side) and FIG. 7B is a bottom view (that is, a view taken from the separation sheet 101*d* side). Furthermore, FIG. 8 is a cross sectional view in VIII-VIII' cross section in FIG. 7.

Figure 8:
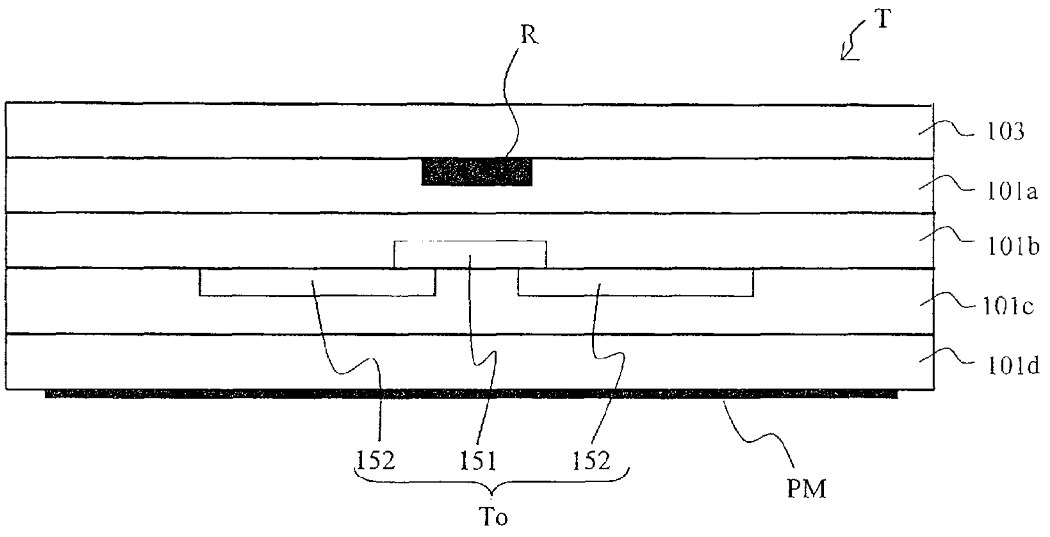
FIG. 8 is a cross sectional view in VIII-VIII' cross section in FIG. 7A.

In these FIGS. 7A, 7B, and 8, the RFID label T is of a five-layer structure in which the cover film 103 is added to the four-layer structure illustrated in FIG. 3, and from the cover film 103 side (on the upper side in FIG. 8) toward the opposite side thereof (on the lower side in FIG. 8), the cover film 103, the adhesive layer 101*a*, the base film 101*b*, the adhesive layer 101*c*, and the separation sheet 101*d* form five layers. Then, as described above, the RFID circuit element To including the antenna 152 that is provided on the backside of the base film 101*b* is disposed in the adhesive layer 101*c*, as well as a print R (in this example, letters of "RF-ID" showing the kind of the RFID label T) are printed in a print region S on one side (on the left side in FIG. 7) in the longitudinal direction on the backside of the cover film 103. Furthermore, also on the surface of the separation sheet 101*d*, the cut mark PM is provided, for example, by printing as described above.

Figure 9:
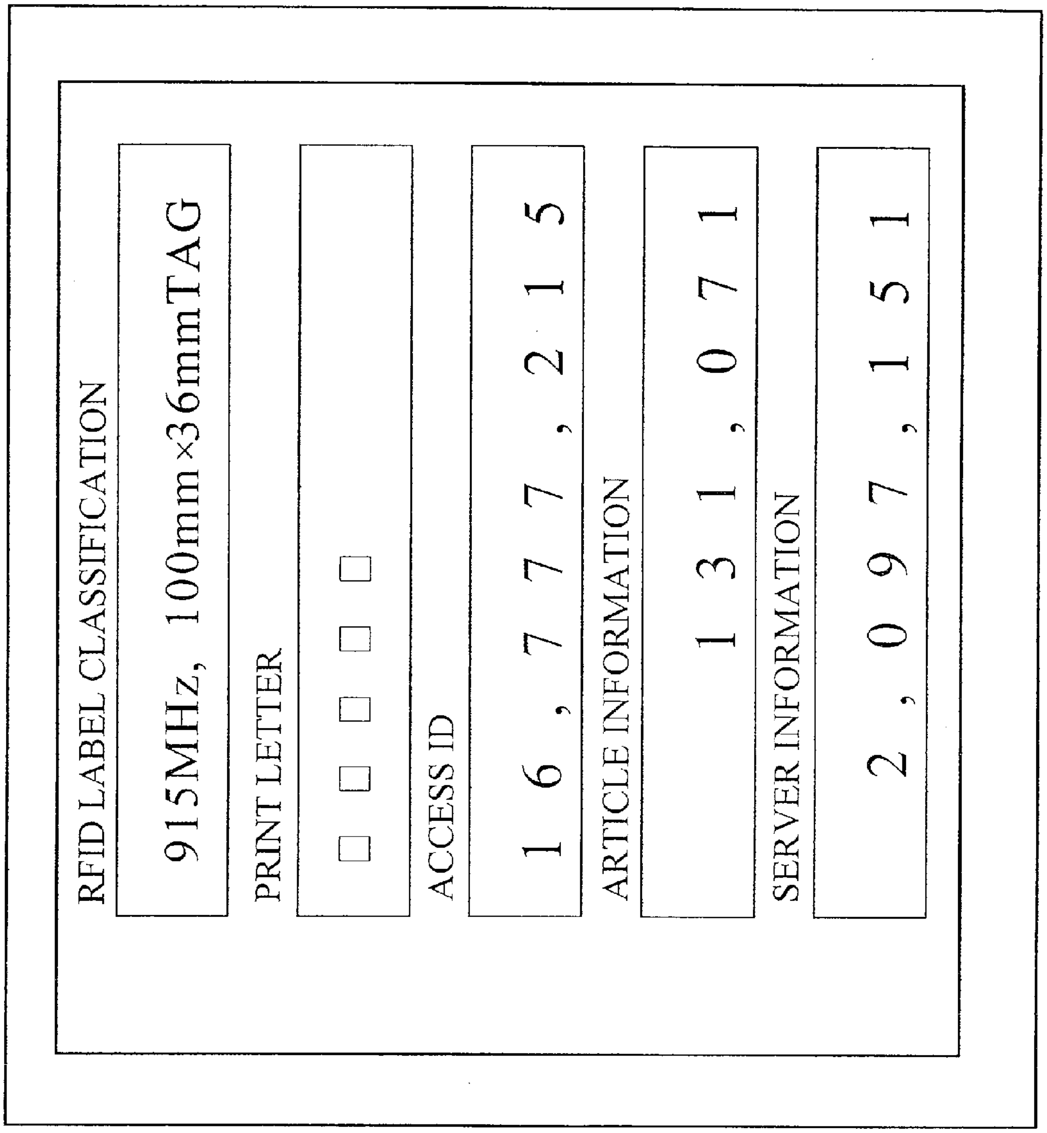
FIG. 9 is a view illustrating one example of a screen displayed on a terminal or a general purpose computer when accessing to RFID tag information.

FIG. 9, when accessing (read or write) RFID tag information of the IC circuit part 151 of the RFID circuit element To using the apparatus 2 for communicating with a RFID tag as described above, is a view illustrating one example of a screen to be displayed on the above-mentioned terminal 5 or general purpose computer 6.

In FIG. 9, in this example, a RFID label kind, a print letter R printed corresponding to the RFID circuit element To, an access (read or write) ID, being an ID specific to this RFID circuit element To, and an address of an article information stored in the above-mentioned information server 7, a destination address of a corresponding information thereof in the above-mentioned route server 4, and the like, can be displayed on above-mentioned terminal 5 and general purpose computer 6. Furthermore, at the time of producing a tag, the apparatus 2 for communicating with a RFID tag is operated by the operation of these terminal 5 or general purpose computer 6, thus the above-mentioned print letter R is printed on the cover film 103, as well as RFID tag information such as article information having preliminarily been stored in the IC circuit part 151 of the RFID circuit element To is read (or information such as the above-mentioned write ID and article information is written in the IC circuit part 151).

Incidentally, although in the above-mentioned description, shown is the example in which accompanied by a printing operation, the feeding guides 13 are held in an access area with respect to the tag label tape 110 with print being moved to access (read or write), it is not limited to this example, but the above-mentioned access may be conducted in a state in which this tag label tape 110 with print is stopped in a predetermined position and held by the feeding guides 13.

Moreover, on the occasion of read or write as mentioned above, a corresponding relation between an ID of the RFID label T generated and information read from the IC circuit part 151 of the RFID label T (or information written in the IC circuit part 151) is stored in the above-described route server 4, and can be referred as necessary.

Here, the largest feature of the present invention is that the apparatus 2 for communicating with a RFID tag functions to produce a RFID label T of various layout aspects of a print letter R and a RFID circuit element To, and in particular, that in this embodiment, in both two print modes of vertical writing or horizontal writing, four kinds of layout aspects (that is, a total of 8 kinds of print aspects) in accordance with the position in a label longitudinal directional of the print letter R and the RFID circuit element To have preliminarily been set respectively, and by an arbitrary layout aspect being selected by an operator (user) out of these eight kinds of print aspects, the apparatus 2 for communicating with a RFID tag produces the RFID label T based on this selection. Hereinafter, descriptions thereof will be made.

FIGS. 10E to 10H are top views illustrating RFID labels T of four kinds of layout aspects of the above-mentioned print letter R and RFID circuit element To in a print mode of horizontal writing. FIGS. 10A to 10D are views for illustrating a corresponding positional relation between a tape and a print buffer (a forward-directional print buffer part 30*b* or a rotation-directional print buffer part 30*c*) when making a print of each of the above-mentioned RFID labels T of four kinds of layout aspects (details will be described later). Each RFID label T illustrated in the above-mentioned FIGS. 10E to 10H corresponds to a RFID label showing four kinds of layout aspects the operator selects. Incidentally, in these FIGS. 10A to 10H, the print letter R is simply shown as "ABC".

In FIGS. 10A to 10H, a RFID label T1H is a RFID label of a layout aspect in which both the print letter R and the RFID circuit element To are positioned on one side (on the left side in the drawing) in the longitudinal direction; a RFID label T2H is a RFID label of a layout aspect in which both the print letter R and the RFID circuit element To are positioned on the other side (on the right side in the drawing) in the longitudinal direction; a RFID label T3H is a RFID label of a layout aspect in which the print letter R is positioned on the other side (on the right side in the drawing) in the longitudinal direction, and the RFID circuit element To is positioned on one side (on the left side in the drawing) in the longitudinal direction; and a RFID label T4H is a RFID label of a layout aspect in which the print letter R is positioned on one side (on the left side in the drawing) in the longitudinal direction, and the RFID circuit element To is positioned on the other side (on the right side in the drawing) in the longitudinal direction.

On the other hand, FIGS. 11E to 11H are top view illustrating RFID labels T of four kinds of layout aspects of the above-mentioned print letter R and RFID circuit element To in a print mode of vertical writing. FIGS. 11A to 11D are views for illustrating a corresponding positional relation between a tape and a print buffer (a forward-directional print buffer part 30*b* or a rotation-directional print buffer part 30*c*) when making a print of each of the above-mentioned RFID labels T of four kinds of layout aspects (details will be described later).

In FIGS. 11A to 11H, a RFID label T1V is a RFID label of a layout aspect in which both the print letter R and the RFID circuit element To are positioned on one side (on the upper side in the drawing) in the longitudinal direction; a RFID label T2V is a RFID label of a layout aspect in which both the print letter R and the RFID circuit element To are positioned on the other side (on the lower side in the drawing) in the longitudinal direction; a RFID label T3V is a RFID label of a layout aspect in which the print letter R is positioned on the other side (on the lower side in the drawing) in the longitudinal direction, and the RFID circuit element To is positioned on one side (on the upper side in the drawing) in the longitudinal direction; and a RFID label T4V is a RFID label of a layout aspect in which the print letter R is positioned on one side (on the lower side in the drawing) in the longitudinal direction, and the RFID circuit element To is positioned on the other side (on the right side in the drawing) in the longitudinal direction.

Figure 12:
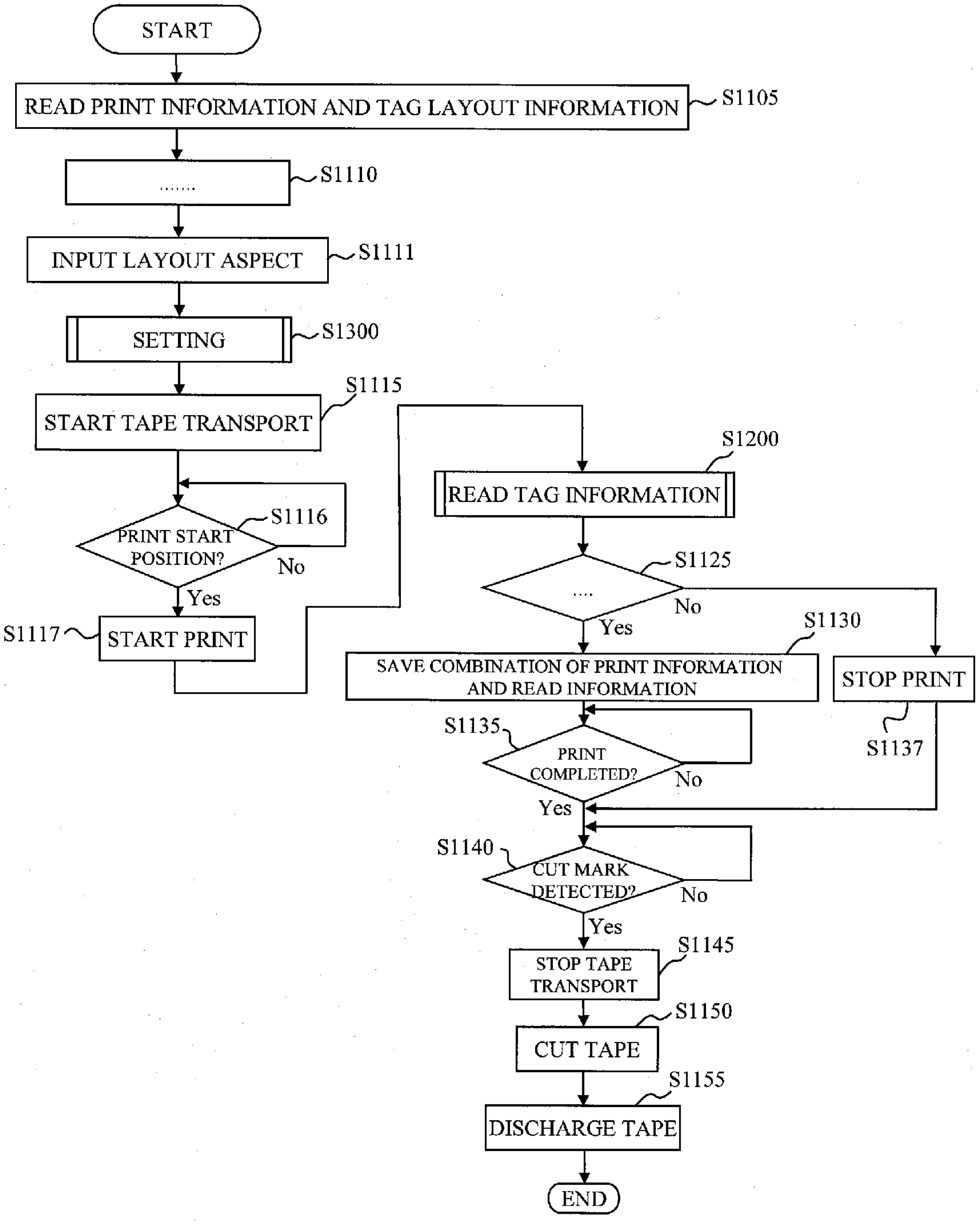
FIG. 12 is a flowchart illustrating a control procedure to be executed by a control circuit.

FIG. 12 is a flowchart showing a control procedure to be executed by the control circuit 30 when various layout aspects of the above-described RFID labels T are produced, that is the cover film 103 is fed, while a predetermined print is being made with the print head 10, and bonded with the base tape 101 to be the tag label tape 110 with print, and thereafter the tag label tape 110 with print are cut every RFID circuit element To, to obtain a RFID label T.

In this FIG. 12, when a read operation of the apparatus 2 for communicating with a RFID tag is performed, this flow is started. First, in Step S1105, a print information to be printed onto the RFID label T using the print head 10 which print information has been input via the above-mentioned terminal 5 or general purpose computer 6 acts as an operation means, is read via the communication line 3 and the input/output interface 31. Furthermore, the layout information (here, on one side in the longitudinal direction of the RFID label) of the RFID circuit element To corresponding to a mark width of the cut mark PM that has been detected by the above-mentioned photo sensor 19 is read.

Thereafter, in Step S1110, a variable N counting the number of times of making retries (number of times of access tries) with no response from the RFID circuit element To, and a flag F indicating whether the communication is good or bad, are initialized to be zero.

Subsequently, in Step S1111, the layout aspect (that is any one of eight kinds of the above-mentioned RFID labels T1H to T4H, T1V to T4V) of the RFID label T input via the above-mentioned terminal 5 or general purpose computer 6 by an operator is read out via the communication line 3 and the input/output interface 31.

Incidentally, the input of the layout aspect of the RFID label T by the above-mentioned operator is conducted by selecting one RFID label with the use of a proper input means out of the RFID labels T1H to T4H, T1V to T4V illustrated in FIGS. 10E to 10H or FIGS. 11E to 11H that are shown on display means (e.g., display) of the above-mentioned terminal 5 or general purpose computer 6. Incidentally, the selection is not made from the layout aspects displayed in such a way, but may be done by inputting respective positions of a print position (to the left/to the right or on the upper side/on the lower side) and a RFID circuit element To position (to the left/to the right or on the upper side/on the lower side) using a proper input means of the terminal 5 or the general purpose computer 6.

Then, in Step S1300, based on the layout-information of a RFID tag input in the step S1105 and the aspect of the RFID label T read in Step S1111, the tape feeding amount to a print start position, and the print direction (forward direction or rotation direction) that are based on the label aspect thereof are set.

Thereafter, in Step S1115, a control signal is output to the cartridge shaft driving circuit 24, and the ribbon take-up roller 106 and the tape feeding roller 107 are driven to rotate by a driving force of the motor to drive cartridge shaft 23. With the arrangement, the base tape 101 is fed out from the first roll 102 to be fed to the tape feeding roller 107, and the cover film 103 is fed out from the second roll 104. Furthermore, a control signal is output to the tape-feeding-roller motor 28 via the tape-feeding-roller driving circuit 29, and the feeding roller 17 is driven to rotate. Incidentally, at this time, the print head has not been energized yet, and no print is made on the cover film 103.

In the next Step S1116, it is determined whether or not the tag label tape 110 has reached the print start position by the transport in the step S1115, that is whether or not a transport amount of the tag label tape 110 not printed fed in the step S1115 becomes a tape feed amount set in the previous Step S 1300. The determination of a transport amount at this time, based on a detection result made by the photo sensor 19 of the cut mark PM provided on the RFID label T that has been produced before the RFID label T being produced at the moment, may be conducted, for example, by counting the number of pulses the cartridge shaft driving circuit 24 drives the above-mentioned motor to drive cartridge shaft 23, being a pulse motor. In the case where the determination is satisfied, the operation goes to Step S1117.

In Step S1117, a control signal (refer to the later-described FIG. 14 for details) based on the print direction (forward direction or rotation direction) set in the step 1300 is output to the print-head driving circuit 25, to energize the print head 10. As a result, in a predetermined print region S (region corresponding to a selected print aspect), a print R such as letters, signs, and bar codes read in Step S1105 is printed based on the print direction (forward direction or rotation direction) set in the step S1300. As a result, the base tape 101 and the above-mentioned cover film 103 onto which the above-mentioned print has been made are bonded to be an single unit by the above-mentioned tape feeding roller 107 and sub roller 109, formed as the tag label tape 110 with print, and fed out to the outside of the cartridge body 100.

Thereafter, in Step S1200, a tag information read processing is performed, an inquiry signal for read is transmitted to the RFID circuit element To, and a reply signal including the RFID tag information is received to be read (details will be shown in the later-described FIG. 15). After the operation in this Step S1200 has been ended, the operation goes to Step S1125.

In Step S1125, it is determined whether or not flag F=0. In the case where a read processing has been normally completed, it is with F=0 (refer to Step S1280 in the flow shown in FIG. 15 to be described later), so that this determination is satisfied, and the operation goes to Step S1130.

In Step S1130, the combination of information read from the RFID circuit element To in the step S1200, and print information printed by the print head 10 already based on this information, is output via the terminal 5 or the general purpose computer 6 through the input/output interface 31 and the communication line 3, and stored in the information server 7 or the route server 4. Incidentally, this stored data is stored and held in, for example, a database so as to be capable of being referred from the terminal 5 or the general purpose computer 6 when necessary.

Thereafter, the determination of Step S1135 is repeated until the completion of all the prints onto a print region S corresponding to the RFID circuit element To, being an object to be processed at this time point of the cover film 103, and after the print has been ended, the operation goes to Step S1140.

Incidentally, in the above-described Step S 1125, in the case where a read processing has not been normally completed for some reasons, F=1 (refer to Step S1280 of a flow illustrated in the below-described FIG. 15), so that the determination in S1125 is not satisfied, the operation goes to Step S1137, and a control signal is output to the print-head driving circuit 25 to stop energizing the print head 10, thus stopping the print. By this halfway stop of the print, it is clearly displayed that this RFID circuit element To is not a normal product, and thereafter the operation goes to Step S1140.

In Step 1140, it is determined whether or not the tag label tape 110 with print is further fed, and then the cut mark PM on the separation sheet 101*d* is detected using the above-mentioned photo sensor 19. In the case where the determination is satisfied, the operation goes to Step S1145.

In Step S1145, in response to the detection of the above-mentioned cur mark PM, a control signal is output to the cartridge shaft driving circuit 24 and the tape-feeding-roller driving circuit 29, the motor to drive cartridge shaft 23 and the tape-feeding-roller motor 28 is stopped to drive, and thus the rotation of the ribbon take-up roller 106, the tape feeding roller 107, and the feeding roller 17 is stopped. With the arrangement, the feeding-out of the base tape 101 from the first roll 102, the feeding-out of the cover film 103 from the second roll 104, and the transport of the tag label tape 110 with print conducted by the feeding roller 17 are stopped, and the above-mentioned cut line CL provided on the separation sheet 101*d* is in a position of being just sandwiched between the blades of the cutter 15 (a layout positional relation has preliminarily been set so as to be done).

Thereafter, in Step S1150, a control signal is output to the solenoid driving circuit 27 to drive the solenoid 26, and using the above-mentioned blades of the cutter 15, the tag label tape 110 with print is cut (divided) on the above-mentioned cut line CL. As a result, as described above, produced is a label-like RFID label T including the RFID circuit element To on one side in the longitudinal direction, as well as provided with a predetermined aspect of print.

Thereafter, the operation goes to Step S1155, a control signal is output to the tape-feeding-roller driving circuit 29, the tape-feeding-roller motor 28 is started to drive again, and the feeding roller 17 is rotated. As a result, the transport by the feeding roller 17 is started again, and thus the RFID label T have been produced in a label state in the step S1150 is fed toward the carry-out exit 16, and further carried-out to the outside of the apparatus 2 from the carry-out exit 16.

With the arrangement, a RFID label T of each aspect illustrated in the above-described FIGS. 10E to 10H and FIGS. 11E to 11H is produced.

Figure 13:
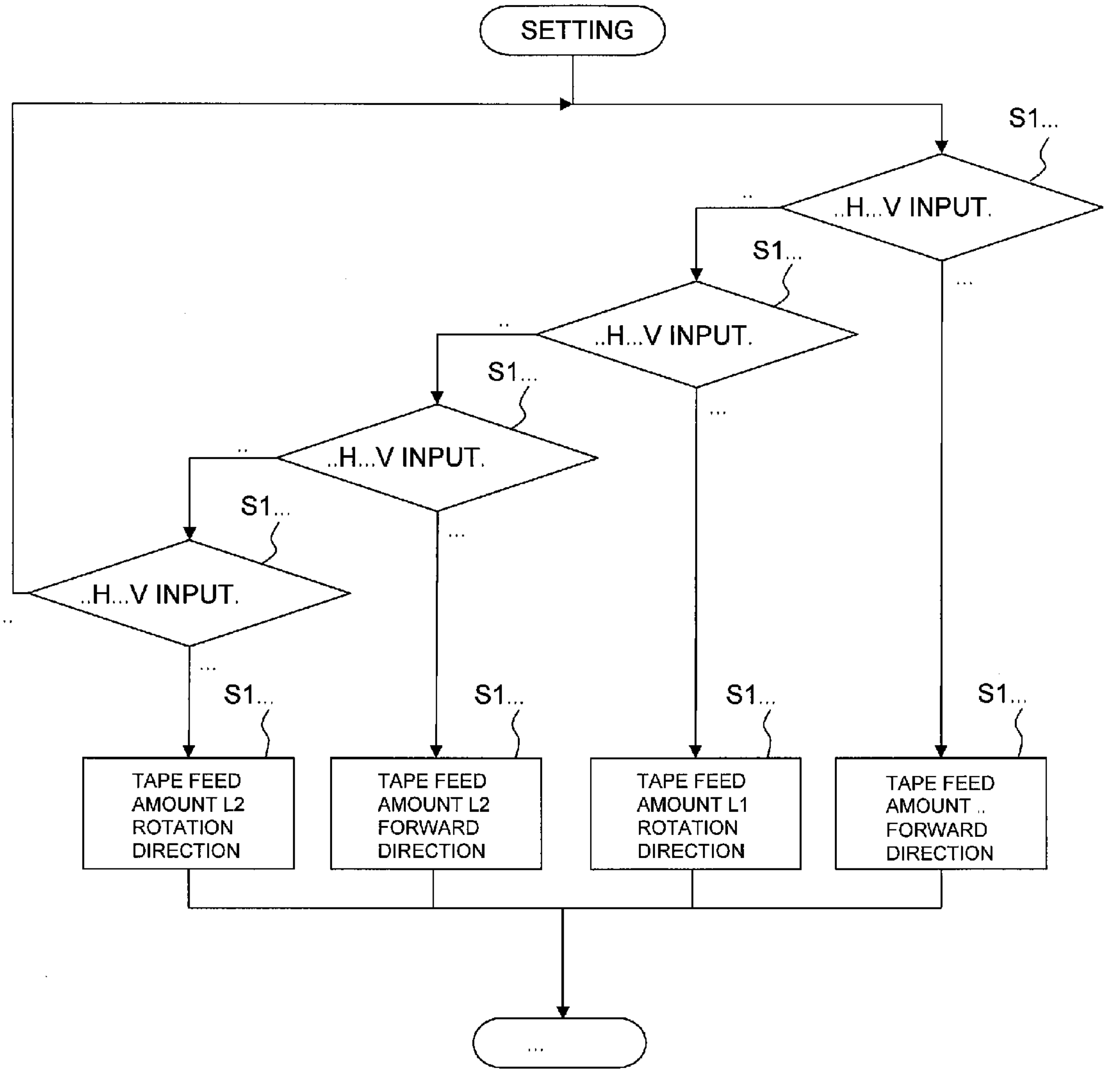
FIG. 13 is a flowchart illustrating a detailed procedure of Step S1300 illustrated in FIG. 12.

FIG. 13 is a flowchart showing a detailed procedure in the above-described Step S1300. In this FIG. 13, first, in Step S1310, it is determined whether or not the layout aspect of the RFID label T input in Step S1111 of FIG. 12 is T1H or T1V. When the determination is satisfied, the operation goes to Step S1320, based on layout-information of a RFID tag input in Step S1105 of FIG. 12, and a tape feed amount and a print direction are set. Here, the tag layout is on one side (on the left side in FIG. 10) in the longitudinal direction, so that the tap feed amount is set to be L1, and the print direction is set to be a forward direction. Here, L1, as illustrated in FIGS. 10A and 10B, and FIGS. 11A and 11B, a distance from an end on one side of the RFID label T in the case where the print letter R is located on one side (on the left side in FIG. 10, and on the upper side in FIG. 11) in the longitudinal direction, and a forward direction is a print direction in which letters are in a normal layout relation in the case the RFID circuit element To is located on one side (on the left side in FIG. 10 and on the upper side in FIG. 11) in the longitudinal direction. On the other hand, in the case where the determination is not satisfied, the operation goes to the next Step S1330.

In Step S1330, it is determined whether or not the layout aspect of the RFID label T input in Step S1111 of FIG. 12 is T2H or T2V. When the determination is satisfied, the operation goes to Step S1340, based on layout-information of a RFID tag input in Step S1105 of FIG. 12, and a tape feed amount and a print direction are set. Here, the tag layout is positioned on one side (on the left side in FIG. 10) in the longitudinal direction, so that the tape feed amount is set to be L1 and the print direction is set to be a rotation direction. Here, the rotation direction is a print direction in which letters are in a layout relation of being rotated 180 degrees in the case where the RFID circuit element To is located on one side (on the left side in FIG. 10 and on the upper side in FIG. 11) in the longitudinal direction. On the other hand, in the case where the determination is not satisfied, the operation goes to the next Step 1350.

In Step S1350, it is determined whether or not the layout aspect of the RFID label T input in Step S1111 of FIG. 12 is T3H or T3V. When the determination is satisfied, the operation goes to Step S1360, based on layout-information of a RFID tag input in Step S1105 of FIG. 12, and a tape feed amount and a print direction are set. Here, the tag layout is on one side (on the left side in FIG. 10) in the longitudinal direction, so that the tap feed amount is set to be L2 and the print direction is set to be a forward direction. Here, L2, as illustrated in FIGS. 10C and 10D, and FIGS. 11C and 11D, in the case where the print letter R is located on the other side (on the right side in FIG. 10, and on the lower side in FIG. 11) in the longitudinal direction, is a distance from an end on one side of the RFID label T. On the other hand, in the case where the determination is not satisfied, the operation goes to the next Step 1370.

In Step S1370, it is determined whether or not the layout aspect of the RFID label T input in Step S1111 of FIG. 12 is T4H or T4V. When the determination is satisfied, the operation goes to Step S1380, based on layout-information of a RFID tag input in Step S1105 of FIG. 12, a tape feed amount and a print direction are set. Here, the tag layout is on the other side (on the left side in FIG. 10) in the longitudinal direction, so that the tape feed amount is set to be L2 and the print direction is set to be a rotation direction. On the other hand, in the case where the determination is not satisfied, the operation returns to the next Step 1310, and the operations are repeated again from Step 1310.

Incidentally, the step S1320, Step S1340, Step S1360 and Step S1380 form determining means configured to determine whether the print in the forward direction is conducted or the print in the rotation direction is conducted.

Figure 14:
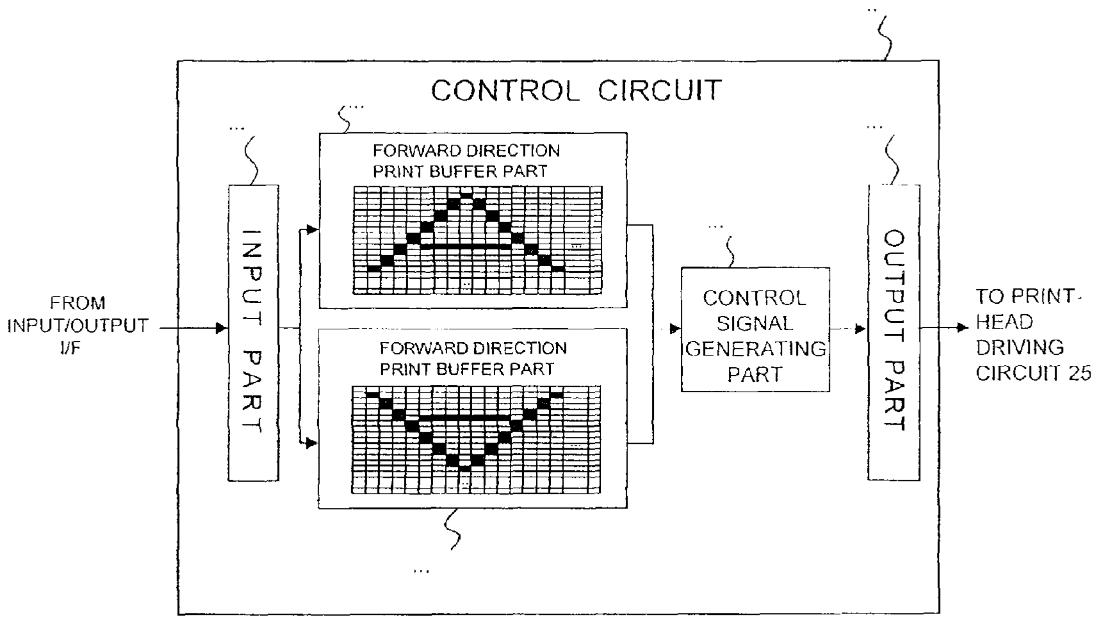
FIG. 14 is a functional block diagram illustrating a function relating to setting of a print direction of functions of the control circuit.

FIG. 14 is a functional block diagram illustrating the function of setting of a print direction (forward direction or rotation direction) among functions of the control circuit 30.

As illustrated in this FIG. 14, the control circuit 30 includes an input part 30*a* (print information input means), a forward direction print buffer part 30*b* (a first print data storage means), a rotation direction print buffer part 30*c* (a first print data storage means), a control signal generating part 30*d*, and an output part 30*e*.

The control circuit 30 is under an input operation via the terminal 5 or the general purpose computer 6 by an operator, and takes-in print information read via the communication line 3 and the input/output interface 31 in Step S1105 of FIG. 12 into the above-mentioned forward direction print buffer part 30*b* and rotation direction print buffer part 30*c* through the input part 30*a*.

The forward direction print buffer part 30*b* develops the print information input through the above-mentioned input part 30*a* on the buffer in a normal direction, and temporarily saves it. On the other hand, the rotation direction print buffer part 30*c* develops the print information input through the above-mentioned input part 30*a* on the buffer in a direction of being rotated 180 degrees, and temporarily saves it. Incidentally, in this FIG. 14, shown is the case where one letter of "A" is developed as one example of data on the buffer.

The control signal generating part 30*c*, in the case where the print direction is set to be the forward direction by setting shown in FIG. 13, reads data at the above-mentioned forward direction print buffer part 30*b*, and generates a control signal based on the forward direction. On the other hand, in the case where the print direction is set to be the rotation direction by setting shown in FIG. 13, reads data at the above-mentioned rotation direction print buffer part 30*c*, and generates a control signal based on the rotation direction.

Then, the forward direction control signal or rotation direction control signal generated at the above-mentioned control signal generating part 30*d* is output to the print-head driving circuit 25 through the output part 30*e*. With the arrangement, the print head 10 is energized so as to correspond to the print in the forward direction or in the rotation direction, and in a predetermined print region S of the cover film 103, the print R will be printed in accordance with the print direction (forward direction or rotation direction) set by setting shown in FIG. 13.

Figures 10A, 10B, 10C, 10D, 10E, 10F, 10G, 10H:
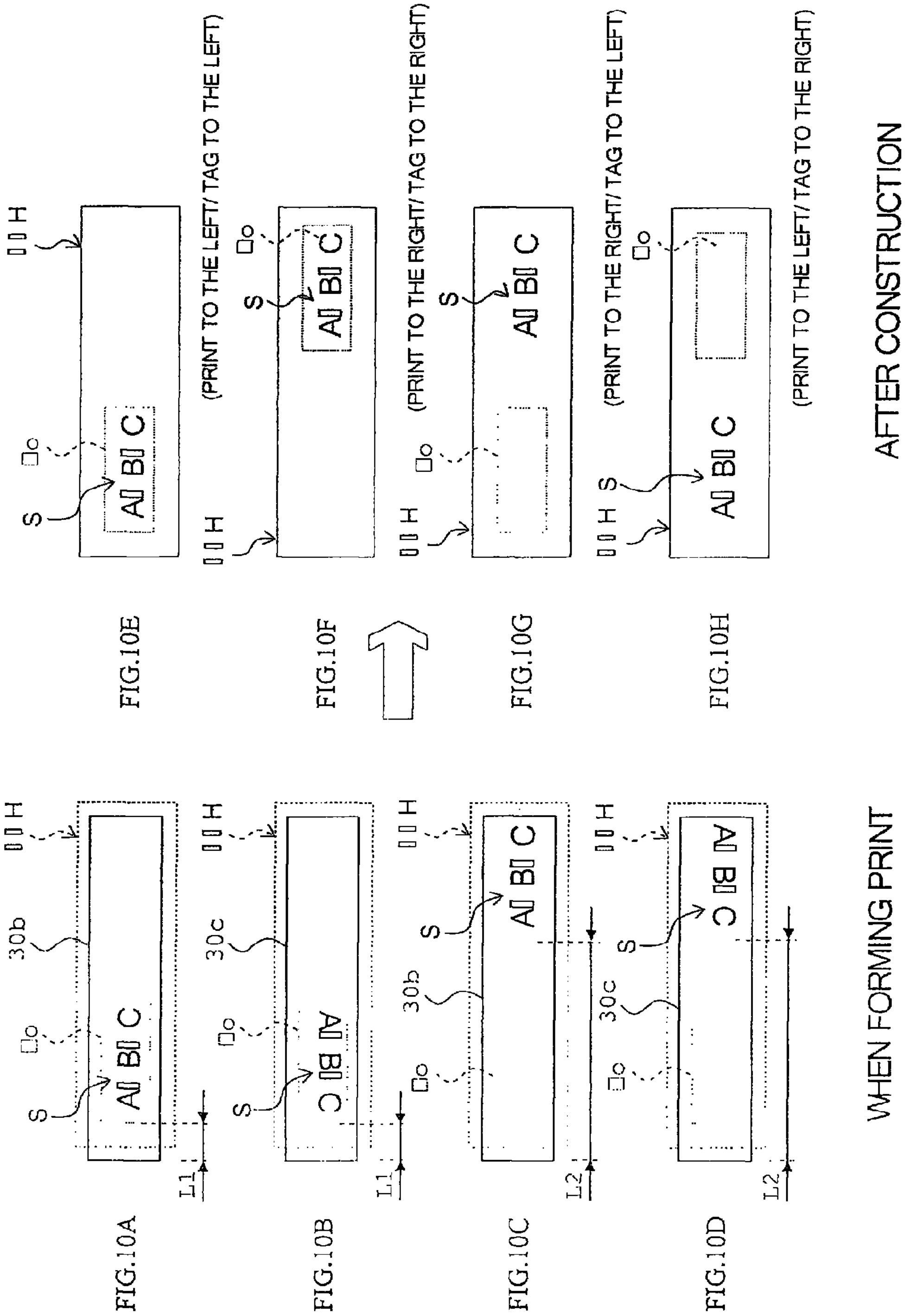
FIGS. 10A to 10H are top views illustrating RFID labels of four kinds of layout aspects of a print letter and a RFID circuit element in a print mode of horizontal writing.

Here, returning to the above-described FIGS. 10 and 11, the RFID labels T1H, T3H, T1V and T3V illustrated in these FIGS. 10 and 11 are a label aspect in which the print is conducted in the forward direction to be produced, so that the print is made based on data at the above-mentioned forward direction print buffer part 30*b*. That is, in the case of producing the RFID label T1H illustrated in FIG. 10E, as illustrated in FIG. 10A, the print is made based on a print data developed in the forward direction to one side (to the left in the drawing) on the forward direction print buffer part 30*b*; and in the case of producing the RFID label T2H illustrated in FIG. 10G, as illustrated in FIG. 10C, the print is made based on a print data developed in the forward direction to the other side (to the right in the drawing) on the forward direction print buffer part 30*b*. The RFID label T1V, T3V illustrated in FIG. 11 is the same. Whereas, the RFID labels T2H, T4H, T2V and T4V are a label aspect in which the print is made in the rotation direction to be produced, so that the print is made based on data at the above-mentioned rotation direction print buffer part 30*c*. That is, in the case of producing the RFID label T2H illustrated in FIG. 10F, as illustrated in FIG. 10B, the print is made based on a print data developed in the rotation direction to one side (to the left in the drawing) on the rotation direction print buffer part 30*c*; and in the case of producing the RFID label T4H illustrated in FIG. 10H, as illustrated in FIG. 10D, the print is made based on a print data developed in the rotation direction to the other side (to the right in the drawing) on the rotation direction print buffer part 30*c*. The RFID label T2V, T4V illustrated in FIG. 11 is the same.

Figure 15:
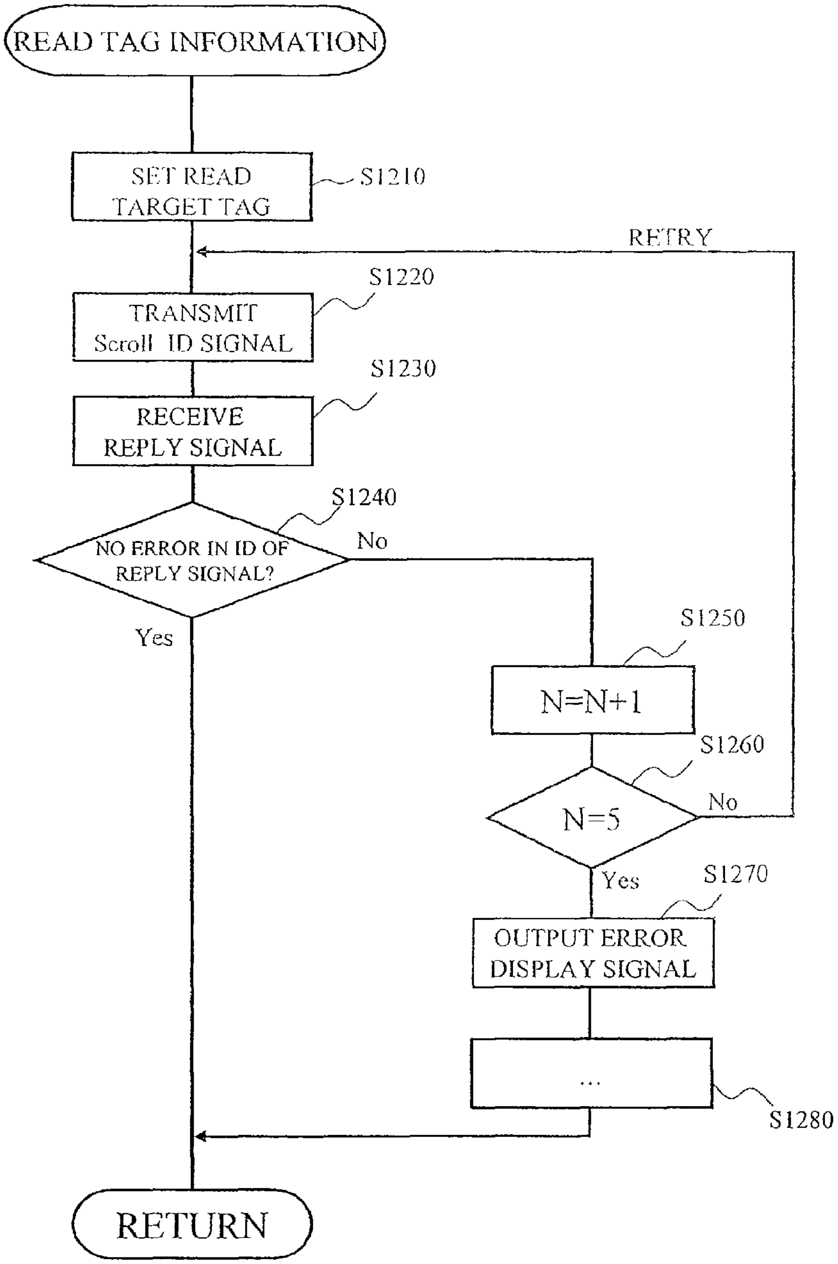
FIG. 15 is a flowchart illustrating a detailed procedure of Step S1200 illustrated in FIG. 12.

FIG. 15 is a flowchart showing a detailed procedure of the above-described Step S1200.

In FIG. 15, first, in Step S1210, after the tag label tape 110 with print has been printed, a RFID circuit element To, being an information read target is fed in the proximity of the antenna 14, and the tag to be a target is set.

Thereafter, in Step S1220, "Scroll ID" command (or it may be "Ping" command requesting a response) to read out information stored in the RFID circuit element To in a manner of following e.g., a predetermined communication parameter is output to the signal processing circuit 22. Based thereon, at the signal processing circuit 22, the "Scroll ID" signal (or the "Ping" signal) as access information is generated to be transmitted to the RFID circuit element To of an access target via the radio frequency circuit 21, and to request a reply.

Next, in Step S1230, a reply signal (RFID tag information such as article information) transmitted from the RFID circuit element To of the above-mentioned access target in response to the above-mentioned "Scroll ID" signal is received via the antenna 14, and taken-in through the radio frequency circuit 21 and the signal processing circuit 22.

Subsequently, in Step S1240, it is determined whether or not there is no error in a reply signal received in the step S1230 using a known error detecting code (CRC code; Cyclic Redundancy Check and the like).

In the case where the determination is not satisfied, the operation goes to Step S1250, in which one is added to N, and further in Step S1260, it is determined whether or not N comes to be a predetermined number of times of retries (5 times in this example. It may be determined to the other number of times as appropriate) having preliminarily been determined. In the case of $N \leqq 4$, the determination is not satisfied, the operation returns to Step S1220 and repeats the same procedure. In the case of $N=5$, the operation goes to Step S1270 and outputs an error display signal to the input/output interface 31 and to the above-mentioned terminal 5 or general purpose computer 6 via the communication line 3 to make a read failure (error) display, and in Step S1280, the above-described flag $F=1$, to end this flow. With the arrangement, even if read is in malfunction, retries will be made until being conducted a predetermined number of times (five times in this example).

In the case where the determination in Step 1240 is satisfied, read of RFID tag information from the RFID circuit element To, being a read target has completed, to end this flow.

In the above-mentioned routine, with respect to the RFID circuit element To, being an access target in the cartridge 100, the RFID tag information in the IC circuit part 151 can be accessed and read. Furthermore, in the case where RFID tag information of the IC circuit part 151 cannot be correctly read within a predetermined number of times, the RFID circuit element To is found to be damaged, so that it can be determined whether or not the RFID label is a defective product.

As described above, the control signal generating part 30*d* provided at the control circuit 30 forms a first print controller configured to control printing device so as to be capable of switching between the print in the forward direction with respect to a predetermined print region and the print in the rotation direction of inverting the forward direction with respect to a predetermined print region.

As described above, in the apparatus 2 for communicating with a RFID tag according to this embodiment, when producing the RFID label T, the base tape 101 and the cover film 103 printed are pressed between the tape feeding roller 107 and the sub roller 109 to produce the tag label tape 110 with print; and further an access information generated in the signal processing circuit 22 and the radio frequency circuit 21 is transmitted to the antenna 152 of the RFID circuit element To via the antenna 14 (read of information is executed in this embodiment, and write of information is executed in the below-described variation).

Here, in this embodiment, by positioning the cut position CL with the use of the cut mark PM, a RFID label T is produced such that the RFID circuit element To is located on one side in the label longitudinal direction, and then can be printed with a print letter R selectively in the forward direction or in the rotation direction inverting this forward direction. With the arrangement, in the case of making a forward direction print and in the case of making a rotation direction print, as illustrated in FIGS. 10E to 10H or FIGS. 11E to 11H, RFID labels T of mutually different layout aspects of the print region S or the RFID circuit element To in the aspect when in use can be produced. As a result, different from a conventional structure in which RFID labels T of the same layout aspect of the print region S or the RFID circuit element To can only be produced, RFID labels of a variety of layout aspects meeting a wide range of needs of a user can be produced, thus enabling to improve convenience.

Figures 11A, 11B, 11C, 11D, 11E, 11F, 11G, 11H:
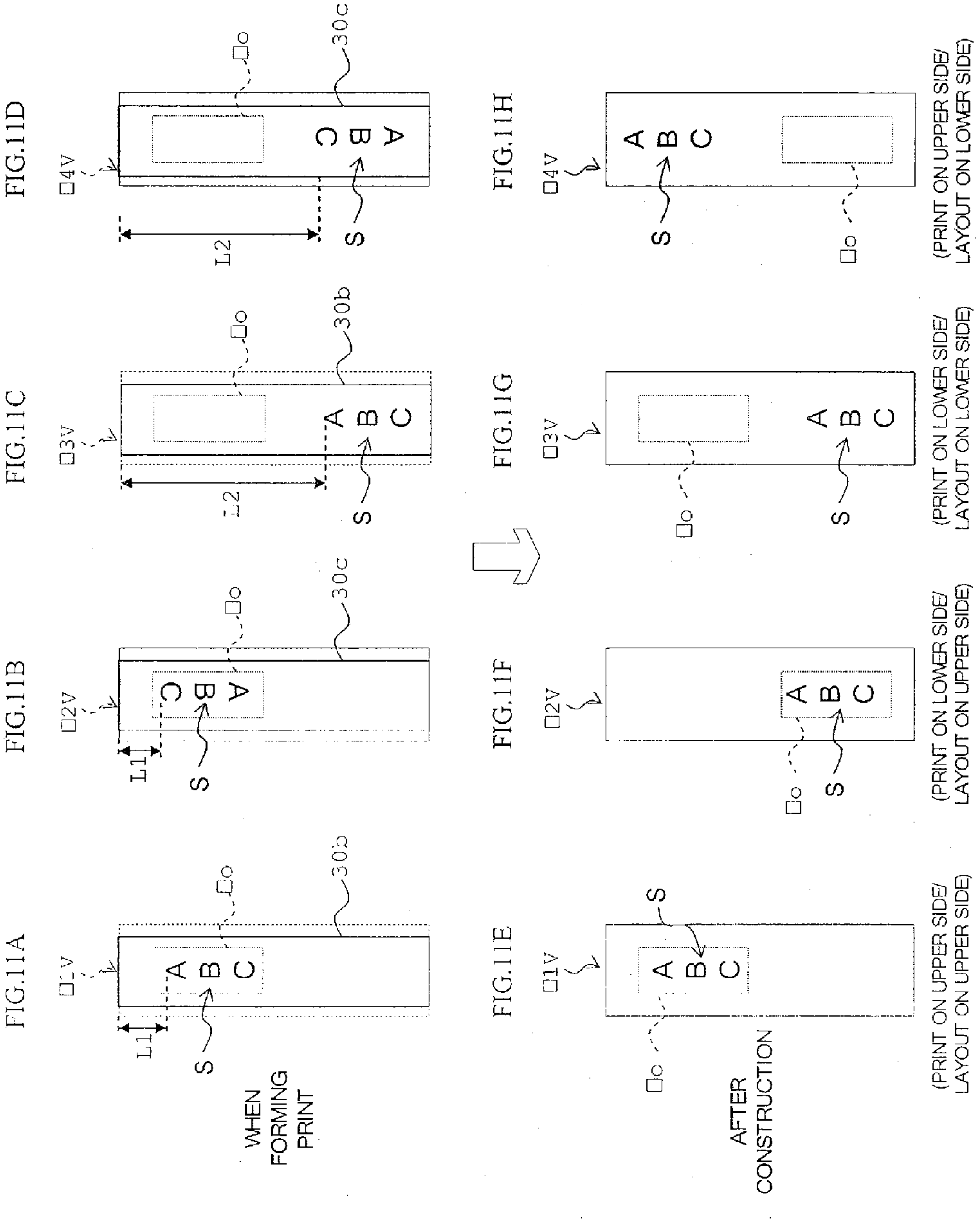
FIGS. 11A to 11H are top views illustrating the above-mentioned RFID labels of four kinds of layout aspects of a print letter and a RFID circuit element in a print mode of vertical writing.

Furthermore, particularly in this embodiment, due to that a print start position (L1 or L2, refer to the above-described FIGS. 10A to 10D, FIGS. 11A to 11D) can be changed based on the layout aspect of the print letter R, the print letter R can be printed selectively on one side or on the other side in the label longitudinal direction. With the arrangement, as illustrated in FIG. 10 or FIG. 11, as are the aspect in which both the print letter R and the RFID circuit element To are located on one side in the label longitudinal direction, the aspect in which both the print letter R and the RFID circuit element To are located on the other side in the longitudinal direction, the aspect in which the print letter R is located on the other side in the longitudinal direction as well as the RFID circuit element To is located on one side in the longitudinal direction, and the aspect in which the print letter E is located on one side in the longitudinal direction as well as the RFID circuit element To is located on the other side in the longitudinal direction, four kinds of layout aspects of RFID labels T can be produced. Consequently, more various layout aspects of RFID labels can be produced.

Furthermore, particularly in this embodiment, there are provided two print modes of vertical writing or horizontal writing, and in each of these print modes, four kinds of layout aspects of RFID labels T based on a label longitudinal directional position of the above-mentioned print letter R and RFID circuit element To can be produced. As a result, an operator (user) can select an arbitrary layout aspect out of a total eight kinds of aspects of RFID labels T to produce the RFID label T, so that still more various layout aspects of RFID labels can be produced.

A specific use example and effects of the use thereof of various (eight kinds in this embodiment) aspects of RFID labels T produced in such a way are described with reference to FIG. 16 and FIG. 17.

Figure 16:
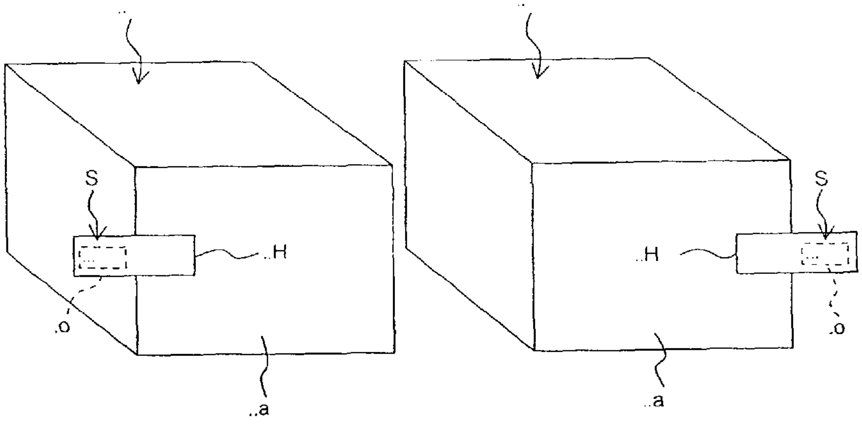
FIG. 16 is a view illustrating one example of the use of a RFID label of a layout aspect in which both the print letter and the RFID circuit element are positioned on one side or on the other side in the label longitudinal direction.

FIG. 16 is a view illustrating an example of the use of the RFID label T1H, T2H (refer to the above-described FIG. 10), being a layout aspect in which both the print letter R and the RFID circuit element To are positioned on one side (on the left side in FIG. 16) or on the other side (on the right side in FIG.

16) in the label longitudinal direction. As illustrated in this FIG. 16, with respect to a side face 50*a*, 51*a* of an object to be affixed 50, 51 of, for example, cardboard boxes, the RFID labels T1H and T2H are affixed such that respective portions provided with the print R and the RFID circuit element To are extended form the objects to be affixed 50 and 51, whereby even in the case where these objects to be affixed 50 and 51 are aligned in parallel or stacked in a direction of the side faces 50*a* and 51*a*, the print R can be visually recognized, and a radio communication with the RFID circuit element To can be easily performed. Note that, although here the RFID labels T1H and T2H produced in a print mode of horizontal writing are used, even if the RFID labels T1V and T1V (refer to the above-described FIG. 11) produced in the print mode of vertical writing, and being the layout aspect in which both the print letter R and the RFID circuit element To are positioned on one side or on the other side in the longitudinal direction, are affixed in the vertical direction with respect to the side faces 50*a* and 51*a* of the objects to be affixed 50 and 51, the same effect can be obtained.

Figure 17:
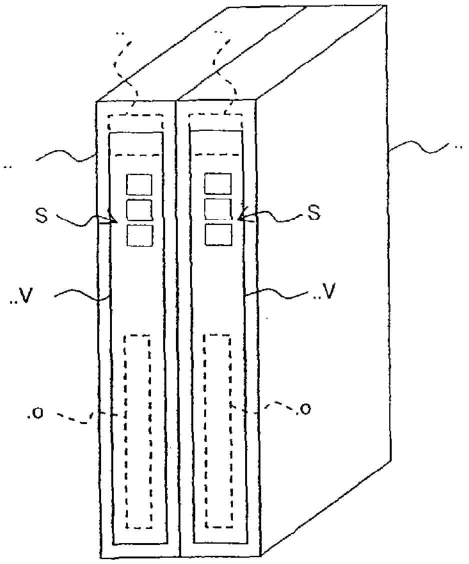
FIG. 17 is a view illustrating one example of the use of a RFID label in which the print letter is positioned on one side in the label longitudinal direction, and the RFID circuit element is positioned on the other side in the longitudinal direction.
Figures 18A, 18B, 18C, 18D, 18E, 18F, 18G, 18H:
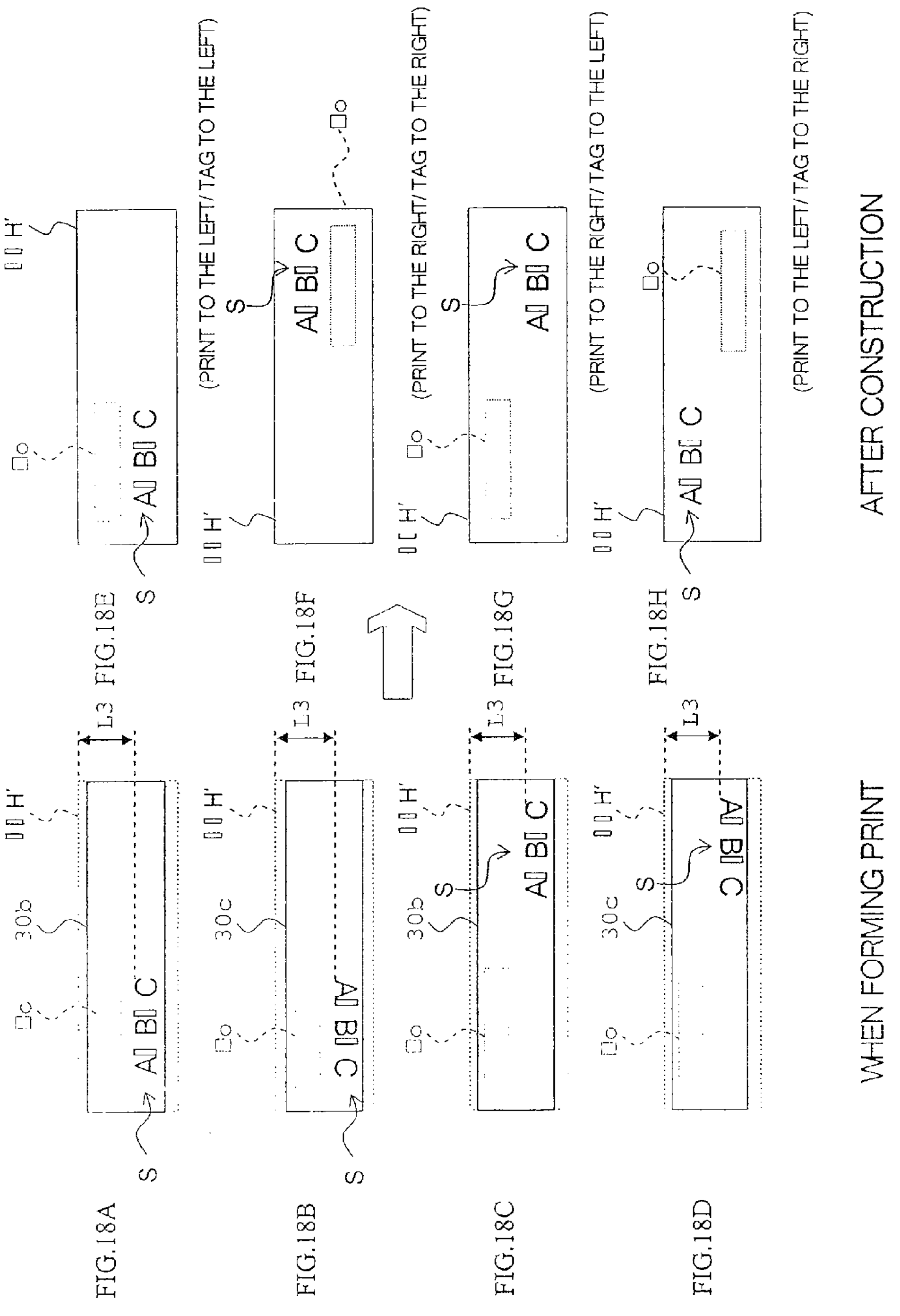
FIGS. 18A to 18H are top views illustrating RFID labels of four kinds of layout aspects of the print letter and the RFID circuit element in a print mode of horizontal writing in a variation in which both the print and the RFID circuit element are located too far to one side in a label width direction.

Whereas, FIG. 17 is a view illustrating one example of the use of the RFID label T4V (refer to the above-described FIG. 11), being a layout aspect in which the print letter R is positioned on one side (on the upper side in FIG. 17) in the label longitudinal direction, and the RFID circuit element To is positioned on the other side (on the lower side in FIG. 17) in the longitudinal direction. As illustrated in FIG. 17, with respect to an object to be affixed 53, for example, binders that are provided with a metal fitting 52 partially in the proximity of the face to be affixed (here, a back strip), the RFID label T4V is affixed such that the RFID circuit element To is positioned spaced apart from the metal fitting 52, thereby enabling the metal fitting 52 not to affect a radio communication performance of the RFID circuit element To. In addition, with the arrangement, owing to the aspect in which the print letter R and the RFID circuit element To are positioned on the opposite sides in the longitudinal direction, such an effect that visibility can be improved can be obtained. Incidentally, the effect of preventing these print failure and the decrease of durability of the RFID circuit element To is not limited to the RFID label T4V illustrated here, but can be obtained with the RFID labels T3V, T3H and T4H (refer to FIGS. 10 and 11), being an aspect in which the print letter R and the RFID circuit element To are positioned on the opposite sides in the longitudinal direction.

Note that, preferred embodiments of the present invention are not limited to the above-described ones, various changes and modifications may be made without departing from the scope of the spirit and technical ideas of the invention as set forth. Hereinafter, such variations will be described.

(1-1) Case where a Print and a RFID Circuit Element are Located Too Far to One Side in a Label Width Direction In the above-mentioned embodiment, although the case of producing RFID labels T of a plurality of layout aspects in different label longitudinal positions of the print R and the RFID circuit element To is described as an example, it is not limited to these examples, but RFID labels T of a plurality of layout aspects in different label width directional positions of the print R and the RFID circuit element To may be produced.

In this case, based on a layout aspect an operator desires, a cartridge 100 configured to include the first roll 102 wound with the base tape 101 in which the RFID circuit element To has preliminarily been disposed on one side or on the other side in the label width direction, is mounted at the cartridge holder part of the apparatus 2 for communicating with a RFID tag. Then, a RFID label is produced using the apparatus 2 for communicating with a RFID tag.

FIGS. 18E to 18H are top views illustrating four kinds of layout aspects of RFID labels T of a print letter and the RFID circuit element To in a print mode of horizontal writing in this variation. FIGS. 18A to 18D are views for illustrating the corresponding positional relation between a tape and a print buffer (the above-mentioned forward direction print buffer part 30*b* and rotation direction print buffer part 30*c*) at the time of making a print of each RFID label T of the above-mentioned four kinds of layout aspects.

In these FIGS. 18A to 18H, a RFID label T1H' is a RFID label of a layout aspect in which both the print letter R and the RFID circuit element To are positioned on one side (on the left side in the drawing) in the longitudinal direction, as well as the print letter R is positioned on the other side (on the lower side in the drawing) in the label width direction and the RFID circuit element To is positioned on one side (on the upper side in the drawing) in the label width direction; and the RFID label T2H' is a RFID label of a layout aspect in which both the print letter R and the RFID circuit element To are positioned on the other side (on the right side in the drawing) in the longitudinal direction, as well as the print letter R is positioned on one side (on the upper side in the drawing) in the label width direction and the RFID circuit element To is positioned on the other side (on the lower side in the drawing) in the label width direction. Furthermore, the RFID label T3H' is a RFID label of a layout aspect in which the print letter R is positioned on the other side (on the right side in the drawing) in the longitudinal direction as well as on the other side (on the lower side in the drawing) in the label width direction, and the RFID circuit element To is positioned on one side (on the left side in the drawing) in the longitudinal direction as well as on one side (on the upper side in the drawing) in the label width direction; and the RFID label T4H' is a RFID label of a layout aspect in which the print letter R is positioned on one side (on the left side in the drawing) in the longitudinal direction as well as on one side (on the upper side in the drawing) in the label width direction, and the RFID circuit element To is positioned on the other side (on the right side in the drawing) in the longitudinal direction as well as on the other side (on the lower side in the drawing) in the label width direction.

Incidentally, although not particularly described using the drawings, as with FIGS. 11A to 11H based on the above-described FIGS. 10A to 10H, also in this variation, there are prepared four kinds of layout aspects (RFID labels T1V' to T4V') in a print mode of vertical writing based on the above-mentioned FIGS. 18A to 18H, and an operator can select an arbitrary layout aspect out of these eight kinds of print aspects.

Figure 19:
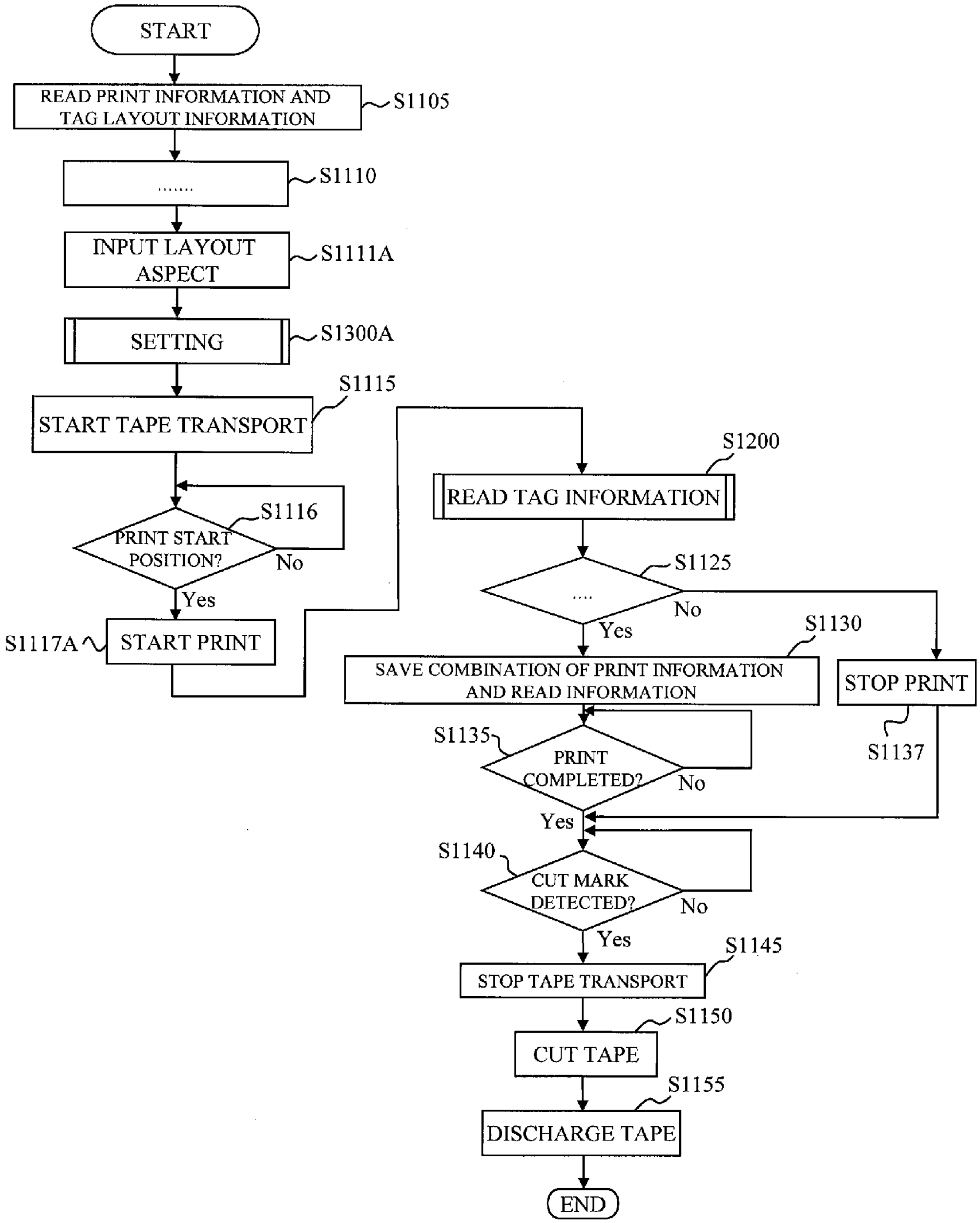
FIG. 19 is a flowchart illustrating a control procedure to be executed in a control circuit in the variation in which the print and the RFID circuit element are located too far to one side in the label width direction.

FIG. 19 is a flowchart showing a control procedure to be executed in the control circuit 30 in this variation, and a drawing corresponding to the above-described FIG. 12. Like reference numerals refer to the same procedures as in FIG. 12.

First, through the same Steps S1105 and S1110 as is FIG. 12, an operation goes to Step S1111A. In this Step S1111A, the layout aspect (that is, any one of eight kinds of the above-mentioned RFID labels T1H' to T4H', and T1V' to T4V') of a FRID label T input via the above-mentioned terminal 5 or general purpose computer 6 by an operator is read via the communication line 3 and the input/output interface 31.

Then, in Step S1300A, based on the layout-information of a RFID tag (here, the tag layout is on one side (on the left side in FIG. 18) in the longitudinal direction as well as on one side (on the upper side in FIG. 18) in the width direction) read in the step S1105, and the aspect of a RFID label T read in Step S1111A, in accordance with this aspect, a tape feed amount to a print start position is set, a print direction (forward direction or rotation direction) is set, and a label width directional position of the print (it is fixed to be L3 from an upper end in this variation, refer to FIG. 18).

Next, through the same Steps S1115 and S1116 as is FIG. 12, in Step S1117A, a control signal based on the print direction (forward direction or rotation direction) and the label width directional position of the print set in the step S1300A is output to the print-head driving circuit 25, and the print head 10 is energized. As a result, in a predetermined region S (region corresponding to a selected print aspect) of the cover film 103, a print R such as letters, signs, bar codes read in Step S1105 is made to print based on the print direction (forward direction or rotation direction) and the label width directional position of the print set in the step S1300. Then, the tag label tape 110 with print is fed to the outside of the cartridge body 100.

Thereafter, Steps S1200 to Step S1155, being the same procedure as is FIG. 12 are conducted. That is, a read processing of a tag information is performed, the combination of a print information and a tag information is stored in the information server 7 or the route server 4, and the tag label tape 110 with print which print has been completed is cut (divided) on a cut line CL to produce a RFID label T.

With the arrangement, each aspect of RFID labels T illustrated in the above-described FIGS. 18E to 18H is produced.

In this variation, such the same effect as is the above-mentioned embodiment that RFID labels of more various layout aspects of RFID labels meeting a wide range of needs of a user can be produced can be obtained.

Incidentally, in the above-mentioned variation, although the print position is fixed to be L3 from the upper end in the label width direction of the print letter R, it is not limited to this example, but the width directional position of the print letter R can be changed. For example, by changing the positions of the print letter R in the label direction in two levels, eight kinds respectively in each print mode of vertical/horizontal writing, that is a total of 16 kinds of layout aspects of RFID labels can be produced, and still more various layout aspects of RFID labels can be produced.

Moreover, in the above-mentioned variation, although the example in which a RFID label T is produced using a base tape 101 provided with the RFID circuit element To on one side (on the upper side in FIG. 18) in the label width direction, is shown, it is a matter of course that a base tape in which the RFID circuit element To is located on the other side (on the lower side in FIG. 18) in the label width direction can be employed.

In addition, in the above-mentioned variation, as is the embodiment, although a cut line CL is set such that the RFID circuit element To is positioned on one side (on the left side in FIG. 18) in the longitudinal direction to produce the RFID label T, it is not limited to this example, but the cut line CL may be set such that the RFID circuit element To is positioned on the other side (on the right side in FIG. 18) in the longitudinal direction to produce the RFID label T, or the cut line CL may be set such that the RFID circuit element To is positioned at a central portion in the longitudinal direction to produce the RFID label T. Also in this case, the same effects can be obtained.

(1-2) Case of Making a Half-Cut

When using a RFID label T to be produced in the above-mentioned embodiment and variation (1-1), as described above, a user (user) needs to peel off the separation sheet 101*d* from the adhesive layer 101*c*. In this variation, a half-cut (only the separation sheet 101*d* part is cut in the width direction with the cover film 103, the adhesive layer 101*a*, the base film 101*b* and the adhesive layer 101*c* left) is made at a half-way portion in the longitudinal direction of the RFID label T, and e.g., the RFID label T is bent at the half-cut portion when in use, thereby making it easy to peel off the separation sheet 101*d*.

Figure 20:
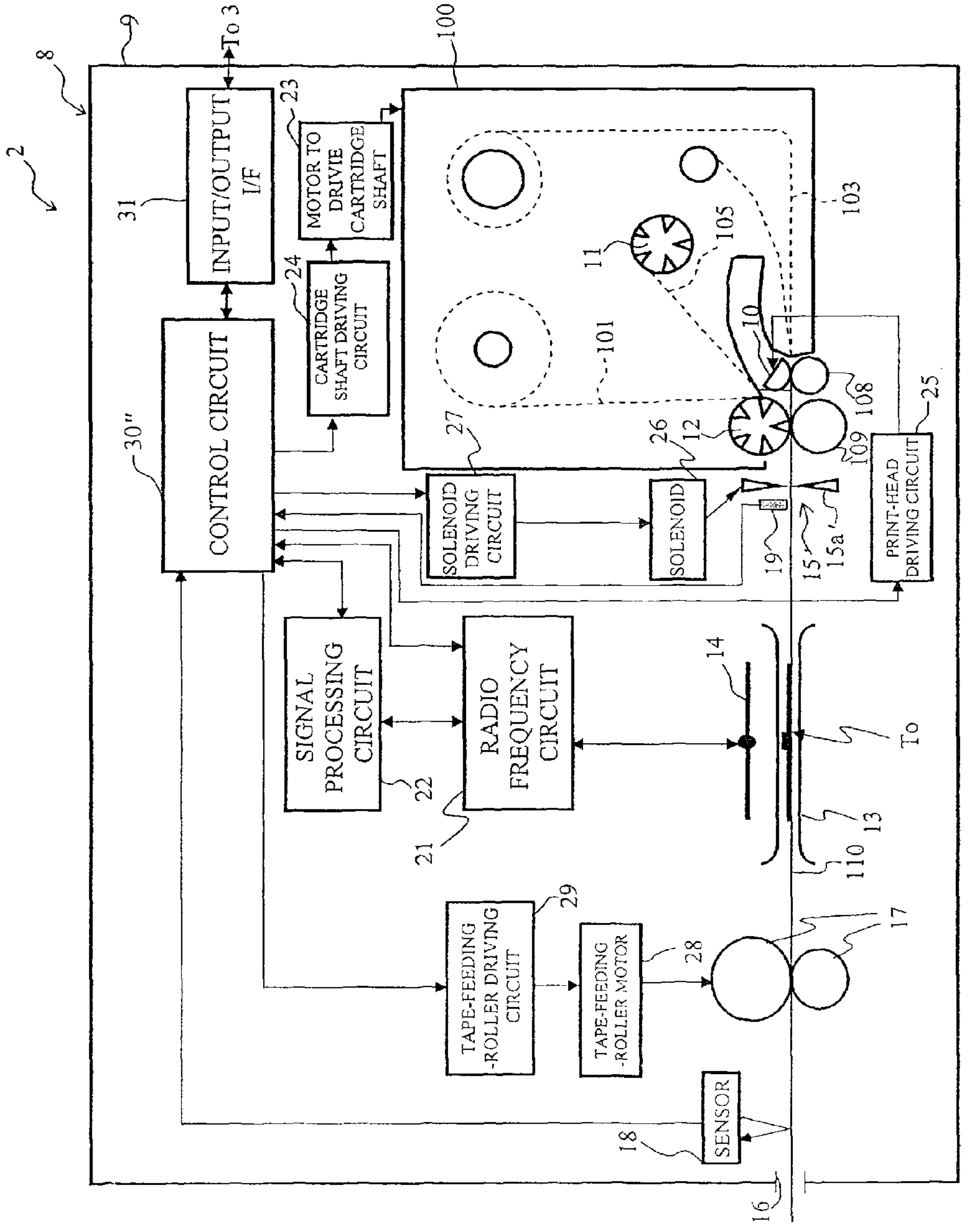
FIG. 20 is a schematic view illustrating a control system of an apparatus for communicating with a RFID tag in a variation of making a half-cut.

FIG. 20 is a schematic diagram illustrating a control system of an apparatus 2 for communicating with a RFID tag in this variation, and a drawing corresponding to FIG. 2 of the above-mentioned embodiment. Like reference numerals refer to the same parts as those of the above-mentioned embodiment, and descriptions thereof are omitted.

In this FIG. 20, a cutter 15' (cutter for separation material layer) is provided instead of the above-described cutter 15, by a control signal being output from a control circuit 30" to the solenoid driving circuit 27, and the solenoid 26 being driven based on this control signal, thereby being brought in operation. This cutter 15' normally functions to cut (divide) the tag label tape 110 with print, as well as can make the half-cut to cut only the separation sheet 101*d* part.

Figure 21:
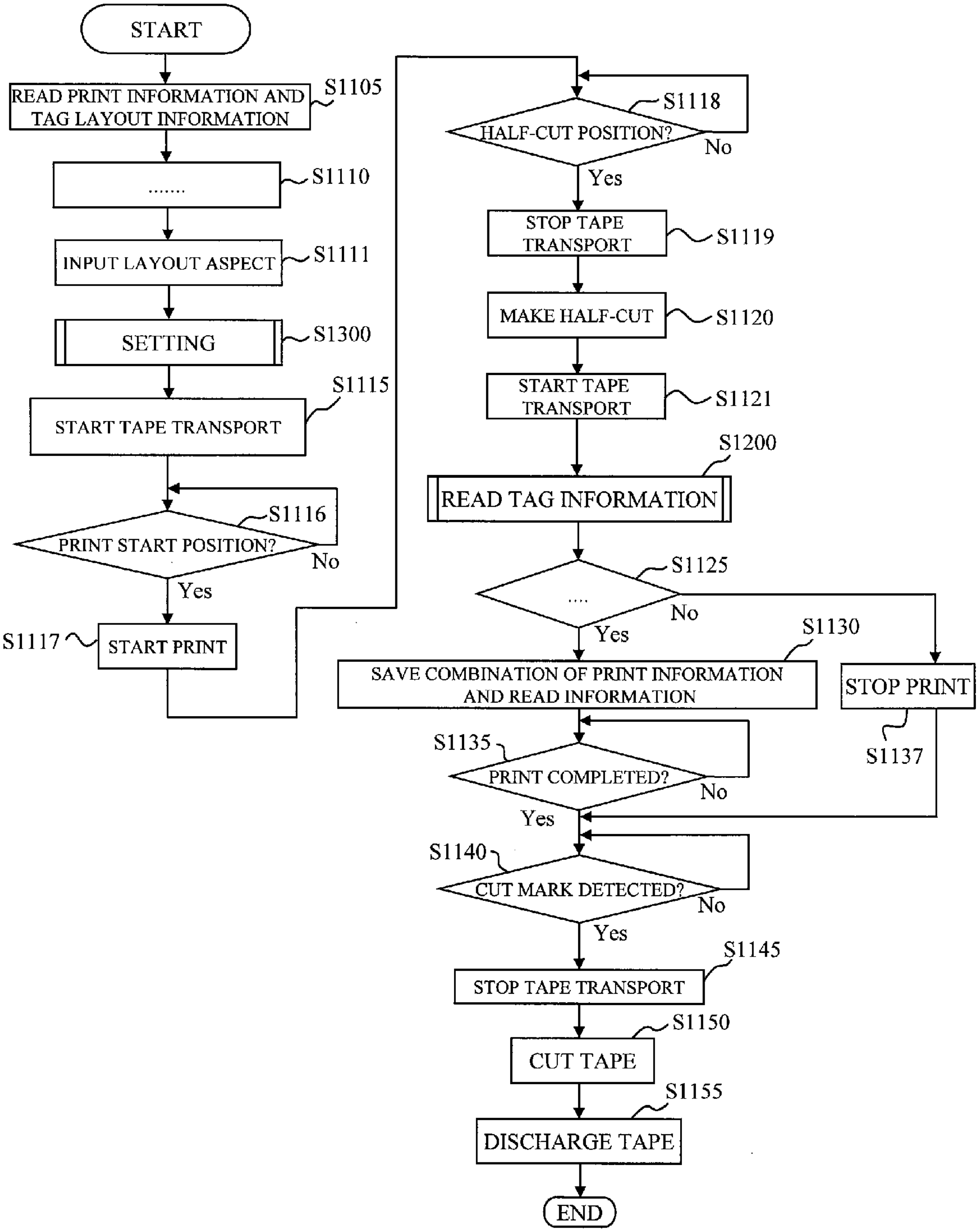
FIG. 21 is a flowchart illustrating a control procedure a control circuit executes in the variation of making the half-cut.

FIG. 21 is flowchart showing a control procedure the control circuit 30" executes in this variation, and a drawing corresponding to FIG. 12 in the above-mentioned embodiment and FIG. 19 in the above-mentioned variation (1-1). Like reference numerals refer to the same procedures as those in these drawings, and descriptions thereof are omitted.

First, through the same Steps S1105 to Step S1117 as is FIG. 12, an operation goes to Step S1118. In this Step S1118, it is determined whether or not the tag label tape 110 with print is fed to reach the half-cut position. That is, in this embodiment, since the half-cut is made in a position substantially in the vicinity of the center in the longitudinal direction of a RFID label T, it is determined whether or not the tag label tape 110 with print has been fed to reach this position. The determination of a transport amount at this time, for example, based on a detection result made by the photo sensor 19 of the cut mark PM provided on the RFID label T that has been produced before the RFID label T being produced at the moment, may be conducted by counting the number of pulses the cartridge shaft driving circuit 24 drives the above-mentioned motor to drive cartridge shaft 23, being a pulse motor, outputs. In the case where the determination is satisfied, the operation goes to Step S1119, and the transport of the tag label tape 110 with print is stopped.

In the next Step S1120, a control signal based on the half cut is output to the solenoid driving circuit 27, a blade 15*a'* on one side (on the separation sheet 101*d* side. On the lower side in FIG. 20) of the cutter 15' is made to move forward toward the tag label tape 110 with print with the stroke made shorter than that at the normal cutting to make the half-cut of the tag label tape 110 with print (after cutting, the blade 15' is reversed to an original position).

In Step S1121, a control signal is output to the cartridge shaft driving circuit 24, and the ribbon take-up roller 106 and the tape feeding roller 107 are driven to rotate by a driving force of the motor to drive cartridge shaft 23. Whereby, the transport of the tag tape with print 110 is started again.

Subsequent Steps S1200 to S1155 are the same as those of the above-described FIG. 12 and FIG. 19, so that descriptions thereof are omitted.

Incidentally, in the above procedures, when the transport of the tag tape with print 110 is stopped for making a half-cut in the step S1119, it is controlled such that the energization of the print head 10 is once stopped, and the print onto the cover film 103 is temporarily stopped. Then, it is controlled such that from a time point of starting the transport of the tape in the step S1121, the print is restarted again.

Figure 22A:
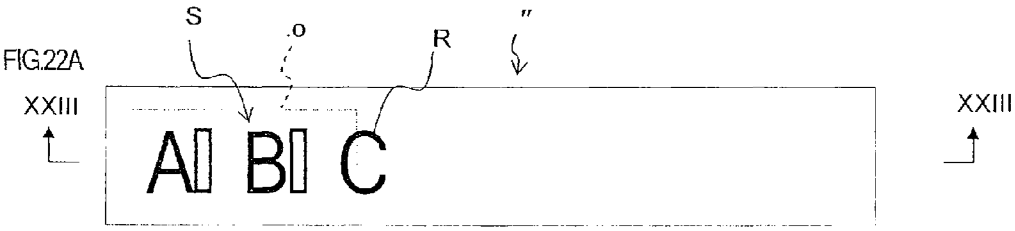
FIGS. 22A and 22B are a top view and a bottom view illustrating one example of an external appearance of the RFID label in the variation of making the half-cut.
Figure 22B:
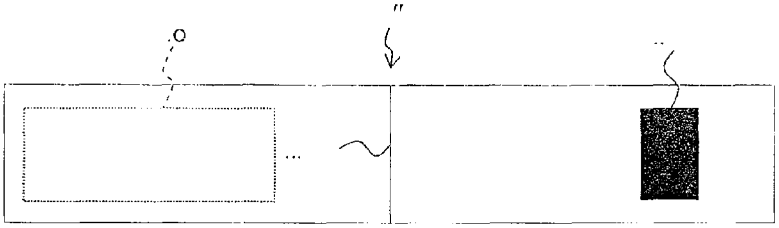
Figure 23:
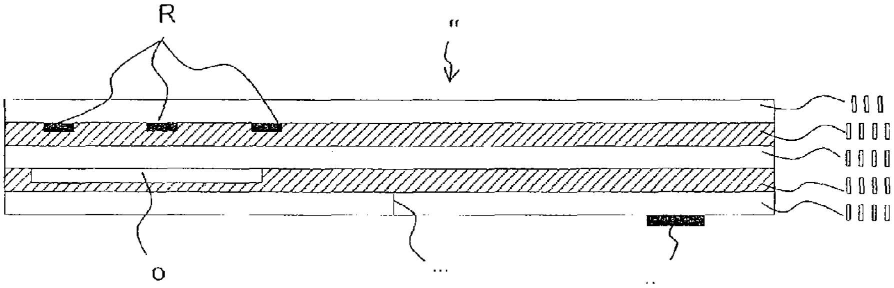
FIG. 23 is a side sectional view in XXIII-XXIII' cross section in FIG. 22A.

FIGS. 22A and 22B are views illustrating one example of an external appearance of a RFID label T" formed as mentioned above; and FIG. 22A is a top view (that is, a view taken from the cover film 103 side, and FIG. 22B is a bottom view (that is, a view taken from the separation sheet 101*d* side). Furthermore, FIG. 23 is a side sectional view in XXIII-XXIII' cross section in FIG. 22A. Incidentally, here as an example, illustrated is a RFID label (corresponding to the RFID label T1H illustrated in FIG. 10) of a layout aspect in which the print R and the RFID circuit element To are positioned on one side (on the left side in FIG. 22) in the longitudinal direction in a print mode of horizontal writing. As illustrated in these FIG. 22 and FIG. 23, in a RFID label T" produced in this variation, only the separation sheet 101*d* is cut in a central position in the longitudinal direction.

According to this variation, in addition to that such the same effect as is the above-mentioned embodiment that RFID labels of various layout aspects meeting a wide range of needs of a user, when using the RFID label T", e.g., a user (user) bends the RFID label T" in a position of a half-cut line HCL, whereby the separation sheet 101*d* on one side and on the other side can be easily peeled off toward both end sides from the central position respectively.

Note that, in the above-mentioned variation, although the position of making the half-cut is in the vicinity of the central position in the longitudinal direction, it is not limited to this case, but a longitudinal position may be changed as appropriate.

(1-3) Case of Making a Print Region Variable

In the above-described embodiment and variations (1-1) and (1-2), although the label longitudinal positions of a print R are changed stepwise only in two positions on one side and on the other side, and combined with a print direction (forward direction or rotation direction), to preliminarily prepare several kinds of layout aspects, and an operator selects a desired aspect thereof, it is not limited to this case. That is, for example, it is preferable that the label longitudinal position of the print R be consecutively varied, and when an operator inputs a desired print position, for example, with numerical values, the print R is located in the longitudinal position corresponding to this value.

In this case, in Step S1116 illustrated in the above-described FIG. 12 (or FIG. 19, FIG. 21), it is determined whether or not a transport amount of the tag label tape 110 is in a desired print start position (distance L from an end on one side of the RFID label T) the operator has input. The determination of the transport amount at this time, letting a proper position such as the cut line CL be a reference position, may be made by counting the number of pulses the cartridge shaft driving circuit 24 drives the above-mentioned motor to drive cartridge shaft 23, being a pulse motor outputs.

With the arrangement, the number of layout aspects of the print R can be largely increased, so that further various layout aspects of RFID labels T can be produced.

Note that, in the above-mentioned variation, as to the label width directional position of the print R, likewise positioning may be conducted by inputting numerical values by the operator.

Furthermore, in the above-described embodiment and variations (1-1) and (1-2), although the position of the cut line CL is fixedly set with the cut mark PM such that the RFID circuit element To is positioned on one side in the longitudinal direction, it is not limited to this case. That is, for example, the position of the cut line CL may be changed, and the label longitudinal position of the RFID circuit element To may be set to be variable. In this case, for example, when the operator inputs a desired longitudinal position of the RFID circuit element To e.g., with numerical values, the position of the cut line CL is set such that the RFID circuit element To is located in the longitudinal position corresponding to these values, and the tag label tape 110 may be cut in this position.

In specific, in Step S1140 shown in the above-described FIG. 12 (or FIG. 19, FIG. 21), it is determined whether or not the transport amount of the tag label tape 110 is in the position (distance L' from the end on one side of the RFID label T) of the cut line CL so as to be in a desired RFID circuit element To position the operator has input. The determination of the transport amount at this time, letting the cut line CL be a reference position, may be done by counting the number of pulses the cartridge shaft driving circuit 24 drives the above-mentioned motor to drive cartridge shaft 23, being a pulse motor outputs.

With the arrangement, the number of layout aspects of the RFID circuit element To can be largely increased, so that further various layout aspects of RFID labels T can be produced.

Figure 24:
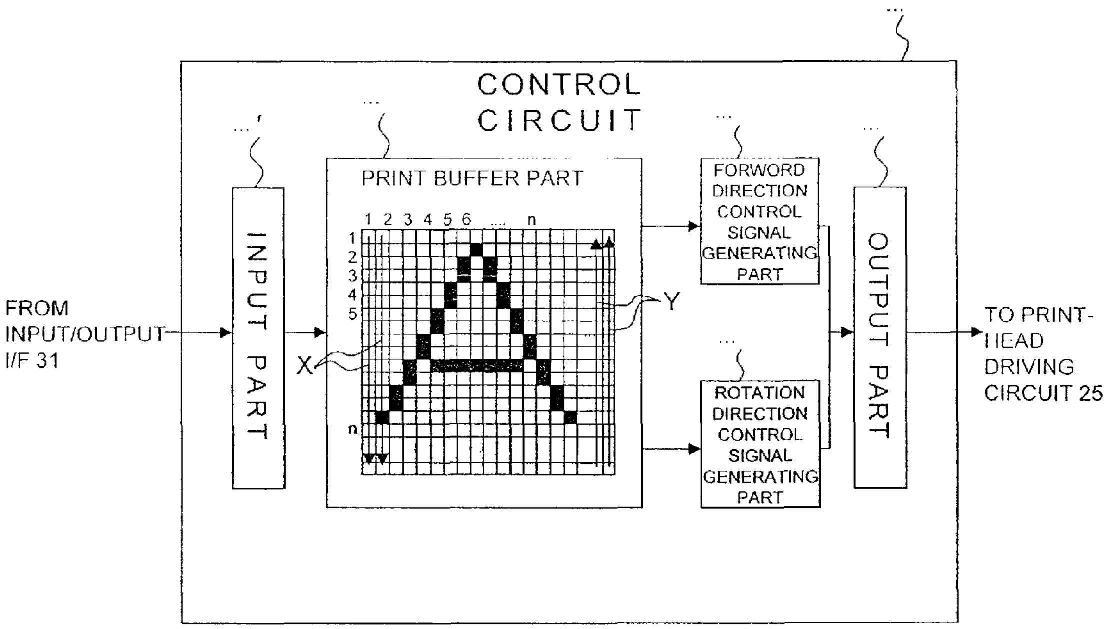
FIG. 24 is a functional block diagram illustrating a function relating to setting of a print direction in the control circuit in the variation in which the print in a forward direction or in a rotation direction is made based on a reading direction of a buffer.

(1-4) Case of Making a Print in Forward/Rotation Directions Based on a Read Direction of a Buffer Data In the above-mentioned embodiment, although when making a print in the rotation direction, a print information in the rotation direction is developed on the rotation direction print buffer part 30*c*, and a control signal is generated based on this print information, it is not limited to this example, for example, as illustrated in FIG. 24, a control signal corresponding to the forward direction or the rotation direction may be generated based on the direction of reading the print information on the buffer.

FIG. 24 is a functional block diagram showing the function relating to setting of a print direction (forward direction or rotation direction) of a control circuit 30A in this case. As illustrated in this FIG. 24, the control circuit 30A includes an input part 30*a*', a print buffer part 30*f* (a first storage device for print data), a forward direction control signal generating part 30*g*, a rotation direction control signal generating part 30*h*, and an output part 30*e'*.

The control circuit 30A is under an input operation via the terminal 5 or the general purpose computer 6 by an operator, and a print information read via the communication line 3 and the input/output interface 31 in the above-described Step 1105 of FIG. 12 is taken-in in the above-mentioned print buffer part 30*f* through the input part 30*a'*.

The print buffer part 30*f* develops the print information input through the above-mentioned input part 30*a*' in the forward direction on the buffer, and temporarily saves it.

The forward control signal generating part 30*g*, in the case where a print direction is set to be the forward direction by setting shown in the above-described FIG. 13, data on the above-mentioned print buffer part 30*f* is read in X direction in the drawing from coordinates (1, 1), next in X direction in the drawing from coordinates (2, 1), and further in the same read direction from coordinates (3, 1) and afterwards, and a control signal based on the forward direction is generated.

On the other hand, the rotation direction control signal generating part 30*h*, in the case where a print direction is set to be the rotation direction by setting shown in FIG. 13, data on the above-mentioned print buffer part 30*f* is read in Y direction in the drawing from coordinates (n, n), next in Y direction in the drawing from coordinates (n−1, n), and further in the same read direction from (n−2, n) and afterwards, and a control signal based on the rotation direction is generated.

The control circuit 30A outputs a forward direction control signal that is generated at the above-mentioned forward direction control signal generating part 30*g* or a rotation direction control signal that is generated at the above-mentioned rotation direction control signal generating part 30*h* to the print-head driving circuit 25 through the output part 30$e'$. Whereby, the print head 10 is energized so as to correspond to the print in the forward direction or in the rotation direction, and the print R will be printed in a predetermined print region S of the cover film 103 in accordance with a print direction (forward direction or rotation direction) set by setting shown in FIG. 13.

In this case, the forward direction control signal generating part 30$g$ and the rotation direction control signal generating part 30$h$ provided in the control circuit 30A form a first print controller configured to control a printing device so as to be capable of being switched between the print in the forward direction with respect to a predetermined print region and the print in the rotation direction of inverting the forward direction with respect to a predetermined region.

(1-5) Case of not Automatically Detecting a Layout-Information of a RFID Tag

In the above-mentioned embodiment, although by detecting a mark width of the cut mark PM using the above-mentioned photo sensor 19, layout information of the RFID circuit element To is automatically taken-in, it is not limited to this example. That is, it is preferable that an operator mounts the cartridge 100 in which the base tape 101 which layout information of the RFID circuit element To is known is contained, at the cartridge holder part of the apparatus 2 for communicating with a RFID tag, and this known layout-information of a RFID tag is input via, for example, the above-mentioned terminal 5 or general purpose computer 6. In this case, the photo sensor 19 can be unnecessary.

(1-6) Others (A) Case of Write of RFID Tag Information

Heretofore, although the case of producing a RFID label that can only be read (cannot be written) is described as an example, it is not limited to this case, the present invention may be applied to the case of writing information in the IC circuit part 151 of the RFID circuit element To.

In this case, in the procedure corresponding to Step S1115 of the above-described FIG. 12 (or FIG. 19, FIG. 21), in addition to a print information to be printed onto the RFID label T using the print head 10, information to be written in the IC circuit part 151 of the RFID circuit element To is read; in the procedure corresponding to Step S1200, a tag ID (whole or a part) is specified, and then a memory initialization (deletion) for writing RFID tag information such as ID information or article information thereof is executed, and thereafter this RFID tag information is transmitted to the RFID circuit element To to be written; and in the procedure corresponding to Step S1130, the combination of information written in the above-mentioned RFID circuit element To and the print information printed already based thereon is stored.

Also in this variation, the same effects as is the above-mentioned embodiment can be obtained.

(B) Case of Not Bonding

That is, as described in the above-mentioned embodiment, it is not the case that the cover film 103 different from the base tape 101 provided with the RFID circuit element To is directly applied with print, ant then they are bonded together, but the case where the present invention is applied to a cartridge configured to include at least a RFID tag for an apparatus for communicating with a RFID tag making a print on a cover film a tag tape includes.

Figure 25:
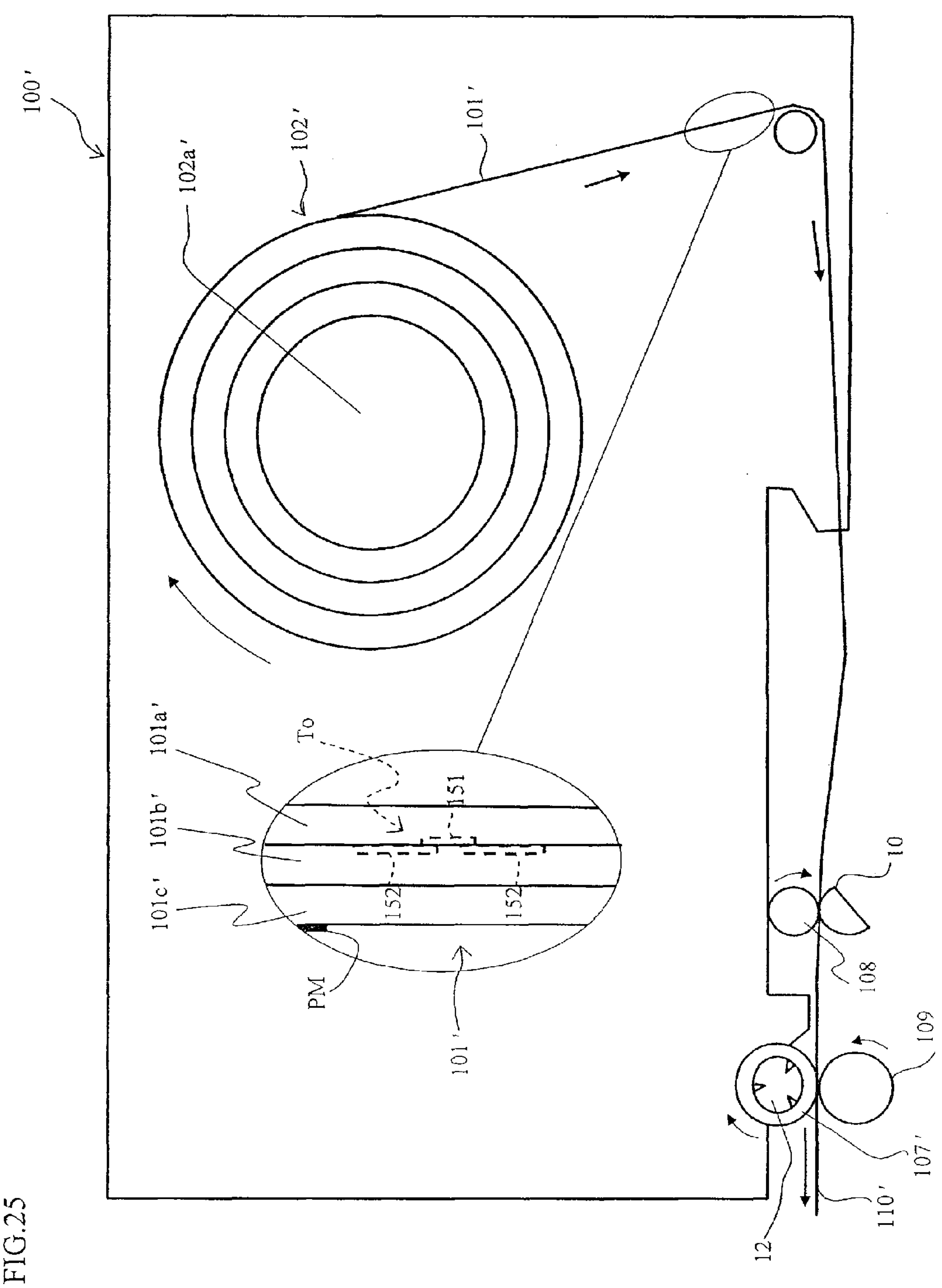
FIG. 25 is an explanatory view for illustrating a detailed structure of a cartridge in a variation in which no bonding is made.

FIG. 25 is an explanatory view for illustrating a detailed structure of a cartridge 100' of this variation, and a drawing corresponding to the above-described FIG. 3. Like reference numerals refer to the same parts as those of FIG. 3, and descriptions thereof are omitted.

In FIG. 25, the cartridge 100' includes a first roll (roll of tape with RFID tag) 102' wound with a thermal tape 101' (first tape, tag tape), and a feeding roller 107' feeding this thermal tape 101' toward the outside of the cartridge 100'.

The first roll 102' is wound with the above-mentioned strip-like transparent thermal tape 101' in which a plurality of the above-mentioned RFID circuit elements To is sequentially formed in the longitudinal direction around a reel member 102$a'$.

The thermal tape 101' to be wound around the first roll 102' is in a three-layer structure in this example (refer to a partially enlarged view in FIG. 25), and constructed to be laminated, from the side to be wound on the outside toward the opposite side, in order of a cover film 101$a'$ made of a PET (polyethylene terephthalate) and the like having a thermal recording layer on the surface, an adhesive layer 101$b'$ made of an appropriate adhesive material, and a separation sheet 101$c'$ (separation material).

On the backside of the cover film 101'$a$, the IC circuit part 151 configured to store information is integrally provided, and on the surface of the backside of the cover film 101'$a$, the above-mentioned antenna 152 is formed. On the backside of the cover film 101'$a$, the above-mentioned separation sheet 101$c'$ is bonded to the cover film 101'$a$ with the above-mentioned adhesive layer 101$b'$. Then, on this separation sheet 101$c'$, as with the separation sheet 101$d$ of the base tape according to the above-mentioned embodiment, a cut mark PM (identifier) for positioning the cut position CL with the use of the cutter 15 is provided.

When the cartridge 100' is mounted at the cartridge holder part of the above-mentioned apparatus 2 for communicating with a RFID tag, and a roller holder (not illustrated) is moved from a separation position to a contact position, the thermal tape 101' is sandwiched between the print head 10 and the platen roller 108, as well as between the feeding roller 107' and the sub roller 109. Then, accompanied by the movement of the feeding roller driving shaft 12 by a driving force of the motor to drive cartridge shaft 23 (refer to FIG. 2), the feeding roller 107', the sub roller 109 and the platen roller 108 are rotated in synchronization, and the thermal tape 101' is fed out from the first roll 102'.

This thermal tape 101' fed out is fed to the print head 10 on the downstream side in a transport direction. At the print head 10, a plurality of heater elements is energized by the above-mentioned print-head driving circuit 25 (refer to FIG. 2), whereby a print is printed on the surface of the cover film 101$a'$ of the thermal tape 101' to be formed as a tag label tape 110' with print, and thereafter carried-out to the outside of the cartridge 100'. Incidentally, it is a matter course to be a print of using such an ink ribbon as in the above-described embodiment.

After carried-out from the cartridge 100', with respect to a predetermined RFID circuit element To, access (read/write of information) is made to information in the IC circuit part 151 via the above-described antenna 14. Thereafter, the transport using the feeding roller 17, the cut using the cutter 15 and the like are the same as is the above-mentioned embodiment, so that descriptions thereof are omitted.

In this variation, as with the above-mentioned embodiment, e.g., such an effect that RFID labels of various layout aspects meeting a wide rang of needs of a user can be produced, can be obtained.

A second embodiment according to the present invention will be described with reference to FIGS. 26 to 42.

Figure 26:
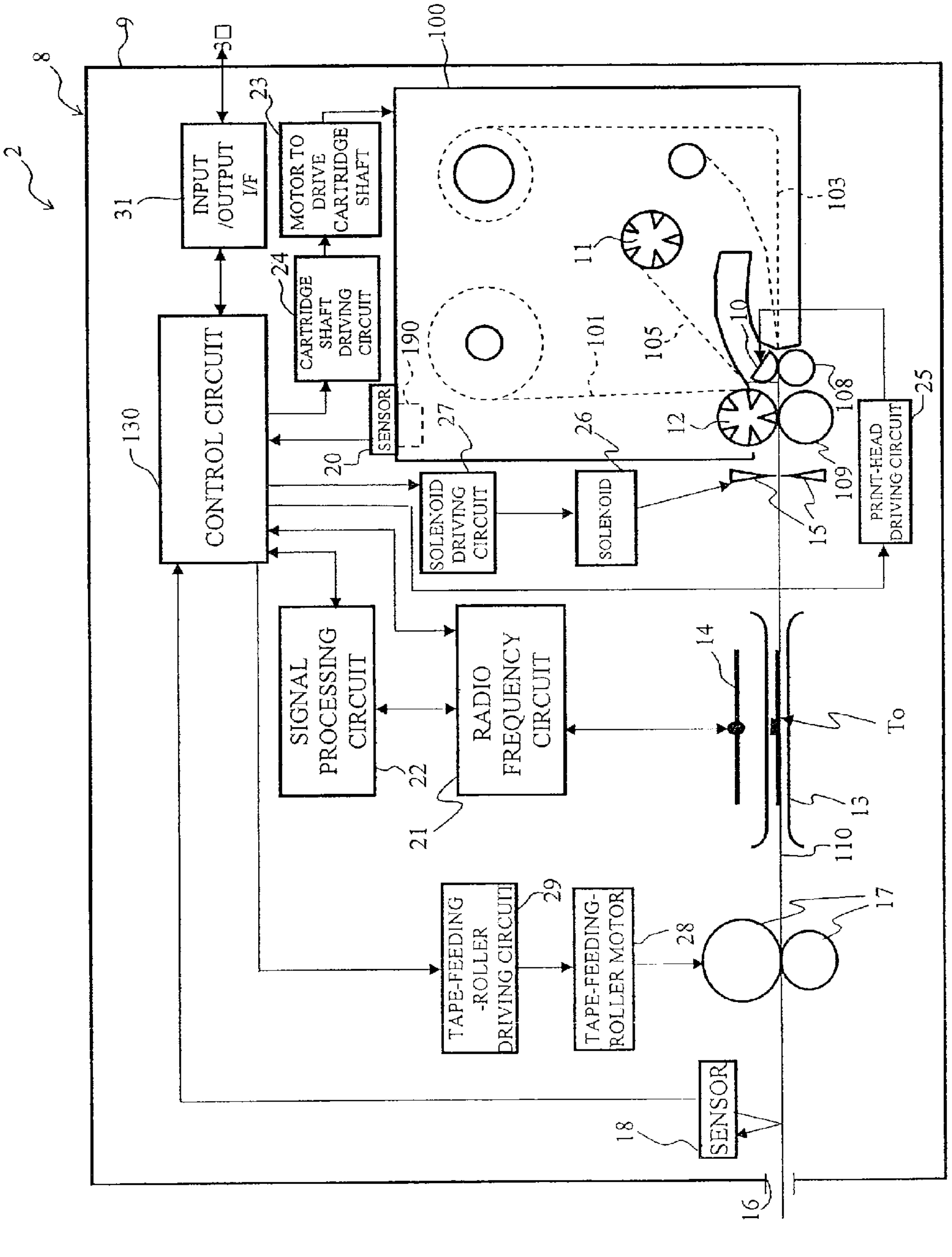
FIG. 26 is a schematic diagram illustrating a detailed structure of an apparatus for communicating with a RFID tag according to a second embodiment of the present invention.

FIG. 26 is a schematic diagram illustrating a detailed structure of an apparatus 2 for communicating with a RFID tag according to this embodiment, and a drawing corresponding to FIG. 2 of the above-mentioned first embodiment. Like reference numerals refer to the same parts as those of FIG. 2, and descriptions thereof are omitted.

In FIG. 26, in the apparatus 2 for communicating with a RFID tag according to this embodiment, the photo sensor 19 is eliminated from the construction illustrated in FIG. 2, as well as there is provided a sensor (a second detecting means) 20 configured to detect layout-information of a RFID tag (information showing a layout position of a RFID circuit element To in the base tape 101. For example, a tape width, layout interval information of the RFID circuit element To and the like are included.) in a part to be detected 190 (details will be described later) provided in the cartridge 100. In addition, via the above-mentioned radio frequency circuit 21, signal processing circuit 22, cartridge shaft driving circuit 24, print-head driving circuit 25, solenoid driving circuit 27, tape-feeding-roller driving circuit 29 and the like, the entire operation of the apparatus 2 for communicating with a RFID tag is to be controlled by a control circuit 130 having an equal function to that of the control circuit 30 according to the above-mentioned first embodiment. Furthermore, also the apparatus 2 for communicating with a RFID tag according to this embodiment, as is the above-mentioned first embodiment, is connected to the route server 4, the terminal 5, the general purpose computer 6 and a plurality of information servers 7 via a wired or wireless communication line 3 (refer to the above-described FIG. 1).

Furthermore, since the construction of the cartridge 100, the radio frequency circuit 21, and the RFID circuit element To is the same as those described with reference to respective FIGS. 3, 5 and 6 in the above-mentioned first embodiment, descriptions thereof are omitted.

Figure 27:
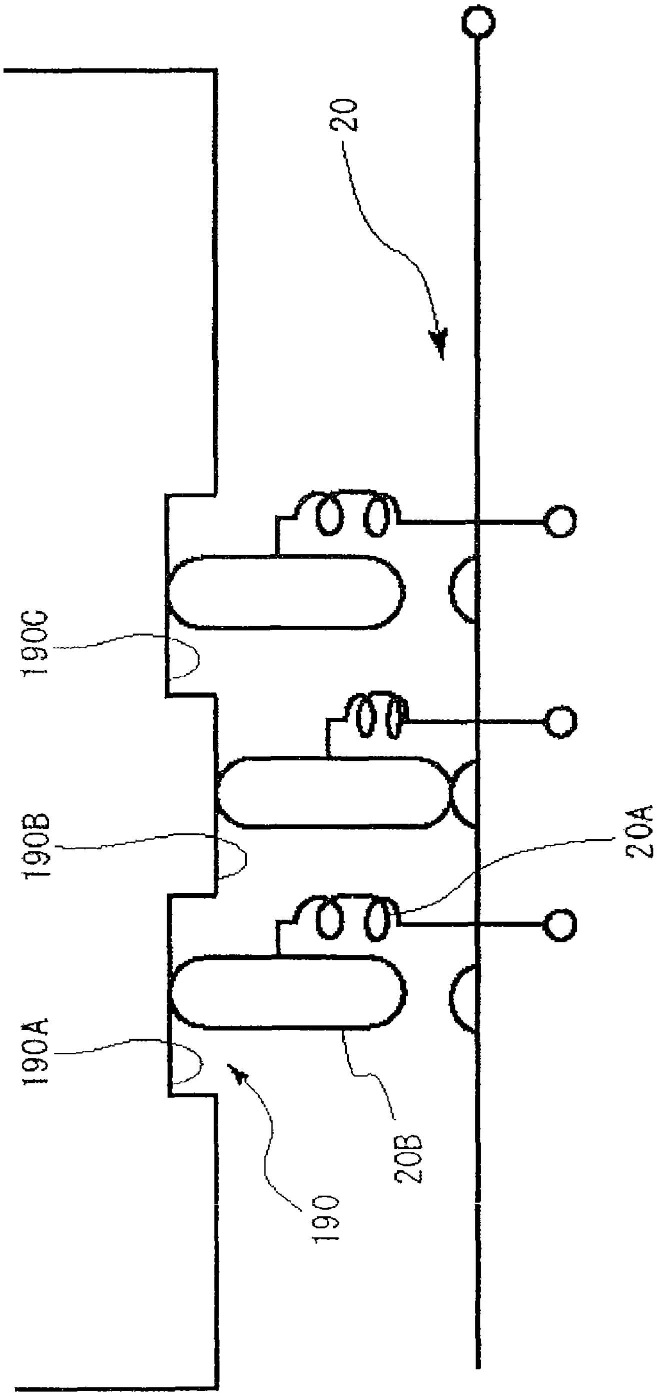
FIG. 27 is an explanatory view illustrating one example of construction of a sensor detecting layout-information of a RFID tag of a cartridge.

FIG. 27 is an explanatory view illustrating one example of the construction of the above-mentioned sensor 20.

In FIG. 27, the sensor 20, in this example, is a mechanical switch in which with respect to identifiers 190A to 190C of the part to be detected (element to be detected) possessing a concavo-convex shape, a contact 20B of a spring member 20A is biased to be in contact, thereby detecting the concavo-convex shape, and a detection signal is to be output to the control circuit 130 from the contact 20B located corresponding to each depression or projection.

These identifiers 190A to 190C, with the presence or absence of the above-mentioned depression and projection, indicate the above-mentioned layout-information of a RFID tag (information representing the layout position of the RFID circuit element To in the base tape 101. For example, a tape width, layout interval information of the RFID circuit element To and the like are included.) of the cartridge 100, and the above-mentioned sensor 20 detects this layout-information of a RFID tag regarding this cartridge 100 to output it to the control circuit 130.

Note that, the sensor 20 act as the above-mentioned second detecting device is not limited to a mechanical switch, but may be the other type, for example, a sensor using the reflection of lights. In this case, there are provided, for example, a light emitting diode emitting a light in response to a signal from the control circuit 130, and a photo transistor configured to receive a reflected light of this emitted light at each of the identifies 190A to 190C, and to output a corresponding detection signal to the control circuit 130.

Figure 28A:
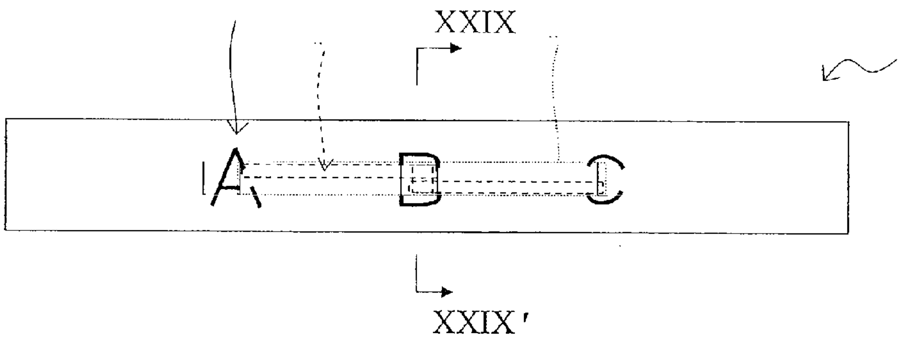
FIGS. 28A and 28B are a top view and a bottom view illustrating one example of an external appearance of a RFID label.
Figure 28B:
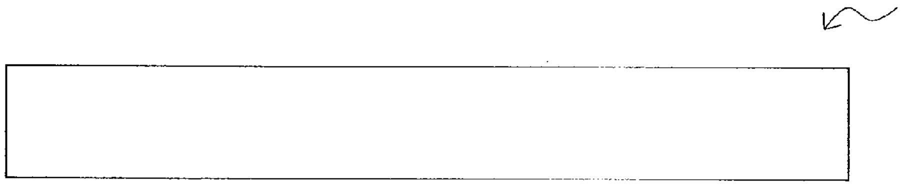

FIGS. 28A and 28B are views illustrating one example of an external appearance of RFID label T formed by read or write of information of the RFID circuit element To and the cut of the tag label tape 110 with print being completed in the same method as that of the above-mentioned first embodiment in the apparatus 2 for communicating with a RFID tag according to this embodiment, FIG. 28A is a top view and FIG. 28B is a bottom view, and they are drawings corresponding to FIG. 7A and FIG. 7B according to the above-mentioned first embodiment. Furthermore, FIG. 29 is a cross sectional view in XXIX-XXIX' in FIG. 7, and a drawing corresponding to FIG. 8 of the above-mentioned first embodiment.

Figure 29:
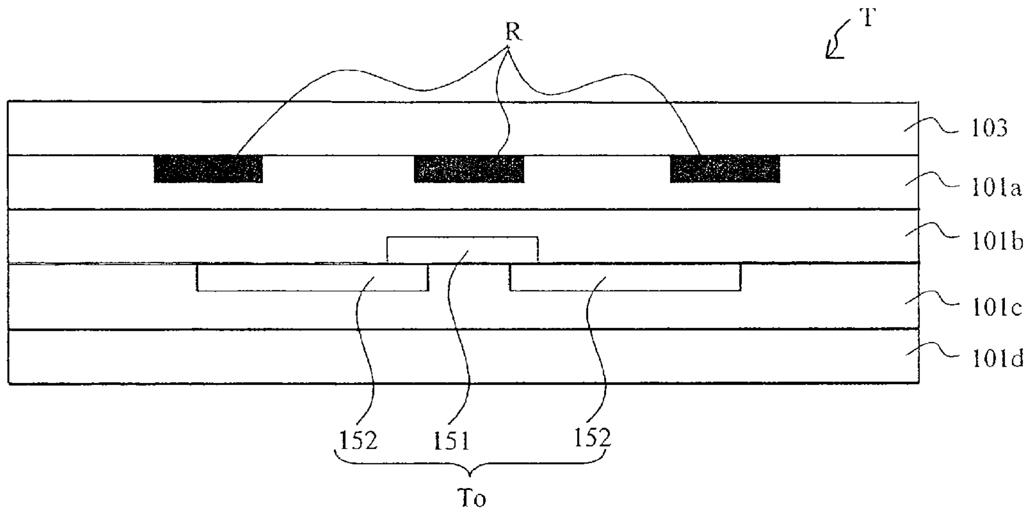
FIG. 29 is a cross sectional view in XXIX-XXIX' cross section in FIG. 28A.

In these FIGS. 28A, 28B and 29, according to this embodiment, a RFID label T, as with the above-mentioned first embodiment, is constructed to be of five layers of the cover film 103, the adhesive layer 101*a*, the base film 101*b*, the adhesive layer 101*c*, and the separation sheet 101*d*, with a RFID circuit element To included.

At this time, on the backside of the cover film 103, a print R (in this example, letters of "ABC") is printed, as illustrated in FIG. 28A, the print R, to visually recognize (identify) the layout region of the RFID circuit element To, is printed such that the print in a region TA (hereinafter, described as a tag layout region TA) corresponding to the layout position of the RFID circuit element To is more bold than outside of the region (details will be described later).

The feature of this embodiment, as described above, is that the apparatus 2 for communicating with a RFID tag functions to make a print such that the layout region of the RFID circuit element To can be visually recognized (identified), particularly that in this embodiment, a print aspect of the print R in the tag layout region TA corresponding to the layout position of the RFID circuit element To is selected out of a plurality of the print aspects by an operator (user), whereby the apparatus 2 for communicating with a RFID tag accordingly produces a RFID label T which print aspect in the tag layout region TA is changed.

Figure 30:
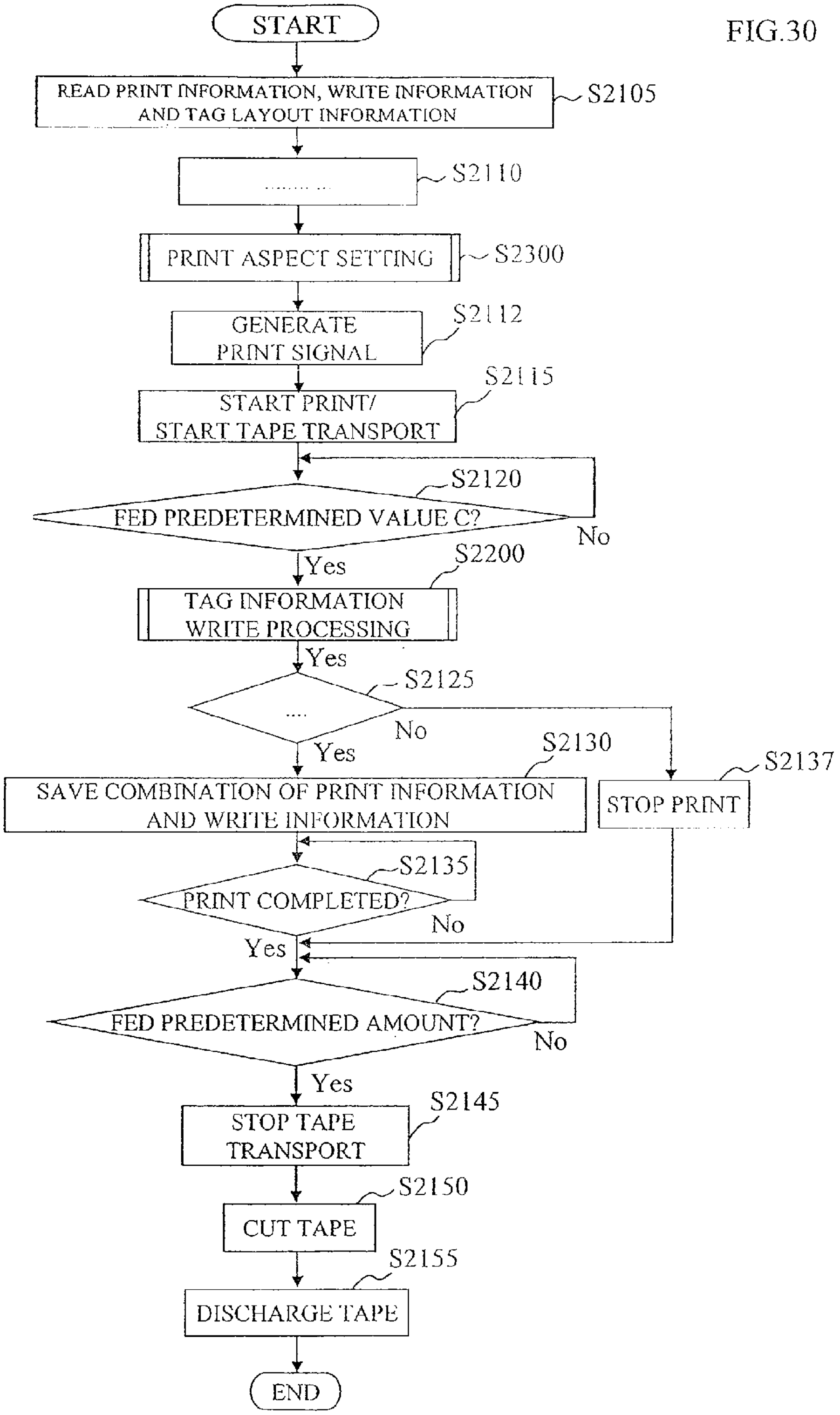
FIG. 30 is a flowchart illustrating a control procedure to be executed by the control circuit at the time of producing a RFID label.

FIG. 30 is a flowchart showing control procedure carried out by a control circuit 130 when, in the production of the RFID label T as mentioned above, the cover film 103 is fed and predetermined print is made thereon with the print head 10, as well as the cover film 103 is bonded with the base tape 101 to produce the tag label tape 110 with print, thereafter the RFID label T is formed by cutting the tag label tape 110 with print.

In FIG. 30, firstly in step S2105, the flow starts when writing is carried out in the apparatus 2 for communicating with RFID tags. Then in the same way as Step S1105 shown in FIG. 12 of the above-described first embodiment: information that is input via a terminal 5 or a general purpose computer 6 and is to be written into the IC circuit part 151 of a RFID circuit element To and print information that is to be printed on the RFID label T with the print head 10 in response to that are read via a communication line 3 and an input/output interface 31; and also layout-information of a RFID tag on a cartridge 100 detected with a sensor 20 is read via the input part 130*c* (refer to FIG. 12 to be described later). The print information read on this occasion is developed on a print buffer 130*b*1 of a print memory 130*b* and stored temporarily therein and the layout-information of a RFID tag is developed on a tag region buffer 130*d*1 of a tag region memory 130*d* and stored temporarily therein (refer to FIG. 32 to be described later).

Thereafter, in step S2110, in the same way as Step S1110 in FIG. 12, variables M and N to count the number of retries and a flag F indicating the communication quality are initialized to zero.

Then in step S2300, a print aspect of print R in a tag layout region TA is set in response to the input operation carried out by an operator via the terminal 5 or the general purpose computer 6 (for details, refer to FIG. 31 to be described later).

In subsequent step S2112, a control signal to be output to the print-head driving circuit 25 is generated corresponding to the print aspect set in the step S2300 mentioned above based on the print information and the layout-information of a RFID tag read in the step S2105 (for details, refer to FIG. 32 to be described later).

Then in step S2115, in the same way as Step S1115 of FIG. 12 described previously, the ribbon take-up roller 106 and the tape feeding roller 107 are driven to rotate and the base tape 101 is fed out from the first roll 102 and the cover film 103 is fed out from the second roll 104. On this occasion, the control signal generated in the step S2112 is output to the print-head driving circuit 25, electricity is applied to the print head 10, and print R such as letters, symbols, bar codes, and the like read in step S2105 is printed in a predetermined region of the cover film 103 while the print aspect in the tag layout region TA is changed corresponding to the print aspect set in the step S2300. Further the feeding roller 17A is driven to rotate in the same way as described previously. As a result, the base tape 101 and the printed cover film 103 are integrated to form the tag label tape 110 with print, and carried-out from the cartridge 100 as described previously.

Thereafter in step S2120, whether or not the tag label tape 110 with print is conveyed by a predetermined distance C (for example, a conveyed distance until a RFID circuit element To which the cover film 103 having corresponding print is bonded reaches a feeding guide 13) is determined. The determination of the conveyed distance may sufficiently be carried out, for example, by detecting an appropriate identification mark disposed on the base tape 101 (for example, a cut mark PM described in FIG. 3 in the above-described first embodiment) with a separately attached known tape sensor (a sensor similar to a photo sensor 19 in the above-described first embodiment may also be accepted). When the determination is satisfied, the operation goes to Step S2200. In step S2200, RFID tag information is written and, after initializing (erasing) memories for writing, the RFID tag information is transmitted to the RFID circuit element To and written (for details, refer to FIG. 33 to be described later). After the completion of Step S2200, the operation goes to Step S2125.

In step S2125, in the same way as Step S1125 described previously, whether or not a flag F is zero is determined. Since F keeps zero if the writing is completed normally (refer to Step S2245 in the flow shown in FIG. 33 to be described later), the determination is satisfied and the operation goes to Step S2130.

In step S2130, in the same way as Step S1130 described previously, the combination of the information written in the IC circuit part 151 of the RFID circuit element To in the step S2200 and the print information printed with the print head 10 corresponding thereto is stored in an information sever 7 and a route server 4. Here, the stored data are stored and held in, for example, a database so as to be referable via the terminal 5 or the general purpose computer 6 when necessary.

Thereafter in step S2135, the fact that print to the region in the cover film 103 corresponding to the RFID circuit element To that is an object to be processed at this moment is completely ended is confirmed and thereafter the operation goes to Step S2140.

Here, in Step S2125 mentioned above, when writing is not completed normally for some reason, F is regarded as one (refer to Step S2245 in the flow shown in FIG. 33 to be described later). Consequently, the determination in step S2125 is not satisfied, the operation goes to Step S2137, printing is stopped in the half-way in the same way as Step S1137 described previously, and thereafter the operation goes to Step S2140.

In step 2140, whether or not the tag label tape 110 with print is further conveyed by a predetermined distance (for example, the distance by which all the RFID circuit element To as the object and the print region of the cover film 103 corresponding thereto are conveyed to the extent of exceeding a cutter 15 by a predetermined length (an excessive distance)) is determined. The conveying distance determination on this occasion may also be carried out sufficiently by, for example, detecting a mark with a tape sensor in the same way as Step S2120 described previously. When the determination is satisfied, the operation goes to Step S2145.

In step S2145, in the same way as Step S1145 described previously, the feed-out of the base tape 101 from the first roll 102, the feed-out of the cover film 103 from the second roll 104, and the transportation of the tag label tape 110 with print with the feeding roller 17 are stopped.

Thereafter in step S2150, in the same way as Step S1150 described previously, the tag label tape 110 with print is cut with the cutter 15. As described previously, on this occasion, all the RFID circuit element To and the print region of the cover film 103 corresponding thereto are sufficiently conveyed beyond the cutter 15 and, by the cutting with the cutter 15, a label-shaped RFID label T on which predetermined RFID tag information is written in the RFID circuit element To and predetermined print corresponding thereto is made is produced.

Thereafter, the operation goes to Step S2155, in the same way as Step S1155 described previously, transportation with the feeding roller 17 is restarted and the produced RFID label T is discharged.

Figure 31:
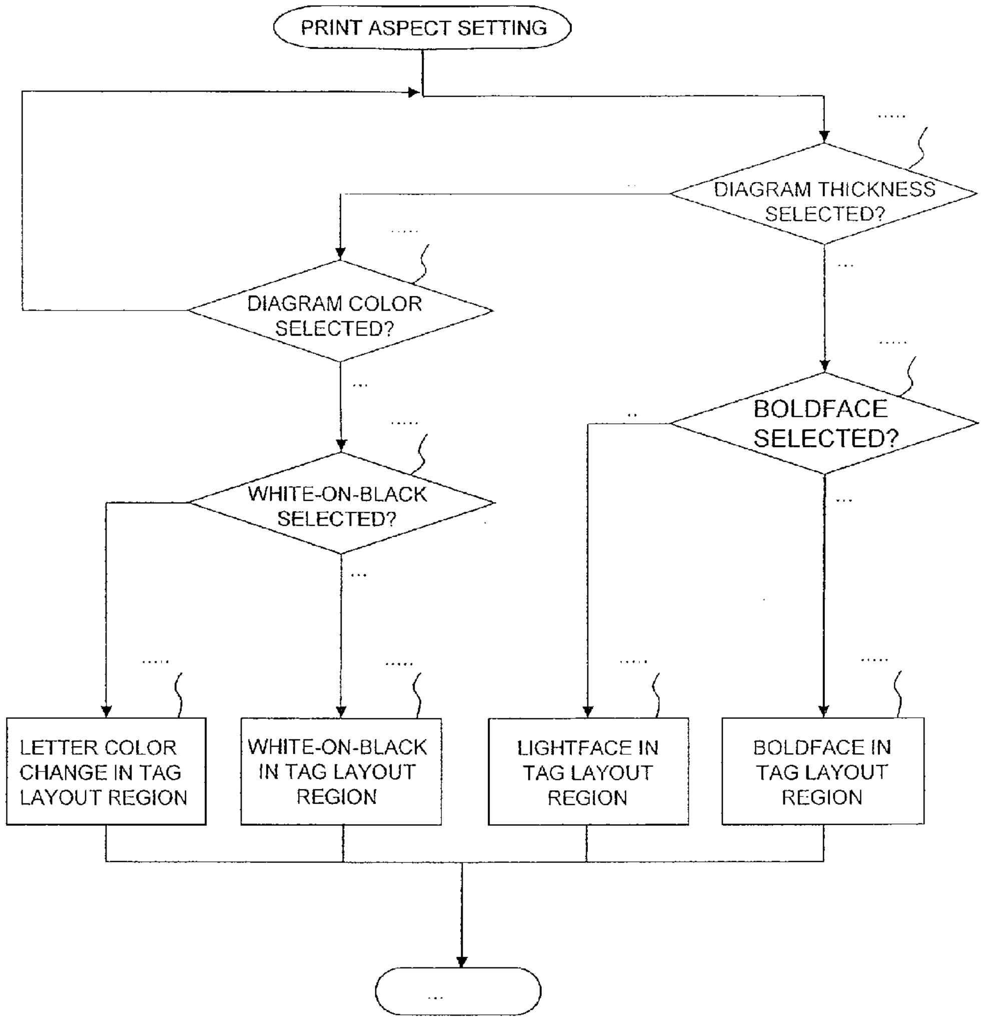
FIG. 31 is a flowchart illustrating a detailed procedure of Step S2300 in FIG. 30.

FIG. 31 is a flowchart showing detailed procedure of Step S2300 mentioned above.

In FIG. 31, firstly in step S2310, via the terminal 5 or the general purpose computer 6, whether or not an operator has selected and input a line drawing thickness as the print aspect to be changed in a tag layout region TA is determined. Here, the input on this occasion is carried out by, in the terminal 5 or the general purpose computer 6, selecting and inputting the line drawing thickness from the selective display (here line drawing thicknesses or line drawing colors) of a predetermined print aspect. When the determination is satisfied, the operation goes to subsequent Step S2320.

In step S2320, whether or not an operator has selected and input a boldface as the print aspect in the tag layout region TA is determined. When the determination is satisfied, the operation goes to Step S2330 and the print aspect in the tag layout region TA is set at the boldface. On the other hand, when an operator has not selected a boldface, the determination is not satisfied, the operation goes to Step S2340, and the print aspect in the tag layout region TA is set at a lightface.

Here, the thickness of print when a boldface or a lightface is set in step S2330 or S2340 mentioned above may be automatically set at an appropriate predetermined thickness, for example an operator may input the thickness of print in the form of a numerical value completely freely. Otherwise an operator may select and input a print thickness from among a plurality of predetermined print thicknesses.

In contrast, when the line drawing thickness is not selected in foregoing step S2310, the determination is not satisfied and the operation goes to subsequent Step S2350. In the step S2350, whether or not an operator has selected and input a line drawing color as the print aspect to be changed in the tag layout region TA is determined. When the determination is not satisfied, the operation goes back to Step S2310. When the determination is satisfied, the operation goes to subsequent Step S2360.

In step S2360, whether or not an operator has selected and input black-white inversion as the print aspect in the tag layout region TA is determined. When the determination is satisfied, the operation goes to Step S2370 and the print aspect in the tag layout region TA is set at the black-white inversion. On the other hand, when the operator has not selected the black-white inversion, the determination is not satisfied, the operation goes to Step S2380, and the print aspect in the tag layout region TA is set at font color change.

Here, in the selection of a font color when font color change is selected in step S2380, predetermined font colors may be set, for example, so that the print color may be set at red in the tag layout region TA and at black in the other regions. Besides the case, an operator may freely assign a font color.

Figure 32:
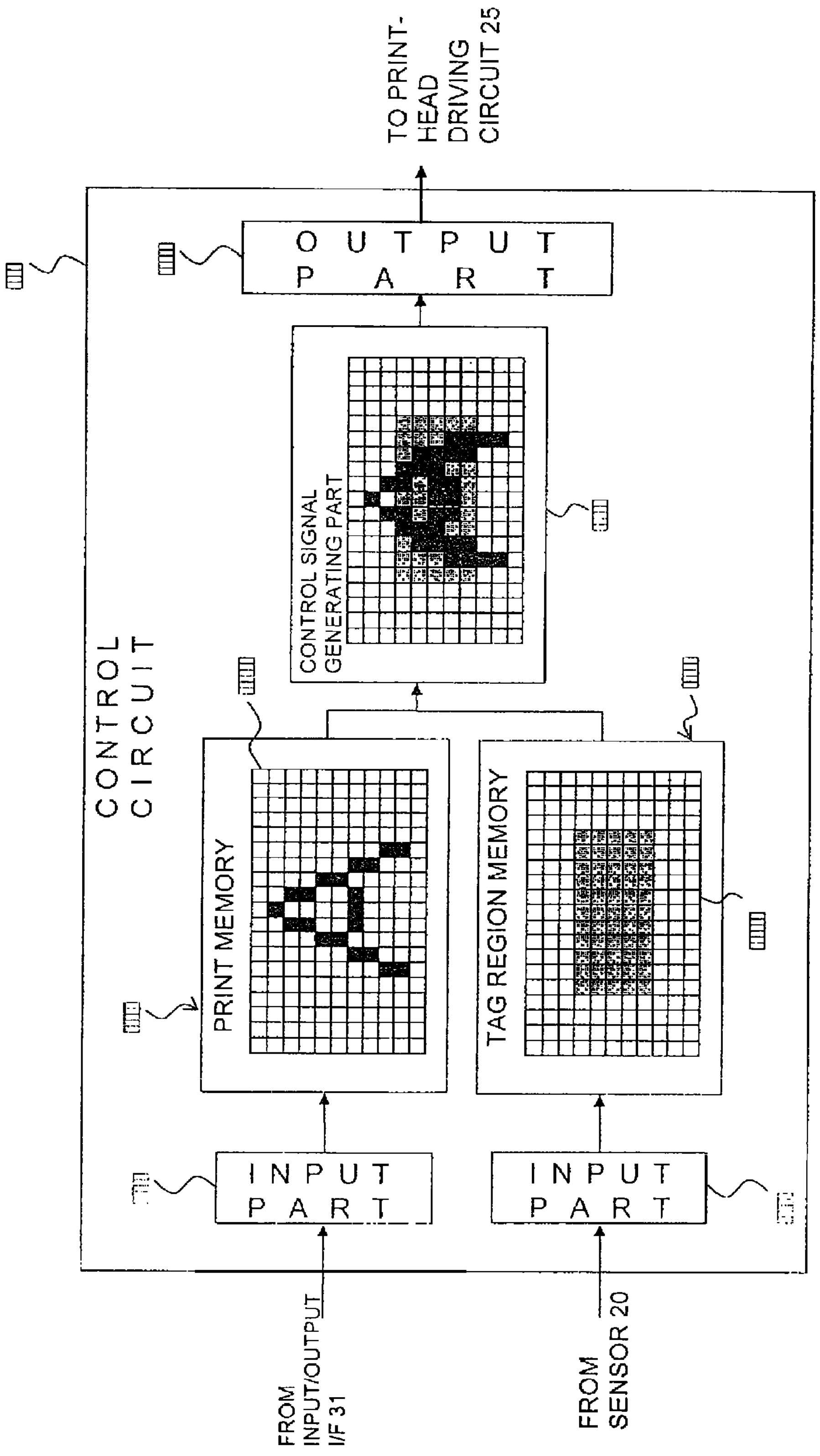
FIG. 32 is a functional block diagram extracting and illustrating a portion relating to the generation of a control signal for printing that is executed in Step S2112 of FIG. 30 of functions of the control circuit.

FIG. 32 is a functional block diagram showing the part that is extracted from the functions of the control circuit 130 and related to the generation of control signals for print executed in step S2112 in FIG. 30 mentioned above.

In FIG. 32, the control circuit 130 is provided with: an input part (a print information input means) 130*a* to input print information from the input/output interface 31; a print memory (a second print data storage means) 130*b* to develop the print information input via the input part 130*a* on a print buffer (a storage region for print data) 130*b*1 and temporarily store it therein; another input part (a layout-information of a RFID tag input means) 130*c* to input layout-information of a RFID tag detected with a sensor 20 from a part to be detected 190 disposed in a cartridge 100; a tag region memory (a tag layout data storage means) 130*d* to develop the layout-information of a RFID tag input via the input part 130*c* on a tag region buffer (a storage region for layout-data of a RFID tag) 130*d*1 and temporarily store it therein; a control signal generating part 130*e* as a second print controller to generate a control signal to be output to a print-head driving circuit 25 based on the print information and the layout-information of a RFID tag stored in the print memory 130*b* and the tag region memory 130*d* respectively; and an output part 130*f* to output the generated control signal to the print-head driving circuit 25.

The print memory 130*b* develops the input print information on the print buffer 130*b*1 and converts it into alignment information of dots (here two kinds of dots; black and white). Here, in FIG. 32, for the simplification of the explanations, the case where only one letter "A" is input as the print letter R is shown.

Meanwhile, the tag region memory 130*d* sets a tag layout region TA (refer to FIG. 28 described previously) corresponding to the layout position of a RFID circuit element To from the input layout-information of a RFID tag. The tag layout region TA is set so as to be somewhat larger than the actual layout region of the RFID circuit element To as shown in FIG. 28A described previously from the viewpoint of securely preventing the RFID circuit element To from being cut. Here, the tag layout region TA may also be set so as to be nearly as large as the actual layout region of the RFID circuit element To. Then, the region information of the set tag layout region TA is developed on the tag region buffer 130*d*1 and converted into the alignment information of dots (here two kinds of dots; gray and white).

Here, the capacities of the print buffer 130*b*1 and the tag region buffer 130*d*1 are set so as to be nearly identical to each other and also set at the capacities corresponding to the size of the actual tag layout region TA. With the arrangement, at least data of the amount corresponding to the tag layout region TA can be stored and print that makes the tag layout region TA visually recognizable (identifiable) against other regions can be assured.

The control signal generating part 130*e* generates a control signal corresponding to the print aspect set via the print aspect setting shown in FIG. 31 shown earlier based on the print information stored in the print memory 130*b* and the layout-information of a RFID tag store in the tag region memory 130*d*. More specifically, when a boldface is set in the tag layout region in step S2330 in FIG. 31 for example, as shown in FIG. 32, the print information on the print buffer 130*b*1 is processed so that the thickness of the letters at the part corresponding to the tag layout region TA in the print information may increase. Then the output part 130*f* outputs the print information on the buffer processed as mentioned above to the print-head driving circuit 25 as control signals aligned in rows. Here, although the print information and the layout-information of a RFID tag are shown in a superimposed manner in the control signal generating part 130*e* for the easiness of comprehension in the figure, the information output as the control signals is only the print information shown with the black color and the layout-information of a RFID tag shown with the gray color in the figure is not output.

Figure 33:
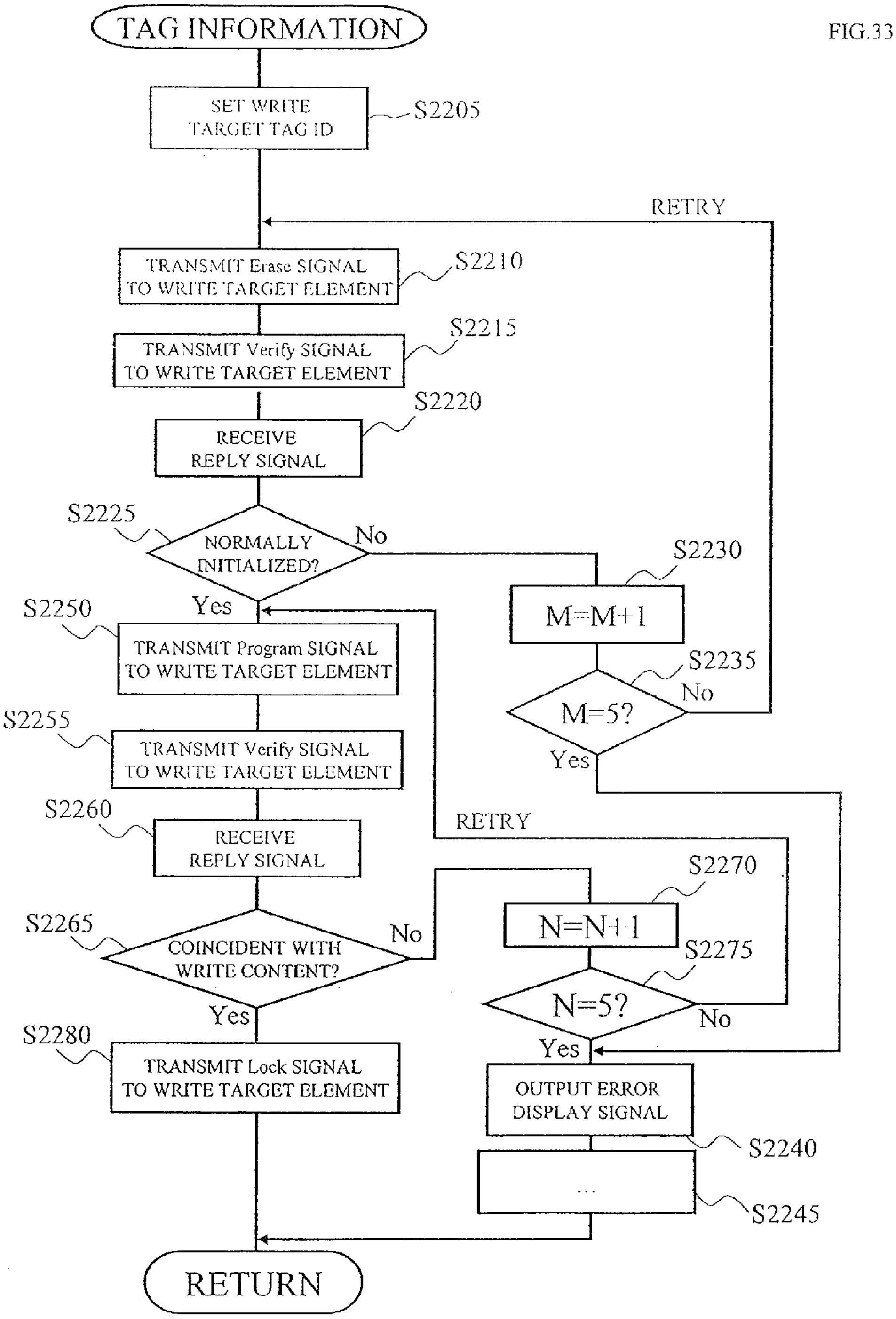
FIG. 33 is a flowchart illustrating a detailed procedure of Step S2200 in FIG. 30.

FIG. 33 is a flowchart showing detailed procedure of Step S2200 in FIG. 30 mentioned above.

In FIG. 33, firstly in step S2205, identification numbers ID (ID information, tag IDs) of a plurality of RFID circuit elements To contained in one RFID label T that is an object of writing by an appropriate known method are set respectively (as described previously, as the identification information written in a RFID tag To, ID information differentiated for each RFID circuit element To is always stored and each RFID circuit element To can be accessed without interference), and a RFID circuit element To into which information is written is conveyed in the vicinity of the antenna 14.

Thereafter, in step S2210, an "Erase" command to initialize information stored in a memory part 157 of the RFID circuit element To is output to the signal processing circuit 22. Based on this, the "Erase" signal as access information: is generated at the signal processing circuit 22; is transmitted to the RFID circuit element To into which information is written via the radio frequency circuit 21; and initializes the memory part 157.

Subsequently, in step S2215, a "Verify" command to confirm the content in the memory part 157 is output to the signal processing circuit 22. Based on this, the "Verify" signal as access information: is generated at the signal processing circuit 22; is transmitted to the RFID circuit element To into which information is written via the radio frequency circuit 21; and requests a reply. Thereafter in step S2220, a reply signal transmitted from the RFID circuit element To into which information is written is: received in response to the "Verify" signal via the antenna 14; and taken in via the radio frequency circuit 21 and the signal processing circuit 22.

Next, in step S 2225, based on the reply signal, information in the memory part 157 of the relevant RFID circuit element To is confirmed and whether or not the memory part 157 has been normally initialized is determined.

When the determination is not satisfied, the operation goes to Step S2230, one is added to M, and further whether or not M equals five is determined in step S2235. When M is four or less, the determination is not satisfied, the procedure goes back to Step S2210, and the same procedure is repeated. When M equals five, the operation goes to Step S2240, an error display signal is output to the terminal 5 or the general purpose computer 6 via the input/output interface 31 and the communication line 3, corresponding write failure (error) is displayed, and the flow is terminated. In this way, even if initialization is unsuccessful, retry may be carried out up to five times.

When the determination is satisfied in step S2225, the operation goes to Step S2250, and a "Program" command to write intended data to the memory part 157 is output to the signal processing circuit 22. Based on this, the "Program" signal as access information (RFID tag information such as ID information) is generated at the signal processing circuit 22 and transmitted to the RFID circuit element To into which information is written via the radio frequency circuit 21. Thereby the information is written into the memory part 157.

Thereafter in step S2255, a "Verify" command is output to the signal processing circuit 22. Based on this, the "Verify" signal as access information: is generated at the signal processing circuit 22; is transmitted to the RFID circuit element To into which information is written via the radio frequency circuit 21; and requests a reply. Thereafter in step S2260, a reply signal transmitted from the RFID circuit element To into which information is written in response to the "Verify" signal is: received via the antenna 14; and taken in via the radio frequency circuit 21 and the signal processing circuit 22.

Subsequently in step S2265, based on the reply signal, the information stored in the memory part 157 of the relevant RFID circuit element To is confirmed and whether or not the transmitted predetermined information is normally stored in the memory part 157 is determined.

When the determination is not satisfied, the operation goes to Step S2270, one is added to N, and further whether or not N equals five is determined in step S2275. When N is four or less, the determination is not satisfied, the procedure goes back to Step S2250, and the same procedure is repeated. When N equals five, the operation goes to Step S2240 described previously, likewise corresponding write failure (error) is displayed on the terminal 5 or the general purpose computer 6, the flag F is set at one in step S2245, and the flow is terminated. In his way, even if information writing is unsuccessful, retry may be carried out up to five times.

When the determination is satisfied in step S2265, the operation goes to Step S2280, and a "Lock" command is output to the signal processing circuit 22. Based on this, the "Lock" signal is generated at the signal processing circuit 22 and transmitted to the RFID circuit element To into which information is written via the radio frequency circuit 21, and additional writing of information to the relevant RFID circuit element To is prohibited. Thereby the writing of RFID tag information into the RFID circuit element To into which the information is written is completed and the flow is terminated.

By the above routine, it is possible to write intended RFID tag information (ID information and the like) into the IC circuit part 151 of the RFID circuit element To be accessed in the cartridge 100.

FIGS. 34A to 34D are views illustrating one example of the external appearances of RFID label printed and formed in various print aspects as mentioned above.

Figure 34A:
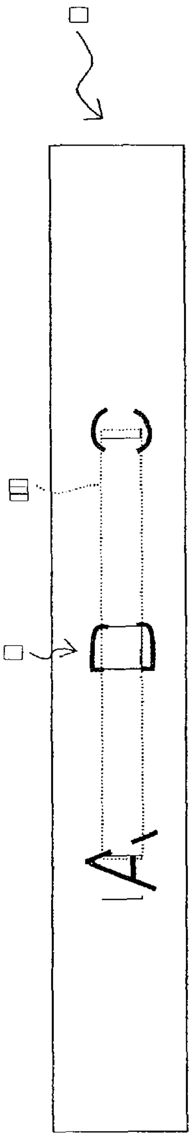
FIGS. 34A to 34D are views illustrating an example of an external appearance of each RFID label that is printed and formed in each print aspect using an apparatus for communicating with a RFID tag.
Figure 34B:
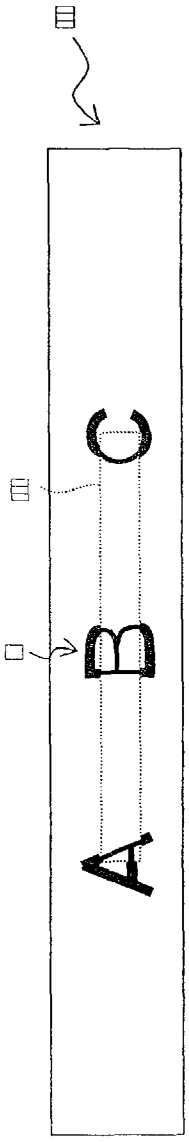
Figure 34C:
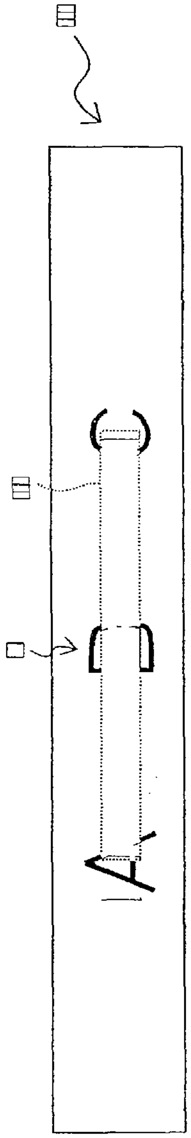
Figure 34D:
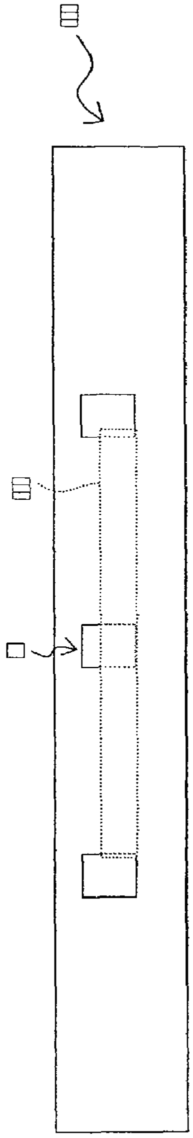

In FIGS. 34A to 34D, FIG. 34A shows a RFID label T (the same as the RFID label T shown in FIG. 28 described previously) in the case where a boldface is set in the tag layout region in step S2330 in FIG. 31, and FIG. 34B shows a RFID label T1 in the case where a lightface is set in the tag layout region in step S2340 in FIG. 31. Further, FIG. 34C is an example of a RFID label T2 in the case where black-white inversion is set in the tag layout region in step S2370 in FIG. 31, and here an example wherein the outside of the tag layout region TA is printed with black and the inside of the tag layout region TA is inversed and printed with white is shown. Here, inversely, the outside of the tag layout region TA may be printed with white and the inside of the tag layout region TA may be printed with black. FIG. 34D is an example of a RFID label T3 in the case where the font color change is set in the tag layout region in step S2380 in FIG. 31, and here an example wherein print is applied so that the font color at the inside of the tag layout region TA may be thinner than that at the outside is shown. Here, inversely, print may be made so that the font color at the inside of the tag layout region TA may be thicker than that at the outside. Otherwise, print may be made so as to change the color itself (including the change in gradation).

As described above, in an apparatus 2 for communicating with RFID tags according to the present embodiment, a base tape 101 on which RFID circuit elements To are disposed at nearly equal intervals is fed out, a tag label tape 110 with print produced by bonding the fed-out base tape 101 and a printed cover film 103 together is cut with the cutter 15, and thus the RFID label T is produced. On this occasion, print is made to the cover film 103 so that the thickness and the color of letters may be differentiated between the outside and the inside of the tag layout region TA and thereby the layout region TA of a RFID circuit element To may be visually recognized (identified). With the arrangement, the tag layout region TA is visualized at a glance and a user can easily recognize the tag layout region TA on the produced RFID label T from the printed side (from the top side). As a result, unnecessary parts of the RFID label T are easily cut and removed while the RFID circuit element To is prevented from being cut. Further, when the RFID label T is bonded to an object, it is possible to devise the affixing style and the affixing position easily depending on the region of the RFID circuit element To. Consequently, convenience for users can be enhanced.

On this occasion, in the present embodiment in particular, print aspects in a plurality of tag layout regions TA are set in advance as described previously and an operator (a user) can select a visually recognizable desirable print aspect from among the print aspects. With the arrangement, it is possible to surely recognize a tag layout region TA even when the user changes, and convenience for users can be surely enhanced.

Further, in the present embodiment in particular, the control circuit 130 is configured so as to have the print memory 130*b* to develop print information on the print buffer 130*b*1 and store it therein, and hence it is possible to store the print information generated at the control signal generating part 130*e* in the buffer before the print is made based on the print information stored in the print memory 130*b* and the layout-information of a RFID tag stored in the tag region memory 130*d*. As a result, when print is made, the control signal generating part 130*e* can process print by simply reading the print information stored in the buffer and outputting the print information as the drive signal to the print-head driving circuit 25, and hence it is possible to realize print control with a simple configuration.

Here, the present embodiment may be variously modified within the range not deviating from the spirit and the technical ideas of the present embodiment. Such variations will be described hereunder.

(2-1) The Case of Changing the Print Aspect of a Background

In the above embodiment, the tag layout region TA is made visually recognizable (identifiable) by changing the print aspect of the print letter R. Besides that, it is also acceptable to make the tag layout region TA visually recognizable (identifiable) by printing a background together with the print letter R on a cover film 103 and changing the print aspect on the background.

Figure 35:
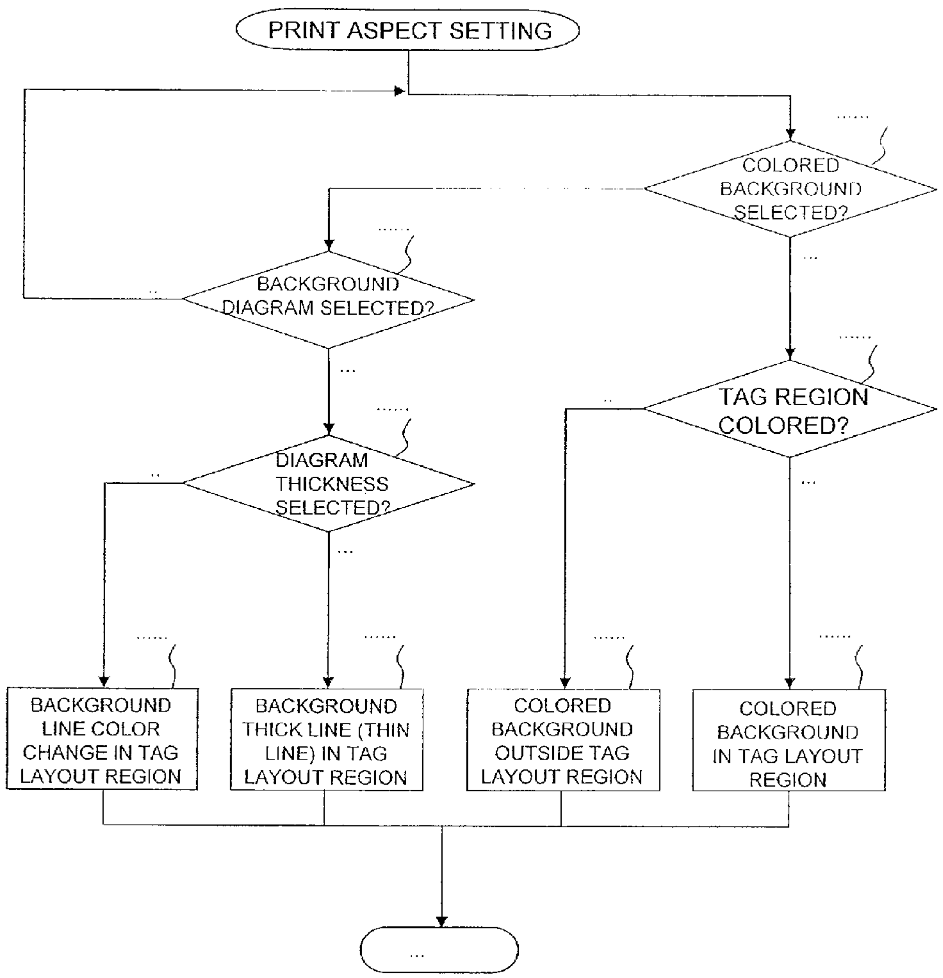
FIG. 35 is a flowchart illustrating a detailed procedure of a print aspect setting to be executed by a control circuit in the variation in which the print aspect of a background is varied.

Print aspect setting processed with a control circuit 130A according to the present variation (corresponding to Step S2300 in FIG. 30 of the above-described second embodiment) will be described with reference to FIG. 35. FIG. 35: is a flowchart showing detailed procedure of print aspect setting processed with the control circuit 130A according to the present variation; and corresponds to FIG. 31 of the above-described embodiment.

In FIG. 35, firstly in step S2310A, whether or not an operator has selected and input an ordinary color as the print aspect of the background of the print R (that is, it means not the background of a line drawing such as hatching to be described later but a homochromatic background) is determined via the terminal 5 or the general purpose computer 6. When the determination is satisfied, the operation goes to subsequent Step S2320A.

In step S2320A, whether or not an operator has selected and input coloring as the print aspect of the background in the tag layout region TA is determined. When the determination is satisfied, the operation goes to Step S2330A, and the print aspect of the background in the tag layout region TA is set at coloring. On the other hand, when an operator has not selected coloring in step S2320A mentioned above, the determination is not satisfied, the operation goes to Step S2340A, the background outside the tag layout region TA is colored, and the background in the tag layout region TA is set at a not-colored print aspect (that is a print aspect on a colored background). Here, on this occasion, the color of the background in the tag layout region TA is the same as the color of the base film 101*b* observed through the cover film 103.

Here, with regard to the color of the background, it is also acceptable to set a color beforehand and automatically color the background with the set color, or an operator may freely select and input a color in the print aspect setting.

On the other hand, when an operator has not selected coloring as the print aspect of the background in foregoing step S2310A, the determination is not satisfied, the operation goes to subsequent Step S2350A, and whether or not an operator has selected and input a line drawing as the print aspect of the background is determined. Here, a background with a line drawing means, for example, a background of hatching, meshing, or the like. When the determination is not satisfied, the procedure goes back to Step S2310A. When the determination is satisfied, the operation goes to subsequent Step S2360A.

In step S2360A, whether or not an operator has selected and input the thickness of the line drawing as the print aspect of the background in the tag layout region TA is determined. When the determination is satisfied, the operation goes to Step S2370A, and the print aspect is set so that the thickness of the line drawing of the background in the tag layout region TA may be thicker (or thinner) than that outside the region. On the other hand, when an operator has not selected the thickness of the line drawing in step S2360A, the determination is not satisfied, the operation goes to Step S2380A, and the print aspect is set so that the color of the line drawing of the background in the tag layout region TA may be differentiated from the color of the line drawing of the background outside the region.

Here, with regard to the thickness of the line drawing of the background, it is also acceptable to: set beforehand the thicknesses of the line drawings inside and outside of the tag layout region TA in the case where the line drawing in the tag layout region TA is thicker (or thinner); and automatically make a print with the set thicknesses. Otherwise, an operator may freely set and input the thickness of the line drawing in the print aspect setting. Further on this occasion, it is also acceptable to select and input a thickness from a plurality of predetermined thicknesses. Furthermore, with regard to the color of a line drawing of the background too, it is acceptable to: set the colors inside and outside the tag layout region TA beforehand; and automatically apply coloring with the set colors. Otherwise, an operator may freely set and input the color of the line drawing in the print aspect setting.

Figure 36:
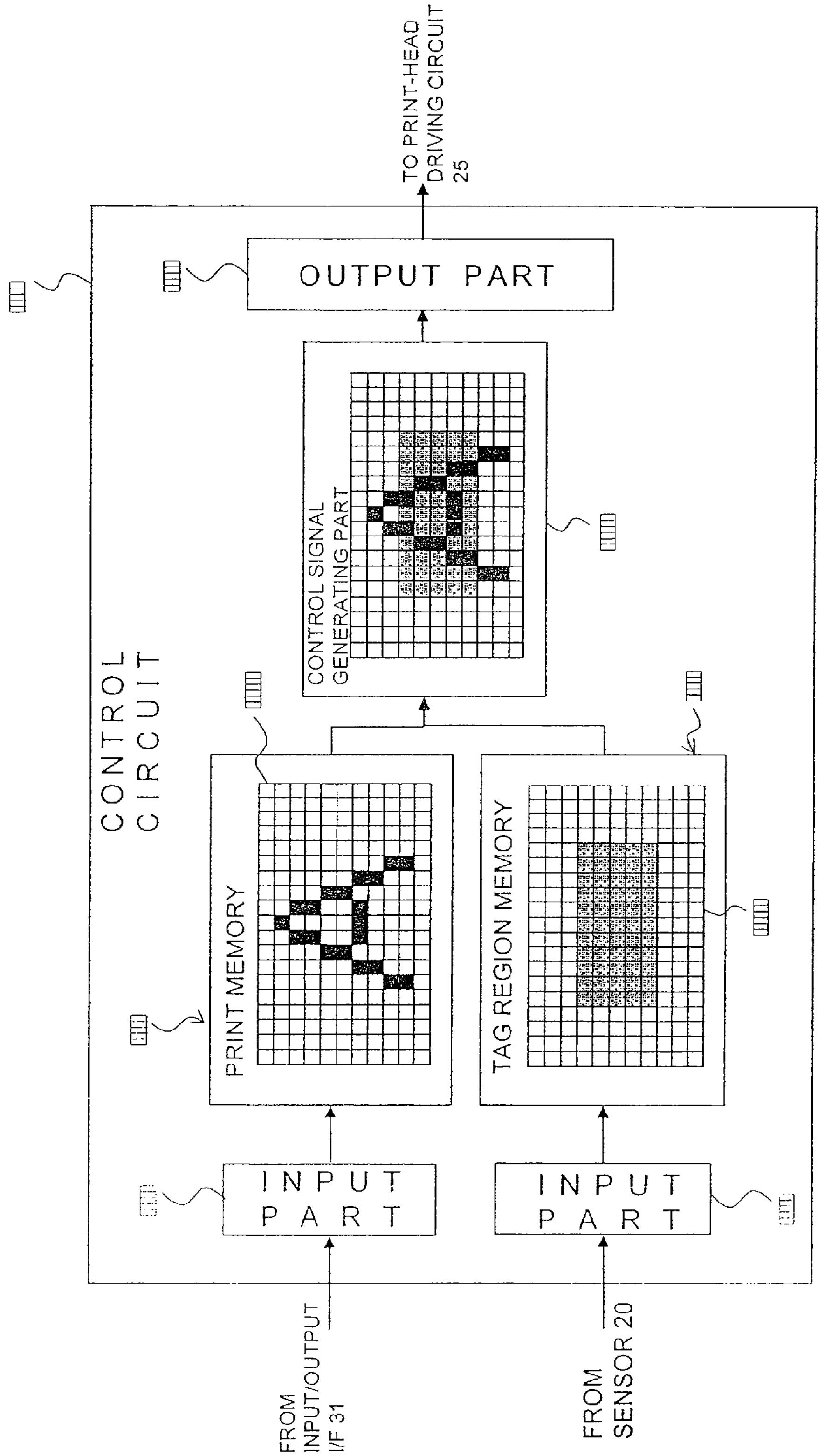
FIG. 36 is a functional block diagram extracting and illustrating a portion relating to the generation of a control signal for printing of functions of the control circuit in the variation in which the print aspect of a background is varied.

Subsequently, the generation of a print signal in a control circuit 130A (corresponding to Step S2112 in FIG. 30 of the above-described embodiment) is described with reference to FIG. 36. FIG. 36: is a functional block diagram showing the part that is extracted from the functions of the control circuit 130A according to the present variation and related to the generation of control signals for printing; and corresponds to FIG. 32 of the above-described second embodiment. In FIG. 36, the same parts as shown in FIG. 32 are represented by the same symbols and the explanations are omitted.

In FIG. 36, the part that is different from the functional block diagram shown in FIG. 32 is a control signal generating part 130Ae as the second print controller. That is, when coloring of the background in the tag layout region is set in step S2330A in FIG. 35 for example, as shown in FIG. 36, the control signal generating part 130Ae, based on the print information stored in the print buffer 130*b*1 of the print memory 130*b* and the layout-information of a RFID tag stored in the tag region buffer 130*d*1 of the tag region memory 130*d*, superimposes the print information and the layout-information of a RFID tag on the same buffer and synthesizes them. Then, the print information and the layout-information of a RFID tag on the buffer thus superimposed are output to the print-head driving circuit 25 as control signals aligned in rows. That is, the control signal generating part 130Ae according to the present variation, unlike the control signal generating part 130*e* shown in FIG. 32, outputs both the print information shown with black and the layout-information of a RFID tag shown with gray in FIG. 36 as the control signals.

FIGS. 37A to 37D are views illustrating one example of the external appearances of RFID label printed and formed in various print aspects in the present variation.

Figure 37A:
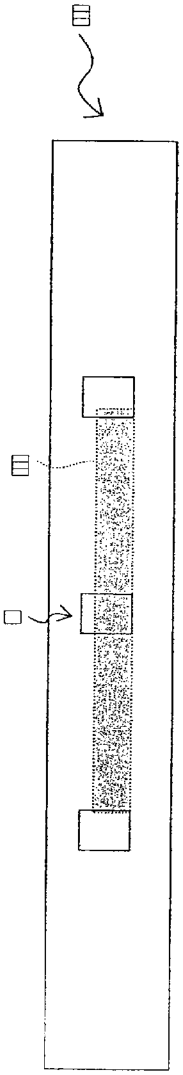
FIGS. 37A to 37D are views illustrating an example of an external appearance of each RFID label that is printed and formed in each print aspect in the variation in which the print aspect of a background is varied.
Figure 37B:
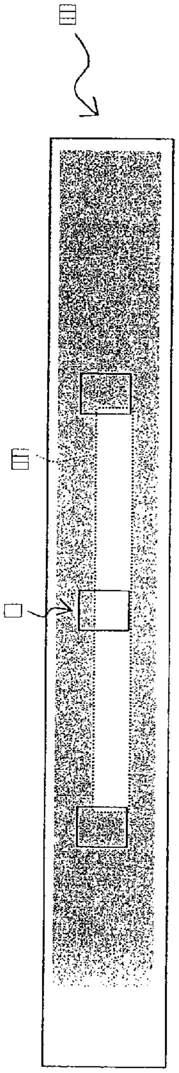
Figure 37C:
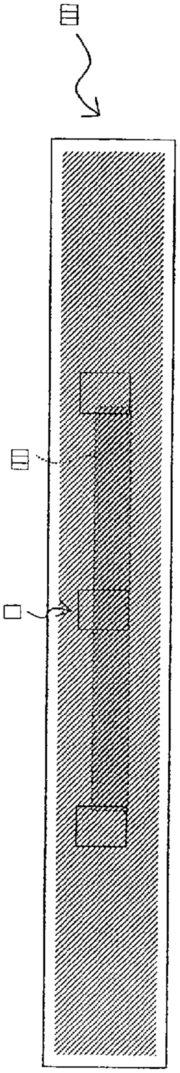
Figure 37D:
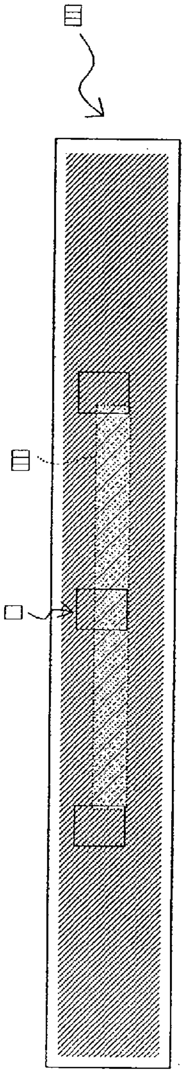

In FIGS. 37A to 37D, FIG. 37A shows a RFID label T4 in the case where the coloring of the background in the tag layout region is set in step S2330A in FIG. 35 described previously, and FIG. 37B shows a RFID label T5 in the case where the coloring of the background outside the tag layout region is set in step S2340A in FIG. 35. Further, FIG. 37C shows a RFID label T6 in the case where thick lines of the background are set in the tag layout region in step S2370A in FIG. 35. Here, contrary to the case of FIG. 37C, it is also acceptable to use thin lines at the background in the tag layout region TA. Furthermore, FIG. 37D is an example of a RFID label T7 in the case where the change of the line color of the background is set in the tag layout region in step S2380A in FIG. 35 and here an example wherein print is made so that the background line color inside the tag layout region TA may be thinner than that outside the tag layout region TA is shown. Here, inversely, it is also acceptable to make a print so that the background line color inside the tag layout region TA may be thicker than theat outside the tag layout region TA. Otherwise, print may be made so as to change the color itself (including the change in gradation).

The present variation described above also exhibits the same effect that the convenience of users is enhanced as the above-described second embodiment.

Here, in the above variation, coloring or printing of a line drawing is applied to the background. Besides that, for example a simple mark (a drawing pattern) or the like may be printed as the background in the tag layout region TA. On this occasion, it is possible to further draw attention from users, for example, by printing a drawing pattern that reminds users of a RFID circuit element To such as an antenna or the like.

(2-2) The Case of Expanding or Contract Print in Conformity with a Tag Layout Region In the above embodiment and the variation (2-1), a tag layout region TA is made visually recognizable (identifiable) by partially changing the print aspect of the part, of the print letter R and the background, located in the tag layout region TA. Besides that, it is also possible to: expand or contract the print letter R so as to conform to the size of the tag layout region TA; print the expanded or contracted print letter R; and thereby make the tag layout region TA visually recognizable (identifiable).

Figure 38:
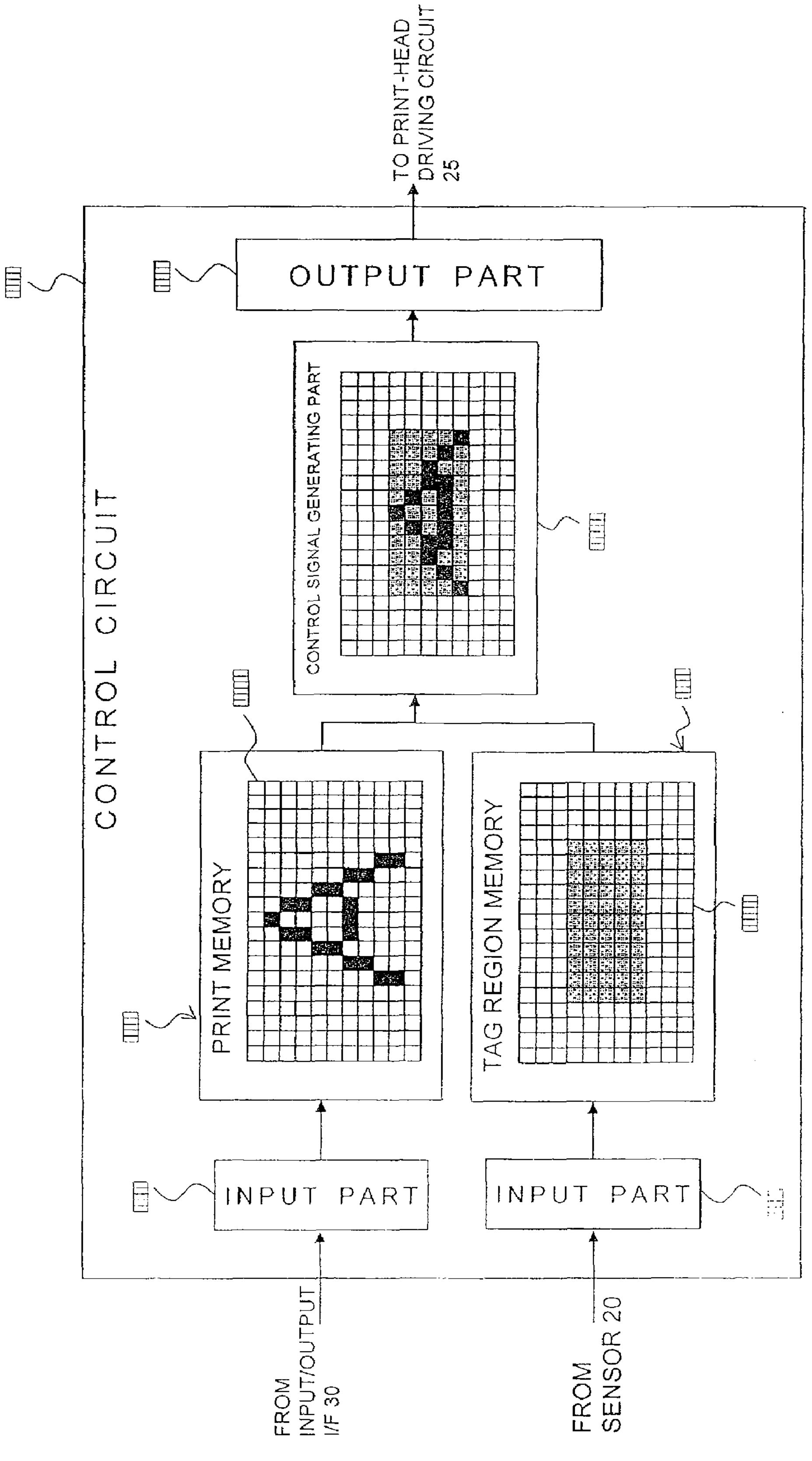
FIG. 38 is a functional block diagram of extracting and illustrating a portion relating to the generation of a control signal for printing of functions of a control circuit in a variation in which a print is expanded and contracted in conformity with the tag layout region.

FIG. 38: is a functional block diagram showing the part that is extracted from the functions of a control circuit 130B according to the present variation and related to the generation of control signals for printing; and corresponds to FIG. 32 of the above-described second embodiment and FIG. 36 of the above-described variation (2-1). In FIG. 38, the same parts as shown in FIGS. 32 and 36 are represented by the same symbols and the explanations are omitted. Here, in FIG. 38, the case where the print R is larger than the tag layout region TA is shown as the example.

In FIG. 38, a part different from the functional block diagrams shown in FIGS. 32 and 36 is a control signal generating part 130Be as the second print controller. That is, the control signal generating part 130Be, as shown in FIG. 38, contracts the print information on the buffer at appropriate ratios in the longitudinal and lateral directions so that the print letter R may stay in the tag layout region TA. Then the contracted print information on the buffer is output to the print-head driving circuit 25 as control signals aligned in rows via the output part 130*f*. Here, although the print information and the layout-information of a RFID tag are shown in a superimposed manner in the control signal generating part 130Be in FIG. 38, in the same way as the control signal generating part 130*e* in FIG. 32, the information output as the control signals is only the print information shown with the black color and the layout-information of a RFID tag shown with the gray color in the figure is not output.

Figures 39A, 39B, 39C:
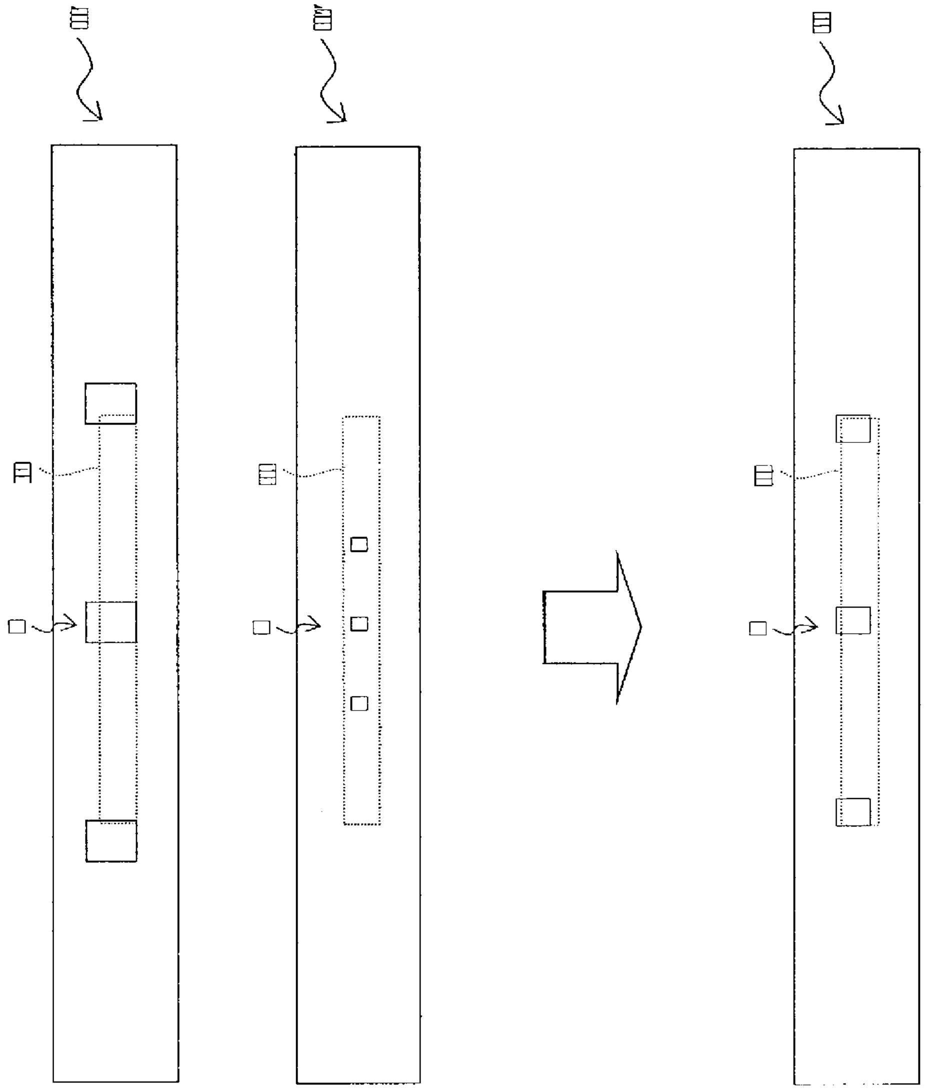
FIGS. 39A to 39C are views illustrating an example of an external appearance of the RFID label that is printed and formed in the variation in which a print is expanded or contracted in conformity with the tag layout region.

FIGS. 39A to 39C are views showing one example of the external appearances of RFID label printed and formed in the present variation.

In FIGS. 39A to 39C, FIG. 39A shows a RFID label T8' in the case where the print R is printed and formed without expansion or contraction as a trial and thereby is larger than the tag layout region TA, FIG. 39B shows a RFID label T8" in the case where the print R is printed and formed without expansion or contraction as a trial and thereby is smaller than the tag layout region TA, and FIG. 39C shows a RFID label T8 produced with an apparatus for communicating with RFID tags according to the present variation in the case of FIG. 39A or 39B above. As shown in FIG. 39, in the RFID label T8, the print R is expanded and contracted at appropriate ratios in the longitudinal and lateral directions and printed so that the print region may be nearly identical to the tag layout region TA.

The present variation described above also exhibits the same effect that the convenience of users is enhanced as the above-described second embodiment.

(2-3) The Case of not Having at Least One of a Print Buffer and a Tag Buffer

Although the control circuit is configured so as to: have both the print memory and the tag region memory; develop the print information and the layout-information of a RFID tag on the buffers of the respective memories; and temporarily store them therein in the above-described second embodiment and the variations (2-1) and (2-2), it is not necessary to have both the buffers as long as the effect of the present embodiment that the convenience of users is enhanced is obtained. That is, the present invention can apply also to an apparatus for communicating with RFID tags of the case where: the control circuit has only a print buffer; the control circuit has only a tag region buffer; or the control circuit does not have both a print buffer and a tag region buffer. Each of the cases will be described hereunder.

(A) The Case of Having Only a Print Buffer

Figure 40:
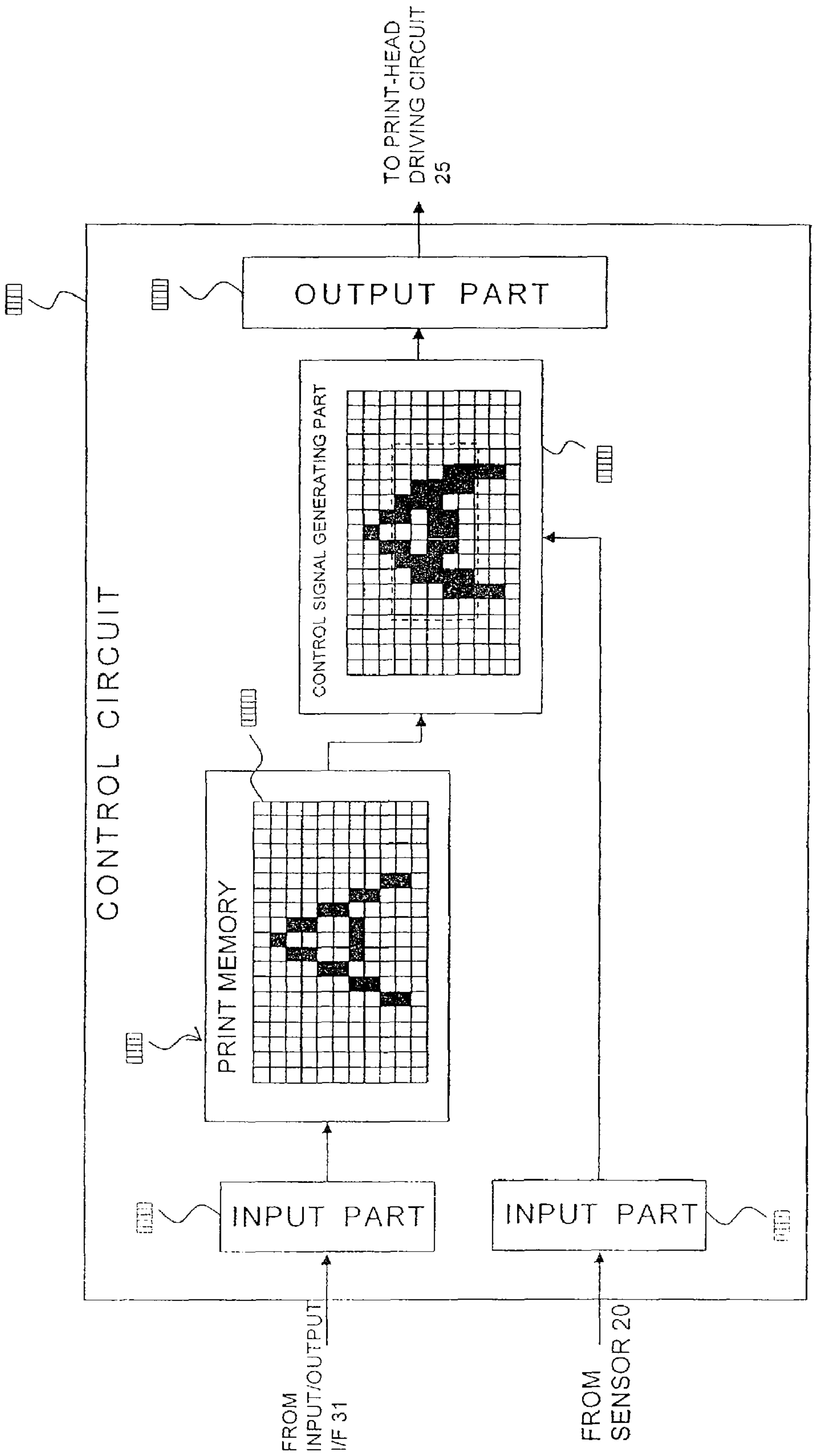
FIG. 40 is a functional block diagram of extracting and illustrating a portion relating to the generation of a control signal for printing of functions of a control circuit in a variation with no tag region buffer part.

FIG. 40: is a functional block diagram showing the part that is extracted from the functions of a control circuit 130C according to the present variation and related to the generation of control signals for printing; and corresponds to FIG. 32 and the like of the above-described second embodiment. In FIG. 40, the same parts as shown in FIG. 32 and the like are represented by the same symbols and the explanations are omitted. Here, FIG. 40 shows the case where a boldface is set in a tag layout region in step S2330 in FIG. 31 described previously.

In FIG. 40, the parts different from the functional block diagram shown in FIG. 32 and the like are that the control circuit does not have a tag region memory 130*d* and has a control signal generating part 130Ce as the second print controller, in place of the control signal generating part 130*e*. That is, in the present variation, the layout-information of a RFID tag input from a sensor 20 is not developed on a tag region buffer 130*d*1 of a tag region memory 130*d* and is directly input into the control signal generating part 130Ce. The control signal generating part 130Ce processes the print information stored in a print buffer 130*b*1 of a print memory 130*b* using the input layout-information of a RFID tag. Then, the processed print information is output to a print-head driving circuit 25 as control signals aligned in rows via an output part 130*f*.

As a result, in the same way as the above-described second embodiment, the print R is printed in the print aspect of a boldface in the tag layout region TA and a RFID label T is produced. Consequently, the tag layout region TA can be recognized at a glance and convenience for users can be enhanced. Further, in the present variation, the control circuit 130 is configured so as to have the print memory 130*b* that develops the print information on the print buffer 130*b*1 and stores the information therein, and hence it is also possible to obtain the effect that print control can be realized with a simple configuration in the same way as the above-described second embodiment. Moreover, since the control circuit 130C is configured so as not to have the tag region memory 130*d*, it is possible to simplify the structure of the control circuit in comparison with the above-described second embodiment.

(B) The Case of Having Only a Tag Region Buffer

Figure 41:
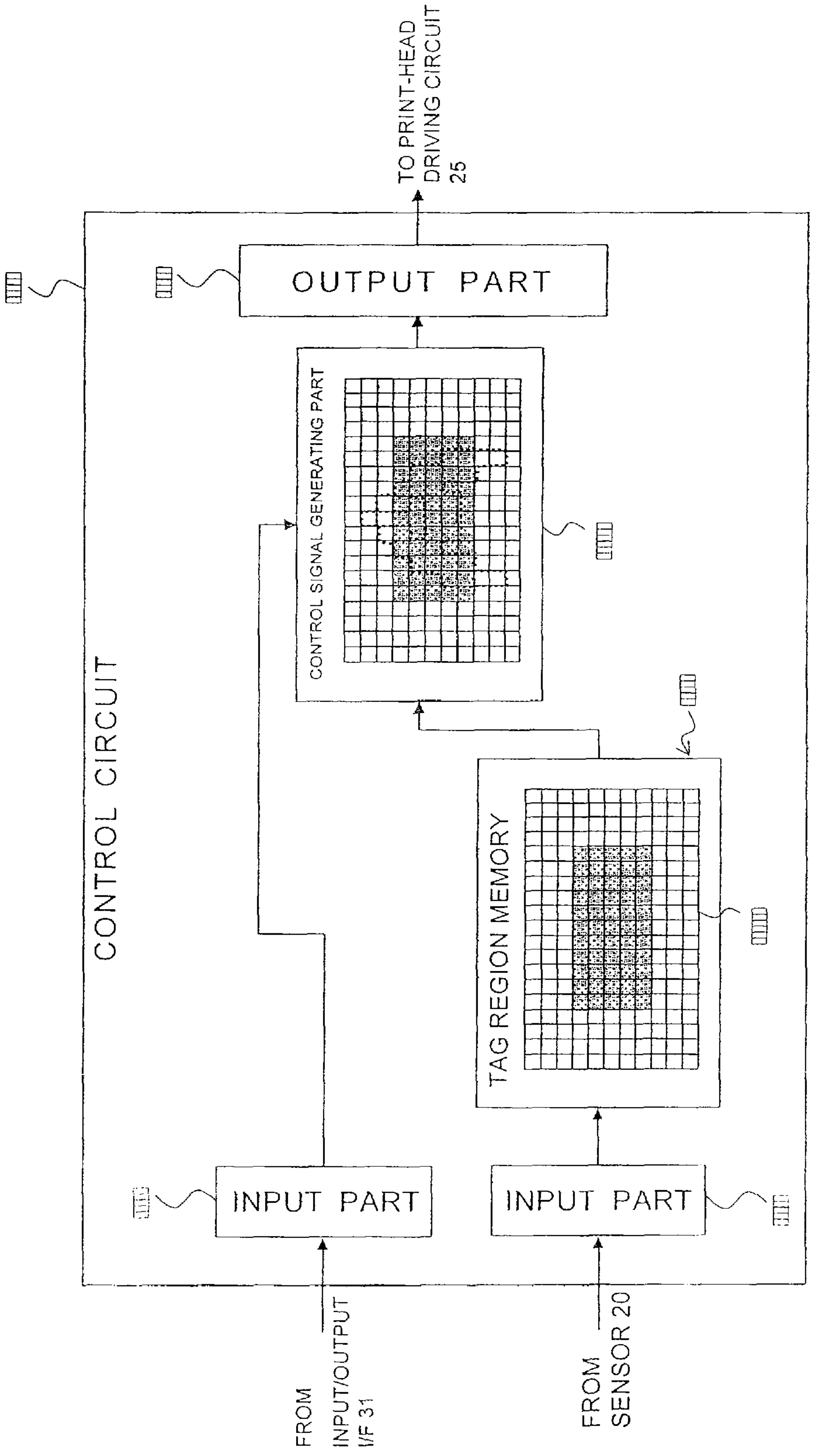
FIG. 41 is a functional block diagram of extracting and illustrating a portion relating to the generation of a control signal for printing of functions of the control circuit in the variation with no print buffer part.

FIG. 41: is a functional block diagram showing the part that is extracted from the functions of a control circuit 130D according to the present variation and related to the generation of control signals for printing; and corresponds to FIG. 32 and the like of the above-described second embodiment. In FIG. 41, the same parts as shown in FIG. 32 and the like are represented by the same symbols and the explanations are omitted. Here, FIG. 41 shows the case where a boldface is set in a tag layout region in step S2330 in FIG. 31 described previously.

In FIG. 41, the parts different from the functional block diagram shown in FIG. 32 and the like are that the control circuit does not have a print memory 130*b* and has a control signal generating part 130De as the second print controller, in place of the control signal generating part 130*e*. That is, in the present variation, the print information that is input from an input/output interface 31 by an operator via a terminal 5 or a general purpose computer 6: is not developed on a print buffer 130*b*1 of a print memory 130*b*; and is directly input into the control signal generating part 130De in rows for example.

The control signal generating part 130De processes the layout-information of a RFID tag stored in a tag region buffer 130*d*1 of a tag region memory 130*d* using the input print information. Then, the processed layout-information of a RFID tag is output to the print-head driving circuit 25 as control signals aligned in rows via an output part 130*f*.

As a result, in the same way as the above-described second embodiment, the print R is printed in the print aspect of a boldface in the tag layout region TA and a RFID label T is produced. Consequently, the tag layout region TA can be recognized at a glance and convenience for users can be enhanced. Further, the control circuit 130C is configured so as not to have a print memory 130*b*, and hence it is possible to simplify the structure of the control circuit in comparison with the above-described second embodiment.

(C) The Case of not Having Both a Print Buffer and a Tag region Buffer

Figure 42:
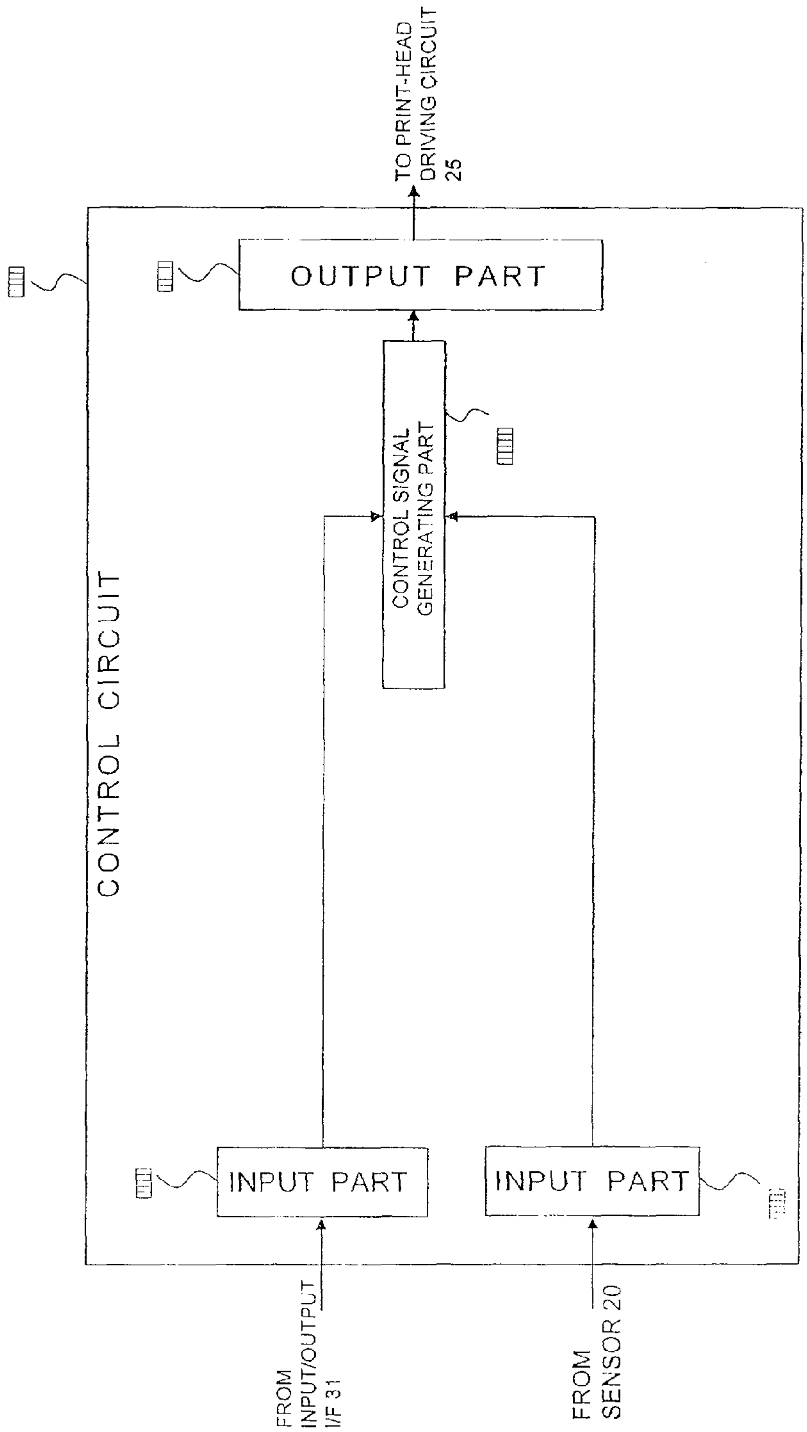
FIG. 42 is a functional block diagram of extracting and illustrating a portion relating the generation of a control signal for printing of functions of a control circuit in a variation with no print buffer part and no tag region buffer part.

FIG. 42: is a functional block diagram showing the part that is extracted from the functions of a control circuit 130E according to the present variation and related to the generation of control signals for printing; and corresponds to FIG. 32 and the like of the above-described second embodiment. In FIG. 42, the same parts as shown in FIG. 32 and the like are represented by the same symbols and the explanations are omitted. Here, FIG. 42 shows the case where a boldface is set in a tag layout region in step S2330 in FIG. 31 described previously.

In FIG. 42, the parts different from the functional block diagram shown in FIG. 32 and the like are that the control circuit does not have both a print memory 130*b* and a tag region memory 130*d* and has a control signal generating part 130Ee as the second print controller, in place of the control signal generating part 130*e*. That is, in the present variation, the print information that is input from an input/output interface 31 by an operator via a terminal 5 or a general purpose computer 6 and the layout-information of a RFID tag input from a sensor 20: are not developed on buffers; and are directly input into the control signal generating part 130Ee. On this occasion, the control signal generating part 130Ee: compares, for example, the print information input in rows with the layout-information of a RFID tag at the position corresponding to the print information each time; and thereby determines whether or not the print information is in the tag layout region TA. The control signal generating part 130Ee: outputs the print information as it is when the control signal generating part 130Ee determines that the print information is outside the tag layout region TA; and outputs the print information processed to a boldface when the control signal generating part 130Ee determines that the print information is inside the tag layout region TA, to a print-head driving circuit 25 as control signals aligned in rows via an output part 130*f*.

As a result, in the same way as the above-described second embodiment, the print R is printed in the print aspect of a boldface in the tag layout region TA and a RFID label T is produced. Consequently, the tag layout region TA can be recognized at a glance and convenience for users can be enhanced. Further, the control circuit 130E is configured so as not to have a print memory 130*b* and a tag region memory 130*d*, and hence it is possible to further simplify the structure of the control circuit.

(2-4) The Case of Changing a Print Aspect of Only a Part in a Tag Layout Region TA In the above cases, all the parts of the print aspect of a print R or a background located in a tag layout region TA are changed. Besides that, it is also possible to change the print aspect of a part in the tag layout region TA. For example, it is possible to visually recognize (identify) the tag layout region TA, for example: by changing the print aspect only in the region corresponding to the contour portion of the tag layout region TA in the print aspect of the print R or the background; or by locating a mark only to the contour portion of the tag layout region TA when the mark is printed to the background as described previously.

(2-5) Others (A) The Case of Carrying Out Only the Reading of Information

The above descriptions have been made based on the case of writing information into an IC circuit part 151 of a RFID circuit element To. Besides that, the present invention may also be applied to a system for producing a RFID label T having a RFID circuit element To that can read information. The same effect can be obtained in this case too.

(B) The Case of not Applying Bonding Together

That is, it is also possible to apply the methods described in the above-described second embodiment to an apparatus for communicating with RFID tags to make a print to a cover film included in a tag tape, in place of making a print to a cover film 103 that is different from a tag tape (a base tape) 101 having RFID circuit elements To and bonding them together like in the case of the above-described second embodiment. On this occasion, the RFID circuit elements To are included in the tape to be printed and a thermal tape may be used as the tape. On this occasion too, the same effect as the above-described second embodiment can be obtained.

A third embodiment according to the present invention will be described with reference to FIGS. 43 to 62.

Figure 43:
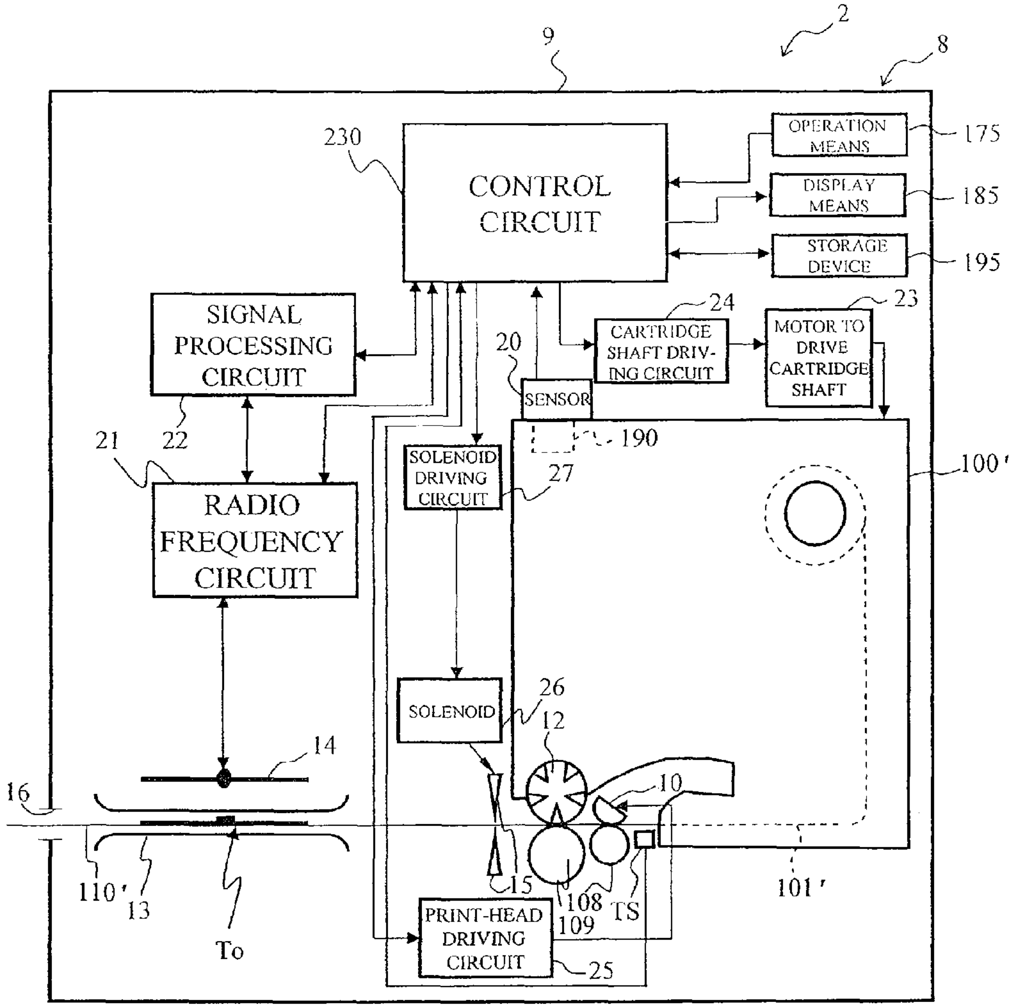
FIG. 43 is a schematic diagram illustrating a detailed structure of an apparatus for communicating with a RFID tag according to a third embodiment of the present invention.

FIG. 43: is a schematic diagram showing the detailed structure of an apparatus 2 for communicating with RFID tags according to the present embodiment; and corresponds to FIG. 26 and the like in the above-described second embodiment. The same parts as the first and second embodiments are represented by the same symbols and the explanations are omitted. In FIG. 43, in an apparatus 2 for communicating with RFID tags according to the present embodiment, the feeding rollers 17, the motor for the feeding roller 28, the tape-feeding-roller driving circuit 29, and the sensor 18 are omitted from the configuration shown in FIG. 26. Further, to a cartridge holder (a holder for setting a tag tape, not shown in the figure) as a recess, in the same way as the configuration shown in FIG. 25 of the above-described first embodiment, a cartridge 100' (a cartridge for including at least a RFID tag) that can consecutively supply a thermal tape (a tag tape, a first tape) 101' is detachably attached.

Further, an apparatus main body 8 is provided with: a print head (a thermal head) 10 to make a predetermined print to the thermal tape 101'; a tape-feeding-roller driving shaft (a drive device) 12 to feed out the thermal tape 101' as a tag label tape 110' with print from the cartridge 100'; an antenna (an apparatus antenna, a communicating device) 14 to receive and transmit signals with RFID circuit elements To included in the tag label tape 110' with print by radio communication using an appropriate frequency band such as a UHF band, a microwave band, or a shortwave band; a cutter (a cutter) 15 to cut the tag label tape 110' with print to a predetermined length at a predetermined timing and produce a label-shaped RFID label T (details will be described later); and a pair of feeding guides 13 to set and keep a RFID circuit element To at a predetermined access area facing the antenna 14 when signals are transmitted and received by the radio communication and to guide the tape 110' after cut (a RFID label T).

Meanwhile, the apparatus main body 8 is also provided with: the sensor 20 to detect information (the layout intervals of RFID circuit elements To in the thermal tape 101', parameter information of attribute of a RFID tag such as a tape width, and others) contained in the part to be detected (a position-information keeping part for a RFID tag, an information keeping part) 190 similar to FIG. 26 disposed on the cartridge 100'; a control circuit 230 configured to have the functions similar to those of the control circuits 30 and 130 described previously, to control the entire operations of the apparatus 2 for communicating with RFID tags via a radio frequency circuit 21, a signal processing circuit 22, a cartridge shaft driving circuit 24, a print-head driving circuit 25, a solenoid driving circuit 27, and others; a memory 195 comprising a nonvolatile hard disc or the like for example and having a database; an operation means 175 by which an operator can make input operation; and a display device 185 to provide a predetermined display to the operator.

Further, the configurations of the radio frequency circuit 21 and a RFID circuit element To are the same as those described with reference to FIGS. 5 and 6 respectively in the above-described first embodiment and the configuration of the sensor 20 is the same as that described with reference to FIG. 27 in the above-described second embodiment. Hence the explanations thereof are omitted.

Figure 44:
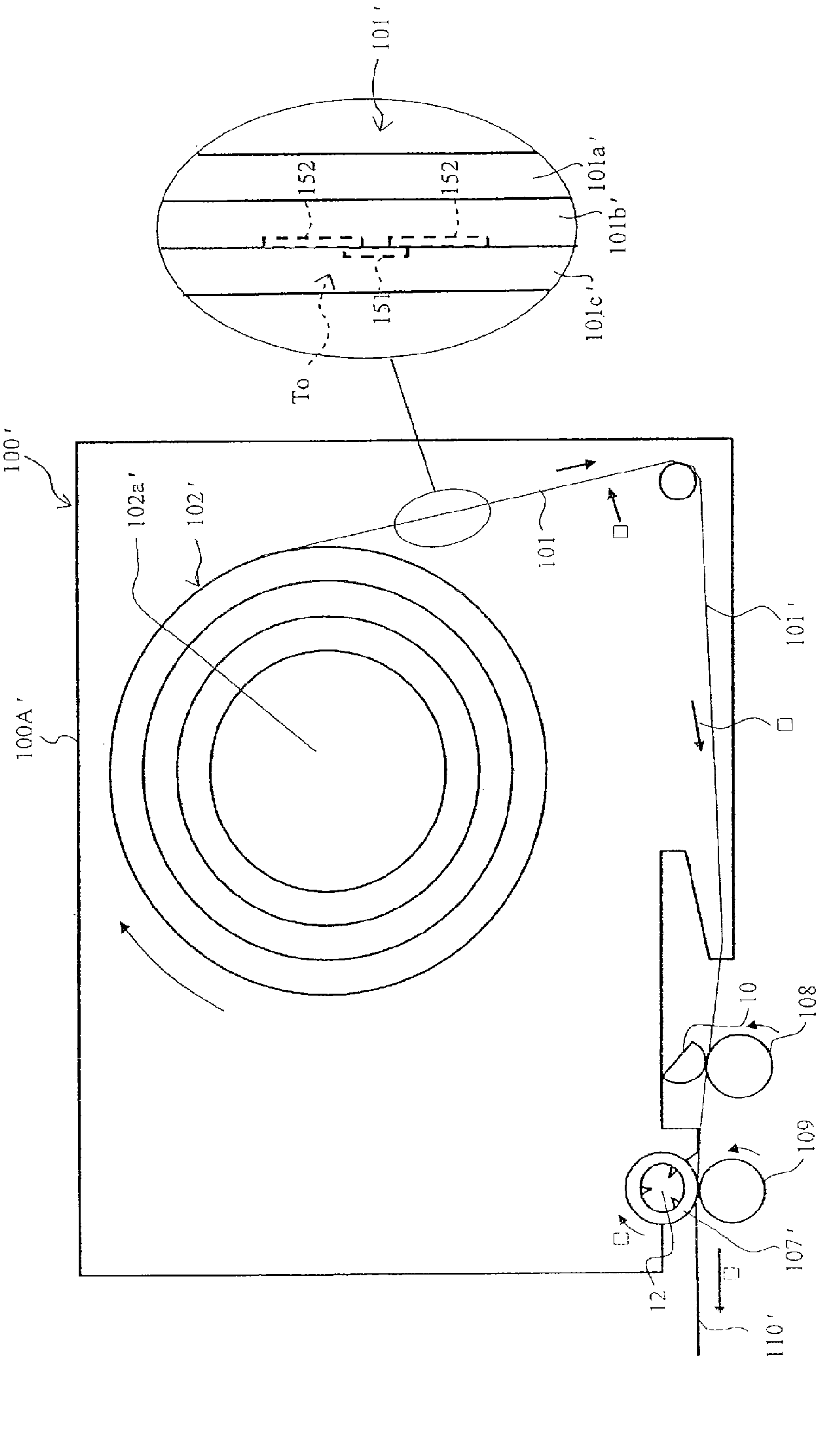
FIG. 44 is an explanatory view for illustrating a detailed structure of a cartridge.

FIG. 44 is an explanatory view for illustrating the detailed structure of a cartridge 100' and is a view similar to FIG. 25 in the above-described first embodiment. A difference from FIG. 25 is that a cut mark PM in a separation sheet 101*c*' of a thermal tape 101' is omitted in FIG. 44. The others are similar to FIG. 25.

Figure 45:
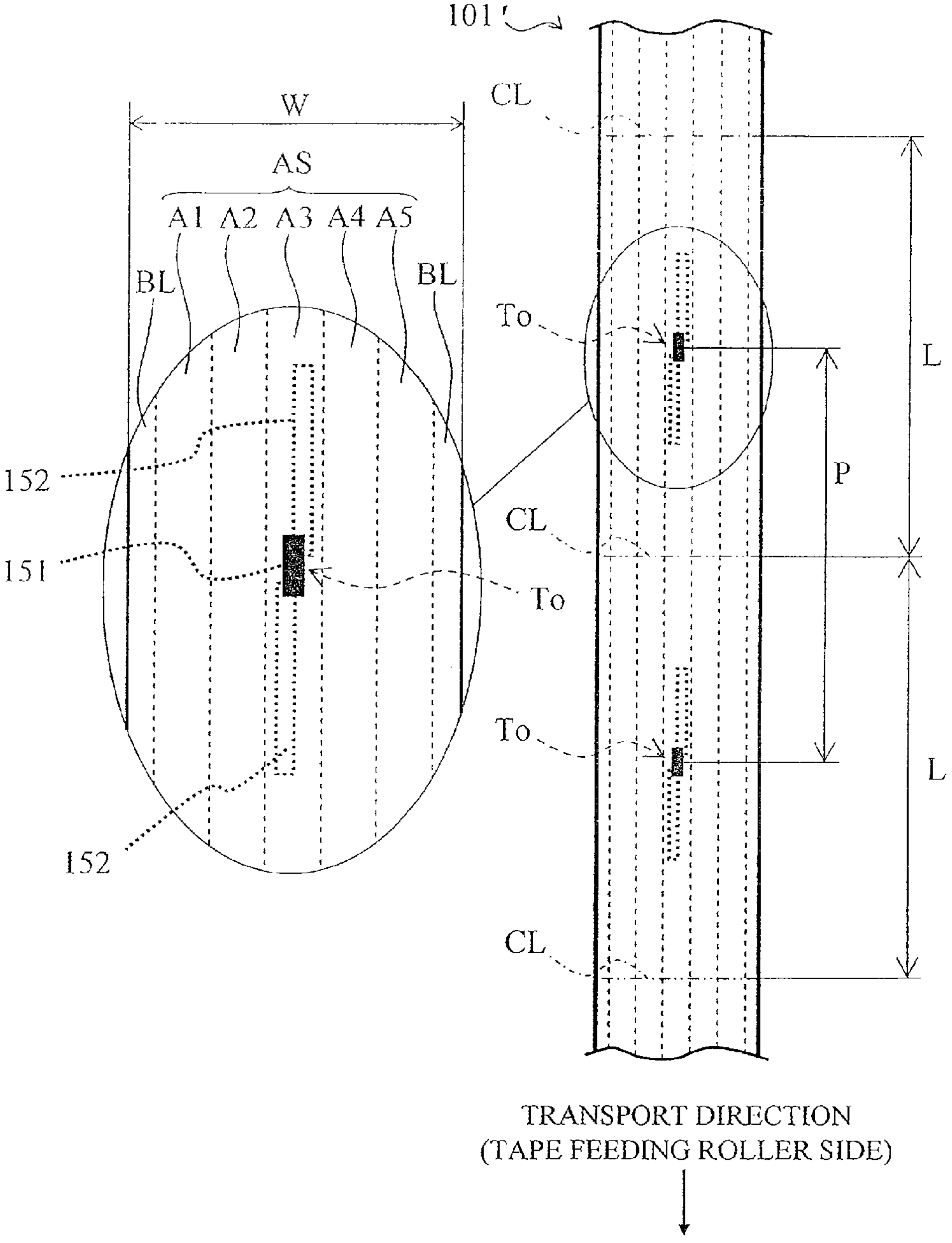
FIG. 45 is a top view of a thermal tape taken in a direction indicated by an arrow E in FIG. 44.

FIG. 45 is a top view of a thermal tape 101' that: is viewed in the direction indicated with the arrow E in FIG. 44; and shows the layout of RFID circuit elements To in the thermal tape 101'. In FIG. 45, in the thermal tape 101', the RFID circuit elements To are aligned at predetermined intervals (pitches) P in a tape longitudinal direction (the vertical direction in the figure) and a cutting line CL (the line along which the tape is to be cut) along which the tape is cut off with a cutter 15 is located at an intermediate position between adjacent RFID circuit elements To. With the arrangement, the layout interval P of the RFID circuit elements To coincides with the label length L of a produced RFID label T.

The enclosed and enlarged part in FIG. 45 is a view schematically showing the region where a RFID circuit element To is located. In the present embodiment, the range of the length (hereunder referred to as a tape width W) of the thermal tape 101' in the tape width direction (in the transverse direction in the figure) excluding the blank spaces BL on both the edges is a print candidate region AS and the whole print candidate region AS is configured so as to be equally divided into five minimum print division regions A1, A2, A3, A4, and A5 in the tape width direction. Further, a space region corresponding to a space for a predetermined number of dots exists in the planar direction of the tape (in the tape width and length directions) between the position where a RFID circuit element To is located and the printable region with the print head 10 (details will be described later). Thereby, the space region can absorb errors as an allowance dimension and hence it is possible to surely reduce the incidence itself of print failure in the vicinity of the position where the RFID circuit element To is located regardless of the accuracy of control and errors in dimensional tolerance. Furthermore, the space region makes it possible to avoid also the inclining portions of the tape surface around the position where the RFID circuit element To is located.

Then in the third embodiment, each of the RFID circuit elements To is arranged in the region A3 located in the center (the third row from the left in the figure) of the minimum print division regions A1 to A5 formed by equally divided into five regions, antennas 152 are disposed at each of the RFID circuit elements To along the tape longitudinal direction, and an IC circuit part 151 is connected to both the antennas 152 at the positions between the antennas 152. Further, the width of the IC circuit part 151 in the tape width direction is smaller than the width of the locations of the antennas 152. That is, the width of the IC circuit part 151 is set so as to be smaller than the width of a whole RFID circuit element To.

Identifiers 190A to 190C that are the objects to be detected with the sensor 20 described previously, by the presence or absence of an irregularity described previously, indicate parameter information on: communication parameters optimum to the RFID circuit elements To in a cartridge 100' (a frequency of a radio wave used for radio communication, a communication protocol, a transmission output, and others); and tag attribute parameters (including the tape width and the number of the minimum print division regions of a thermal tape 101', the layout intervals P in the tape longitudinal direction and information on layout positions in the tape width direction of the RFID circuit elements To, the sensitivity of the RFID circuit elements To, the memory capacity of an IC circuit part 151, and others). Here, usually, the communication parameters and the tag attribute parameters of all the RFID circuit elements To contained in one cartridge are identical (common) to one another. Then the control circuit 230 can know the parameter information of the cartridge 100' from detection signals at the contact point 20B of the sensor 20 showing the irregularity state of the identifiers 190A to 190C.

In this way, parameter data on the cartridge 100' can be obtained from the cartridge 100' itself, and hence operator's labor required for input is unnecessary and the parameter data can be obtained without fail.

Here, the sensor 20 as the detecting device is not limited to a mechanical switch but may be another device such as a sensor that uses reflection of light. In this case, the sensor 20 can comprise, for example, a light-emitting diode to emit light by signals from the control circuit 230 and a phototransistor to receive the light reflected by each of the identifiers and output relevant detection signals to the control circuit 230. Further, as a more advanced optical sensor, a configuration may also be used wherein various kinds of bar codes (including one dimension, two dimensions, and others) are written on a cartridge 100' or the surface of the separation sheet of a thermal tape 101' and the bar codes are read with a reader disposed on the side of the main body 8 of an apparatus 2 for communicating with RFID tags.

Further, besides the mechanical switch and the optical sensor, a configuration may also be used wherein a RFID circuit element for parameter data detection is disposed on the main body of a cartridge 100' and information is read with an antenna disposed on the main body 8 of an apparatus 2 for communicating with RFID tags. Thereby parameter data (including parameter information of attribute of a RFID tag) more than the amount obtained with a sensor of a mechanical switch or an optical sensor can be surely obtained, thereby operator's labor required for the obtainment is unnecessary, and hence convenience is enhanced.

Here, the largest feature of the present embodiment is that an apparatus 2 for communicating with RFID tags is functionalized so that the printable region with a print head 10 may be determined based on information on layout positions of RFID circuit elements To on a thermal tape 101' and the print head 10 may be controlled based on the printable region. In the present embodiment in particular, based on information on the layout positions of RFID circuit elements To contained in a cartridge 100', the printable region is determined so as to avoid at least the layout positions of the RFID circuit elements To in the thermal tape 101'.

FIGS. 46A, 46B, 46C, and 46D: show the print examples of the four RFID labels T1 to T4 produced by finishing the writing of information of RFID circuit elements To and the cutting of RFID label Tapes with print 110' by the same operation as described using FIG. 25 in the apparatus 2 for communicating with RFID tags; and also show print patterns (combination of the size and the location of print letters) that can be printed on a thermal tape 101' wherein the RFID circuit elements To are disposed in the center position (the minimum print division region A3 located at the third row from above in the figure) in the tape width direction as mentioned above.

As mentioned above, in a thermal tape 101' used in the third embodiment, the print candidate region AS is equally divided into five minimum print division regions A1 to A5 in the tape width direction excluding the blank spaces BL on both the edges in the direction of the tape width (in the vertical direction in the figure) and, among the regions, the first, second, fourth, and fifth minimum print division regions A1, A2, A4, and A5 excluding the third minimum print division region A3 wherein the RFID circuit elements To are disposed constitute the printable region AT and print is made only to the printable region AT. The two sizes of print letters are shown in FIG. 7 and comprise: the letters of a small size the size of which in the tape width direction (the height in the figure) coincides with the width corresponding to one row of the minimum print division region (16 dots in this example); and the letters of a medium size the size of which in the tape width direction coincides with the width corresponding to two rows of the minimum print division regions (32 dots in this example). Here, the number of dots (a font set) of each of the letter sizes may also be changed appropriately corresponding to a tape width W when the tape width W of a thermal tape 101' changes. Further, it is configured so that blank spaces BL may be secured at both the ends of a RFID label T in the tape longitudinal direction and the layout error of print may be absorbed.

Figures 46A, 46B, 46C, 46D:
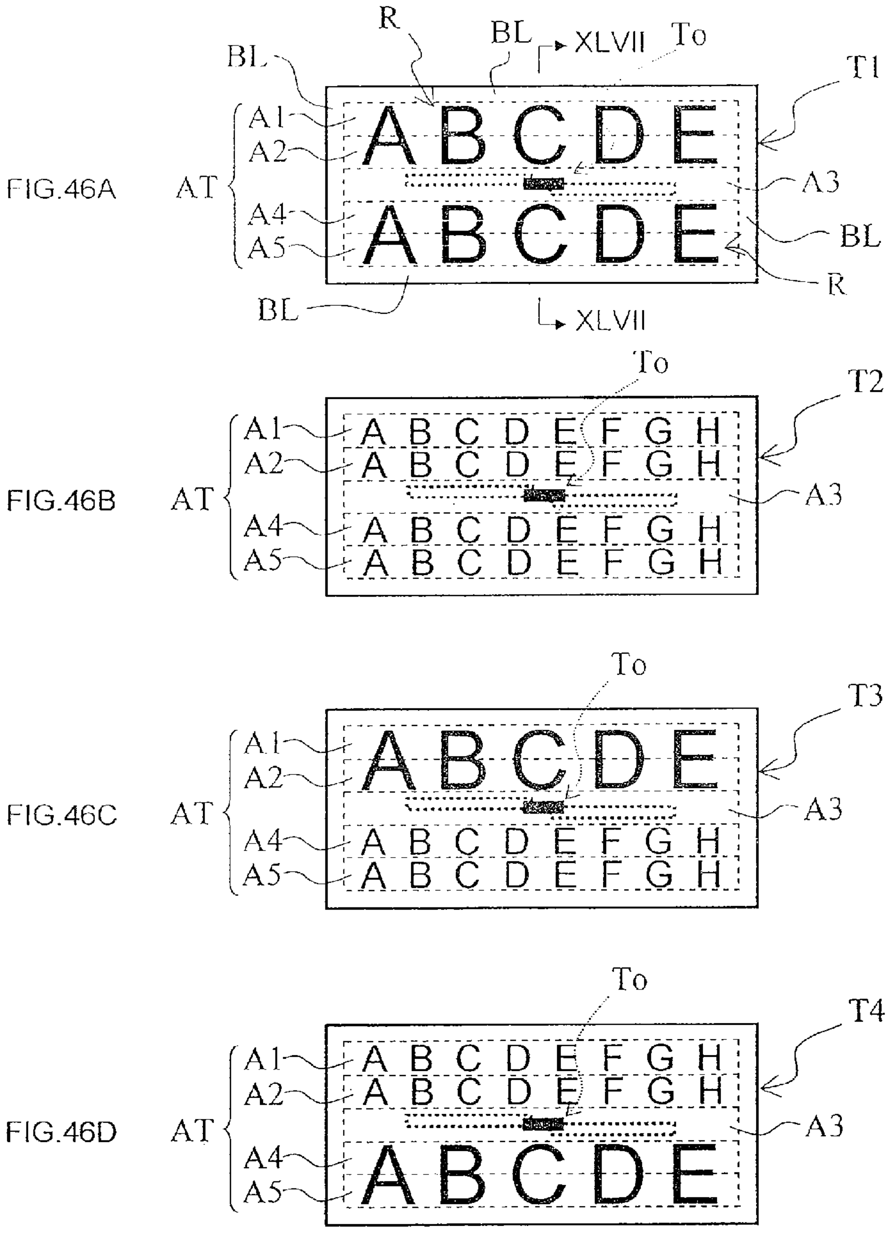
FIGS. 46A to 46D are top views illustrating print examples of a RFID label.

Firstly FIG. 46A shows an example of a print pattern wherein two lines of medium-sized letters are printed in the region formed by combining the minimum print division regions A1 and A2 of the first and second rows and the region formed by combining the minimum print division regions A4 and A5 of the fourth and fifth rows, respectively. FIG. 46B shows an example of a print pattern wherein four lines of small-sized letters are printed in the minimum print division regions A1, A2, A4, and A5 of the first, second, fourth, and fifth rows, respectively. FIG. 46C shows an example of a print pattern of three lines wherein one line of medium-sized letters is printed in the region formed by combining the minimum print division regions A1 and A2 of the first and second rows and two lines of small-sized letters are printed in the minimum print division regions A4 and A5 of the fourth and fifth rows, respectively. FIG. 46D shows an example of a print pattern of three lines wherein two lines of small-sized letters are printed in the minimum print division regions A1 and A2 of the first and second rows respectively and one line of medium-sized letters is printed in the region formed by combining the minimum print division regions A4 and A5 of the fourth and fifth rows. Here, although it is not shown in FIG. 46 in particular, there is a print pattern wherein no letter is printed and a blank space is formed in any one of the lines of the letters in FIGS. 46A to 46D (refer to FIGS. 50 and 55 that will be shown later).

Figure 47:
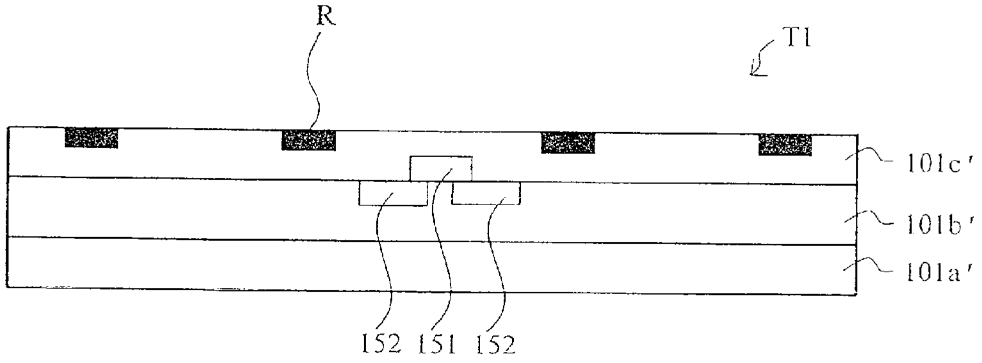
FIG. 47 is a cross sectional view in XLVII-XLVII cross section in FIG. 46A.

FIG. 47: is a transverse sectional view that is taken along line XLVII-XLVII in FIG. 46A and shows a sectional structure of the RFID label T1; and corresponds to FIG. 8 in the above-described first embodiment and FIG. 29 in the above-described second embodiment. The RFID label T1 has a trilaminar structure as illustrated in FIG. 44 and comprises a cover film 101*c*', an adhesive layer 101*b*1 (an adhesive layer for affixing), and a separation sheet 101*a*' in the order from the cover film 101*c*' side (the upper side in FIG. 47) toward the opposite side thereof (the lower side in FIG. 47). Then a RFID circuit element To including antennas 152 disposed on the bottom side of the cover film 101*c*' as described previously is included in the adhesive layer 101*b*' and the print R (the medium-sized letters “ABCDE” in the case of the RFID label T1) is printed in predetermined regions on the surface of the cover film 101*c*'. Here, the explanations have been made based on the RFID label T1 as an example in FIG. 47 but the other RFID labels T2 to T4 have the same sectional structures.

Figure 48:
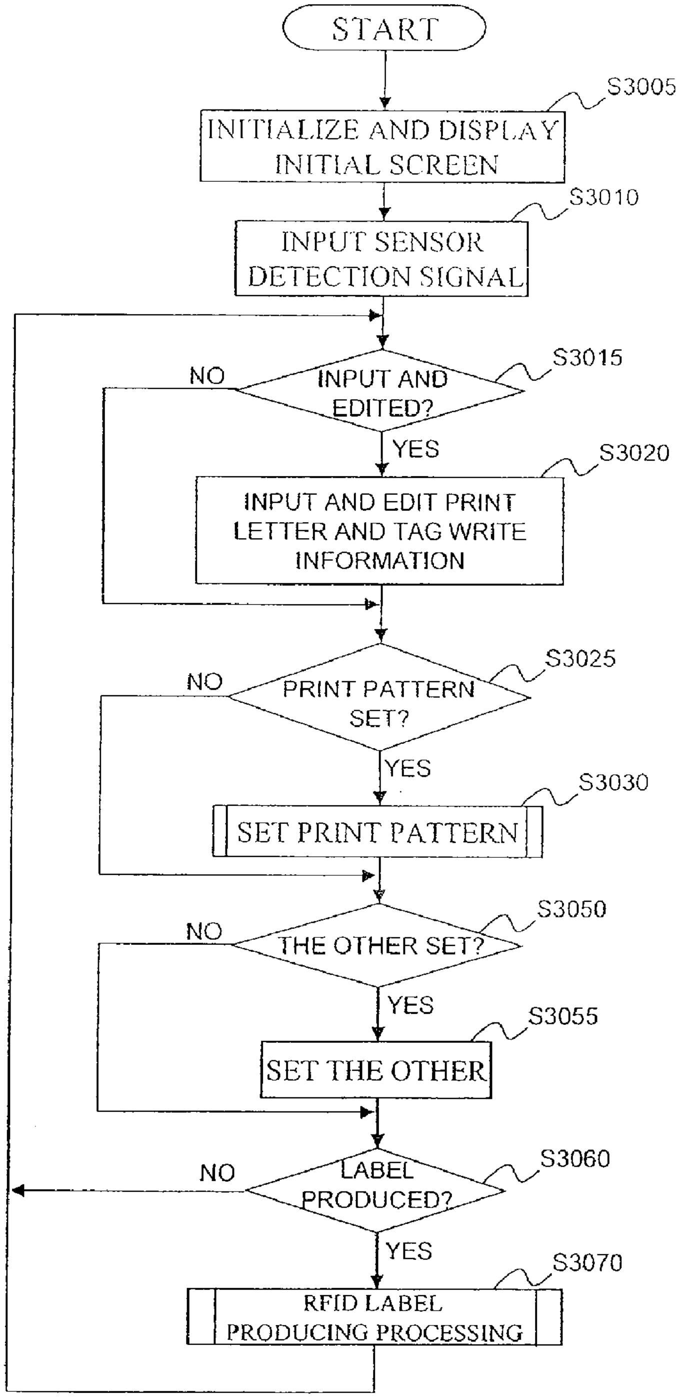
FIG. 48 is a flowchart illustrating a control procedure to be executed by a control circuit.

FIG. 48 is a flowchart showing control procedure carried out with a control circuit 230 when RFID labels T of various kinds of layout aspects as mentioned above are produced, that is, when a RFID label T is produced by conveying a thermal tape 101', making predetermined print with a print head 10, thus forming a tag label tape 110' with print, and thereafter cutting the tag label tape 110' with print.

In FIG. 48, the flow starts when electric power is applied to an apparatus 2 for communicating with RFID tags via an electric power source switch not shown in the figure for example. Firstly in step S3005, various kinds of variables, coefficients, and others are initialized, thereafter display signals to display an appropriate initial screen on a display device 185 are output, and thus the initial screen is displayed.

Thereafter, in step S3010, based on the detection result of a part to be detected 190 provided in a cartridge 100' by the sensor 20, information corresponding to the result (parameter information of attribute of a RFID tag including the tape width W and the number of the minimum print division regions of a thermal tape 101', the layout intervals P in the tape length direction and information on the layout positions in the tape width direction of RFID circuit elements To, and others; communication parameter information including a frequency of a radio wave used for radio communication, a communication protocol, and others; and others) is obtained.

Thereafter, the operation goes to Step S3015 and whether or not an operator has input or edited the data of letters to be print to a RFID label T with a print head 10 or information to be written in a RFID circuit element To in the RFID label T via an operation means 175 is determined. When the input operation or the editing operation is performed, the determination is satisfied, the operation goes to Step S3020, predetermined arithmetic processing corresponding to the operation is performed (further the arithmetic processing result is stored in a predetermined storage means as print information or writing information), relevant display signals are output to a display device 185 and the result is displayed if necessary, and then the operation goes to Step S3025. When the input operation or the editing operation is not carried out in step S3015, the determination is not satisfied in step S3015 and the operation goes to Step S3025 to be described below.

In step S3025, whether or not an operator has set the print pattern of the RFID label T via the operation means 175 is determined. When the setting operation is carried out, the determination is satisfied and the operation goes to Step S3030. When the print pattern setting operation is not performed, the determination is not satisfied and the operation goes to Step S3050 to be described later.

In step S3030, the print pattern setting is carried out based on the operator’s manual operation via the operation means 175 and thereafter the operation goes to Step S3050.

In step S3050, whether or not other various setting operations on the RFID label T (for example, setting of a front blank space on the front side in the transport direction, setting of letter ornament at printing, and others) are carried out via the operation means 175 is determined. When a setting operation is performed, the determination is satisfied, the operation goes to Step S3055, predetermined setting is carried out in the state where various kinds of relevant processing is performed and if necessary relevant display signals are output to the display device 185 for display, and thereafter the operation goes to Step S3060. When the setting operation is not performed in step S3050, the determination is not satisfied and the operation goes to Step S3060 to be described later.

In step S3060, whether or not an operator has operated for the production of the RFID label T via the operation means 175 is determined. When the operation is performed, the determination is satisfied, the operation goes to Step S3070, predetermined print is made with the print head 10 corresponding to the input or edition of the print information and the writing information in steps S3015 and S3020, the information is written into a RFID circuit element To, the RFID label T is produced, and then the operation goes back to Step S3015 to repeat the similar procedure. When the label producing operation is not performed in step S3060, the determination is not satisfied in step S3060 and the operation goes back to Step S3015 to repeat the similar procedure.

Figure 49:
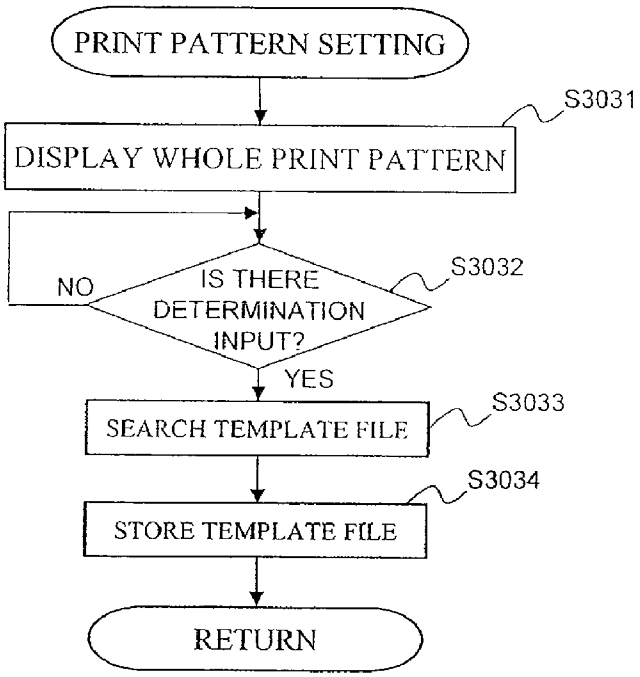
FIG. 49 is a flowchart illustrating a detailed procedure of a print pattern setting in Step S3030 of FIG. 48.

FIG. 49 is a flowchart showing detailed procedure of the print pattern setting in step S3030 in FIG. 48. In FIG. 49, firstly in step S3031, based on the parameter information of attribute of a RFID tag obtained in step S3010 mentioned above in FIG. 48, display signals corresponding to all the print patterns that can be set on a thermal tape 101' are output to the display device 185 and all the print patterns are displayed. On this occasion, the printable region AT is determined from information on the layout position in the tape width direction of a RFID circuit element To contained in the tag attribute parameters so as to keep away from the position where the RFID circuit element To is located, all the print patterns with which print letters of a predetermined size are printable in the printable region AT are determined, and thereafter the print letters are displayed (for details, refer to FIG. 50 to be described later).

Thereafter, in step S3032, whether or not an operator has pushed a cursor key, a decision key, or the like of the operation means 175 and has determined (selected) and input an intended print pattern from among all the print patterns displayed in step S3031 mentioned above is determined. When the decision and input operations are performed, the determination is satisfied and the operation goes to Step S3033. When the decision and input operations are not performed, the determination is not satisfied in step S3032 and the above selection operation is repeated and waits until the operations are performed.

Then the operation goes to Step S3033, a database formed in a memory 195 to develop print letter data on a print buffer to be described later is accessed in response to the decision and input operations in step S3032 mentioned above, and a template file corresponding to the decision and input is searched and obtained. The template file is a model file to develop and generate the image data of a letter string in input print letter data on a print buffer at a print layout of the set print pattern based on the parameters necessary for print such as a tape width W, the size of dots of a print head 10, information on the layout position of a RFID circuit element To, a printable region AT, the number of set print lines, and others (for details, refer to FIG. 51 to be described later).

Thereafter in succeeding Step S3034, the print pattern (the template) obtained in step S3033 mentioned above is stored in a predetermined storage means such as a memory in the control circuit 230, another memory region in the memory 195, or the like, and the flow is finished.

Figure 50:
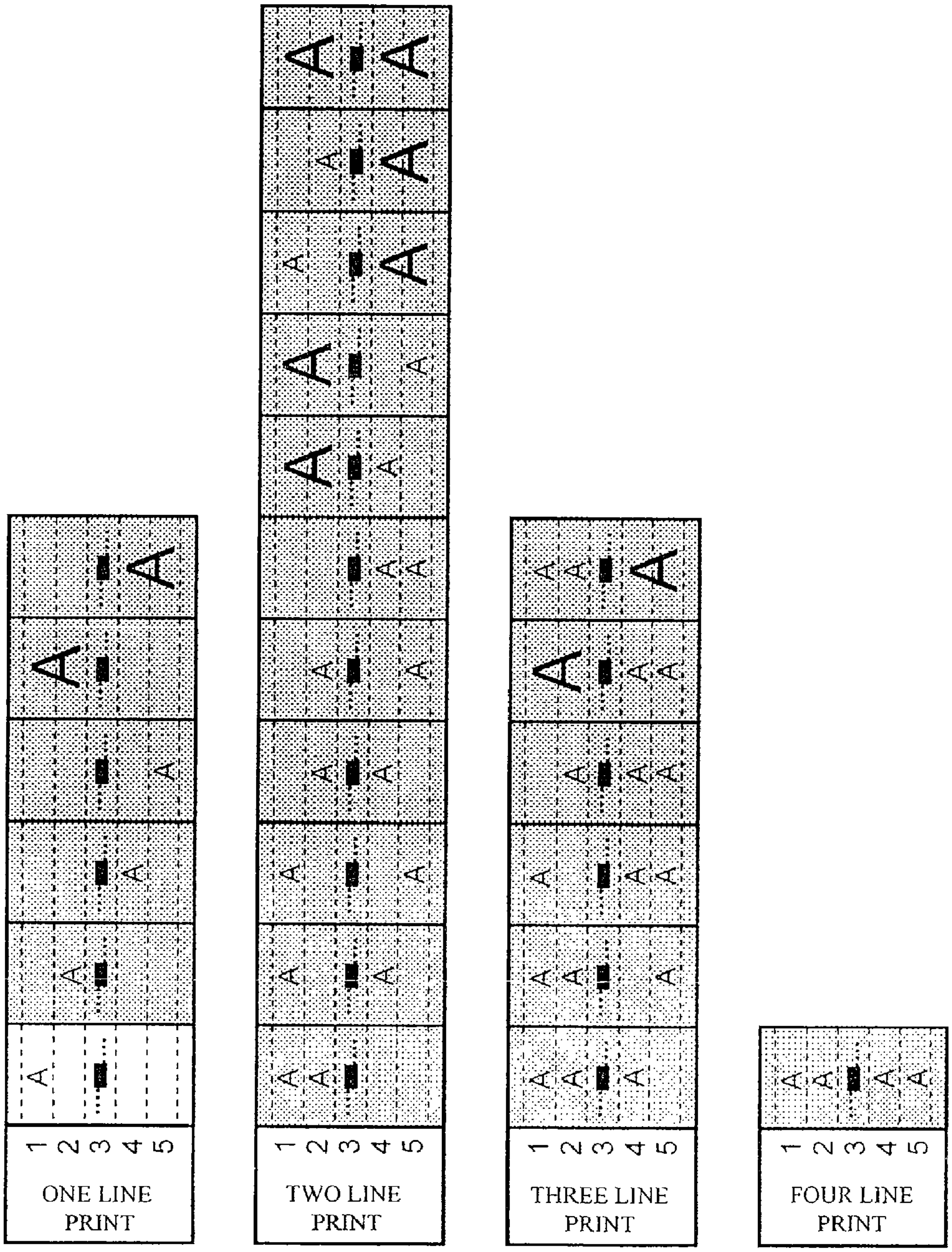
FIG. 50 is a view illustrating display examples of an entire print pattern to be set in a thermal tape in which a RFID circuit element is located in a minimum print divided region in a third stage.

FIG. 50 shows display examples displayed on the display device 185 in step S3031 in FIG. 49 mentioned above. The examples are display examples of all the print patterns that can be set in a thermal tape 101' in the case where RFID circuit elements To are disposed in the minimum print division region A3 of the third row. In the examples, the patterns are classified by the number of the lines of actually printed letter strings (not a blank space), such as "one-line print," "two-line print," "three-line print," and "four-line print." An operator can select relevant print pattern via a direction key such as a cursor key in the operation means 175 and the figure shows an example wherein one print pattern (the print pattern at the left end of the one-line print) is displayed. Usually only the selected print pattern is displayed and the other print patterns are displayed in an aspect different from the selected print pattern (a dark display such as a shaded pattern in this example).

Figure 51:
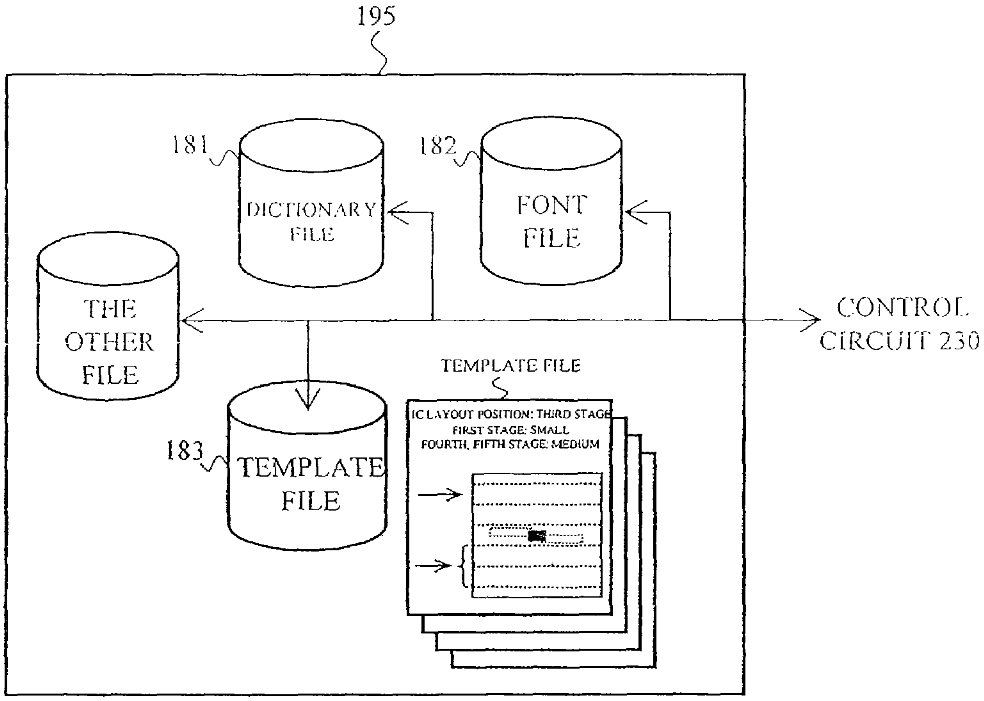
FIG. 51 illustrates one example in a state in which a template file is saved and stored in database that is configured in a storage device.

FIG. 51 shows an example of the state wherein the template file is contained and stored in a database formed in the memory 195 (refer to Step S3033 in FIG. 49 mentioned above). In FIG. 51, in the database in the memory 195, a dictionary file 181 regarding the correspondence between an input letter string and a conversion letter string, a font file 182 regarding the font of each print letter, and a template file 183 regarding a print pattern are contained. The control circuit 230: searches the template file corresponding to the decision and input operations in step S3032 mentioned above in the database in the memory 195; and reads out the template file as described previously.

Figure 52:
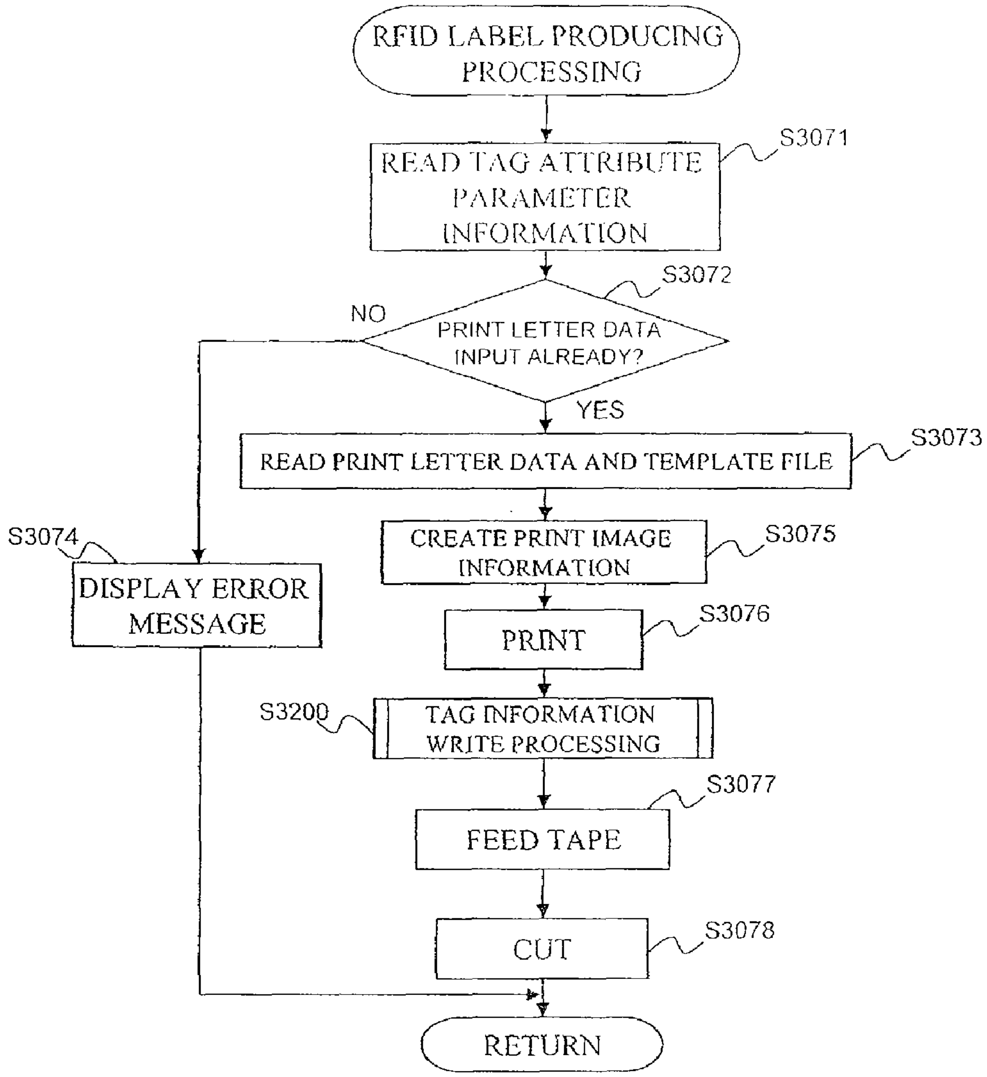
FIG. 52 is a flowchart illustrating a detailed procedure of producing a RFID label in Step S3070 of FIG. 48.

FIG. 52 is a flowchart showing the detailed procedure of RFID label production processing in step S3070 in FIG. 48. In FIG. 52, firstly in step S3071, the parameter information of attribute of a RFID tag obtained in step S3010 mentioned above in FIG. 48 is read out and the operation goes to Step S3072.

In step S3072, whether or not print letter data is input in step S3020 mentioned above in FIG. 48 (in other words, whether or not print information is stored in the above-described predetermined storage means) is determined. When the relevant print letter data is already input, the operation goes to Step S3073. When the relevant print letter data is not input, the determination is not satisfied in step S3072, signals to display an error message corresponding thereto are generated in step S3074, output to the display device 185, and displayed. Then the flow is terminated.

In step S3073, the print letter data stored in the storage means in step S3020 mentioned above and the template file stored in the storage means in step S3034 are read out. Thereafter, in successive Step S3075, print image information is: developed and generated on a print buffer (details are described later) provided in the control circuit 230 based on the print letter data and the template file obtained in step S3073 mentioned above; and stored temporarily. Here on this occasion, the relevant image display may be previewed at the display device 185.

Thereafter, the operation goes to Step S3076, control signals are output to a cartridge shaft driving circuit 24, a tape-feeding-roller driving shaft 12 is driven with a motor to drive cartridge shaft 23, a tag label tape 110' with print is conveyed, the control signals are output to a print-head driving circuit 25 during that time, print corresponding to the print image information developed on the print buffer in step S3075 mentioned above is made to a cover film 101*c*' with a print head 10.

Then in step S3200, inquiry signals to request a RFID circuit element To respond are transmitted, writing information input, stored and held in steps S3015 and S3020 in FIG. 48 is transmitted to a responded predetermined RFID circuit element To, and the relevant information is written into an IC circuit part 151 (tag information write processing, details will be described later).

Thereafter, the operation goes to Step S3077, control signals are output to the cartridge shaft driving circuit 24, the tape-feeding-roller driving shaft 12 is driven with the motor to drive cartridge shaft 23, tape feeding is carried out in order to convey a tag label tape 110' with print by a predetermined distance, thereafter in step S3078, control signals are output to a solenoid driving circuit 27, electricity is supplied to a solenoid 26, thereby a cutter 15 is activated, and the tag label tape 110' with print is cut at the position in the transport direction at the moment. With the arrangement, a RFID label T (refer to FIGS. 46A to 46D shown earlier) wherein information is written into a predetermined RFID circuit element To and relevant print is finished is completed and carried-out from a carry-out exit 16 to the outside of an apparatus 2 for communicating with RFID tags in the manner of separating from the tape 110'.

Figure 53:
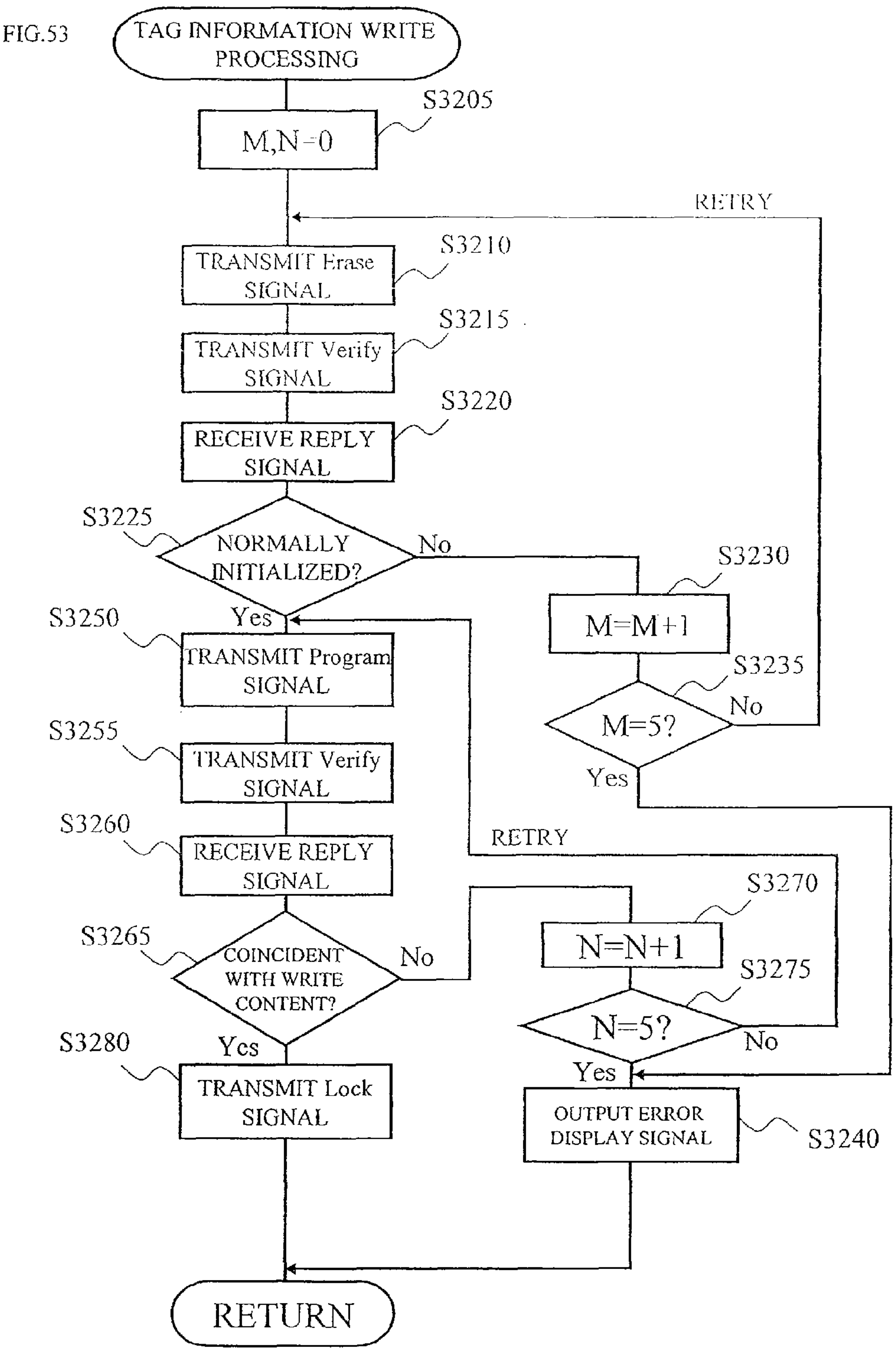
FIG. 53 is a flowchart illustrating a detailed procedure of a tag information write processing in Step S3200 illustrated in FIG. 52.

FIG. 53: is a flowchart showing the detailed procedure of tag information write processing in step S3200 shown in FIG. 52; and corresponds to FIG. 33 in the above-described second embodiment. Firstly in step S3205, the variables M and N to count the number of retries when no response comes from a RFID circuit element To are initialized to zero.

Thereafter, in step S3210, in the same way as Step S2210 shown in FIG. 33, an "Erase" signal: is generated; is transmitted to the RFID circuit element To into which information is to be written; and initializes the memory part 157.

Subsequently, in steps S3215 and S3220, in the same way as Steps S2215 and S2220 mentioned above, a "Verify" signal is generated and transmitted to the RFID circuit element To into which information is to be written, and the reply signal is received and taken in via an antenna 14.

After that, in steps S3225 to S3265 which are the same as Steps S2225 to S2265 mentioned above, a "Program" signal is generated, information is written into the memory part 157 of the RFID circuit element To, a "Verify" signal is produced and transmitted, the reply signal is taken in, and whether or not transmitted predetermined information is normally stored in the memory part 157 is determined.

When the determination in step S3265 is not satisfied, in step S3275 through Step S3270 similar to Step S2270 mentioned above, whether or not N equals five is determined. When N is four or less, the determination is not satisfied, the operation goes back to Step S3250, and the same procedure is repeated. When N equals five, the operation goes to Step S3240 described previously, relevant writing failure (error) is displayed on a display device 185, and the flow is terminated. In this way, even if information writing is unsuccessful, retry may be carried out up to five times.

When the determination in step S3265 is satisfied, the operation goes to Step S3280 similar to Step S2280 mentioned above, a "Lock" signal is generated and transmitted, and writing of additional information to the RFID circuit element To is prohibited. Thereby the writing of RFID tag information into the RFID circuit element To into which information is written is completed and the flow is terminated.

In the above procedure, Step S3031 of the control flow shown in FIG. 49 carried out with the control circuit 230 constitutes a print region determination means to determine a printable region AT with a print head 10 based on information on the layout position of a RFID circuit element To in a thermal tape 101' described in the claims. Further, Step S3076 shown in FIG. 52 carried out with the control circuit 230 corresponds to a third print controller to control the print head 10 based on the printable region AT determined by the print region determination means.

As described above, in an apparatus 2 for communicating with RFID tags according to the present embodiment, when a RFID label T is produced, a thermal tape 101' is conveyed with a tape feeding roller 107' and a sub-roller 109, thus a tag label tape 110' with print is produced, further access information generated with a signal processing circuit 22 and a radio frequency circuit 21 is transmitted to antennas 152 of a RFID circuit element To via the antenna 14, and access to the information of an IC circuit part 151 of the RFIF circuit element To (in this case, writing of information) is carried out. Thereafter, the tag label tape 110' with print is cut with a cutter 15 and the RFID label T of a predetermined length is produced.

Here, in the present embodiment, when a RFID label T is produced from a thermal tape 101' as mentioned above, a printable region AT with a print head 10 on the thermal tape 101' is determined based on the information on the layout position of a RFID circuit element To and the print head 10 is controlled based on the printable region AT. With the arrangement, it is possible to: make a print so as to keep away from the vicinity of the position where the RFID circuit element To is allocated; and reduce the incidence of print failure in the vicinity of the layout position of the RFID circuit element To. Consequently, convenience for users can be enhanced and the quality of a RFID label T with print can be assured.

Further, in the present embodiment in particular, by determining a printable region AT so as to keep away from both the layout positions of the IC circuit part 151 and the tag side antennas 152 of a RFID circuit element To in a thermal tape 101', it is possible to: prevent print from being adversely affected not only by the IC circuit part 151 that constitutes the largest protrusion in the RFID circuit element To but also by the antennas 152 that constitute other protrusions; and hence reduce the incidence of print failure further surely.

Here, in the above descriptions, all the print patterns that can be set in a thermal tape 101' when a RFID circuit element To is located in the minimum print division region A3 of the third row as shown in FIG. 50 are exemplified. Besides that, all the print patterns that can be set in a thermal tape 101' when RFID circuit elements To are located in the minimum print division regions A1, A2, A4, and A5 of the first, second, fourth, and fifth rows respectively are also prepared. In the present embodiment in particular, in step S3031, based on parameter information of attribute of a RFID tag obtained in step S3010 mentioned above, a printable region AT is determined so as to keep away from the layout position of a RFID circuit element To and relevant all print patterns are displayed. That is, at least one of the size (the letter size), number of lines, the direction of print letters in a print head 10 is changed corresponding to at least one of: the positional relation between the layout position of the RFID circuit element To and the printable region AT; and the size of each of the RFID circuit element To and the printable region AT. With the arrangement, when a RFID circuit element To is biased to one side in a tape width direction for example, by using the wider region on the opposite side as a printable region AT (setting a print pattern suitable for that), it is possible to realize print of large letters or print of a large number of letters or lines. Inversely, it is also possible to make a print of small letters or print of a small number of lines on the other side. In addition, by rotating the orientation of print, it is also possible to make a rotationally symmetrical print and produce a different RFID label (also refer to FIG. 55 in the after-mentioned variation). By such print control, it is possible to produce various kinds of RFID labels according to the usage and needs of users.

Here, the present embodiment is not limited to the above cases and can be further variously modified in the range not deviating from the spirit and the technical ideas of the present embodiment. Such variations will be described hereunder.

(3-1) The Case of Determining a Printable Region at so as to Keep Away from Only an IC Circuit Part 151 in a RFID Circuit Element To In the above-described third embodiment, when a printable region AT is determined from a print candidate region AS, the printable region AT is determined so as to keep away from the whole layout position of a RFID circuit element To. Besides that, it is also possible to determine the printable region AT so as to keep away from only an IC circuit part 151. Such variations are described with reference to FIGS. 54 to 58. The same parts as the above-described third embodiment are represented by the same symbols and the explanations are omitted occasionally.

Here, In the present variation, explanations will be made based on the case where print is made using a thermal tape 101' wherein a RFID circuit element To is disposed at a biased position other than the center in the width direction, namely at a position asymmetrical to the center line of the width direction, of the thermal tape.

Figure 54:
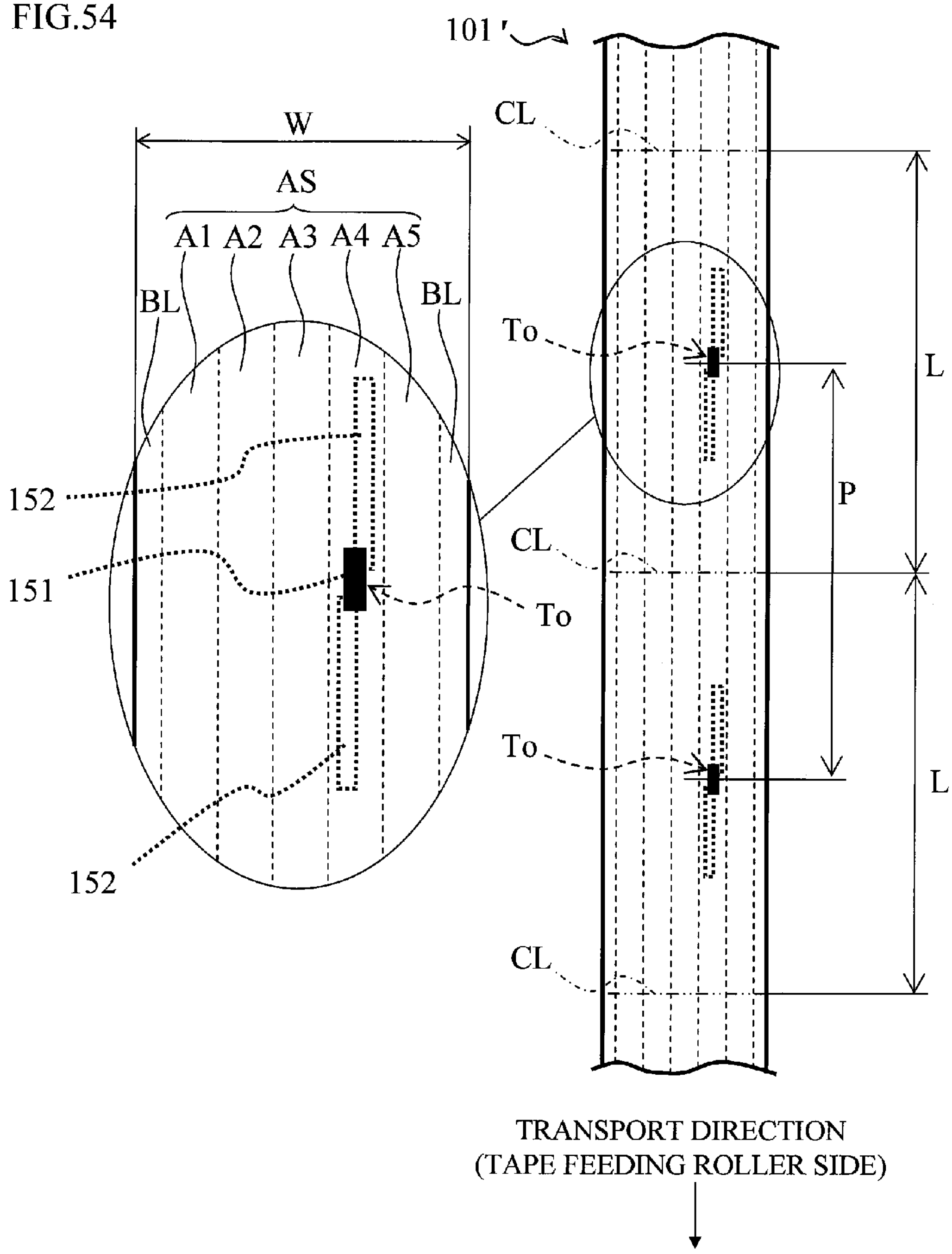
FIG. 54 is a top view of a thermal tape illustrating a layout of a RFID circuit element in a variation in which a printable region is determined so as to avoid only the IC circuit part.

FIG. 54: is a top view of a thermal tape 101' showing the layout of RFID circuit elements To in such a thermal tape 101'; and corresponds to FIG. 45 in the above-described third embodiment. In FIG. 54, each of the RFID circuit elements To is disposed in the minimum print division region A4 located at the fourth row from the left in the figure in the equally-divided five minimum print division regions A1 to A5, and the width of an IC circuit part 151 in the tape width direction is smaller than the layout width of two antennas 152 in the same way as the case of FIG. 45, that is, the IC circuit part 151 is formed so that the width thereof may be smaller than that of the whole RFID circuit element To.

Figure 55:
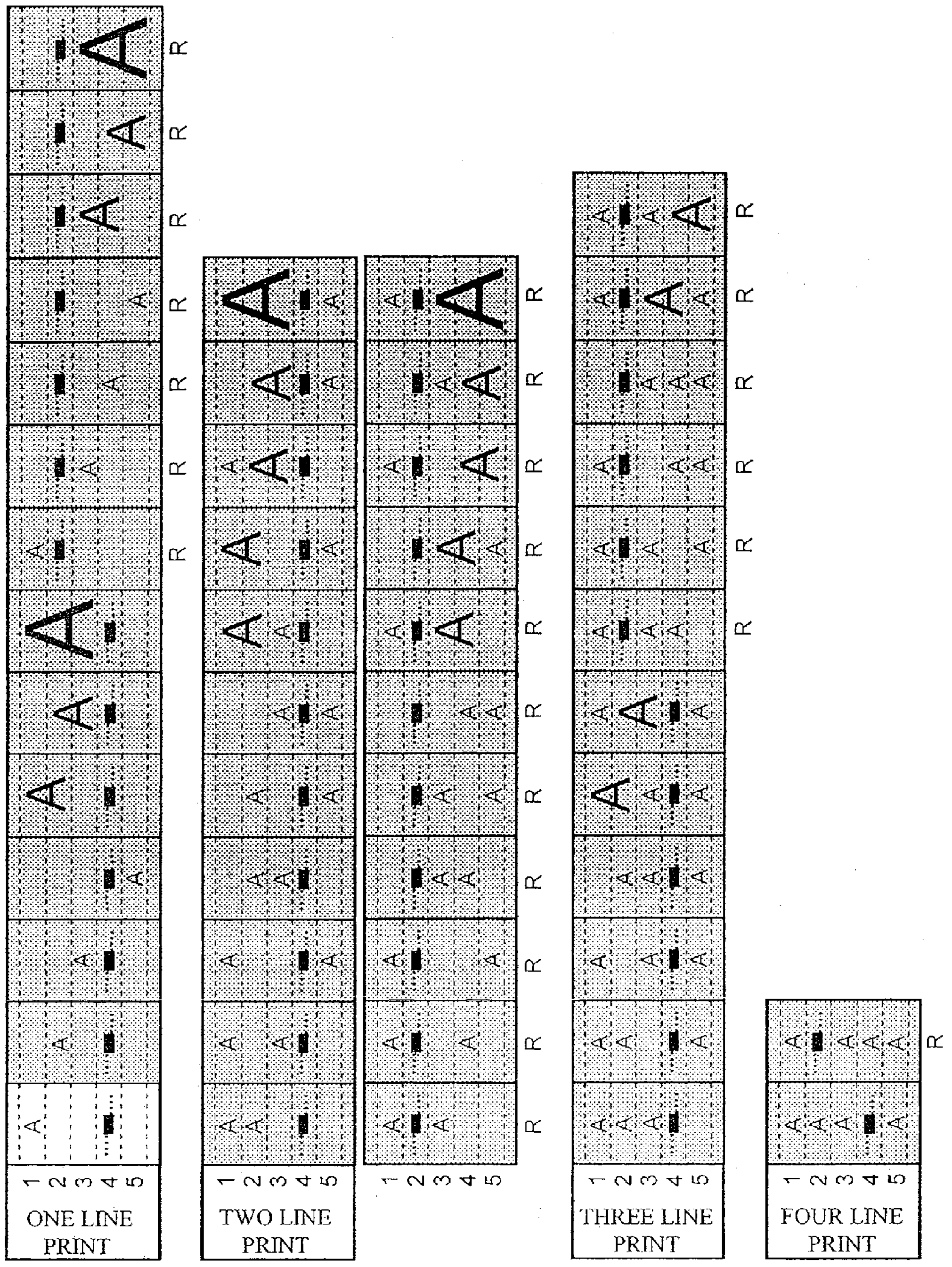
FIG. 55 is a view illustrating a display example of an entire print pattern to be set in a thermal tape in which the RFID circuit element is located in the minimum print divided region in a fourth stage.

FIG. 55: comprises display examples in the case where all the print patterns that can be set in a thermal tape 101' are displayed on a display device 185 (Step S3031 in FIG. 49) in print pattern setting according to the present variation; and corresponds to FIG. 50 in the above-described third embodiment. Here, in the examples shown in the figure, as shown in the print pattern at the seventh position from the left end or the rightmost position in the one-line print in FIG. 55, it is possible to print even letters the size of which in the tape width direction is as large as the size coinciding with the width corresponding to three minimum print division regions (48 dots in this example).

Figure 56A:
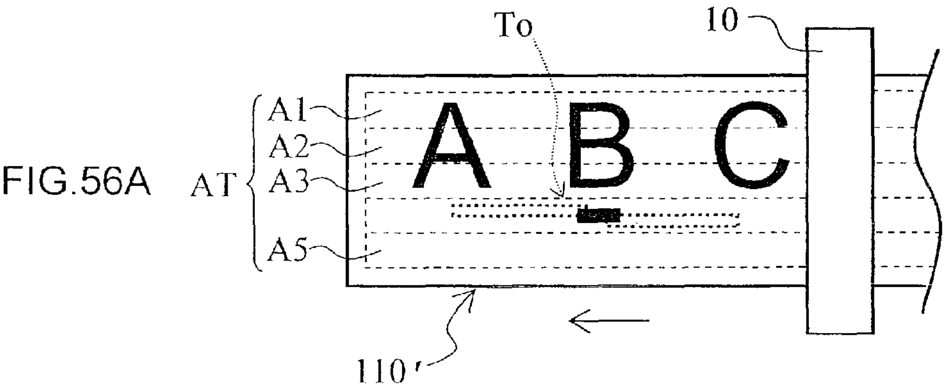
FIGS. 56A and 56B are views illustrating a print example of a tag label tape with print in the case of being printed in a forward print direction pattern and in the case of being printed in an opposite print direction pattern.
Figure 56B:
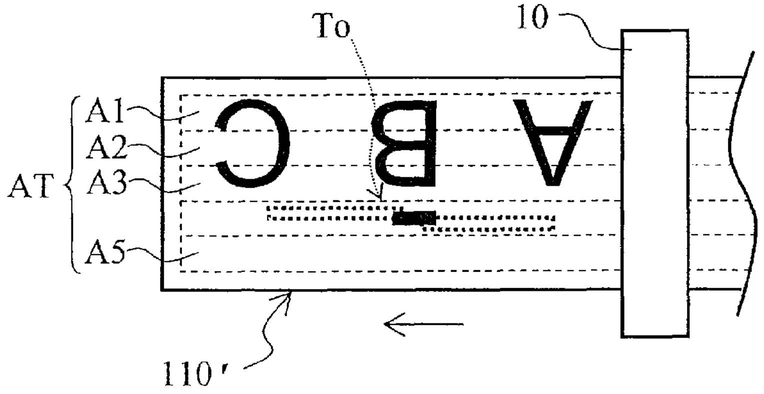

Then in FIG. 55, the print patterns indicated with the reference letter "R" under the print patterns are in the forms of the print patterns in the inverse direction and are differentiated from the print patterns not indicated with a reference letter (called print patterns in the forward direction). Normally, when a thermal tape 101' wherein a RFID circuit element To is disposed at the fourth row (from above in the figure) is used like this case, the thermal tape 101' is conveyed in the forward direction and each of the print letters is printed from the head of the letter string in a normal upright state (in the example shown in the figure, from the first print pattern to the seventh print pattern from the left end of the one-line print shown in FIG. 55) as shown in FIG. 56A. In contrast, by locating each of the print letters upside down and printing the letter string from the end (namely print is made rotationally symmetrically) during the forward direction conveying likewise as shown in FIG. 56B, the produced RFID label has a layout identical to the layout formed by making a print with the print pattern (in the example shown in the figure, the rightmost print pattern of the one-line print shown in FIG. 55) of the case where a thermal tape 101' wherein a RFID circuit element To is disposed at the second row (from above in the normal positioning after the completion of print) is used. In the present variation, such a print pattern in the inverse direction can also be set, thereby print can be made with print patterns that are applied to two kinds of layout-position information of RFID circuit elements To the layout positions of which are different from each other while an identical thermal tape is used, and hence it is possible to double the variation of the print layout and improve the convenience and versatility of an apparatus for communicating with RFID tags.

Figure 57:
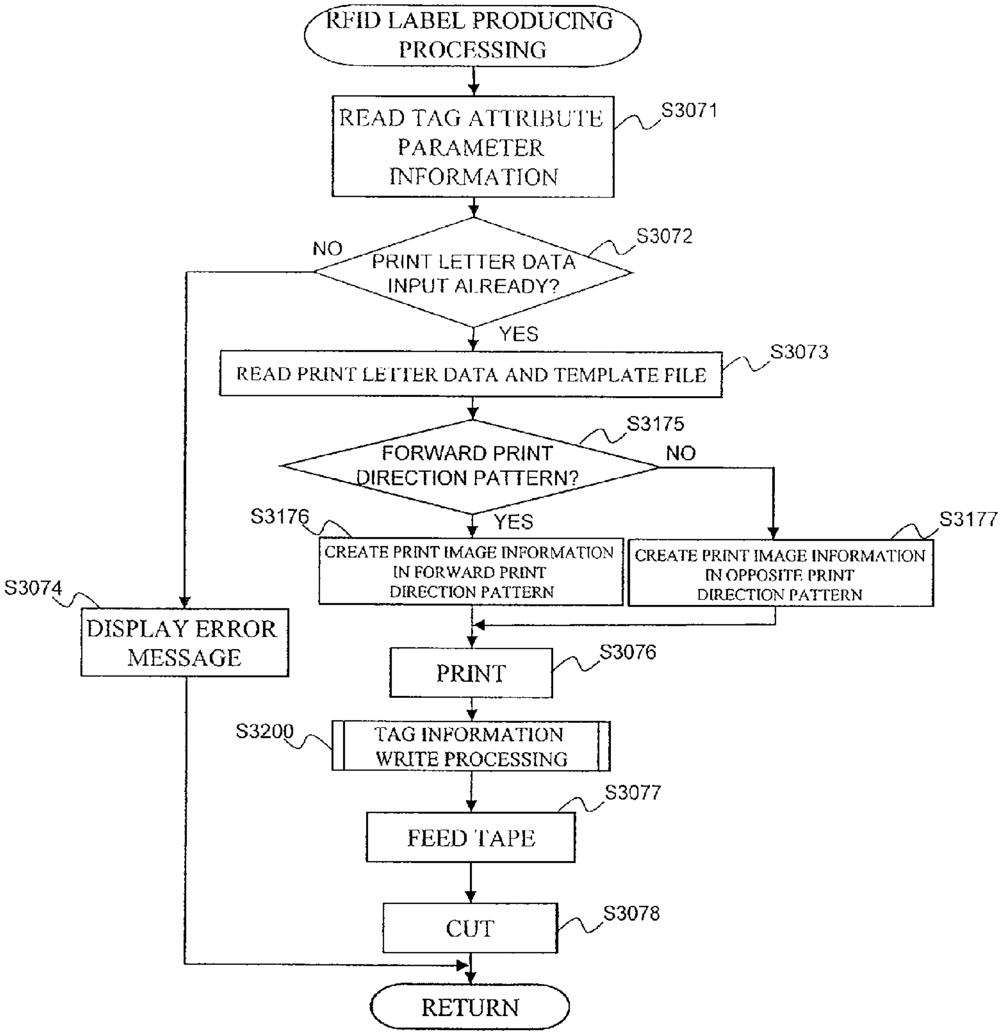
FIG. 57 is a flowchart illustrating a detailed procedure of producing a RFID label to be executed by a control circuit in a variation in which a printable region is determined so as to avoid only the IC circuit part.

FIG. 57: is a flowchart showing the detailed procedure of RFID label production processing in step S3070 in FIG. 48 mentioned above carried out with a control circuit 230 in such a variation; and corresponds to FIG. 52 in the above-described third embodiment. The flow shown in FIG. 57 is different from that shown in FIG. 52 in the fact that step S3175 as the procedure of determining whether the print pattern is in the forward direction or in the inverse direction, Step S3176 as the procedure of generating print image information when the print pattern is in the forward direction, and Step S3177 as the procedure of generating print image information when the print pattern is in the inverse direction are additionally set, in place of the procedure of generating print image information in step S3075 in FIG. 52.

That is, after Steps S3071 and S3072 similar to those in FIG. 52, in step S3073, a template file (refer to FIG. 55) corresponding to print letter data and a print pattern coming from a storage means is read via an input part 230*a* (refer to FIG. 58 to be described later). Subsequently, in step S3175, whether the print pattern is in the forward direction or in the inverse direction is determined based on the template file and, according to the determination result, relevant image data is developed on a print buffer 230*d* and generated in step S3176 or S3177 (refer to FIG. 58 to be described later).

Then in step S3076, in the same way as described earlier, control signals are output to a cartridge shaft driving circuit 24, a tape-feeding-roller driving shaft 12 is driven with a motor to drive cartridge shaft 23, a tag label tape 110' with print is conveyed, at the same time control signals are output to a print-head driving circuit 25, and print corresponding to print image information developed on the print buffer is made to a cover film 101*c*' with a print head 10 in step S3176 or S3177 mentioned above. The succeeding procedure is the same as that shown in FIG. 52 and hence the explanations are omitted.

Figure 58:
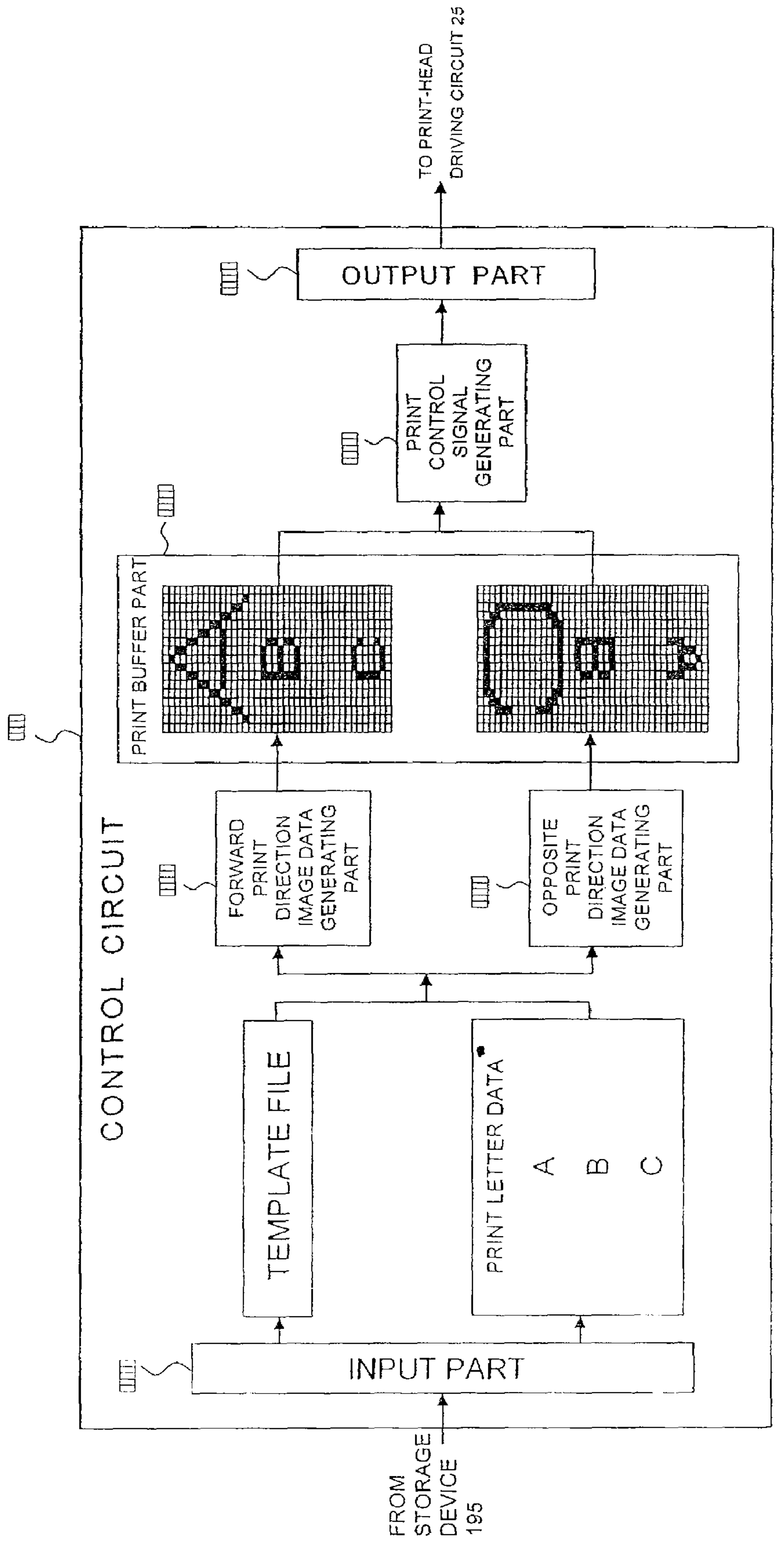
FIG. 58 is a functional block diagram of extracting and illustrating a portion relating to the generation of a control signal for printing that is executed in Step S3175, S3176, S3177 of FIG. 57.

FIG. 58 is a functional block diagram showing the part that is extracted from the functions of a control circuit 230 and related to the generation of print control signals transmitted to a print-head driving circuit 25 carried out in steps S3175, S3176, and S3177 in FIG. 18 described earlier.

In FIG. 58, the control circuit 230 is provided with: an input part 230*a* to input print letter data and a template file from a memory 195; a forward direction image data generating part 230*b* and an inverse direction image data generating part 230*c* to generate image data that are sorted by the determination based on the template file (Step S3175 in FIG. 57) and conform to the print pattern in the relevant direction; a print buffer 230*d* to develop and store the image data generated above; a print control signal generating part 230*e* to generate control signals output to the print-head driving circuit 25 based on the image data stored in the print buffer 230*d*; and an output part 230*f* to output the generated control signals to the print-head driving circuit 25.

The forward direction print image data generating part 230*b* generates data when the template file relates to a print pattern in the forward direction and the inverse direction print image data generating part 230*c* generates data when the template file relates to a print pattern in the inverse direction. Each of the generating parts 230*b* and 230*c*: converts input print letter data into layout information of dots (here two kinds of dots; black and white) in accordance with a print layout shown by the template file; and develops the layout information on the print buffer 230*d*. Then at the time of the generation of the image data, dots are placed only in a printable region AT while keeping away from the layout position of an IC circuit part 151. Here, although the case where "A," "B," and "C" as the letter string of each line in three-line print are input one by one is shown in FIG. 58 in order to simplify explanations, a plurality of letters may be input as the letter string of each line.

The print control signal generating part 230*e* generates control signals based on the image data stored in the print buffer 230*d*. More specifically, the image data stored as information on matrix arrangement of dots on the print buffer 230*d* are output one line by one line as control signals to the print-head driving circuit 25.

In the present variation configured as mentioned above, by determining a printable region AT so as to keep away from at lest the position of a RFID circuit element To where an IC circuit part 151 is located in a thermal tape 101', it is possible to prevent at least the IC circuit part 151 that constitutes the largest protrusion in the RFID circuit element To from adversely affecting print. In particular, when a RFID circuit element To is disposed not at a position in each of the minimum print division regions A1 to A5 but at an ambiguous position in the tape width direction (when layout-position information is based on dots) as mentioned above, a wider printable region AT can be ensured and thus the present variation is further effective.

Further, in the present variation in particular, by disposing a RFID circuit element To at an asymmetrical position in the label longitudinal direction or in the label width direction on a RFID label produced from a thermal tape 101' (in this example, the RFID circuit element To is disposed in the minimum print division region A4), it is possible to produce a different RFID label only by making a print rotationally symmetrically while rotating the orientation of the print with the print pattern of the inverse direction and overturning the RFID label after produced as mentioned above. With the arrangement, it is possible to easily produce various kinds of RFID labels according to the usage and needs of users.

Here, in the present variation, it is also possible to: provide an apparatus for communicating with RFID tags with a print minimum storage means (for example, an appropriate storage means such as a RAM, a ROM, or the like) to set and store an allowable minimum value (a minimum font set) regarding the size of print letters (font set); and control a print head 10 based on the allowable minimum value stored in the print minimum storage means. In this case, there is the effect of preventing print of letters of such a small size as users can hardly distinguish visually.

Here, in the above-described third embodiment and the present variation, a print candidate region AS is equally divided into five minimum print division regions A1 to A5 and a RFID circuit element To is located to any one of the minimum print division regions. However, the present invention is not limited to those cases and a print candidate region AS may be equally divided into a number, other than five (five rows), of minimum print division regions. Otherwise, a RFID circuit element To may be disposed at a position in the tape width direction according to not only layout-position information in the equally divided minimum print division regions but also layout-position information by the number of dots of a print head 10 and thereby the same effect as mentioned above can be obtained.

(3-2) The Case of Setting a Printable Region at by Changing a Print Aspect Even at a Layout Position of a RFID Circuit Element To In the above cases, a printable region AT is determined so as to keep away from the layout position of a RFID circuit element To or at least an IC circuit part 151. The present invention is not limited to those cases, and it is also possible to: determine a printable region AT so as to include the layout position of a RFID circuit element To (or at least an IC circuit part 151); and control a print head 10 so as to change the print aspect between a part corresponding to the layout position of the RFID circuit element To and the other part in the determined printable region AT.

That is, for example, a print aspect such as a color and a thickness of print at the part corresponding to the layout position of the RFID circuit element To is differentiated from other printable regions. As an example, a print aspect is set beforehand so that print may be thinner at a part corresponding to the layout position of the RFID circuit element To than at the other part (in this case, the print is thin from the beginning and hence there is no problem even if print fading or the like may occur), and thereby it is possible to avoid problems in the quality assurance of the produced RFID label.

(3-3) The Case of Providing a Thermal Tape with Information on the Layout Position of a RFID Circuit Element To or an IC Circuit Part 151

In the above cases, a cartridge 100' is provided with an identifier corresponding to information on the layout position of a RFID circuit element To or at least an IC circuit part 151. The present invention is not limited to those cases however and it is also acceptable to provide a thermal tape with an identifier corresponding to the layout-position information as an information keeping part (a position-information keeping part for a RFID tag).

By this sort of present variation, when a RFID label is produced from a thermal tape as mentioned above, for example, it is possible to determine a printable region AT in the thermal tape on the side of an apparatus 2 for communicating with RFID tags based on the information on the layout position of a RFID circuit element To. On this occasion, it is possible to: make a print so as to keep away from the vicinity of the layout position of the RFID circuit element To; or make a print in an aspect that allows fading or the like to occur (for example, setting thin print) even when print is made to the vicinity of the layout position of the RFID circuit element To. As a result, it is possible to: reduce the incidence of print failure in the vicinity of the layout position of the RFID circuit element To, or avoid the occurrence of problems in the quality of the RFID label even when print failure occurs. Consequently, it is possible to assure the quality of a RFID label with print.

Figure 59A:
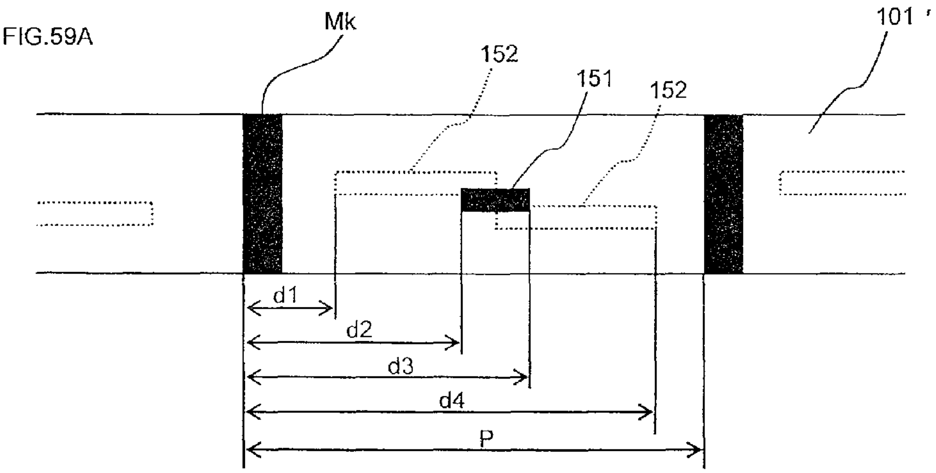
FIGS. 59A and 59B are explanatory views for illustrating a variation in which there is provided a tape-side identifier such as marking in a position corresponding to a layout position of the RFID circuit element as a position-information keeping part for a RFID tag.
Figure 59B:
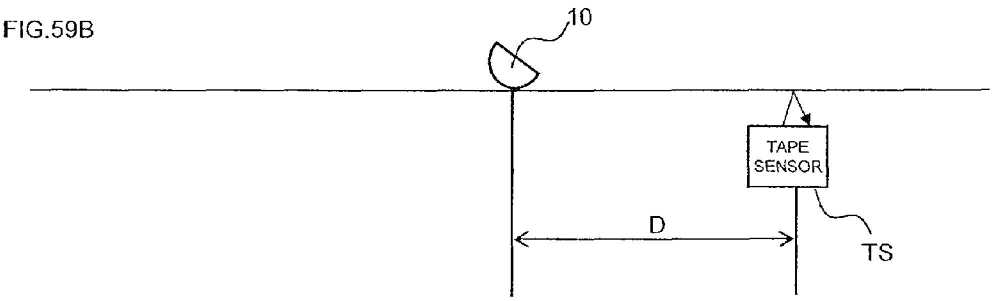

Here, as an information keeping part (a position-information keeping part for a RFID tag), as shown in FIG. 59A, a tape-side identifier Mk may be formed by marking or the like at a position corresponding to the layout position of a RFID circuit element To. Preferably the tape-side identifier Mk is formed on a separation sheet 101*a*', then the distance from the tape-side identifier Mk to the front end of an antenna 152 (the left end in the figure) is set at d1, the distance from the same to the front end of an IC circuit part 151 is set at d2, the distance from the same to the rear end of the IC circuit part 151 (the right end in the figure) is set at d3, and the distance from the same to the rear end of the other antenna 152 is set at d4. Further in this case, as shown in FIG. 59B, the distance between a print head 10 and a tape sensor TS disposed at a predetermined position in a cartridge 100' in order to detect the tape-side identifier Mk is set at D. Thereby a tape-side identifier such as a marking can be detected on the side of an apparatus 2 for communicating with RFID tags, and thereby it is possible, for example, to determine a printable region AT in a thermal tape 101' based on the information on the layout position of a RFID circuit element To obtained in accordance with the detection result. For example, when the tape sensor TS detects the tape-side identifier Mk (the detection signals are input into a control circuit 230) and thereafter a tape is sent by the distance of D+d2 (at the location of a print head 10), the layout region of the IC circuit part 151 begins and, when the tape is sent by the distance of D+d3, the layout region of the IC circuit part 151 ends. Consequently, it is possible to perform processing such as excluding the layout region of the IC circuit part 151 from a print region (here, it goes without saying that a whole RFID circuit element To including not only the IC circuit part 151 but also the antennas 152 may be excluded from the print region).

Figure 60:
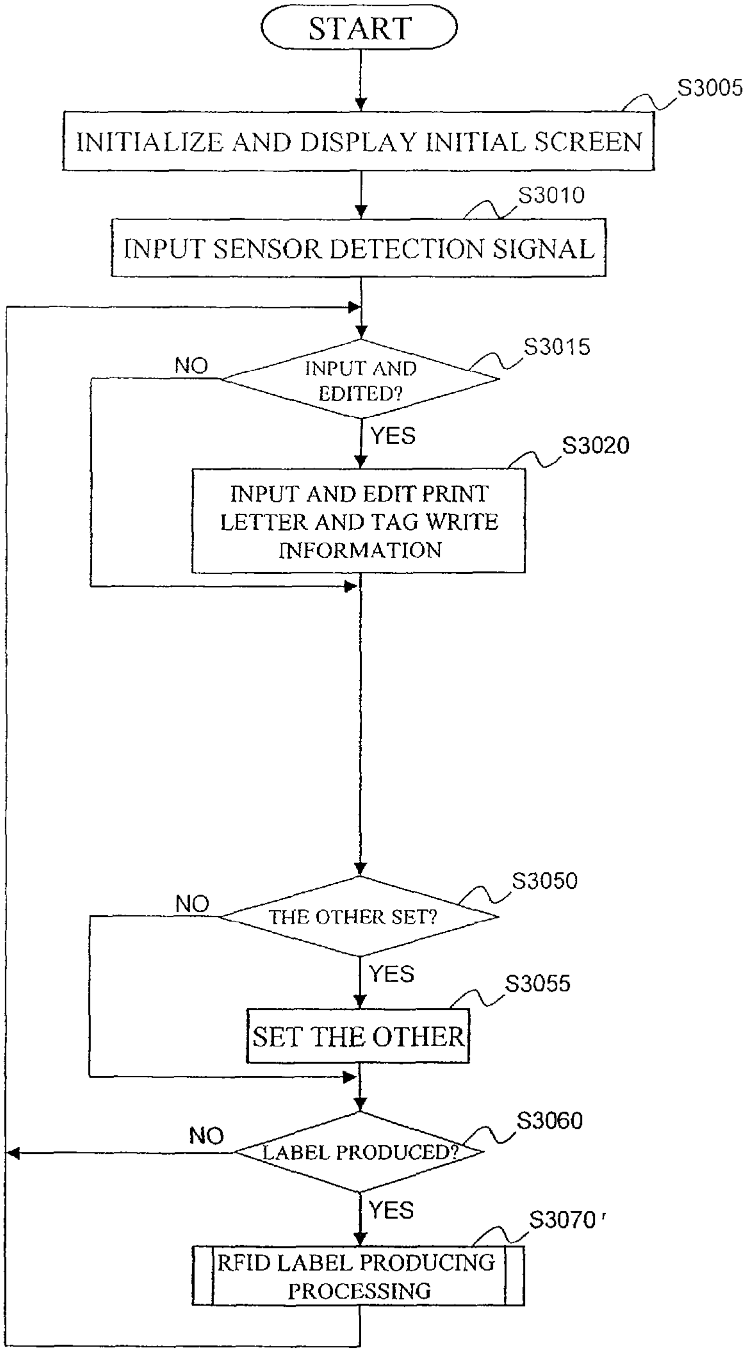
FIG. 60 is a flowchart illustrating a control procedure to be carried out by a control circuit in the variation illustrated in FIGS. 59A and 59B.

FIG. 60: is a flowchart showing the control procedure carried out with a control circuit 230 in this case; and nearly corresponds to FIG. 48 mentioned above. The same parts as those shown in FIG. 48 are represented by the same symbols and the explanations are omitted. As shown in the figure, Steps S3025 and S3030 in FIG. 48 are omitted in FIG. 60. That is, in this example, such print pattern processing as shown in FIG. 49 is not performed, namely such a template as shown in FIGS. 50 and 51 is not used, and print is made along a predetermined fixed pattern (for example, one-line letters in the center of the tape width direction). Further, in step S3070' set in place of Step S3070 in FIG. 48, RFID label production processing is performed (for details, refer to FIG. 61 to be described below).

Figure 61:
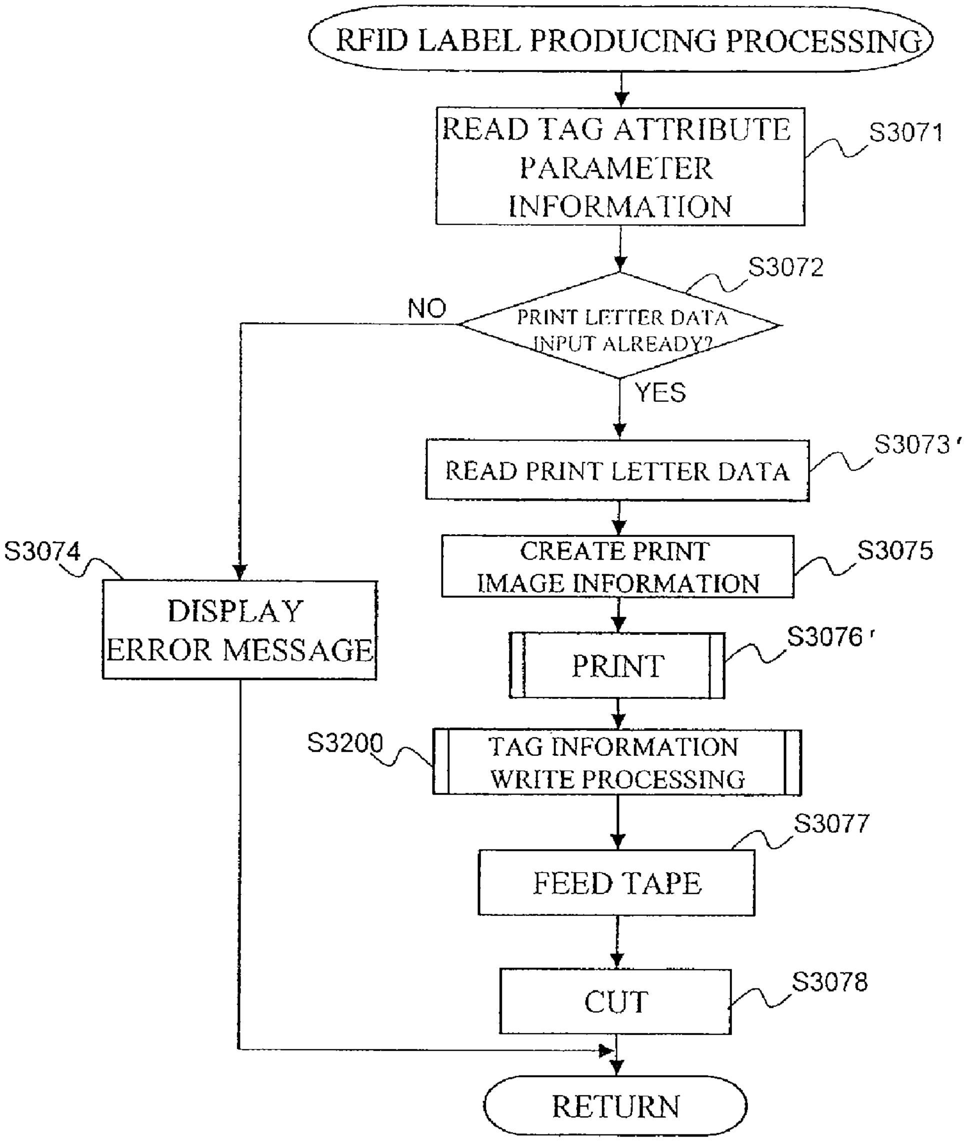
FIG. 61 is a flowchart illustrating a detailed procedure of producing the RFID label illustrated in Step S3070' of FIG. 60.

FIG. 61: is a flowchart showing the detailed procedure of the RFID label production processing shown in step S3070' in the flow shown in FIG. 60; and nearly corresponds to FIG. 52 mentioned above. The same parts as those shown in FIG. 52 are represented by the same symbols and the explanations are omitted. The difference of FIG. 61 from FIG. 52 is that, in response to not using such a template as mentioned above: only the print letter data stored in a memory means in step S3020 mentioned above is read out in step S3073' introduced in place of Step S3073; and the procedure of print processing is set in step S3076' in place of Step S3076.

Figure 62:
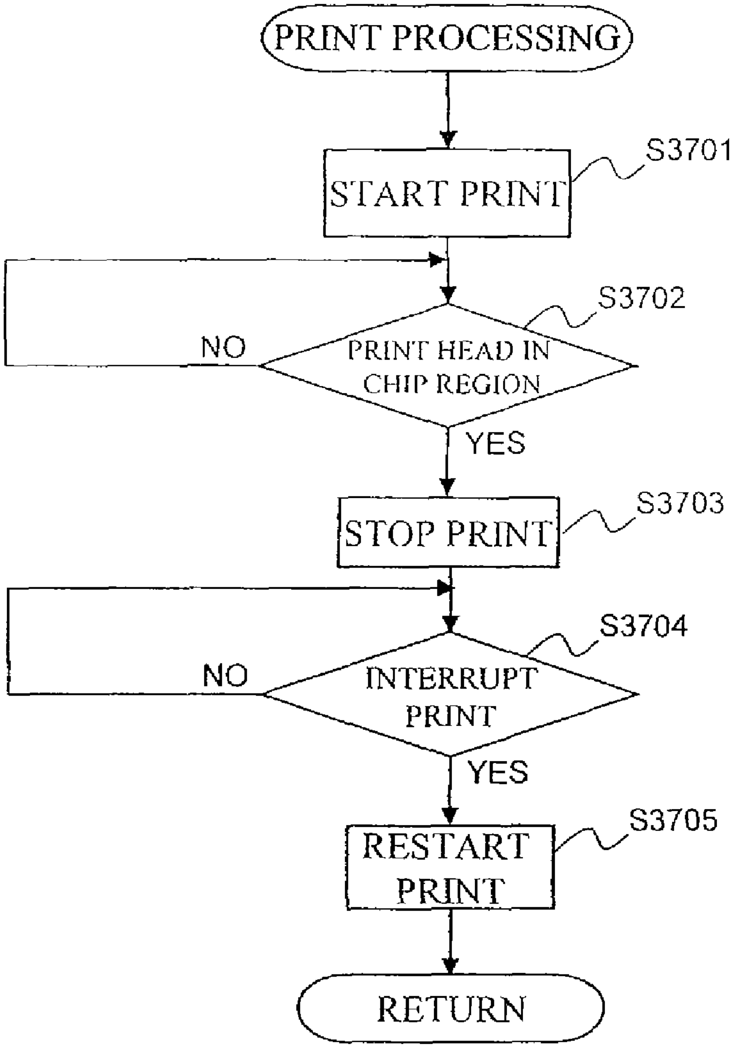
FIG. 62 is a flowchart illustrating a detailed procedure of Step S3076' of FIG. 61.

FIG. 62 is a flowchart showing the detailed procedure in step S3076' in FIG. 61. Firstly print starts in step S3701. That is, control signals are output to a cartridge shaft driving circuit 24, a tape-feeding-roller driving shaft 12 is driven with a motor to drive cartridge shaft 23, a tag label tape 110' with print is fed, the control signals are output to a print-head driving circuit 25 during that time, and print corresponding to the print image information developed on a print buffer in step S3075 mentioned above is made to a cover film 101*c*' with a print head 10.

Thereafter, the operation goes to Step S3702 and whether or not an IC circuit part 151 has reached the position of the print head 10 is determined based on signals detected with a tape sensor TS. Speaking of that with the above-described case, whether or not the tape is fed by the distance of D+d2 after the tape sensor TS detects a tape-side identifier Mk is determined.

When the determination is satisfied, the operation goes to Step S3703, control signals are output to the print-head driving circuit 25, thus the print head 10 is controlled so as to stop print, and thereby the print operation started in step S3701 mentioned above is interrupted once (here, the feeding of the tag label tape 110' with print is continued). Thereafter, the operation goes to Step S3704.

In step S3704, whether or not the IC circuit part 151 has exceeded the position of the print head 10 is determined based on signals detected with the tape sensor TS. Speaking of that with the above-described case, whether or not the tape is fed by the distance of D+d3 after the tape sensor TS detects the tape-side identifier Mk is determined.

When the determination is satisfied, the operation goes to Step S3705, control signals are output to the print-head driving circuit 25, thus the print head 10 is controlled so as to start print, thereby print operation restarts in the same way as Step S3701 mentioned above, and the routine is terminated.

Here, in the above case, Steps S3702 and S3704 in the control flow shown in FIG. 62 that are carried out with the control circuit 230 constitute a print region determination means to determine (resultantly) a printable region with the print head 10 (the region other than the IC circuit part 151 in this example) based on information on the layout position of a RFID circuit element To in a thermal tape 101' described in the claims, and Steps S3701, S3703, and S3705 correspond to a third print controller to control the print head 10 based on the printable region determined by the print region determination means.

In the above example too, in the same way as the above-described third embodiment, at least by determining (resultantly) a printable region so as to keep away from the layout position of an IC circuit part 151 of a RFID circuit element To in a thermal tape 101', at least the effect of preventing the IC circuit part 151 that constitutes the largest protrusion in the RFID circuit element To from adversely affecting print is obtained.

Further, the tape-side identifier comprising marking or the like may be used also as an identifier for positioning at the time of feed control. On this occasion, it is possible to: easily carry out the feed control for the positioning of a printing position and a cutting position by using the identifier as a reference mark; and use the identifier commonly without the additional installation of an identifier for positioning.

Furthermore, as an information keeping part (a position-information keeping part for a RFID tag), it is possible to: store layout information of the relevant RFID circuit element To in an IC circuit part 151 provided in a thermal tape (a tag position information storage means); and read and obtain the information from the apparatus side. On this occasion too, the same effect as described above can be obtained.

(3-4) Another Aspect of the Tag Tape

In the foregoing, a case has been described as an example in which the thermal tape 101' is wound around the reel member 102*a*' as the tag tape to form the roll 102' and the roll 102' is mounted inside the cartridge 100' so that the thermal tape 101' is fed out. However, the invention is not limited to the foregoing. For example, an elongated-planar or strip-shaped tape or sheet (including those formed by feeding out the tape which has been wound into a roll and subsequently cutting it to a suitable length) having at least one RFID circuit element To provided thereon may be stacked in a predetermined receptacle to provide a cartridge which in turn is mounted on the cartridge holder at the side of the apparatus 2 for communicating with a RFID tag, and the RFID label may be produced by printing or writing on the tape or sheet that was carried or fed out from the receptacle.

Furthermore, without being limited to the cartridge type, an arrangement is also conceivable in which the roll 102' is directly mounted on the side of apparatus 2 for communicating with a RFID tag, or the elongated-planar or strip-shaped tape or sheet is carried from outside the apparatus 2 for communicating with a RFID tag and supplied into the apparatus 2 for communicating with a RFID tag, one by one, by a predetermined feeder mechanism. Also with these cases, a similar effect as with the above-mentioned third embodiment can be obtained.

(3-5) The Case of Only Reading Information

In the foregoing, a case has been described as an example in which information is written into the IC circuit part 151 of the RFID circuit element To. However, the present invention, without being limited to the foregoing, may be applied to an apparatus for communicating with a RFID tag of RFID labels comprising a RFID circuit element To, which is capable of only reading the information. A similar effect can also be obtained in this case.

(3-6) The Case of Using an Ink Ribbon

In the foregoing, a case has been described as an example in which thermal tape 101' is used. However, without being limited to the foregoing, a print may be made using an ink ribbon. A similar effect can also be obtained in this case.

(3-7) Other Cases

Additionally, with the third embodiment and respective variations, a case of a standalone type has been described as an example in which the apparatus 2 for communicating with a RFID tag has a memory 195 constituting a database for independently storing and retrieving required information. However, the invention, without being limited to the foregoing, may be applied to a RFID tag production system having an interface in the apparatus 2 for communicating with a RFID tag and being connected to a route server, a terminal, a general purpose computer, and a plurality of information servers via a wired or wireless communication line, similarly as with the first and the second embodiments. A similar effect can also be obtained in this case.

A fourth embodiment of the present invention will be described, referring to FIGS. 63 to 73.

Figure 63:
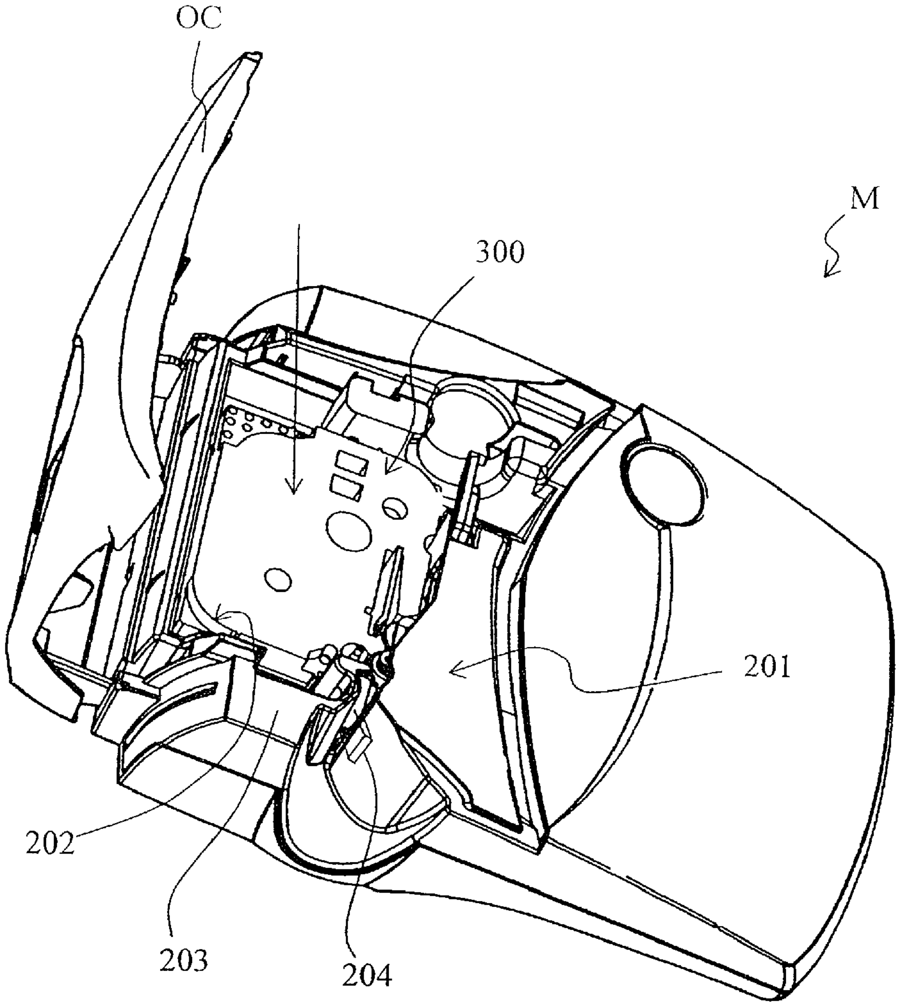
FIG. 63 is a perspective view illustrating an entire schematic structure of an apparatus for communicating with a RFID tag according to a fourth embodiment of the present invention.

FIG. 63 is a perspective view illustrating an entire schematic structure of the apparatus for communicating with a RFID tag of the present embodiment (with the cartridge 300 attached and the flip cover OC opened, as described below).

In FIG. 63, the apparatus M for communicating with a RFID tag comprises a main body 201, a cartridge holder 202 (holder for selective installation) configured to contain a cartridge 300 removably mounted on the main body 201, a housing 203 configured to define the outer periphery of the main body 201, an antenna 204 (apparatus antenna) configured to exchange signals via radio communication using appropriate frequencies such as UHF band, microwave band, or shortwave band, and a flip cover OC which is pivotably connected to the main body 201 so as to cover the cartridge holder part 202 in the closed state.

Figure 64:
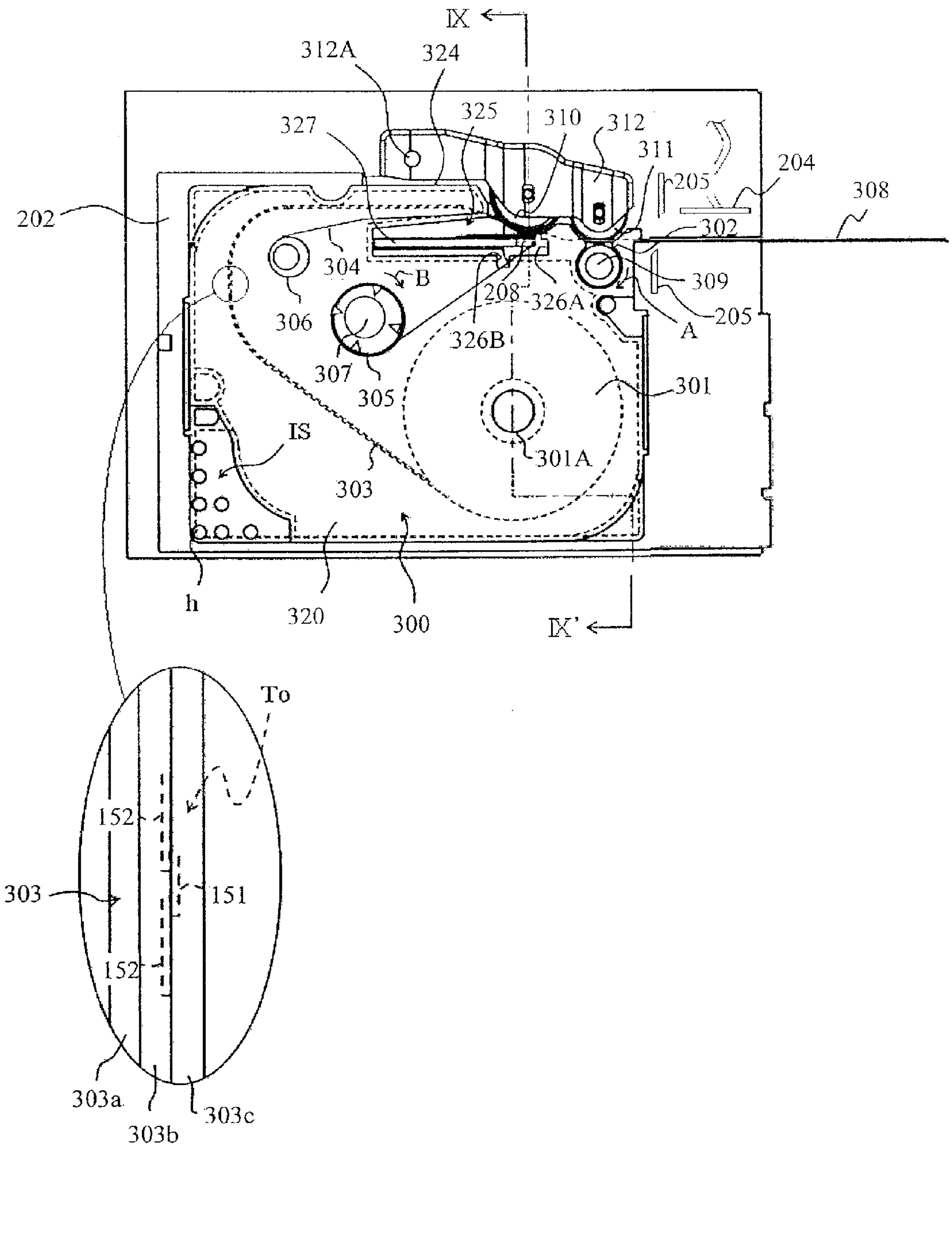
FIG. 64 is a top perspective view partially illustrating the interior taken in II direction of FIG. 63.

FIG. 64 is a (partly perspective) top view seen from the direction II in FIG. 63 illustrating a portion around the cartridge 300, together with the cartridge 300, of the main body 201.

In FIG. 64, the cartridge 300, being removably fitted into the cartridge holder part 202 which is a recess inside the housing 203, comprises a tape roll 301 having tape 303 wound thereon as the first tape, a ribbon-supply-side-roll 306 configured to feed out the ink ribbon 304 for printing, a ribbon take-up roller 305 configured to take up the ink ribbon 304 after printing, and a feeding roller 302 configured to feed the tape roll 301 outward from the cartridge 300.

The tape roll 301 has the above-mentioned belt-shaped, transparent tape (tag tape, as appropriately in the following) 303 wound around the reel member 301A, the tag tape having a plurality of RFID circuit elements To sequentially formed along its longitudinal direction.

The tape 303, having a three-layer structure (see partially enlarged view of FIG. 64), is formed by laminating, from the outward winding side (left side in FIG. 64) toward the opposite side (right side in FIG. 64), a separation sheet 303*a*, an adhesive layer 303*b*, a cover film (print-receiving layer, tape base) 303*c* composed of PET (polyethylene terephthalate) or the like in this sequence.

The separation sheet 303*a* is bonded to the back side (left side in FIG. 64) of the cover film 303*c* by the adhesive layer 303*b*. The separation sheet 303*a* is provided in order to allow the completed RFID label T to, when applying it to a predetermined article, to be bonded to the article through the adhesive layer 303*b* by peeling off the sheet. Additionally, with regard to the tape 303, an IC circuit part 151 configured to store information is integrally provided on the back side of the cover film 303*c* (left side in FIG. 64) in this example, and an antenna 152 connected to the IC circuit part 151 for transmitting and receiving information is formed on the surface of the back side of the cover film 303*c*, the RFID circuit element To comprising the IC circuit part 151 and antenna 152.

In addition, a part to be detected IS (tape-kind-information keeping portion, information keeping portion) is formed at the corner on the opposite side of the feeding roller 302 on the case 320 of the cartridge 300. The part to be detected IS has a plurality of switch holes h bored with a predetermined patterns, each of which representing the type of the cartridge specified by the tape-kind information as to whether the tag tape or a normal tape described below is provided, or other parameter information such as, for example, the communication parameter (frequency of the radio wave or communication protocol used in the radio communication, etc.) or the tag attribute parameter (sensitivity of the antenna 152 of the RFID circuit element To, memory capacity of the IC circuit part 151, width of the tape 303, layout interval of the RFID circuit elements To on the tape 303, tape position in the width direction of the RFID circuit element To, etc.), which are most suitable for the RFID circuit element To when the tag tape is provided. The patterns, which are different according to each cartridge type, will be detected by the cartridge sensor (or cartridge detection switch) 332 (detecting device; see FIG. 65 or 66 described below) provided on the main body 201 side.

On the other hand, a print head (thermal head) 208 configured to make a predetermined print on the tape 303 fed out from the tape roll 301, a ribbon take-up roller driving shaft 307 configured to drive the ribbon take-up roller 305 which takes up the ink ribbon 304 that finished printing on the tape 303, a feeding roller driving shaft 309 as the drive means for driving the feeding roller 302, and a roller holder 312, provided at a position opposed to the print head 208 in a contactable and separable manner, to hold the platen roller 310 and the sub-roller 311 are provided on the cartridge holder part 202 of the apparatus M for communicating with a RFID tag.

When the cartridge 300 is mounted on the cartridge holder part 202 of the apparatus M for communicating with a RFID tag, the roller holder 312 is moved from the separation position to the contact position, whereby the tape 303 and the ink ribbon 304 are sandwiched between the print head 208 and the platen roller 310, and the tape 303 is also held between the feeding roller 302 and the sub-roller 311. The tape-feeding-roller driving shaft 309, the sub-roller 311 and the platen roller 310 are coupled by a gear so that the feeding roller 302, sub-roller 311 and platen roller 310 rotate as the tape-feeding-roller driving shaft 309 is driven. Then, the ink ribbon 304, driven by the ribbon-supply-side-roll 306 and the ribbon take-up roller 305 provided at the side of the surface of the tape 303 which is fed out from the second roll 302, is pressed against the print head 208 to be brought into contact with the surface of the tape 303.

In the above-mentioned arrangement, the feeding roller 302 and the ribbon take-up roller 305 synchronously rotate, respectively in the directions shown by arrows A and B, due to the driving force of the motor to drive cartridge shaft 403 (described below), and the tape 303 is fed out from the tape roll 301 by the driving force. At the same time a plurality of heater elements of the print head 208 is energized by the print-head driving circuit 405 (described below) (in this occasion the size or position of the print drive region of the print head 208 is controlled according to the cartridge type, the details of which will be described below referring to FIGS. 70-072). As a result, prints R such as predetermined characters, symbols, bar codes are printed on the cover film 303*c* (see FIG. 68C described below) of the tape 303, which is then formed as a label tape with print 308 and carried out of the cartridge 300. The ink ribbon 304 which has completed the printing on the tape 303 is taken up by the ribbon take-up roller 305 driven by the ribbon take-up roller driving shaft 307.

Here, the cartridge holder part 202 is arranged to attach/detach, in addition to the cartridge 300 having the tape 303 (tag tape) with the RFID circuit elements To formed thereon, a cartridge 300' having the tape 303' (referred to as the normal tape, hereunder) wound around the tape roll 301' as the first tape with no RFID circuit element provided thereon, whereby the normal tape 303' is conveyed, similarly as with the cartridge 300, to allow printing by the print head 208.

Figure 65:
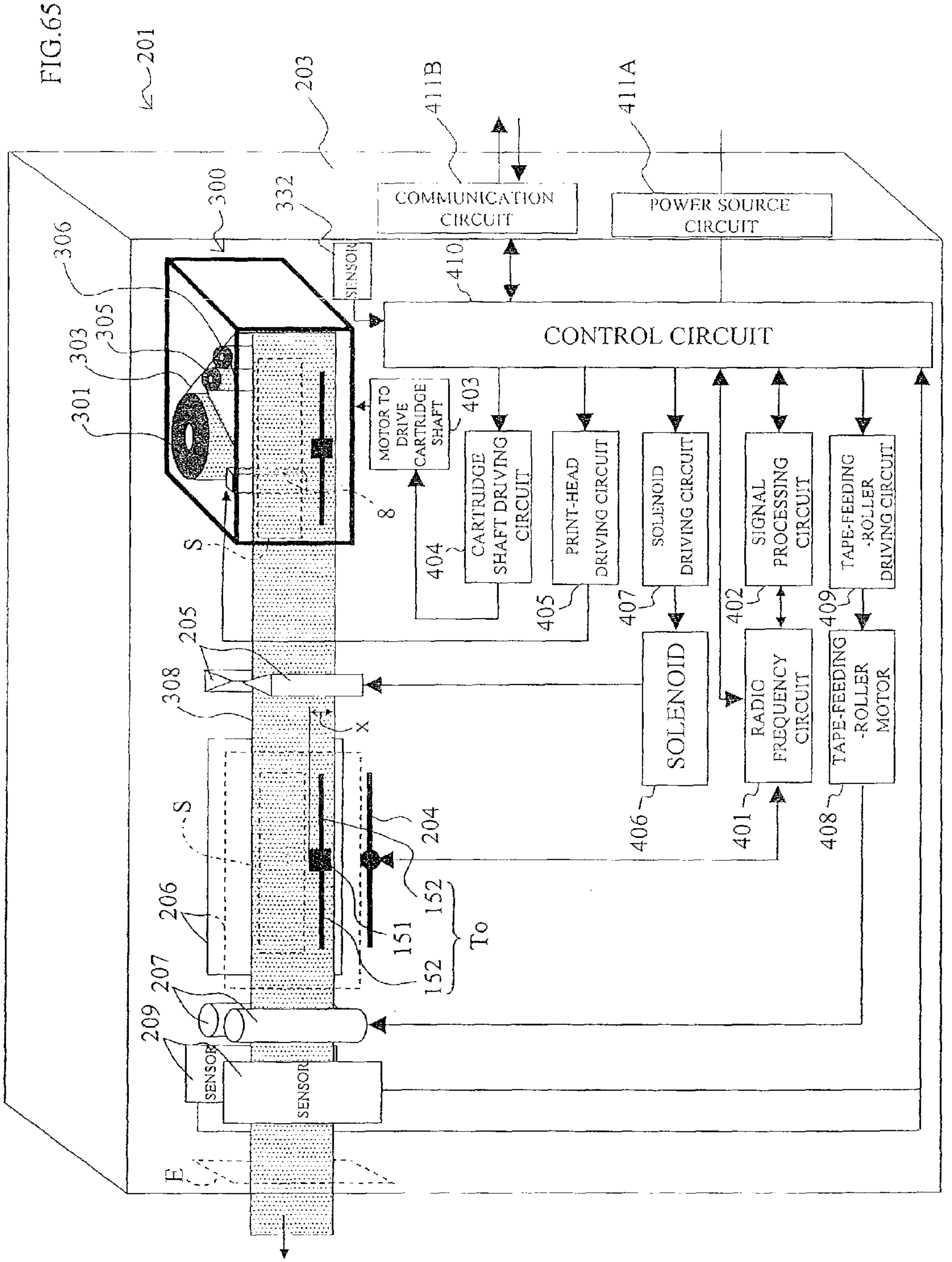
FIG. 65 is a schematic diagram illustrating details of an apparatus main body in a sate in which a cartridge provided with a tag tape is mounted.

FIG. 65 is a schematic diagram illustrating in detail the main body 201 with the cartridge 300 mounted therein, the cartridge 300 having the tape 303 (tag tape) with the RFID circuit elements To formed thereon.

In FIG. 65, the tag tape 303 wound around the tape roll 301 has the plurality of RFID circuit elements To arranged at an end on one side in the width direction (bottom of FIG. 65 in this example), while an end on the other side in the width direction (top of FIG. 65 in this example) of respective RFID circuit elements To is the print region S in which a print corresponding to each of the RFID circuit elements To is made by the print head 208.

In addition to the above-mentioned arrangement, the main body 201 comprises the antenna 204 configured to exchange, along with the above-mentioned print operation, signals via radio communication using appropriate frequencies such as UHF band, microwave band, or shortwave band with the RFID circuit element To provided on the label tape with print 308, a cutter 205 configured to cut the label tape with print 308 to a predetermined length at a predetermined timing to produce a label-shaped RFID label T (described below), a pair of feeding guides 206 configured to set and to hold the RFID circuit element To in a predetermined access area opposing the antenna 204 when exchanging signals via the radio communication, and guiding respective RFID labels T after the cutting, a feeding roller 207 configured to feed and carry out the guided RFID label T toward the carry-out exit E, a sensor 209 for configured to detect presence or absence of the RFID label T at the carry-out exit E, a radio frequency circuit 401 configured to access (read or write) the information (RFID tag information) of the IC circuit part 151 of the RFID circuit element To via the antenna 204, a signal processing circuit 402 configured to process the signals read from the IC circuit part 151 of the RFID circuit element To and to read information as well as access the IC circuit part 151 of the RFID circuit element To, a cartridge shaft driving circuit 404 configured to control the drive of the motor to drive cartridge shaft 403, a print-head driving circuit 405 configured to control the power supply to the print head 208, a solenoid 406 configured to drive the cutter 205 to perform the cutting operation, a solenoid driving circuit 407 configured to control the solenoid 406, a tape-feeding-roller driving circuit 409 configured to control a tape-feeding-roller motor 408 which drives the feeding roller, and a control circuit 330 configured to control the overall operation of the apparatus M for communicating with a RFID tag via the radio frequency circuit 401, the signal processing circuit 402, the cartridge shaft driving circuit 404, the print-head driving circuit 405, the solenoid driving circuit 407, the tape-feeding-roller driving circuit 409 and so on.

The cutter 205, provided nearby the exit of the cartridge 300, is carried out from the cartridge 300 and further cuts, to a predetermined length at a predetermined timing, the label tape with print 308 which has completed reading/writing of the RFID tag information with respect to the IC circuit part 151 of the RFID circuit element To, thereby producing a divided RFID tag T having RFID circuit elements To.

The control circuit 330, being a so-called micro computer and hence its detailed illustration omitted, comprises a CPU or the central processing unit, a ROM and a RAM, and is arranged to execute signal processing according to the program preliminarily stored in the ROM, using temporary storage function of the RAM. In addition, the control circuit 330 is power-supplied by the power source circuit 411A and connected to a communication line, for example, via the communication circuit 411B, allowing exchanges of information with the route server, other terminals, a general-purpose computer, and information servers which are connected to the communication line but not illustrated. Furthermore, tape discrimination information (the above-mentioned information as to whether the tag tape or the normal tape is provided, and other parameter information) from the cartridge sensor 332 is input to the control circuit 330. The control circuit 330 controls the power supply to the print head 208 (see FIGS. 72 and 73 below for details), based on the information from the cartridge sensor 332.

Figure 66:
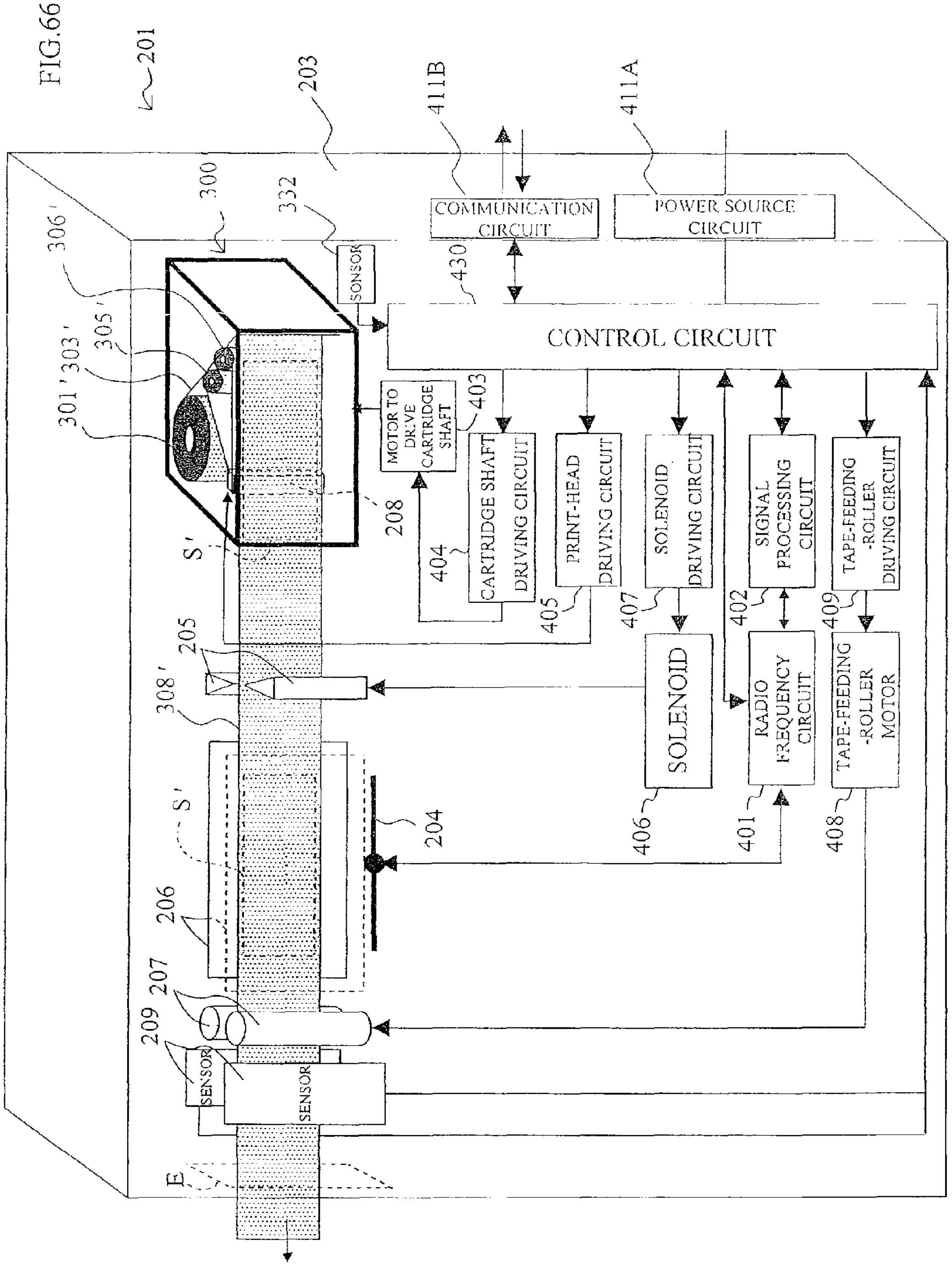
FIG. 66 is a schematic diagram illustrating details of an apparatus main body in a state in which a cartridge provided with a normal tape is mounted.

FIG. 66 is a schematic diagram illustrating the details of the main body 201 with the cartridge 300' containing the normal tape 303' mounted therein. However, in FIG. 66, elements which are equivalent with those of FIG. 65 have the same symbols and thus their description is omitted here, since their respective operations and functions are similar to those of FIG. 65. The cartridge 300' differs from the cartridge 300 of FIG. 65 in that a normal tape 303' with no RFID circuit element provided thereon is wound around the tape roll 301, and the print is made on the print region S' of the normal tape 303' to produce the label tape with print 308', which is then cut with the cutter 205 to produce the label T' (see FIG. 69 described below). In addition, with the cartridge 300' having the normal tape 303' shown in FIG. 66, the attachment positions of the tape roll 301', the ribbon-supply-side-roll 306', the ribbon take-up roller 305', and the feeding roller 302' are displaced along the axial direction of respective rolls or rollers, compared with respective rolls and rollers 301, 306, 305, and 302 of the cartridge 300. Consequently, the positions of the tapes 303' and 308' are slightly displaced upward in the diagram, compared with the positions of the tape 303 and 308 of the cartridge 300. Specifically, the position of the tape transport path of the tape 308 contained in the cartridge 300 and the position of the tape transport path of the tape 308' contained in the cartridge 300' are displaced along the width direction of the tape 308 (downward in FIG. 65) by a length approximately equal to (or a length not below) the distance x from an end on one side of the tape 308 in the width direction (lower end in FIG. 65) to an end on the other side of the tape 308 in the width direction (upper end in FIG. 65) of the IC circuit part 151 (see also the difference between the tape carry-out exit positions shown in FIGS. 69 and 70 described below). In other words, the position of the end on one side (lower end in FIG. 66) of the tape 308' in the width direction when the cartridge 300' is mounted is approximately identical to the position of the end on the other side (upper end in FIG. 65) in the width direction of the tape 308 of the IC circuit part 151 of the tape 308 when the cartridge 300 is mounted.

Note that, access to the RFID tag via the antenna 204 will not be performed when the normal tape 303' is used.

Figure 67:
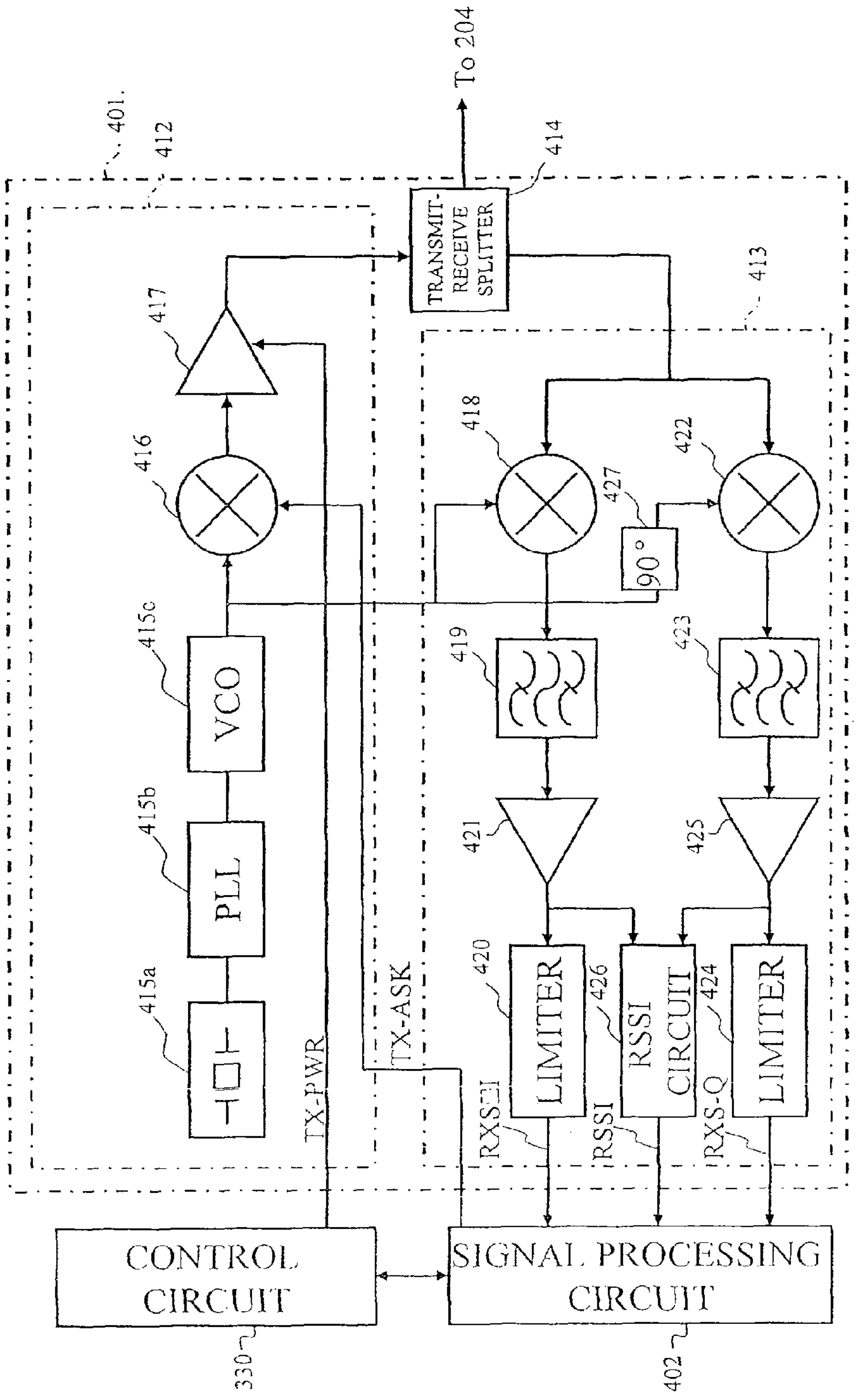
FIG. 67 is a functional block diagram illustrating a detailed function of a radio frequency circuit.

FIG. 67 is a functional block diagram illustrating the details of the functions of the radio frequency circuit 401. In FIG. 67, the radio frequency circuit 401 comprises a transmitting portion 412 for transmitting, via the antenna 204, signals to the RFID circuit element To, a receiving portion 413 for receiving the reflected wave from the RFID circuit element To which has been received by the antenna 204, and a transmit-receive splitter 414.

The transmitting portion 412 includes a crystal oscillator 415*a*, a PLL (Phase Locked Loop) 415*b*, and a VCO (Voltage Controlled Oscillator) 415*c* which function as the carrier wave generation means for generating a carrier wave to access (read/write) the RFID tag information of the IC circuit part 151 of the RFID circuit element To; a first multiplying circuit 416 (or a variable amplification factor amplifier may be used in the case of amplitude modulation) configured to modulate the generated carrier wave based on the signal provided from the signal processing circuit 402 (amplitude modulation based on the "TX_ASK" signal from the signal processing circuit 402, in this example); and a first amplifier 417 configured to amplify (amplification with the amplification factor determined by the "TX_PWR" signal from control circuit 330, in this example) the modulated wave which has been modulated by the first multiplying circuit 416. The output of the first amplifier 417 is then transmitted to the antenna 204 via the transmit-receive splitter 414 and supplied to the IC circuit part 151 of the RFID circuit element To.

The receiving portion 413 includes a first receiving signal multiplying circuit 418 configured to multiply the reflected wave from the RFID circuit element To which is received by the antenna 204 and the generated carrier wave; a first band-pass filter 419 for extract only the signals in the necessary band from the output of the first receiving signal multiplying circuit 418; a first receiving signal amplifier 421 configured to amplify the output of the first band-pass filter 419; a first limiter 420 configured to further amplify the output of the first receiving signal amplifier 421 and convert it into a digital signal; a second receiving signal multiplying circuit 422 configured to multiply the reflected wave from the RFID circuit element To which is received by the antenna 204 and the carrier wave whose phase is delayed 90 degrees by a phase shifter 427 after its generation; a second band-pass filter 423 for extract only the signals in the necessary band from the output of the second receiving signal multiplying circuit 422; a second receiving signal amplifier 425 configured to amplify the output of the first band-pass filter 423; and a second limiter 424 configured to further amplify the output of the second receiving signal amplifier 425 and convert it into a digital signal. Then, a signal "RXS-I" which is output from the first limiter 420 and a signal "RXS-Q" which is output from the second limiter 424 are input to the signal processing circuit 402 and processed therein.

In addition, the output of the second amplifier 421 and the third amplifier 425 are also input to the RSSI (Received Signal Strength Indicator) circuit 426, so that a signal "RSSI" indicating the intensity of these signals are input to the signal processing circuit 402. In this manner, the apparatus M for communicating with a RFID tag of the present embodiment performs demodulation of the reflected wave from the RFID circuit element To by I-Q quadrature demodulation.

Here, since the functional arrangement of the RFID circuit element To provided on the tag label tape with print 308 using the tag tape 303 is similar to those described in the first to third embodiments using FIG. 6, its explanation is omitted.

Figure 68A:
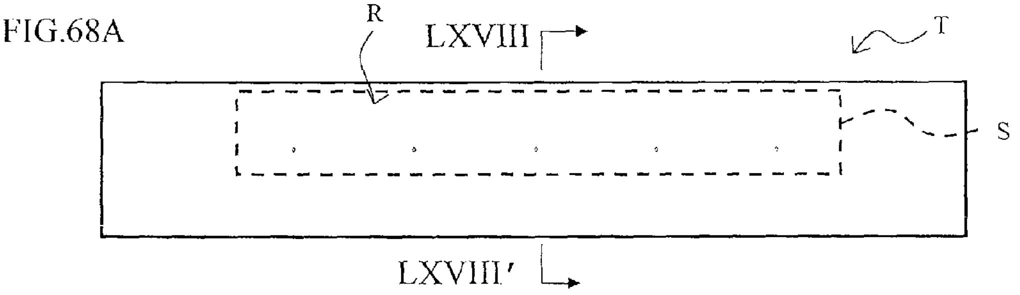
FIGS. 68A to 68C are a top view, bottom view and cross sectional view in LXVIII-LXVIII' cross section of FIG. 68A illustrating one example of an external appearance of a RFID label.
Figure 68B:
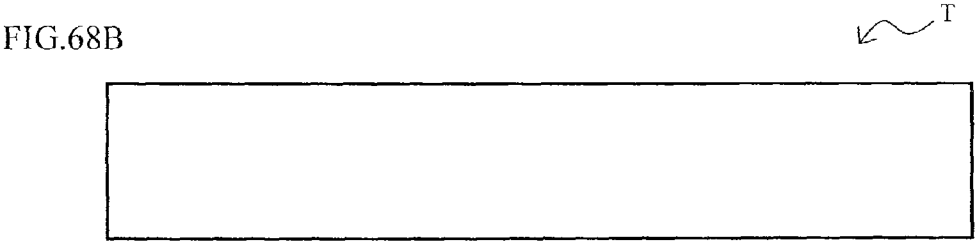
Figure 68C:
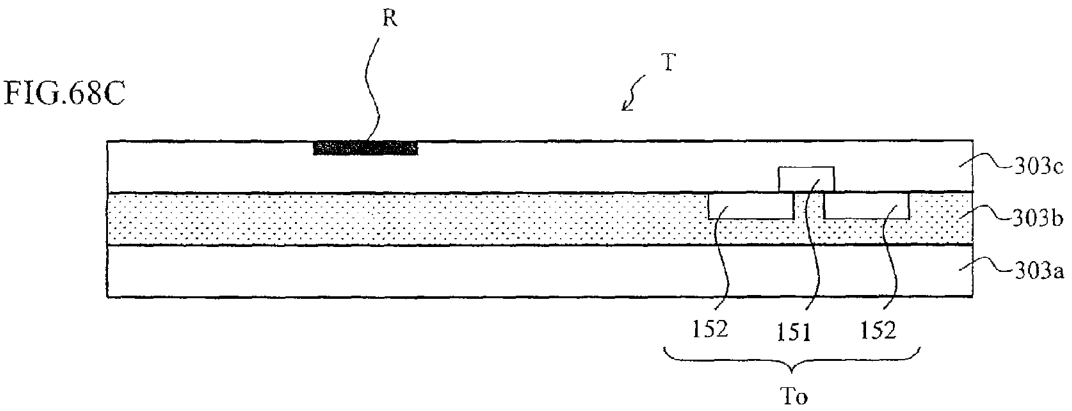

FIGS. 68A to 68C illustrate an example of external appearances of the RFID label T formed by completing the reading (or writing) of the information of the RFID circuit element To and the cutting of the label tape with print 308 after the cartridge 300 is mounted on the cartridge holder part 202 as described above, with FIG. 68A being the top view and FIG. 68B being the bottom view. In addition, FIG. 68C is a cross sectional view taken along LXVIII-LXVIII' of FIG. 68.

In FIGS. 68A to 68C, the RFID label T has a three-layer structure as stated above, in which the cover film 303*c*, the adhesive layer 303*b*, and the separation sheet 303*a* are laminated in this order from the surface (top of FIG. 68C) toward the opposite side (bottom of FIG. 68C). Additionally, as described above, a RFID circuit element To comprising an IC circuit part 151 and an antenna 152 is provided on the back side of the cover film 303*c*, and a print R (in this example, letters "AA-AA") is printed on the surface of the cover film 303*c*.

Figure 69A:
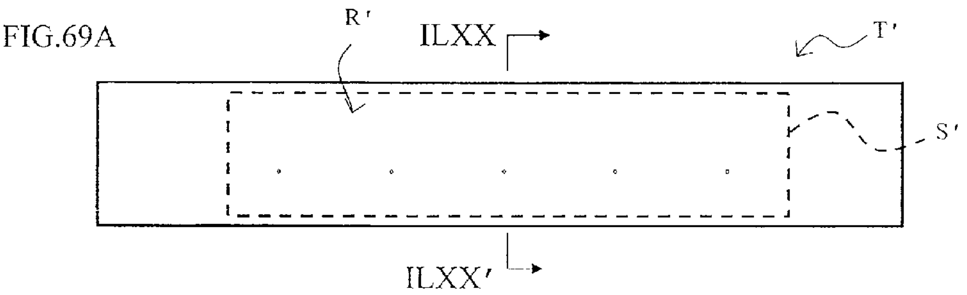
FIGS. 69A to 69C are a top view, bottom view and cross sectional view in ILXX-ILXX' cross section of FIG. 69A illustrating one example of an external appearance of the label.
Figure 69B:
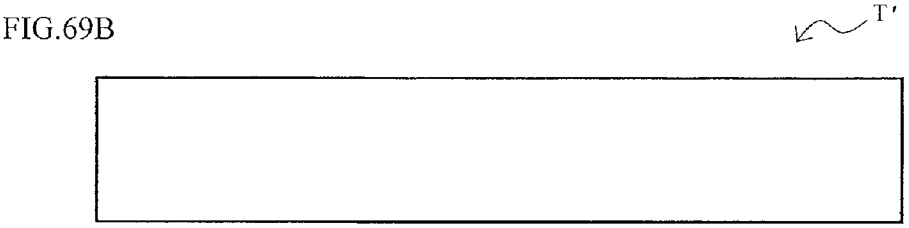
Figure 69C:
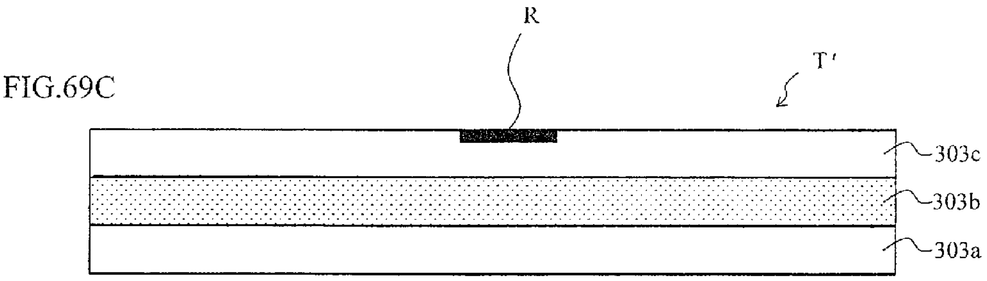

On the other hand, FIGS. 69A to 69C illustrate an example of external appearances of the RFID label T' by completing the cutting of the label tape with print 308' after the cartridge 300' is mounted on the cartridge holder part 202 and the print is made on the normal tape 303' as described above, with FIG. 69A being the top view and FIG. 69B being the bottom view. In addition, FIG. 69C is a cross sectional view taken along ILXX-ILXX' of FIG. 69A.

In FIGS. 69A to 69C, the label T' has a three-layer structure similar to the RFID label T, in which the cover film 303*c*, the adhesive layer 303*b*, and the separation sheet 303*a* are laminated in this order from the surface (top of FIG. 69C) to the opposite side (bottom of FIG. 69C). Additionally, a print R' (in this example, letters "BB-BB") is printed on the surface of the cover film 303*c*.

In the above-mentioned basic arrangement, one of the major features of the present embodiment is that the tape carry-out exit of the cartridge 300 containing the tag tape 303 is different from that of the cartridge 300' containing the normal tape 303' and, as a result, the transport path of the tag tape 303 when the cartridge 300 is mounted differs from that of the normal tape 303' when the cartridge 300' is mounted in the cartridge holder part 202 of the same apparatus M. The details will be described referring to FIGS. 70 to 73 as follows.

Figure 70:
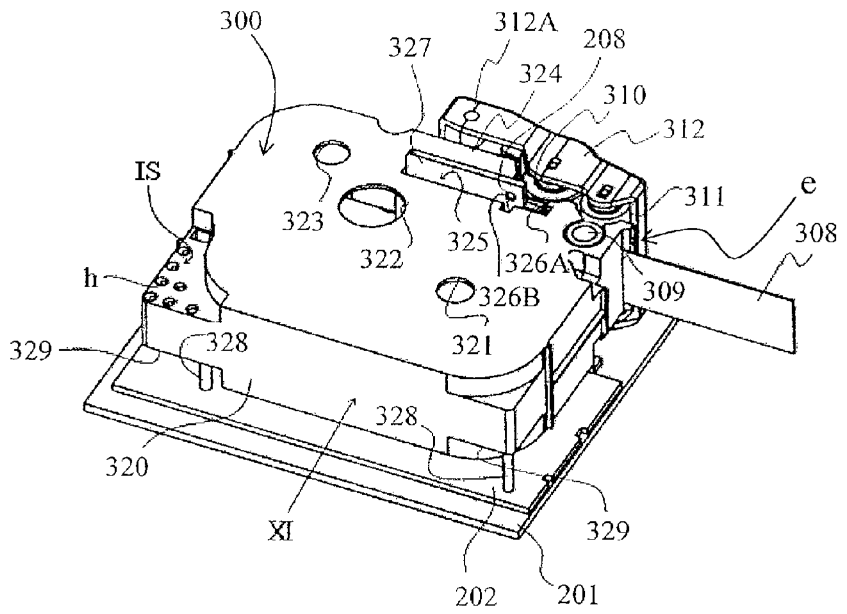
FIG. 70 is a perspective view illustrating a detailed structure of the cartridge and a peripheral portion thereof in the case where the tag tape is mounted.

FIG. 70 is a perspective view illustrating the detailed structure of the cartridge 300 having the tag tape 303 mounted therein, together with its periphery.

In FIG. 70, the cartridge 300 includes a case 320 as the housing configured to form its outer periphery, the case 320 having a support hole 321 for rotatably supporting the tape roll 301, a support hole 322 for rotatably supporting the ribbon take-up roller 305, and a support hole 323 configured to rotatably support the feeding roller 302.

In addition, an arm part (a guide part) 324 is provided on one side (right front side in FIG. 70) of the case 320 for guiding the tape 303 which is fed out from the tape roll 301 and the ink ribbon 304 which is fed out from the ribbon-supply-side-roll 306 and feeding them out through the opening (not shown) of the protruding end. In addition, a head mounting part 325 in which the print head 208 is inserted and mounted on the left front side, shown in FIG. 70, of the arm part 324. A first fitting part 326A is formed so that it enters the wall part, which is opposing the arm part 324 of the head mounting part 325, toward the a tape carry-out direction, while a second fitting part 326B is formed so that it enters toward a direction orthogonal to the first fitting part 326A.

Additionally, in the cartridge holder part 202, the roller holder 312, which is rotatably supported around the supporting shaft 312A vertically provided on the main body 201, is arranged so as to face the cartridge 300, with the roller holder 312 rotatably supporting the sub-roller 311 and the platen roller 310. As described above, the tape 303 is drawn from the tape roll 301 by cooperation of the feeding roller 302 and the sub-roller 311 and, after being guided from the opening of the arm part 324 to the head mounting part 325, sandwiched between the print head 208 and the platen roller 310, and also sandwiched between the feeding roller 302 and the sub-roller 311. In addition, the ink ribbon 304 is drawn from the ribbon-supply-side-roll 306 by the ribbon take-up roller 305 and, after being guided from the opening of the arm part 324 to the head mounting part 325, wound around the periphery of the ribbon take-up roller 305.

Figure 71:
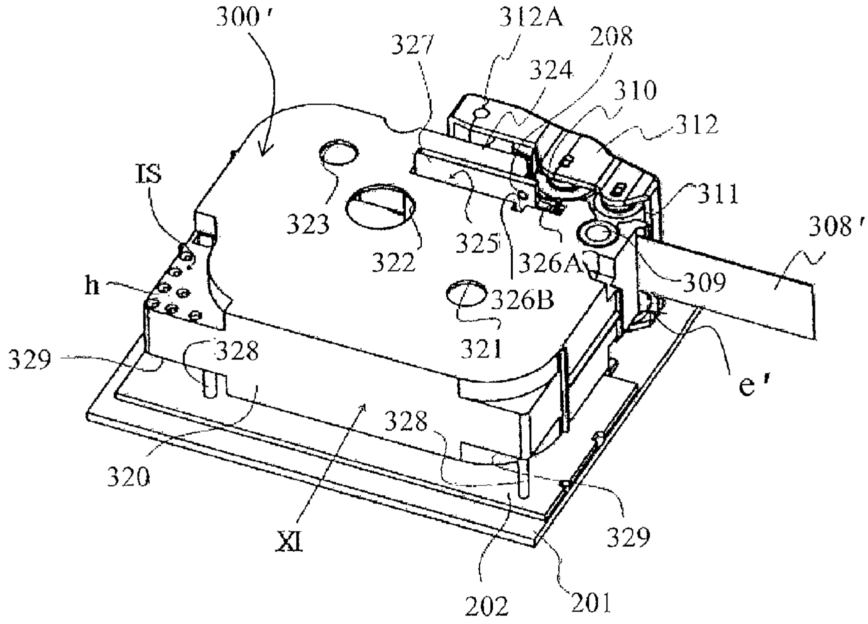
FIG. 71 is a perspective view illustrating a detailed structure of the cartridge and a peripheral portion thereof in the case where a normal tape is mounted.

FIG. 71 is a perspective view illustrating the detailed structure of the cartridge 300', as well as its periphery, with the normal tape mounted therein. In FIG. 71, elements which are equivalent with those of FIG. 70 have the same symbols and thus their description is omitted here, since their respective operations and functions are similar to those of FIG. 70. The tape carry-out exit e' of the tag-label tape with print 308' of the cartridge 300' in FIG. 71 is slightly displaced upward of the page sheet compared with the position of the tape carry-out exit e of the tag-label tape with print 308 of the cartridge 300 in FIG. 70. In order to provide such an arrangement, for example, the tape position can be displaced by inserting a spacer part or the like between the members supporting the tapes 303 and 308, or 303' and 308' within the cartridges 300 and 300'. In addition, procedures other than the above may be used such as narrowing the space within the cartridge by a raised bottom.

Figure 72A:
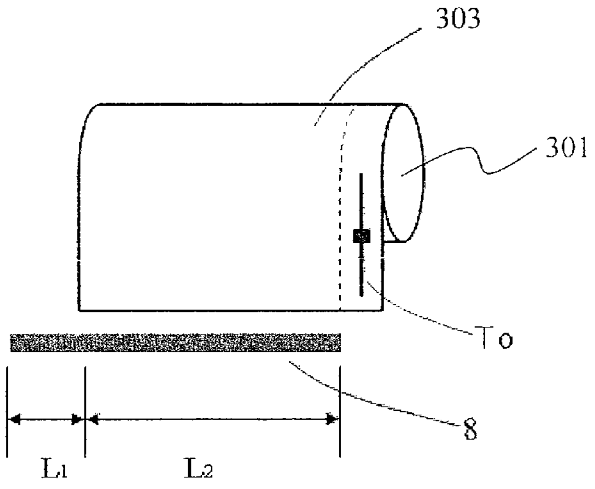
FIG. 72A is a schematic view illustrating a relative relation between a tape position and a print head in the case of being provided with the tag tape.
Figure 72B:
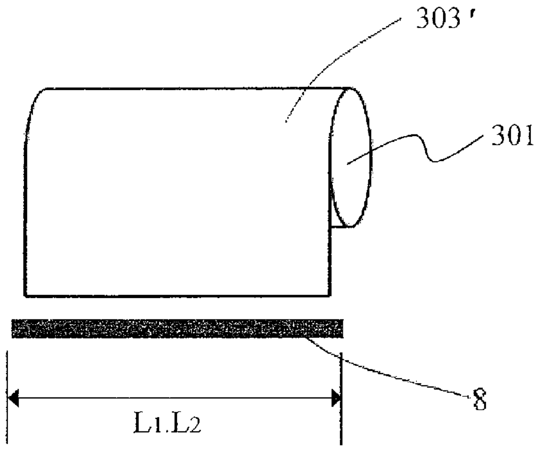
FIG. 72B is a schematic view in the case of being provided with the normal tape.

FIG. 72A is a schematic diagram illustrating the relative relationship between the tape position and the print head 208 in the cartridge 300 containing the tag tape 303, and FIG. 72B is a schematic diagram illustrating the relative relationship between the tape position and the print head 208 in the cartridge 300' containing the normal tape 303'.

With the apparatus M for communicating with a RFID tag of the present embodiment, as shown in FIG. 72A, when the cartridge 300 containing the tag tape 303 is mounted on the cartridge holder part 202, the position of the tape 303 is located at further right side of the page sheet so that the print head 208 does not overlap with the RFID circuit element To located on the one side of the tag tape 303 in the width direction (not to contact a portion of the RFID circuit element To). The above arrangement eliminates the need of power supply to the part of the print head 208 indicated as L1 in the diagram on the left side of the page sheet, hence it turns out that only the part of the print head 208 indicated as L2 in the diagram needs to be power-supplied by controlling the print-head driving circuit 405 (in other words, the print-head drive region has a length of L2).

On the other hand, when the cartridge 300' containing the normal tape 303' is mounted on the cartridge holder part 202, it is arranged, as shown in FIG. 72B, that the position of the tape 303' is located at further left side of the page sheet so that the print head 208 faces the entire tape 303. In this case, the part of the print head 208 indicated as L1+L2 in the diagram is power-supplied by controlling the print-head driving circuit 405 (in other words, the print-head drive region has a length of L1+L2)

Figure 73:
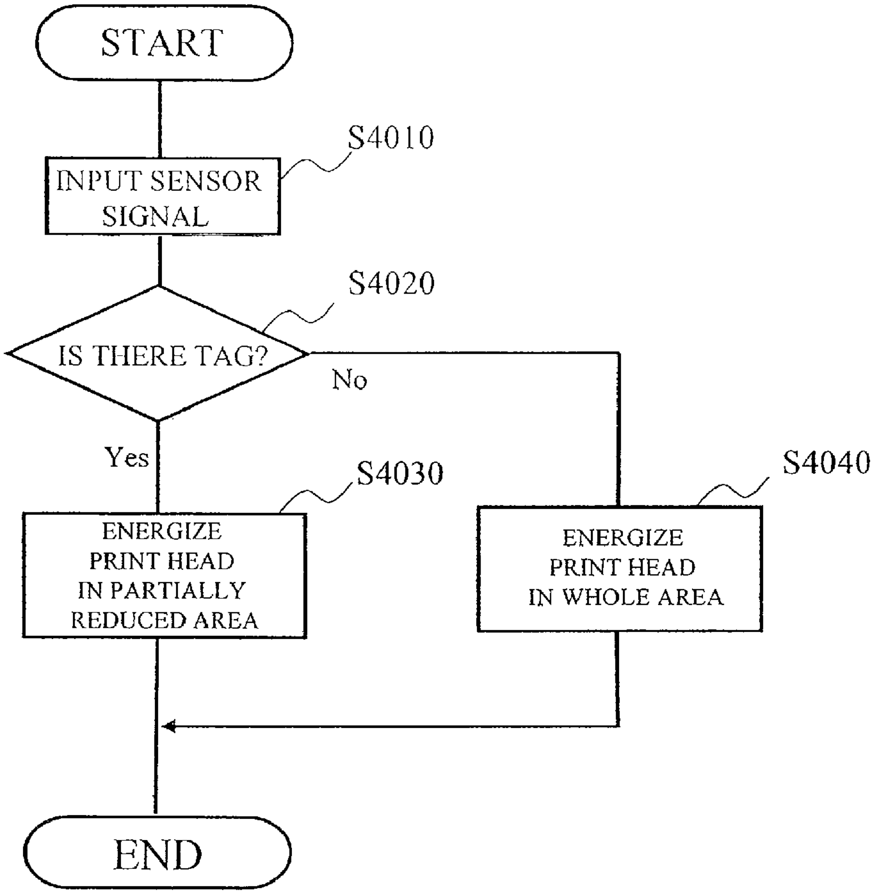
FIG. 73 is a flowchart illustrating an energization control operation of a heater element of a print head in a print-head driving circuit.

FIG. 73 is a flow chart illustrating the energization control operation of the heater element of the print head 208 performed by the control circuit 330 via the print-head driving circuit 405 for the case in which the cartridge 300 containing the tag tape 303 is mounted, and the case in which the cartridge 300' containing the normal tape 303' is mounted.

In FIG. 73, the cartridge sensor 332 first detects in step S4010 the type of the cartridge 300 and 300', in other words, whether the tape is the tag tape 303 or normal tape 303', then the sensor signal is input (identified).

Next, in step S4020, it is determined, based on the sensor signal input in step S4010 mentioned above, whether or not a tag is present, in other words, whether it is the cartridge 300 containing the tag tape 303 or the cartridge 300' containing the normal tape 303'.

If it is determined to be the tag tape 303, the operation goes to step S4030, where a control signal is output to the print-head driving circuit 405 so that energization mode of the print head 208 is set to be a partially reduced energization in which the L1 part is a no-energization area (=the print-head drive region is only a length of L2) as shown in FIG. 72A and the flow is finished. If, otherwise, it is determined in step S4020 that the tape is the normal tape 303', the operation goes to step S4040 where a control signal is output to the print-head driving circuit 405 so that the energization mode of the print head 208 is set to be whole-area energization in which the whole area of L1+L2 (=print-head drive region is the length of L1+L2) is energized as shown in FIG. 72B and the flow is finished.

As thus described, steps S4020, S4030 and S4040 of the flow shown in FIG. 73, which are executed by the control circuit 330, constitute a fourth print controller configured to switch the print-head drive region of the printing device, according to whether the tag tape or the normal tape is mounted, based on the detection result of the detecting device.

According to the present embodiment arranged as above, when the cartridge 300 containing the tag tape 303 is mounted in the cartridge holder part 202, the position of the tape transport path in the apparatus M for communicating with a RFID tag is displaced, as shown in FIG. 65 and FIG. 66, compared with the case in which the cartridge 300' containing the normal tape 303' is mounted (based on the difference between the mounting positions of the tapes 308 and 308' as shown in FIGS. 70 and 71). In addition, particularly, the length of the print-head drive region of the print head 208 changes from L1+L2 to L2, as shown in FIGS. 65 and 66 or FIGS. 72A and 72B, according to the difference between the positions. Therefore, it can be arranged that the print-head drive region (the part having a length of L2) of the print head 208 does not overlap with the RFID circuit element To provided on the tag tape 303, whereby eliminating the possibility of damaging the RFID circuit element To due to heater of the print head 208, as well as eliminating the possibility of developing fading of prints. As a result, convenience for the user can be enhanced, since both the tag-label-with-print T and the normal label T' can be produced on the same apparatus M for communicating with a RFID tag, and the soundness of the RFID label T and the quality of the prints can be enhanced. On this occasion, particularly, electric power consumption can be reduced by reducing the length of the print-head drive region of the print head 208 from L1+L2 to L2 and stopping the power supply to the part of length L1 when mounting the cartridge 300 containing the tag tape 303 so that unnecessary print drive to the part of length L1 which went out of the tape 303 is avoided, while preventing the print-head drive region from overlapping with the RFID circuit element To as described above.

A fifth embodiment of the present invention will be described, referring to FIGS. 74 to 93.

Figure 74:
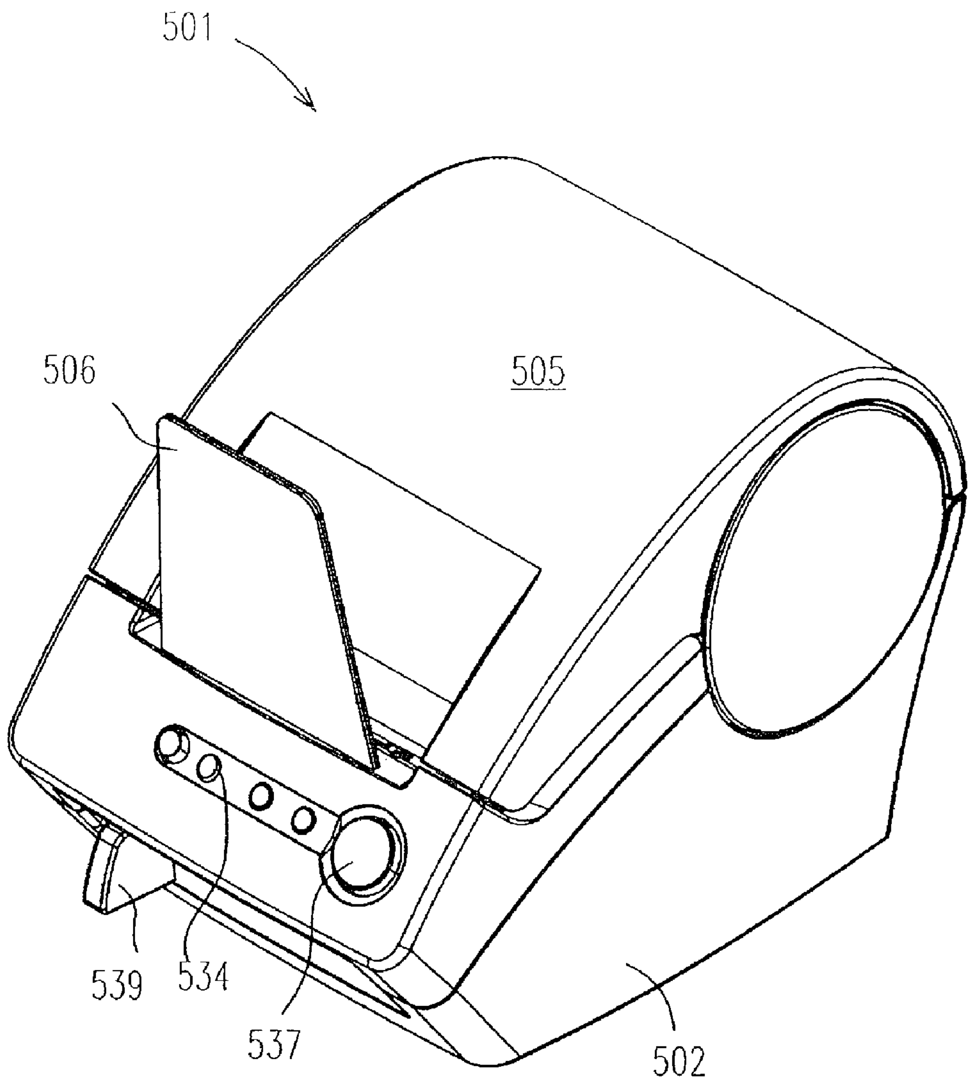
FIG. 74 is a perspective view illustrating a schematic construction of an apparatus for communicating with a RFID tag according to a fifth embodiment of the present invention.

FIG. 74 is a perspective view illustrating a schematic arrangement of an apparatus for communicating with a RFID tag of the present embodiment.

In FIG. 74, the apparatus 501 for communicating with a RFID tag comprises a main body housing 502, a transparent resin-made upper cover 505, a transparent resin-made tray 506 vertically provided substantially opposing the front center of the upper cover 505, a power-supply button 507 provided on the front of the tray 506, a cutter lever 509, an LED lamp 534 and the like.

Figure 75:
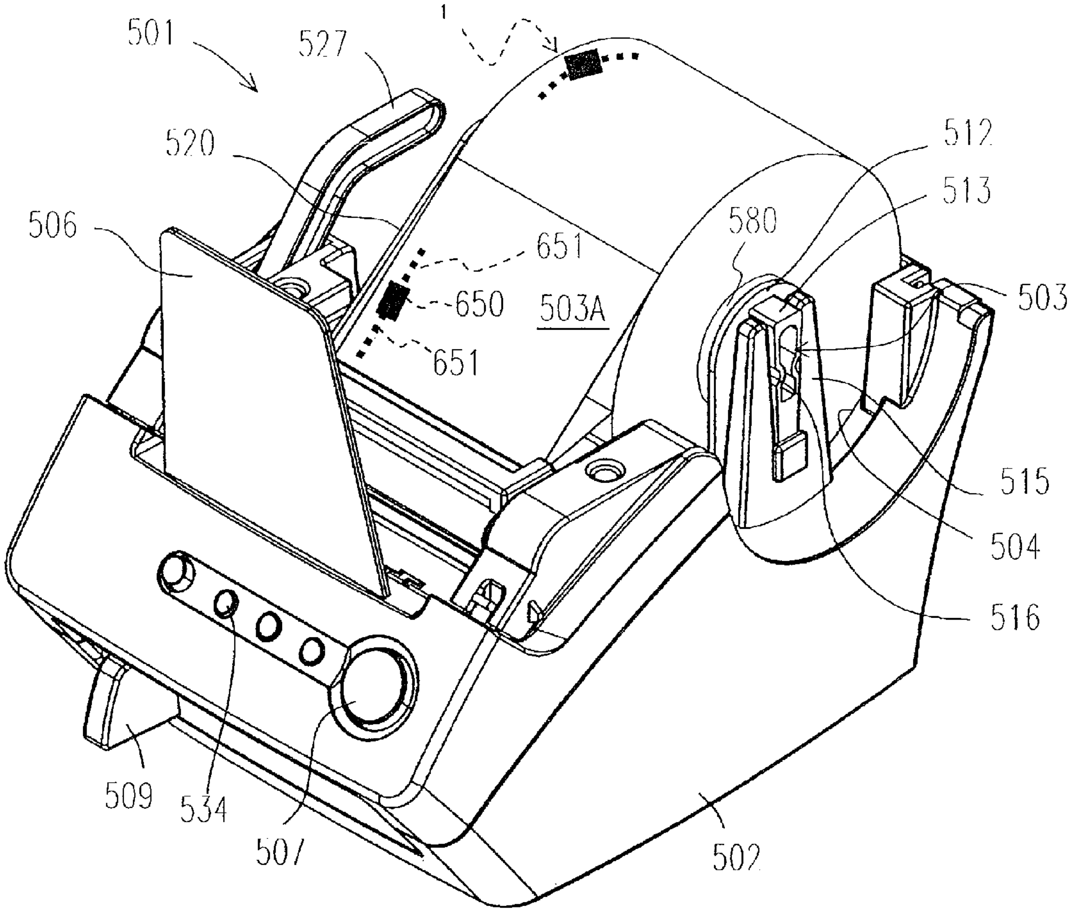
FIG. 75 is a perspective view illustrating a state in which a top cover of the apparatus for communicating with a RFID tag illustrated in FIG. 74 is removed.

FIG. 75 is a perspective view illustrating the apparatus 501 for communicating with a RFID tag shown in FIG. 74 with the upper cover 505 removed.

In FIG. 75, a tape spindle member 503 (the cartridge in the present embodiment) is removably received in a tape spindle member receptacle (holder for selective installation) 504. The tape spindle member 503 comprises a positioning holder member 512 and a guide member 520, with the tape 503A (tag tape, first tape) having a predetermined width being rotatably wound around. In other words, the guide member 520 as a side wall on one side and the positioning holder member 512 as a side wall on the other side are provided at both edges of the tape 503A in its axial direction, substantially orthogonally to the axial line. In addition, the above-mentioned upper cover 505 is attached allowing open and close movements thereof to the back side upper edge so as to cover the top of the tape spindle member receptacle 504.

In addition, a support member 515 is provided at an edge of the substantially vertically side against the transport direction of the tape spindle member receptacle 504, the support member 515 having a first positioning groove 516 formed thereon which is substantially vertically long and U-shaped when seen from the front with an upward opening. An attachment member 513 having a vertically long, substantially rectangular cross section, which is formed in a manner protruding outward from the positioning holder member 512 and tapering downward when seen from the front, is fit into the support member 515 by closely contact inside the downward-tapered first positioning groove 516. The height of protrusion of the attachment member 513 is formed to be approximately equal to the width of the first protrusion of the positioning groove 516. Here, a spacer part 580 configured to mount the tag tape 503A after slightly displacing it closer to the guide member 520 side (left back of the page sheet of FIG. 75) is provided in between the holder member 512 and the tape 503A.

A lever 527 is provided on the front end in the transport direction of the edge of other side of the tape spindle member receptacle 504. On the tape 503A, RFID circuit elements T1 comprising an IC circuit part 650 and an antenna 651 are arranged in a row along the tape longitudinal direction nearby an end on one side (left side of the page sheet of FIG. 75) in this example (size in the illustration is exaggerated for clarifying their presence). Note that, in the present embodiment, a normal tape 503A' (see FIG. 84 described later) as the first tape with no RFID circuit element provided thereon may be used as the tape in place of the tag tape 503, which will be described later.

Figure 76:
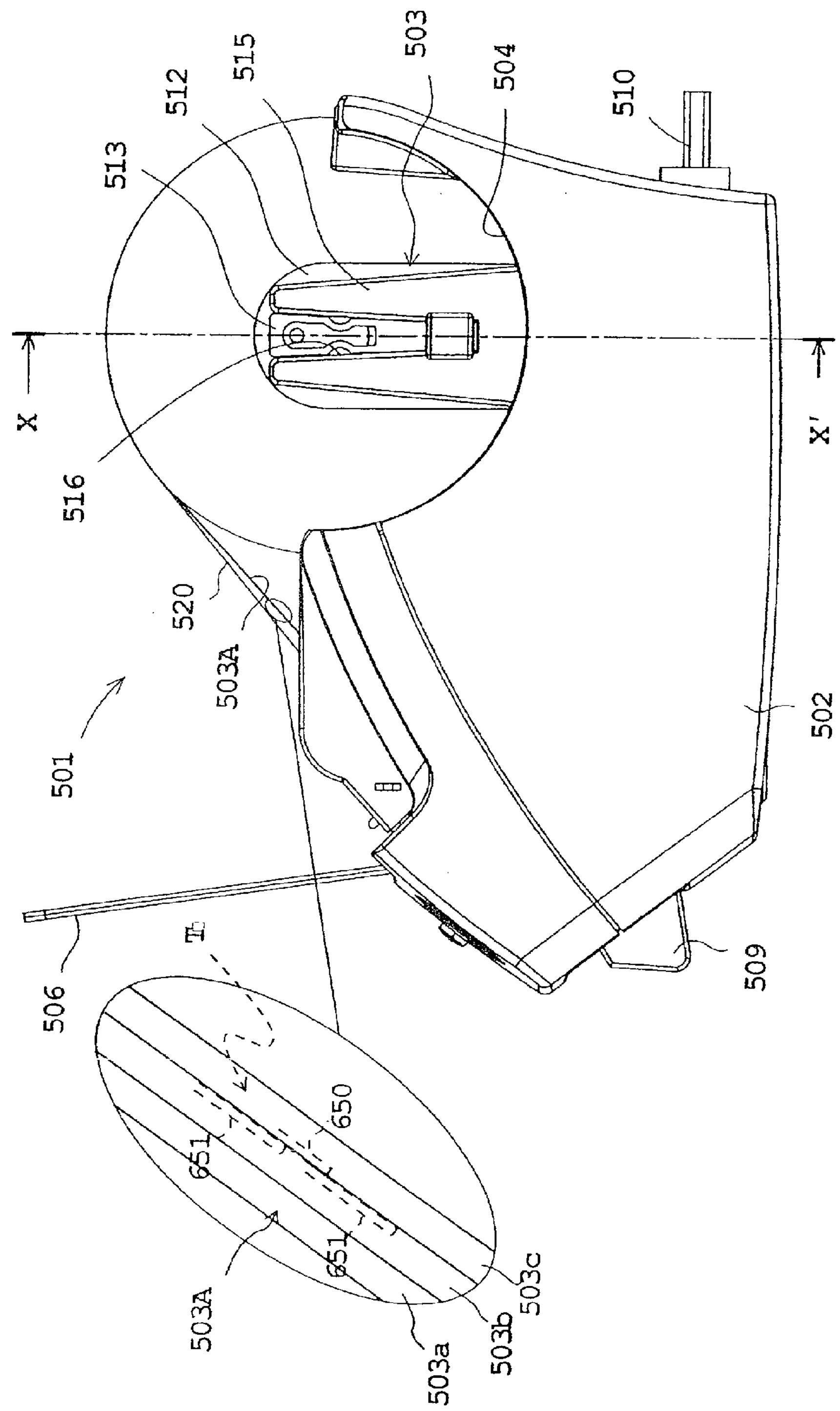
FIG. 76 is a side view of the structure illustrated in FIG. 75.

FIG. 76 is a side view of the structure shown in FIG. 75. As shown in FIG. 76, the tag tape 503A having a three-layer structure (see partially enlarged view of FIG. 76) in this example, is formed by laminating, from the outward winding side (left top in FIG. 76) toward the opposite side (right bottom in FIG. 76), a separation sheet 503*a*, an adhesive layer 503*b*, and an elongated self-coloring thermal paper (tape base) 503C, in this sequence.

On the back side (top left in FIG. 76) of thermal paper 503*c*, an IC circuit part 650 configured to store information is provided integrally in this example. An antenna 651 connected to the IC circuit part 650 is formed on the surface of the back side of thermal paper 503*c* for transmitting and receiving information. The RFID circuit element T1 consists of the IC circuit part 650 and the antenna 651. Also on the back side (top left in FIG. 76) of thermal paper 503*c*, the separation paper 503*a* is bonded to the thermal paper 503*c* by the adhesive layer 503*b*. When affixing the completed RFID label T to a predetermined article or the like, the separation sheet 503*a* can be peeled off so that the RFID label T can be bonded to the article or the like by the adhesive layer 503*b*. Here, a power cord 510 is connected to one side of the rear of the main body housing 502.

Figure 77:
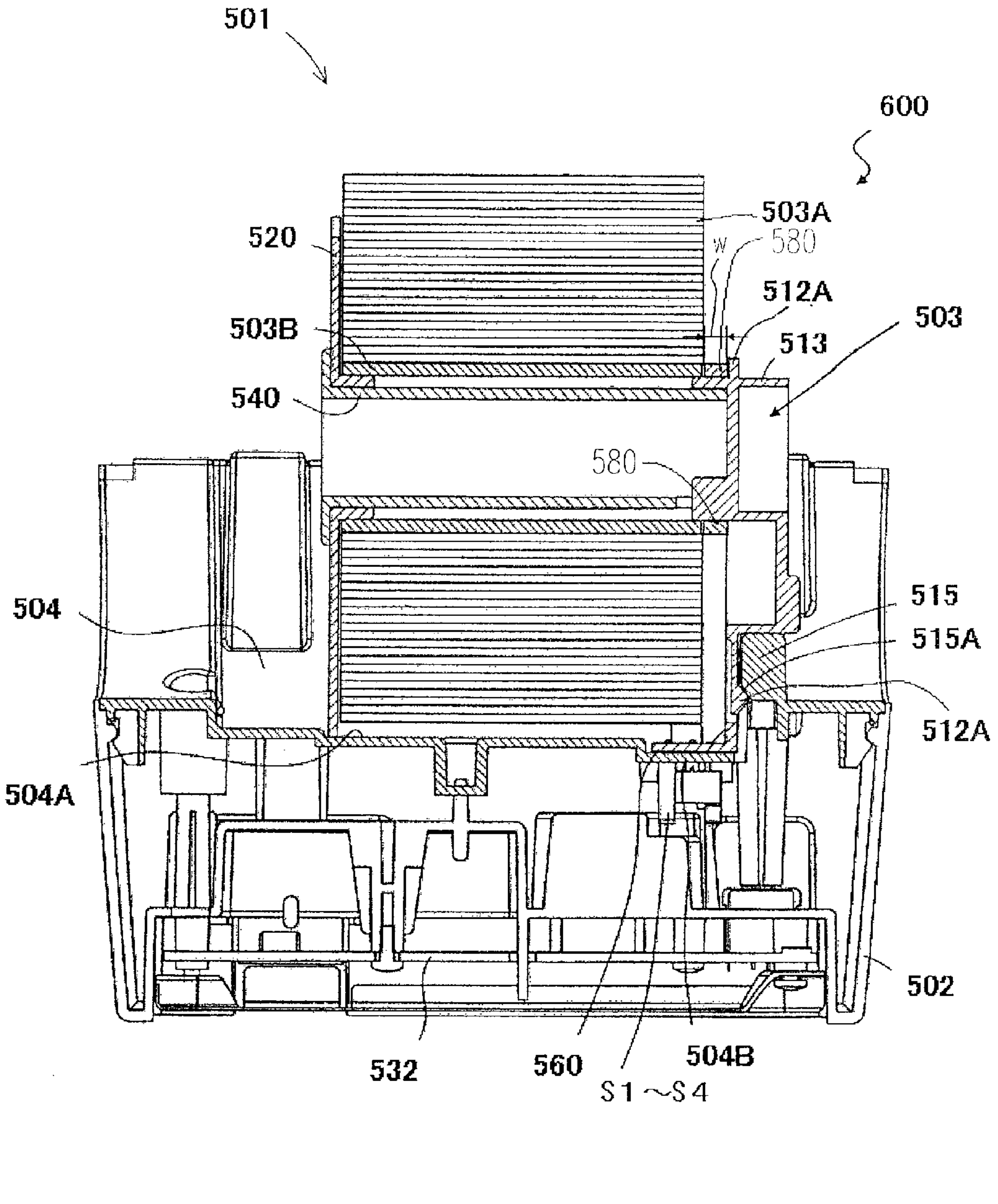
FIG. 77 is a sectional view in X-X' cross section of FIG. 76.

FIG. 77 is a sectional view of the cross-section taken along X-X' of FIG. 76. In FIG. 77, the tag tape 503A is wound around the winding core 503B into a roll. The tape roll body 600 comprises the tag tape 503A and the winding core 503B, the positioning holder member 512, a guide member 520, a tape spindle member 503 having a spacer part 580 and the like.

A substantially cylindrical shaft member 540 is provided between the positioning holder member 512 and the guide member 520 so as to be located inside the winding core 503B in the axial direction, and the tape spindle member 503 comprising mainly the positioning holder member 512, the guide member 520 and the shaft member 540. Additionally, as described above, the spacer part 580 is provided on the holder member 512, wherein the dimension of the winding core 503B (therefore, tag tape 503A) in its axial direction (horizontal direction in FIG. 77) is shorter than the distance between the holder member 512 and the guide member 520 along their axial direction by the dimension of spacer part 580 along its axial direction. As a result, the axial center of the tag tape 503A is slightly displaced toward the guide member 520 (left side of the page sheet of FIG. 77) than the axial center of the shaft member 540. Note that, in this example, the width w (horizontal dimension in FIG. 77) of the spacer part 580 is slightly larger than the width of the RFID circuit element T1 (direction orthogonal to the longitudinal direction of the tape).

An engaging recess 515A is formed at the base end inside the support member 515, and an elastic locking piece 512A protrudingly provided at the lower end of the positioning holder member 512 is engaged with the engaging recess 515A.

On the bottom face of the tape spindle member receptacle 504, a positioning recess 504A having a horizontally-long rectangular planar-shape is formed at a predetermined depth (e.g., about 1.5 to 3 mm) from the base end inside the support member 515, substantially orthogonal to the transport direction. In addition, a control substrate 532 having a control circuit part formed thereon for controlling to drive respective mechanisms according to instructions from external personal computers or the like is provided at the lower part of the tape spindle member receptacle 504.

The width dimension of the positioning recess 504A along the transport direction is defined to be approximately equal to the width dimension of each of the lower end edges of the positioning holder member 512 and the guide member 520 constituting the tape spindle member 503. Additionally, on the base end inside the support member 515 of the positioning recess 504A, a discrimination recess 504B is formed at a position opposing the tape discriminating part 560 (see also FIGS. 85 to 88 described below) extending out from the lower end edge of the positioning holder member 512 substantially orthogonally inward.

The discrimination recess 504B, having a rectangular planar-shape and being vertically-long in the transport direction, is formed at a position deeper than the positioning recess 504A by a predetermined depth (e.g., about 1.5 to 3 mm). In addition, the discrimination recess 504B has four tape discriminating sensors (detecting device) S1, S2, S3 and S4 provided in a substantially L-shape in this example, which comprise a push-type micro-switch and discriminate the type of the tag tape 503A (or the normal tape 503A' described below). These tape discriminating sensors S1 to S4 comprise known mechanical switches, each of which is constituted by a plunger, a micro switch, and the like. The upper end of each plunger is provided so as to protrude from the bottom face of the discrimination recess 504B to the vicinity of the bottom face of the positioning recess 504A. Then, it is detected whether or not respective sensor holes (described below) of the tape discriminating part 560 (type-of-tape information keeping portion) are present by each of the tape discriminating sensors S1 to S4, the ON/OFF signals of which allow detection of the type of the tag tape 503A mounted on the tape spindle member 503 (including detection of whether it is a tag tape 503A with RFID circuit elements T1 or a normal tape 503A' having no RFID circuit element T1 provided thereon, details of which are described below).

Figure 78A:
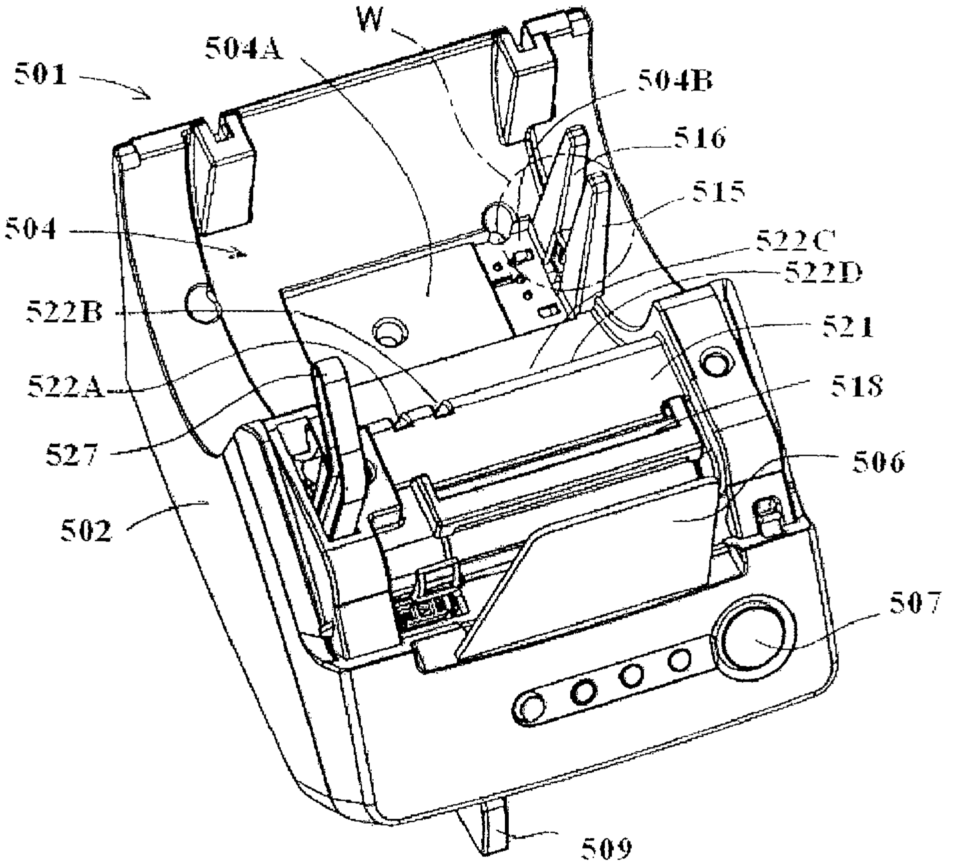
FIG. 78A is a perspective view illustrating a state in which the top cover and a tape roll are removed from the apparatus for communicating with a RFID tag illustrated in FIG. 74.
Figure 78B:
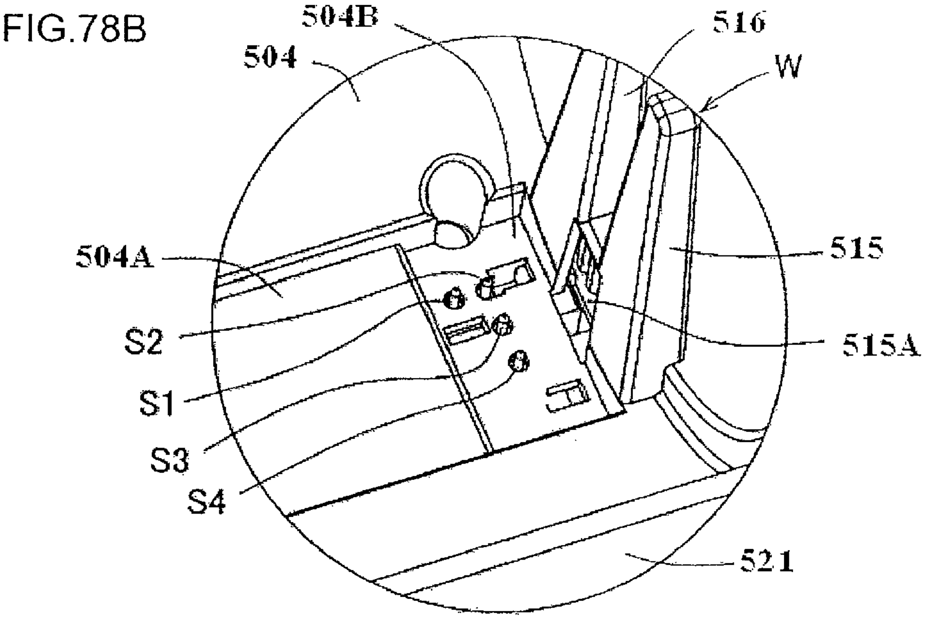
FIG. 78B is an enlarged perspective view at W portion of FIG. 78A.

FIGS. 78A and 78B are, respectively, a perspective view illustrating the apparatus for communicating with a RFID tag shown in FIG. 74 with the upper cover 5 and the tape roll body 600 removed, and an enlarged perspective view of the portion W of FIG. 76A.

In FIGS. 78A and 78B, a mounting part 521 configured to mount the tip of the guide member 520 constituting the tape spindle member 503 is provided. The mounting part 521 is extending substantially horizontally from the back-end edge of insertion slot 518 for inserting the tag tape 503A to the front upper-end edge of the tape spindle member receptacle 504. Here, the tip of the guide member 520 can be extended as far as the insertion slot 518.

A plurality of (two in this example) the second positioning grooves 522A and 522B having a substantially L-shaped cross section is formed at the far-edge corner on the rear side of the transport direction of the mounting part 521, corresponding to the plurality of width dimensions (difference between the tag tape and the normal tape described below) of the tape spindle member 503 containing the tag tape 503A (or the normal tape 503A', details of which described below). Each of the second positioning grooves 522A and 522B is formed so that a part of the portion contact the mounting part 521 of the guide member 520 constituting the tape spindle member 503 can be fit from above; in this example, the groove 522A corresponds to the case of tag tape 503A and the groove 522B corresponds to the case of normal tape 503A', respectively (in other words, the mounting positions of the tape spindle members 503 and 503' are different according to whether the tape is a tag tape 503A or a normal tape 503A'). Although the details will be described below referring to FIGS. 86 and 87, this is because the width of the tape spindle member 503 containing the tag tape 503A is larger than the width of the tape spindle member 503' containing the normal tape 503A' by the width w of the above-mentioned spacer part 508. In addition, the previously mentioned positioning recess 504A is provided from the base end inside the support member 515 to a position opposing the second positioning groove 522A.

The tape roll body 600 comprising the winding core 503B, the tag tape 503A (or the normal tape 503A', the detail of which will be described below) and the tape spindle member 503 (or 503') is removably attached to the tape spindle member receptacle 504 by fitting the attachment member 513 of the positioning member 512 into the first positioning groove 516 of the support member 515, causing the elastic locking piece 512A protrudingly provided at the lower end of the positioning member 512 to be engaged with the engaging recess 515A formed at the base end inside the support member 515, as well as inserting the lower face of the tip of the guide member 520 into each of the second positioning groove 522A (or 522B) to cause the lower end of the guide member 520 to enter and contact inside the positioning recess 504A.

Figure 79:
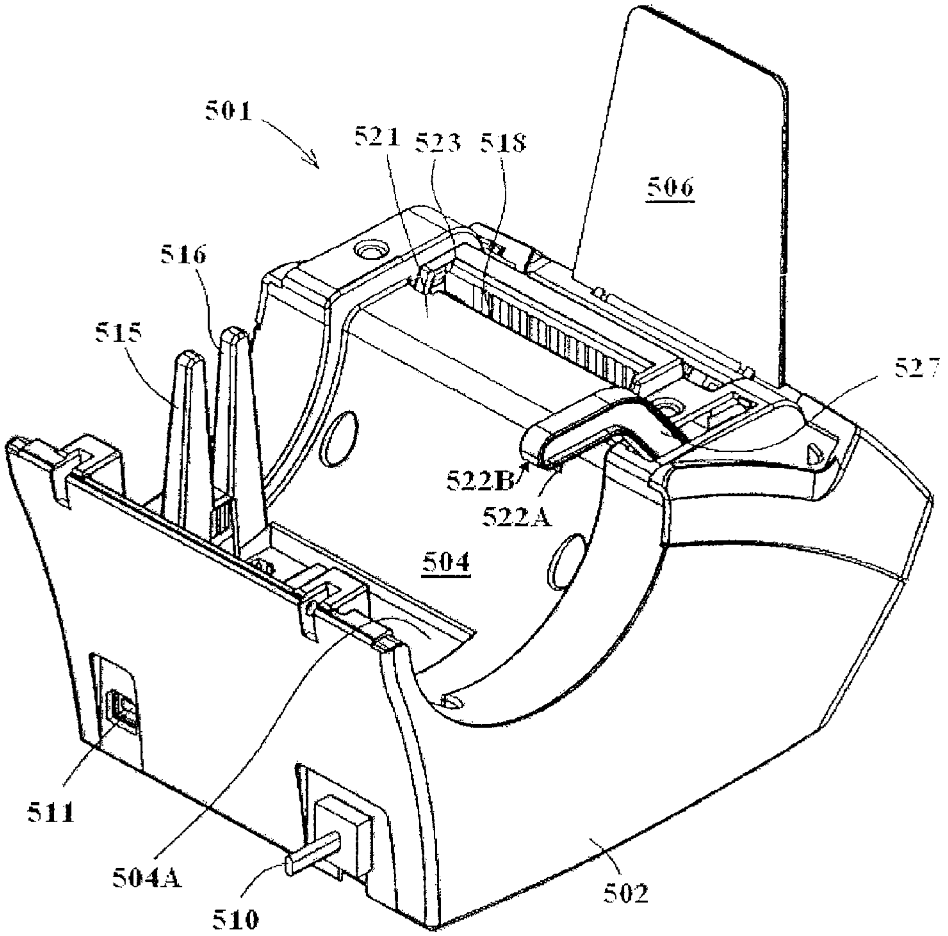
FIG. 79 is a rear perspective view illustrating the state in which the top cover and the tape roll of the apparatus for communicating with a RFID tag illustrated in FIG. 74 are removed.

FIG. 79 is a backward perspective view illustrating the apparatus for communicating with a RFID tag shown in FIG. 74 with the upper cover 505 and the tape roll body 600 removed.

In FIG. 79, a guiding rib part 523 is vertically provided on the side edge of the support member 515 of the insertion slot 518. In addition, the side edge closer to the support member 515 of the insertion slot 518 (left end edge in FIG. 79) is formed so that it is located at a position corresponding to the inner end face of the positioning member 512 which is fit into the support member 515.

Here, a connector area 511 comprising a USB (Universal Serial Bus) connected to personal computers (not shown) is provided at the other side end of the back side of the body housing 502.

Figure 80:
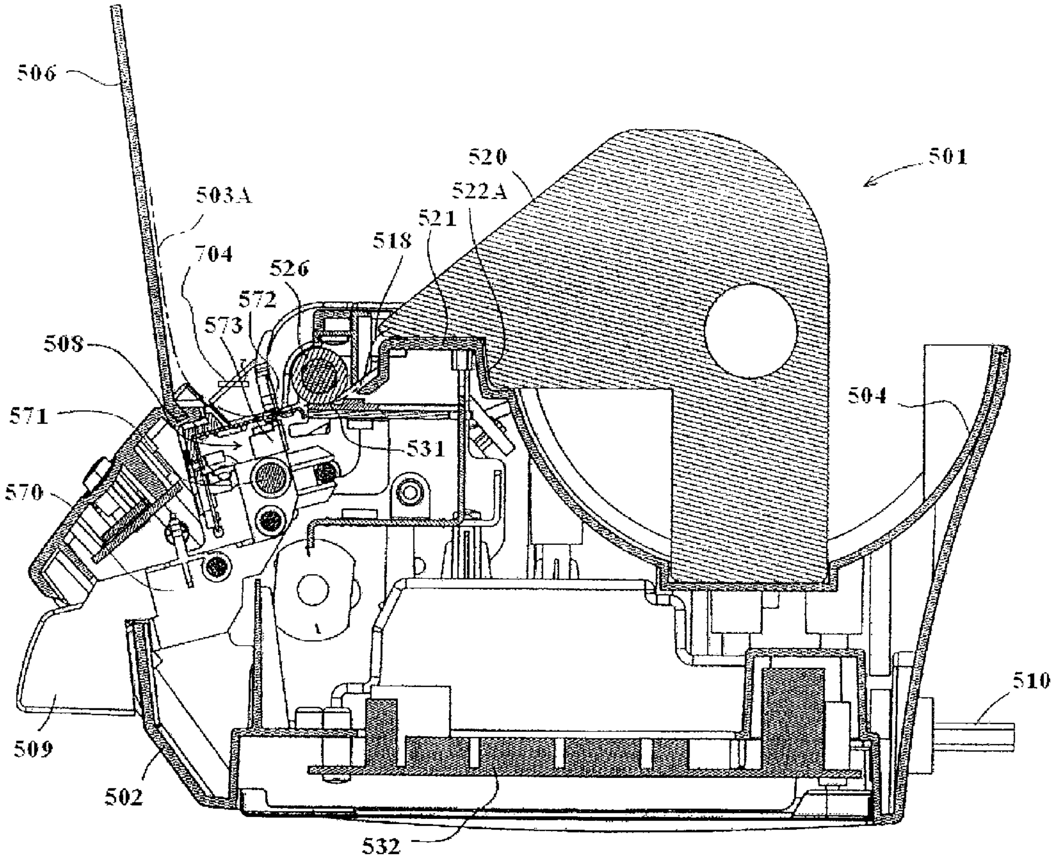
FIG. 80 is a side sectional view illustrating with the top cover removed a state in which a tape shaft member is mounted in the apparatus for communicating with a RFID tag illustrated in FIG. 74.

FIG. 80 is a side sectional view of the apparatus 501 for communicating with a RFID tag shown in FIG. 74 with the tape spindle member 503 mounted thereon and with the upper cover 505 removed.

In FIG. 80, a cutter unit 508 which can be moved horizontally by the cutter lever 509 via a connecting member 570 is provided on the cutter lever 509 which is provided movably in the horizontal direction on the front side-face. The cutter unit 508 has a cutter (cutting blade) 572 provided movably by guide axis 571 along the cutting direction which is substantially orthogonal to the longitudinal direction of the tape 503A (perpendicular direction in the page sheet of FIG. 80), and an intermediate member 573 which is detachably arranged with the cutter 572 and provided on the cutter side of the connecting member 570. In addition, a thermal head (print head) 531 is provided as the printing device configured to print at the lower part of the upstream of the tape 503A transport direction (right-side in FIG. 80) of the cutter unit 508, and a platen roller 526 is provided as the driving device at a position opposing thereto.

The print head 531 is brought into a separated state from the platen roller 526 as a result of a downward movement by lifting the above-mentioned vertical operation lever 527 upward, and into a printable state in which the tag tape 503A is pressed and biased against the platen roller 526 as a result of an upward movement by rotating the lever 527 downward.

In other words, when making a print, the lever 527 is first rotated upward to cause one of the side edges of the tag tape 503A to contact the inner surface of the guide member 520 and insert the other side edge of the tag tape 503A into the insertion slot 518 while causing the other side edge of the tag tape 503A to contact the guiding rib 523 vertically provided at the side edge of the insertion slot 518. By rotating the lever 527 downward in this condition, the tag tape 503A inserted through the insertion slot 518 is pressed and biased toward the platen roller 526 by a line-shaped print head 531. Then predetermined print data can be sequentially printed on the print surface while transporting the tag tape 503A by controlling to drive the print head 531 while rotationally driving the platen roller 526 by a platen roller motor 708 comprising a pulse motor or a stepping motor (see FIG. 82 described below). Furthermore, access (reading or writing of information) to the IC circuit part 650 is performed via an antenna 704 located downstream side in the transport direction, and further, via an antenna 651 of the RFID circuit element T1. Then, the tag-tape-with-print 503A that is carried out onto the tray 506 is cut by the cutter unit 508 by manually operating the cutter lever 509 toward the right-side direction to produce divided RFID labels T comprising RFID circuit elements T1.

Figure 81:
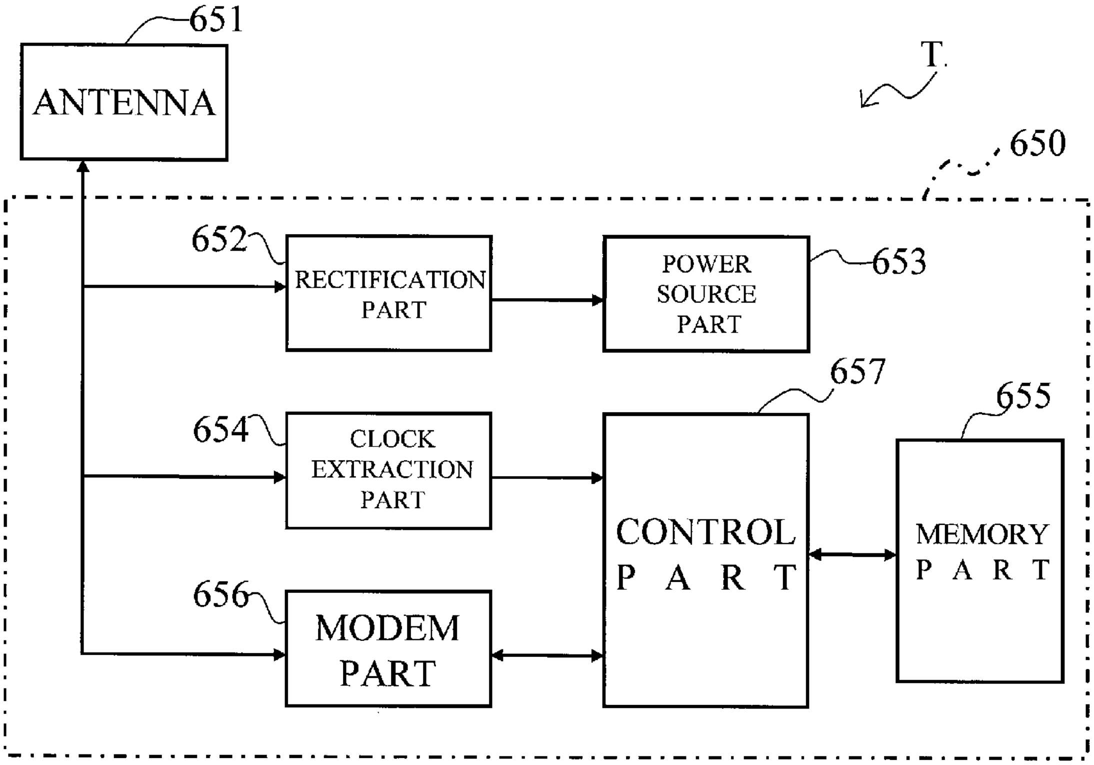
FIG. 81 is a functional block diagram illustrating a functional arrangement of the RFID circuit element provided in the tag tape.

FIG. 81 is a functional block diagram illustrating the functional configuration of the RFID circuit element T1 provided on the tag tape 503A.

In FIG. 81, the RFID circuit element T1, being equivalent to the RFID circuit element To which has already been described in the first to fourth embodiments, comprises an antenna 704 at the apparatus 501 for communicating with a RFID tag, the above-mentioned antenna 651 configured to perform transmission and reception of signals contactlessly using appropriate frequencies such as UHF band, microwave band, short wave band or the like, and the above-mentioned IC circuit part 650 connected to the antenna 651.

The IC circuit part 650 includes a rectification part 652 configured to rectify the carrier wave received by the antenna 651; a power source part 653 configured to accumulate the energy of the carrier wave rectified by the rectification part 652 as the driving power source of IC circuit part 650; a clock extraction part 654 configured to extract the clock signal from the carrier wave received by the antenna 651 and provide it to the control part 657; a memory part 655 which functions as the information storage part capable of storing predetermined information signals, a modem part 656 connected to the antenna 651; and a control part 657 configured to control the operation of the RFID circuit element T1 via the rectification part 652, the clock extraction part 654, and the modem part 656.

The modem part 656 modulates and reflects the carrier wave received by the antenna 704 based on the response signal from the control part 657, as well as demodulating communication signals received by the antenna 651 from the antenna 704 of the apparatus 501 for communicating with a RFID tag, or from other RFID tag reader/writer.

The control part 657 interprets the received signal which has been demodulated by the modem part 656, generates a reply signal based on the information signal stored in the memory part 655, and performs basic controls such as controlling the reply by the modem part 656.

Figure 82:
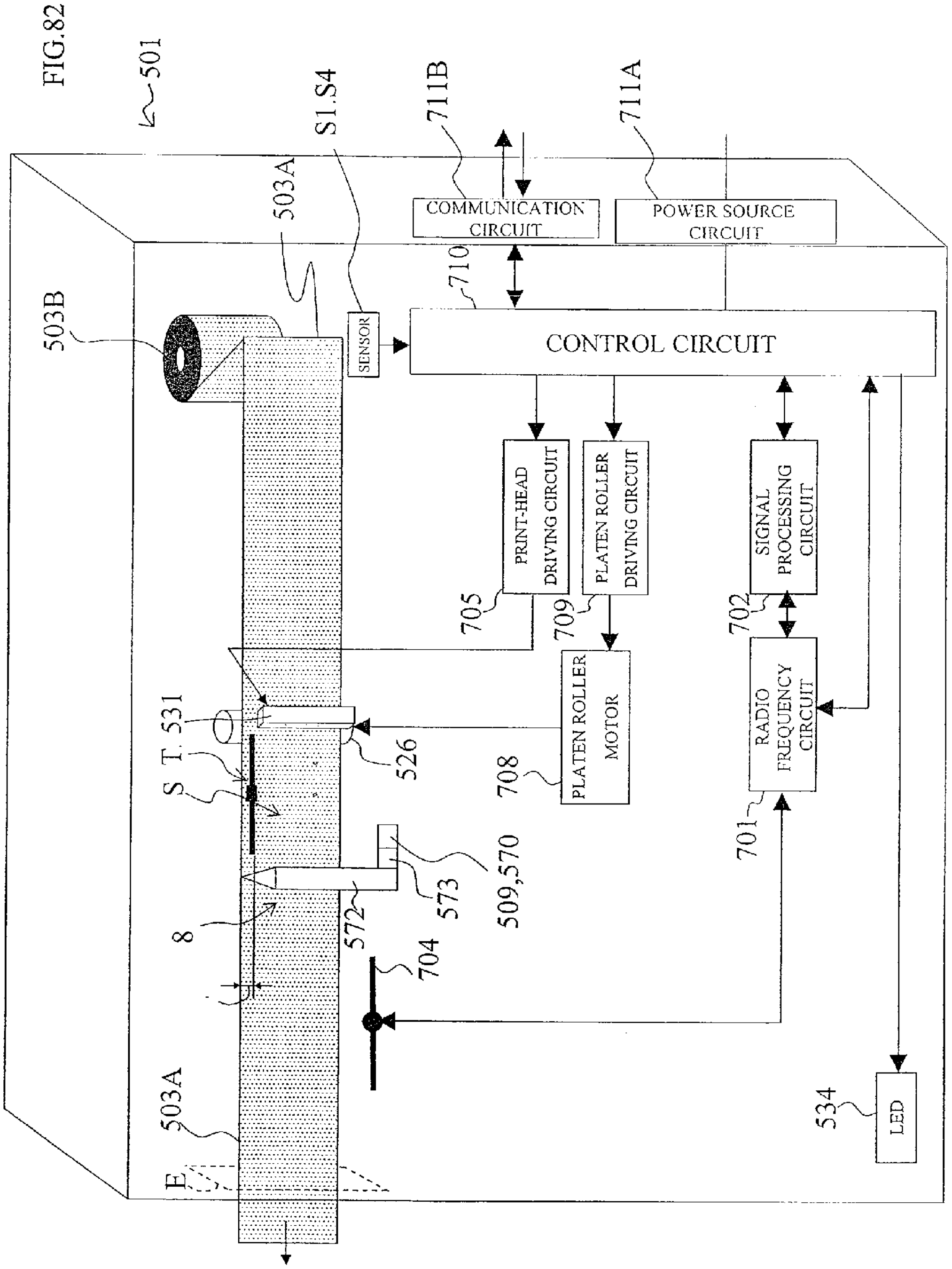
FIG. 82 is a schematic diagram illustrating a control system of the apparatus for communicating with a RFID tag.

FIG. 82 is a conceptual view illustrating the control system of the apparatus 501 for communicating with a RFID tag. In FIG. 82, the tag tape 503A has, as described above, a plurality of the RFID circuit elements T1 arranged at one end in the width direction (upper part of the page sheet of FIG. 82) and, in this example, a region corresponding to each of the RFID circuit elements T1 is the print region S in which a print R corresponding to each of the RFID circuit elements T1 is made by the print head 531. Then, following the above-mentioned print, exchange of signals is performed with the RFID circuit elements T1 provided on the tape 503A by the antenna 704 via radio communication using appropriate frequencies such as UHF band, microwave band, short wave band or the like, and operating the cutter lever 509 causes the cutter unit 508 to cut the tape-with-print 503A as described above, thus producing the RFID label T Additionally on the apparatus 501 for communicating with a RFID tag are provided: the platen roller 526 configured to transport the tag tape 503A and the already cut RFID label T to the carry-out exit E for feed out; a radio frequency circuit 701 configured to access (read or write) information (RFID tag information) of the IC circuit part 650 of the RFID circuit element T1 via the antenna 704; a signal processing circuit 702 configured to receive the signal which has been read from the IC circuit part 650 of the RFID circuit element T1 via the radio frequency circuit 701 and perform a predetermined process to read information, as well as access the IC circuit part 650 of the RFID circuit element T1 via the radio frequency circuit 701; a print-head driving circuit 705 configured to control energization of the print head 531; a platen roller driving circuit 709 configured to control the platen roller motor 708 which drives the platen roller 526; a control circuit 710 configured to control the operation of the entire apparatus 501 for communicating with a RFID tag via the radio frequency circuit 701, signal processing circuit 702, a print-head driving circuit 705, a platen roller driving circuit 709 or the like; and the above-mentioned LED 534 which turns on by the control signal from the control circuit 710. Here, a feeding guide may be further provided for setting and holding the RFID circuit elements T1 in a predetermined access area opposing the antenna 704 at the timing of exchanging signals via the above-mentioned radio communication, as well as guiding each RFID label T after the cutting.

The control circuit 710, being a so-called micro computer and hence its detailed illustration omitted, comprises a CPU or the central processing unit, a ROM and a RAM, and is arranged to execute signal processing according to the program preliminarily stored in the ROM, using temporary storage function of the RAM. In addition, the control circuit 710 is power-supplied by the power source circuit 711A and connected to a communication line, for example, via the communication circuit 711B, allowing exchanges of information with the route server, other terminals, a general-purpose computer, and information servers which are connected to the communication line but not illustrated. Furthermore, tape discrimination information (the information as to whether the tag tape or the normal tape is provided, and other parameter information) from the above-mentioned tape discriminating sensors S1 to S4 is input to the control circuit 710. The control circuit 710 controls the power supply to the print head 531 (see FIGS. 92 and 93), based on the information from the tape discriminating sensors S1 to S4 (details will be described below).

Figure 83:
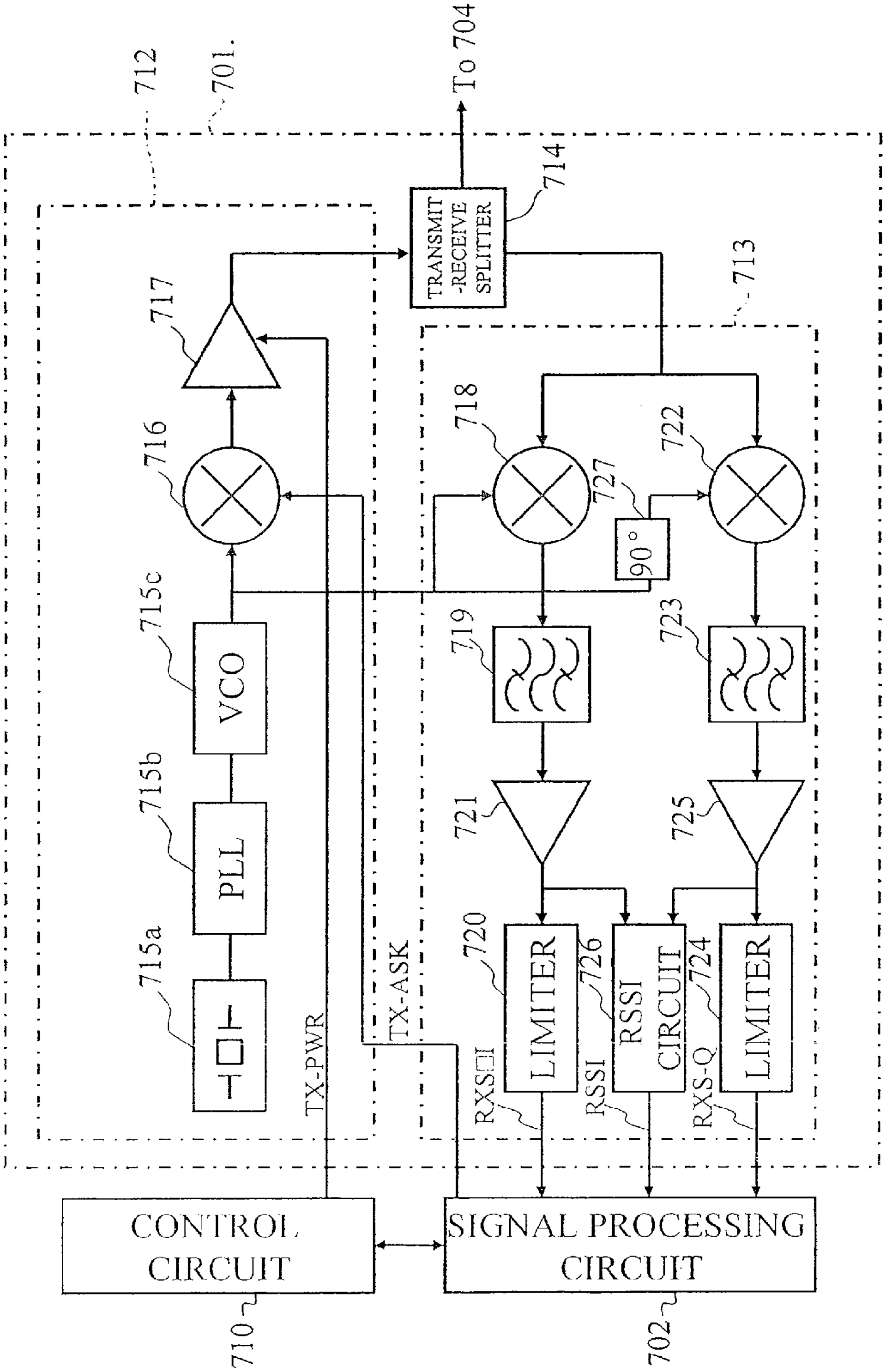
FIG. 83 is a functional block diagram illustrating a detailed function of a radio frequency circuit.

FIG. 83 is a functional block diagram illustrating the detailed functions of the radio frequency circuit 701. In FIG. 83, the radio frequency circuit 701, being equivalent to the radio frequency circuit 21 which has already been described in the first to fourth embodiments, comprises a transmitting portion 712 configured to transmit signals to the RFID circuit element T1 via the antenna 704; a receiving portion 713 configured to receive the reflected wave from the RFID circuit element T1 which is received by the antenna 704; and a transmit-receive splitter 714.

The transmitting portion 712 includes a crystal oscillator 715*a*, a PLL (Phase Locked Loop) 715*b*, and a VCO (Voltage Controlled Oscillator) 715*c* which function as the carrier wave generation means for generating a carrier wave to access (read/write) the RFID tag information of the IC circuit part 650 of the RFID circuit element T1; a transmission multiplying circuit 716 configured to modulate the generated carrier wave based on the signal provided from the signal processing circuit 712 (amplitude modulation based on the “TX_ASK” signal from the signal processing circuit 712, in this example); and a transmission amplifier 717 configured to amplify (amplification with the amplification factor determined by the “TX_PWR” signal from control circuit 710, in this example) the modulated wave which has been modulated by the transmission multiplying circuit 716. The output of the transmission amplifier 717 is then transmitted to the antenna 704 via the transmit-receive splitter 714 and supplied to the IC circuit part 650 of the RFID circuit element T1.

The receiving portion 713 includes a first receiving signal multiplying circuit 718 configured to multiply the reflected wave from the RFID circuit element T1 which is received by the antenna 704 and the generated carrier wave; a first band-pass filter 719 for extract only the signals in the necessary band from the output of the first receiving signal multiplying circuit 718; a first receiving signal amplifier 721 configured to amplify the output of the first band-pass filter 719; a first limiter 720 configured to further amplify the output of the first receiving signal amplifier 721 and convert it into a digital signal; a second receiving signal multiplying circuit 722 configured to multiply the reflected wave from the RFID circuit element T1 which is received by the antenna 704 and the carrier wave whose phase is delayed 90 degrees by the phase shifter 727 after its generation; a second band-pass filter 723 for extract only the signals in the necessary band from the output of the second receiving signal multiplying circuit 722; a second receiving signal amplifier 725 configured to amplify the output of the first band-pass filter 723; and a second limiter 724 configured to further amplify the output of the second receiving signal amplifier 725 and convert it into a digital signal. Then, the signal “RXS-I” which is output from the first limiter 720 and the signal “RXS-Q” which is output from the second limiter 724 are input to the signal processing circuit 702 and processed therein.

In addition, the output of the first receiving signal amplifier 721 and the second receiving signal amplifier 725 are also input to the RSSI (Received Signal Strength Indicator) circuit 726, so that a signal “RSSI” indicating the intensity of these signals are input to the signal processing circuit 702. In this manner, the apparatus 501 for communicating with a RFID tag of the present embodiment performs demodulation of the reflected wave from the RFID circuit element T1 by I-Q quadrature demodulation.

On the other hand, as described above, a tape spindle member 503' having a tape 503A' with no RFID circuit element provided thereon (normal tape) can be attached or detached to the tape spindle member receptacle 504, in addition to the tape spindle member 503 having a tag tape 503A with the RFID circuit element T1 formed thereon. By mounting the tape spindle member 503' on the tape spindle member receptacle 504, the normal tape 503A' is transported and printing may be performed using the print head 531, similarly as with the tag tape 503A.

Figure 84:
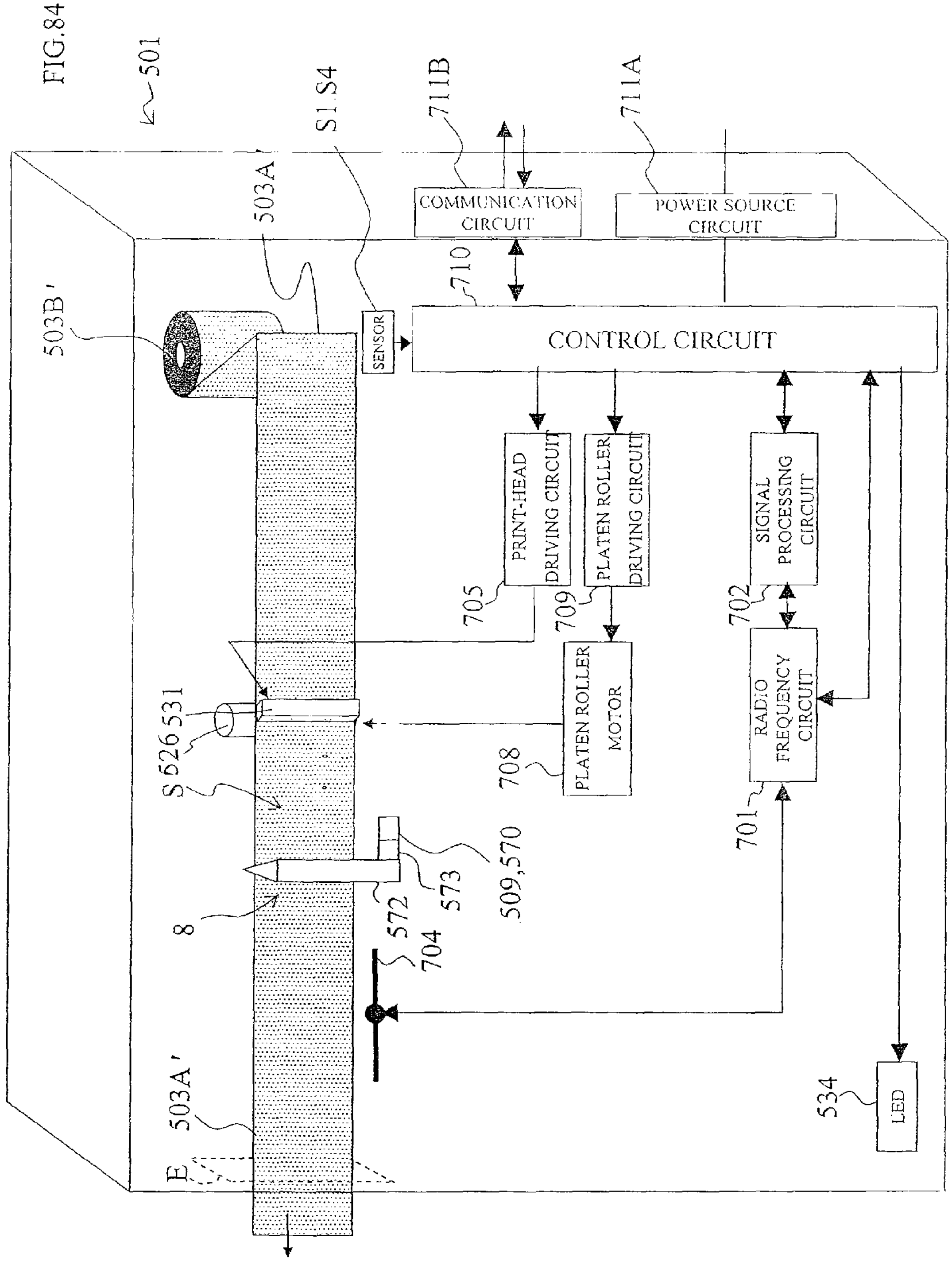
FIG. 84 is a schematic diagram illustrating a control system of the apparatus for communicating with a RFID tag when a normal tape is mounted.

FIG. 84 is equivalent to FIG. 82 (conceptual view illustrating the control system of the apparatus 501 for communicating with a RFID tag) in which the tape spindle member 503' containing the normal tape 503A' is mounted to the tape spindle member receptacle 504. In FIG. 84, the normal tape 503A' is, as described previously, fed at a transport position which is slightly displaced along the axial direction compared with the tag tape 503A (downward of the page sheet of FIG. 84) and, after printing is performed on a predetermined print region S' by the print head 531, operating the cutter lever 509 causes the cutter unit 508 to cut the tape-with-print 503A' as described above, whereby producing a label (tag-less label) T'. The above mentioned displacement of the transport position is, specifically, as follows. The position of the tape transport path of the tag tape 503A and the position of the tape transport path of the normal tape 503A' are displaced along the width direction of the tape (upward in FIG. 82) by a length approximately equal to (or a length not below) the distance y from an end on one side in the width direction of the tag tape 503A (upper end in FIG. 82) to an end on the other side in the width direction of the tag tape 503A (lower end in FIG. 82) of the IC circuit part 650. In other words, the position of the end on one side (upper end in FIG. 84) of the normal tape 503A' in the width direction is substantially identical to the position of the end on the other side (lower end in FIG. 82) in the tape width direction of the IC circuit part 650 of the tag tape 503.

Here, access to the RFID tag via the antenna 704 is not performed when the normal tape 503' is used.

Figure 85A:
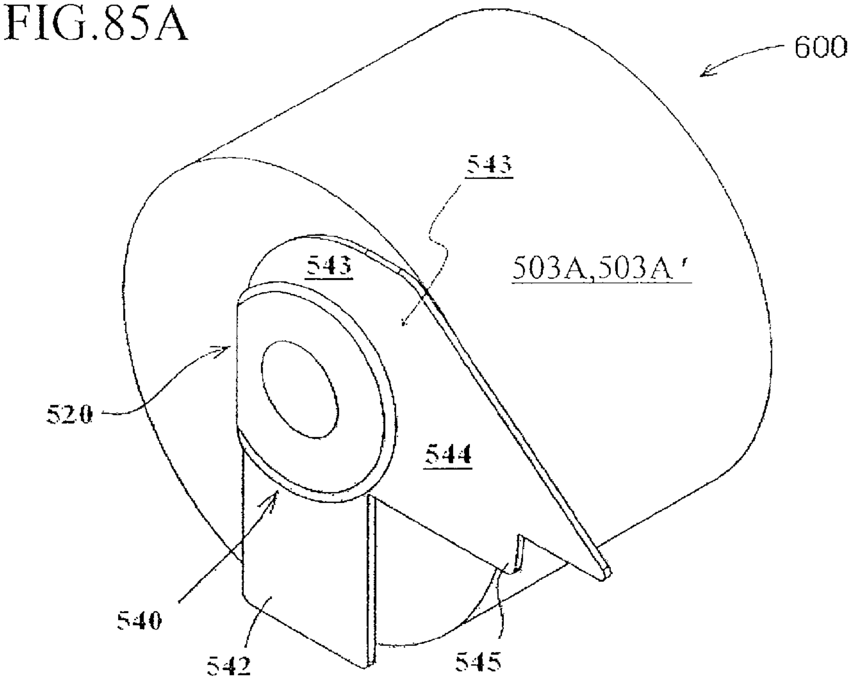
FIG. 85A illustrate a perspective view of a detailed structure of a tape roll body provided at the apparatus for communicating with a RFID tag illustrated in FIG. 74 viewed from above on the front side.
Figure 85B:
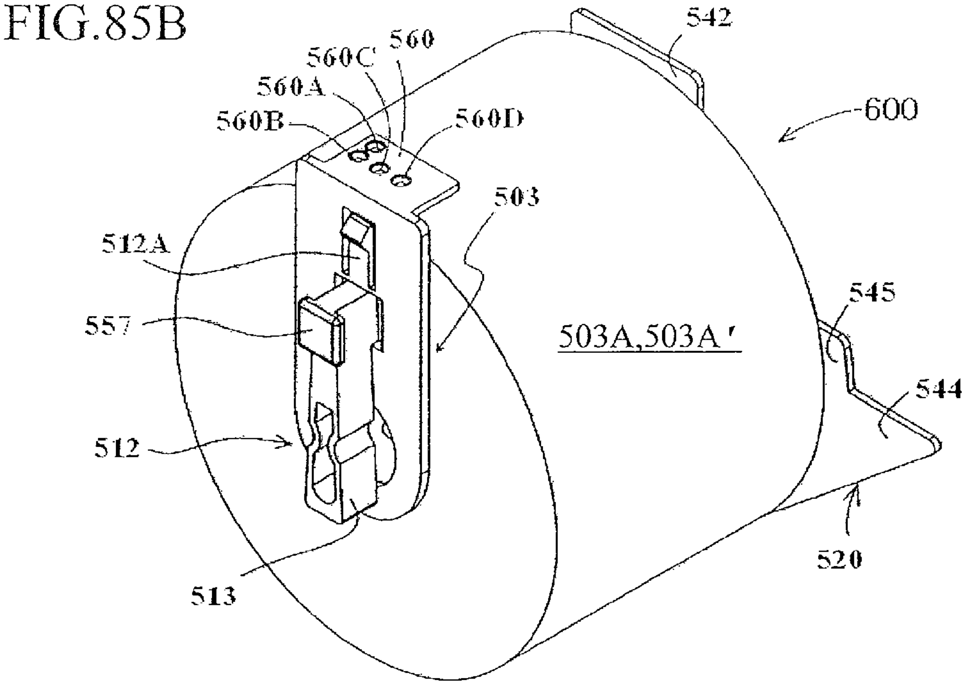
FIG. 85B is a perspective view from behind on the lower side.

FIGS. 85A and 85B are perspective views seen from front-above and back-beneath, respectively, illustrating the detailed structure of the tape roll body 600 provided in the apparatus 501 for communicating with a RFID tag shown in FIG. 74.

In FIGS. 85A and 85B, the guide member 520 of the tape spindle member 503 (or 503') provided in the tape roll body 600 has a first extension part 542 inserted into the positioning recess 504A formed on the bottom surface of the tape spindle member receptacle 504 to contact the bottom surface of the positioning recess 504A, a second extension part 543 extending outward so as to cover the outer end face of approximately one fourth of the circumference in the front direction of the tape 503A (or 503A'), and a third extension part 544 extending from the outer circumference of the second extension part 543 to nearby the insertion slot 518 (see FIG. 79) of the tape 503A (or 503A'), with its upper end edge drooping down.

The lower end face of the tip of the third extension part 544, being formed substantially horizontally, is arranged to contact the mounting part 521 of the apparatus 501 for communicating with a RFID tag and guide one of the side edges of the tape 503A (or 503A') mounted by the inner surface of the third extension part 544 and the second extension part 543 to the insertion slot 518. In addition, a fourth extension part 545 is formed which extends from a position at the lower end face of the third extension part 544 opposing the rear end edge of the mounting part 521 in the transport direction to the first extension part 542 by a predetermined length. The tip of the fourth extension part 545 in the transport direction is arranged to be inserted into each of the second positioning grooves 522A (or 522B) opposing the tape width of the mounted tape 503A, when the lower end face of the third extension part 544 contacts the mounting part 521 (see FIG. 80 described above).

In addition, a flat plate-like guide part 557 (about 1.5 mm to 3 mm long in this example) having a substantially square front shape and protruding outward to the right and left longer than the lower end of the attachment member 513 by a predetermined length (about 1.5 mm to 3 mm in this example) is formed at the lower end of the attachment member 513 of the positioning member 512 of the tape spindle member 503 (or 503'). As a result, when mounting the tape spindle member 503 (or 503'), the tape spindle member 503 (or 503') can be mounted while readily positioning it, by inserting the attachment member 513 into the first positioning groove 516 while causing the guide part 557 formed at the lower end of the attachment member 513 to contact the outer end face of the support member 515.

The lower end edge of the extension part 556 of the positioning member 512 extends so as to protrude downward longer than the lower end edge of the guide member 520 by a predetermined length (about 1 mm to 2.5 mm in this example), and a tape discriminating part 560 having a substantially rectangular front shape and extending substantially orthogonally inward for a predetermined length is formed.

The tape discriminating part 560 has sensor holes 560A to 560D bored in a substantially L-shaped arrangement on a predetermined position opposing the above-mentioned tape discriminating sensors S1 to S4, and functions as the tape identifying part for identifying the type of the tape 503A in cooperation with the sensors S1 to S4. Furthermore, the sensors S1 to S4 are capable of identifying information similar to that of the fourth embodiment such as the information as to whether tag tape 503A or the normal tape 503A' is provided as the type of the tape, and other parameter information.

Figure 86B:
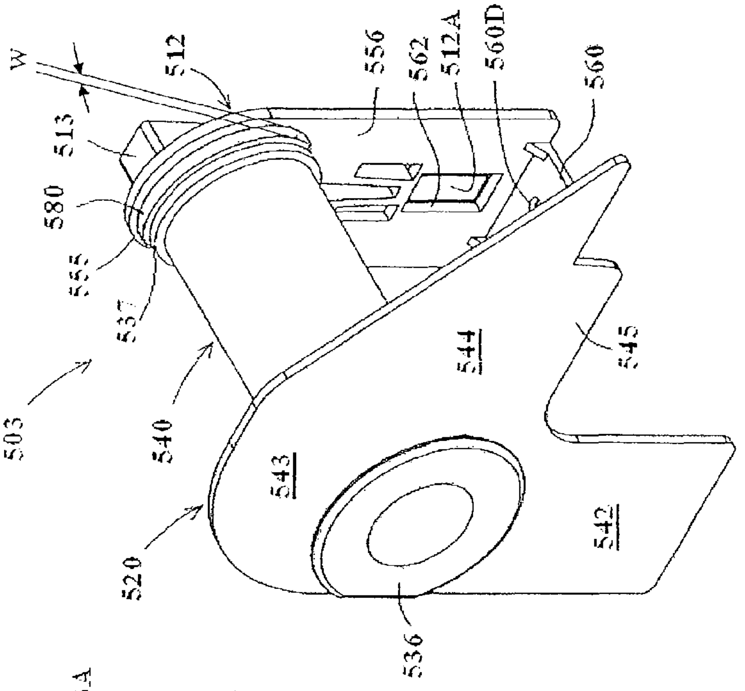
FIGS. 86A and 86B are perspective views of the tape shaft member for the tag tape from the diagonally rear side and a perspective view from the diagonally front side respectively.
Figure 86A:
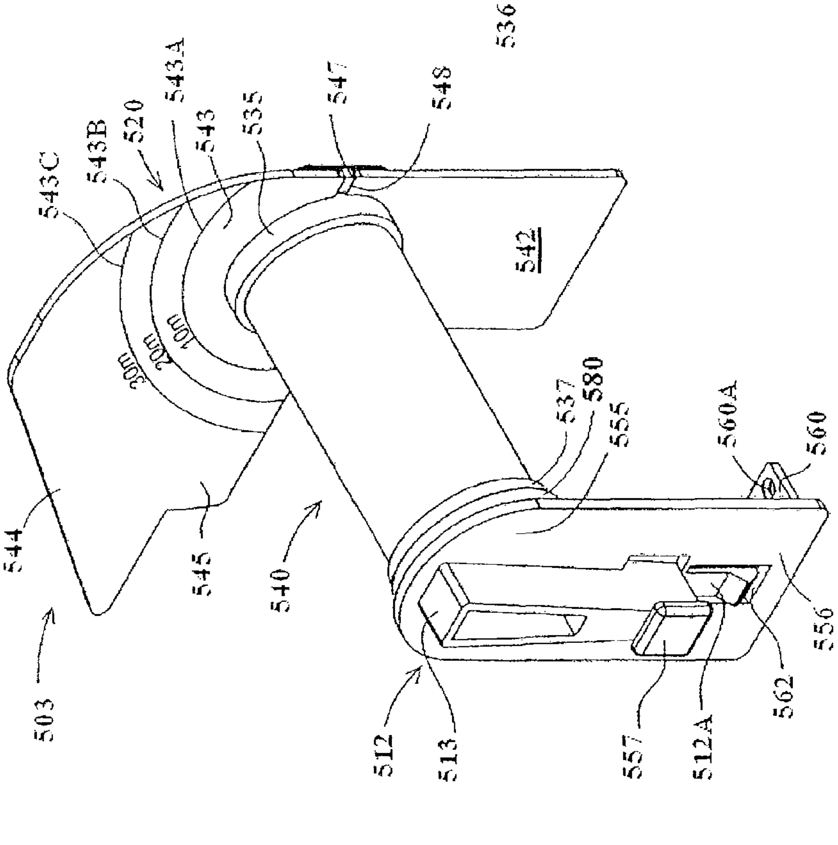

FIG. 86A is a perspective view of the tape spindle member 503 containing the tag tape 503A, seen diagonally from the back, and FIG. 86B is a perspective view seen diagonally from the front.

In FIGS. 86A and 86B, a first cylindrical part 535 is provided in the guide member 520, causing the guide member 520 to contact an end face of the tape 503A by fitting the first cylindrical part 535 inside one of the ends of the cylindrical hole of the winding core 503B. At the same time, a second cylindrical part 537 is provided on the positioning holder member 512, causing the positioning holder member 512 to contact the other end face of the tape 503A by fitting the second cylindrical part 537 inside the other end of the winding core 503B. In this condition, the tape 503A is slightly displaced, as described by FIG. 77, toward the guide member 520 (left front of the page sheet of FIG. 86A and right back of the page sheer of FIG. 86B), since the spacer part 580 is provided on the second cylindrical part 537. Here, although not shown, the RFID circuit element T1 is formed nearby the end part of the guide member 520 in the tape 503A (left front of the page sheet of FIG. 86A and right back of the page sheet of FIG. 86B). The first cylindrical part 535 and the second cylindrical part 537 allows the winding core 503B with the tape 503A wound around to be rotatably held.

In addition, the shaft member 540 has its one end fitted inside the first cylindrical part 535 of the guide member 520, with a flange part 536 formed on the circumference of the one end face, the flange part 536 being fixed to the outer end face of the first cylindrical part 535. Additionally, the other end of the shaft member 540 is fitted inside the second cylindrical part 537 of the positioning holder member 512 and is fixed to the second cylindrical part 537.

In this condition, the first extension part 542 of the guide member 520 extends downward from the lower circumference of the outer end face of the first cylindrical part 535, with a notch 547 having a substantially square front shape provided on its the upper end, i.e., on each of the centers of both the right and left parts of the circumference of the outer end face of the first cylindrical part 535.

In addition, a set of scales 543A, 543B and 543C expressing the winding length of the mounted tape 3A, i.e. the remaining amount of tape 10 m, 20 m and 30 m, respectively is formed on the internal surface of respective extension parts 543, 544 and 545 of the guide member 520. Here, the maximum winding length of the tape 503A to be wound around the tape spindle member 503 is about 30 m.

At the same time, a flange part 555 is formed on the circumference of the second cylindrical part 537 of the positioning member 512, and also an extension part 556 extending downward from the lower circumference of the flange part 555 is formed. The flange part 555 and the internal surface of the extension part 556 contact the outer end face of the tag tape 503A and the winding core 503B. The attachment member 513 is protrudingly provided on substantially the center of the width direction (top-left to bottom-right direction in FIG. 86A) of the outer end face of the flange part 555 and the extension part 556, that is, substantially orthogonal to the axial center from the end edge of the axial center of the shaft member 540.

Figure 87B:
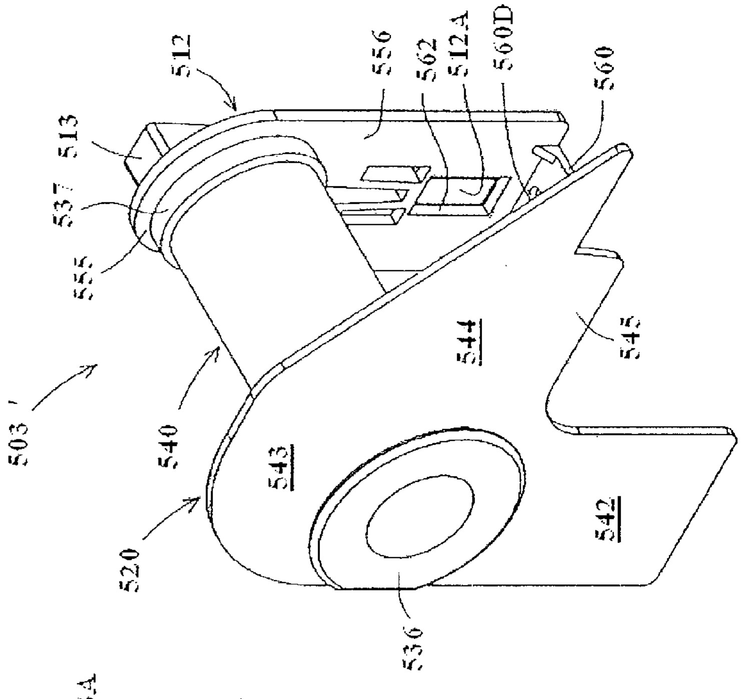
FIGS. 87A and 87B are perspective views of the tape shaft member for the normal tape from the diagonally rear side and a perspective view from the diagonally front side respectively.
Figure 87A:
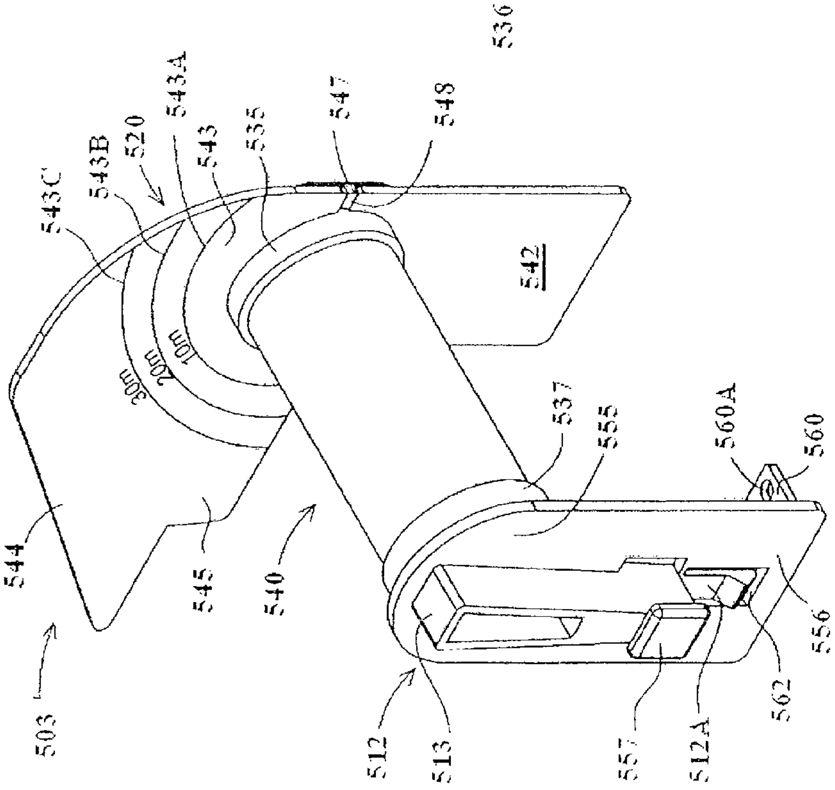

FIG. 87A is a perspective view of the tape spindle member 503' containing the normal tape 503A', seen diagonally from the back, and FIG. 87B is a perspective view seen diagonally from the front. Here, description is omitted because the parts in FIG. 87 which are equivalent to those of FIG. 86 have the same symbols, with similar operation and functionality with those of FIG. 86. As shown in FIGS. 87A and 87B, the spacer part 580 is not provided in the case of the normal tape 503A', hence the width (dimension along the axial direction) of the shaft member 540 becomes shorter by the width w of the spacer part 580. In this manner, the relative position of the tag tape 503A and the normal tape 503A' to the print head 531 becomes different by substantially the width of the RFID circuit element T1 (≈width w of spacer part 580). The resulting effect will be described below, referring to FIG. 92.

Figures 88A, 88B, 88C:
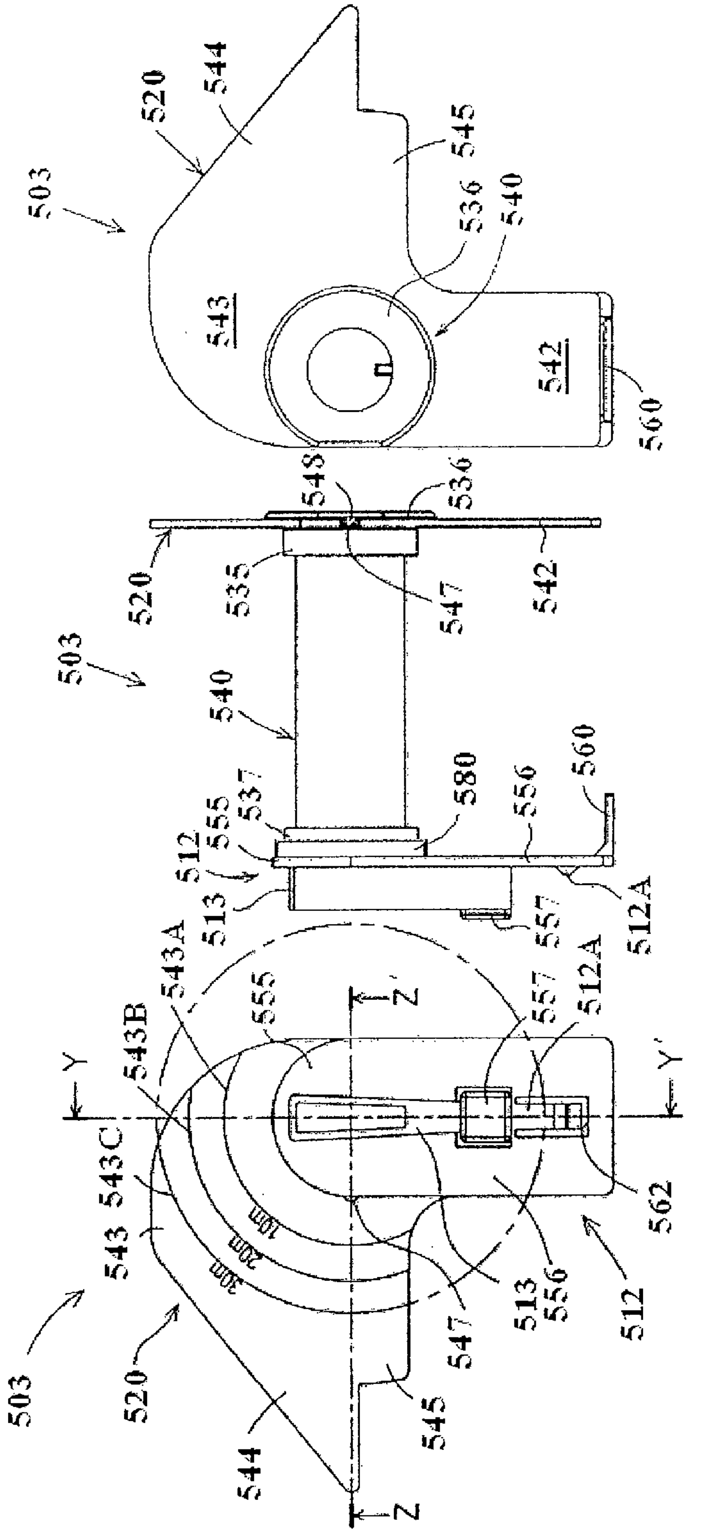
FIG. 88A is a left side view.
FIG. 88B is an elevation view.
FIG. 88C is a right side view, each illustrating a detailed structure of the tape shaft member.

FIG. 88A is a left side view illustrating the detailed structure of the tape spindle member 503 of FIG. 86, with FIG. 88B being the front view and FIG. 88C being the right side view. In FIGS. 88A to 88C, the shaft member 540 is provided between the positioning holder member 512 and the guide member 520, as described above. With regard to the shaft member 540, those of a plurality of types of length, for example, are prepared beforehand so that a plurality of types of the tape spindle member 503 which can mount tag tapes 503A of different width dimensions can be readily produced by changing the length dimension of the shaft member 540.

Figure 89:
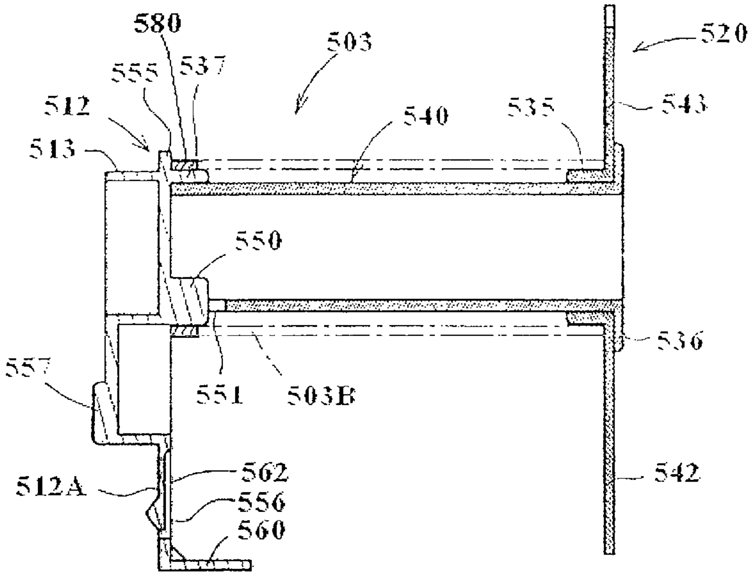
FIG. 89 is a fragmentary sectional view taken in a direction indicated by arrows in Y-Y' cross section of FIG. 88A.

FIG. 89 is a fragmentary sectional view of the cross section taken along Y-Y' in FIG. 88A and seen from the arrow direction. In FIG. 89, a substantially vertically-long notch part 551 is formed on the tip of the shaft member 540 to be inserted in the second cylindrical part 537 of the positioning holder member 512. A positioning rib 550 protrudingly provided in the inner radial direction at the lower end inside the second cylindrical part 537 is inserted in the notch part 551, whereby positioning of the positioning holder member 512 and the guide member 520 can be performed according to the tape width via the shaft member 540. In addition, a vertically long rectangular via-hole 562 is bored in the extension part 556 at the lower end of the attachment member 513 of the positioning member 512, and an elastic locking piece 512A having a protrusion part protruding outward formed on the lower tip thereof is provided on the upper end edge of the via-hole 562.

Figure 90:
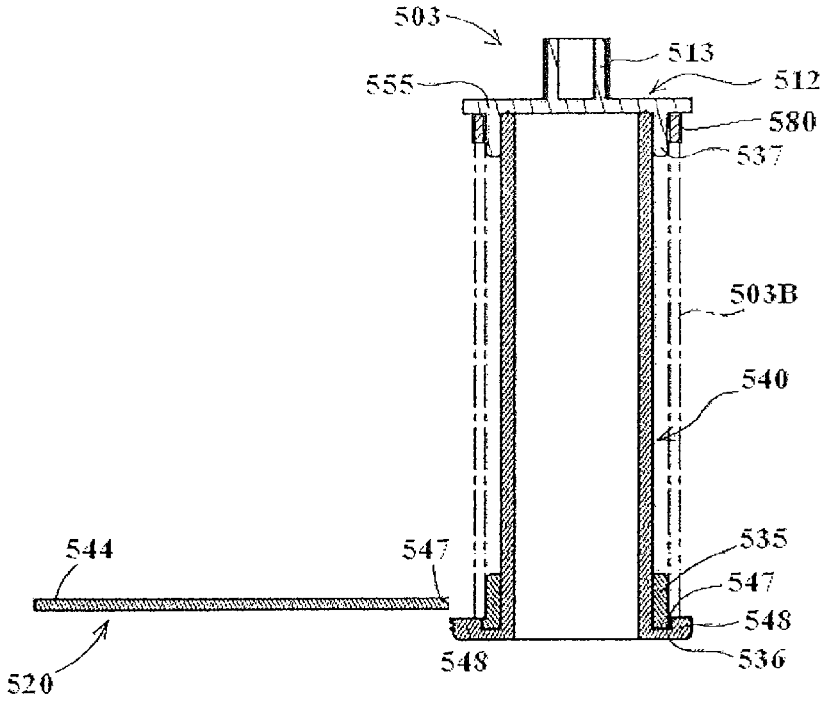
FIG. 90 is a fragmentary sectional view taken in a direction indicated by arrows in Z-Z' cross section of FIG. 88A.

FIG. 90 is a fragmentary sectional view of the cross section taken along Z-Z' in FIG. 88A and seen from the arrow direction. In FIG. 90, a set of positioning protrusions 548 protrudingly provided on the inner surfaces of the flange part 536 of the shaft member 540 is inserted in the above-mentioned notch part 547 of the first extension part 542, whereby positioning against the guide part of the shaft member 540 is performed.

While FIGS. 88 to 90 illustrate the detailed structure of the tape spindle member 503 containing the tag tape 503A, the tape spindle member 503' containing the normal tape 503A' has a substantially similar arrangement. In other words, it differs from the tape spindle member 503 in that, as described above, the dimension of shaft member 540 is shorter, corresponding to the absence of the spacer part 580 having a dimension w in the axial direction. In addition, although the shaft member 540 of the tape spindle member 503' has a smaller length in the axial direction than the shaft member 540 of the tape spindle member 503 (even if a tape with the same width is mounted), a plurality of types of length of the shaft member 540 may be prepared so that normal tapes 503A' having different width dimensions can be mounted on the shaft member 540 of the tape spindle member 503', similarly as described above.

FIGS. 91A to 91E illustrate, respectively, exemplary boring of sensor holes which represent the types of the tape in the tape discriminating part 560 of the positioning holder member 512 of the tape spindle member 503 or 503'.

Figure 91A:
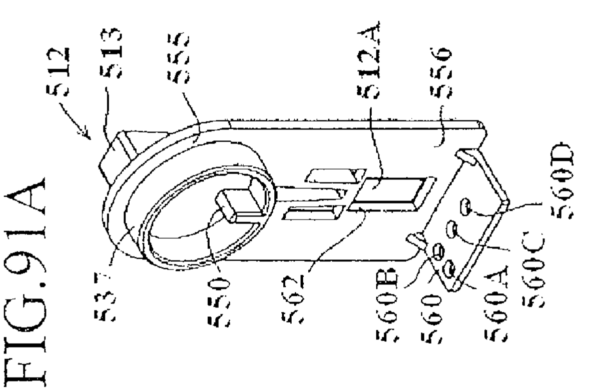
FIGS. 91A to 91E are views illustrating machined examples of sensor holes showing the kind of tapes with respect to a tape discrimination part of a positioning holding member.

FIG. 91A illustrates an example in which four sensor holes 560A to 560D are provided on the tape discriminating part 560, as described above. Corresponding to these tape discriminating holes 560A to 560D, the tape discriminating sensors S1 to S4 are provided in the discrimination recess 504B of the tape spindle member receptacle 504. In each of the sensors S1 to S4, its plunger projects from the bottom surface of the discrimination recess 504B to nearby the bottom surface of the positioning recess 504A, with the micro switch in the OFF state. It is then arranged that, when each of the sensor holes 560A to 560D is present at a position opposing each of the tape discriminating sensors S1 to S4, an OFF signal is output because the plunger is not pressed and the micro switch is in an OFF state, whereas an ON signal is output when each of the sensor holes 560A to 560D of the tape discriminating part 560 is not present at a position opposing each of the tape discriminating sensors S1 to S4 because the plunger is pressed down and the micro switch is switched ON.

Figure 91B:
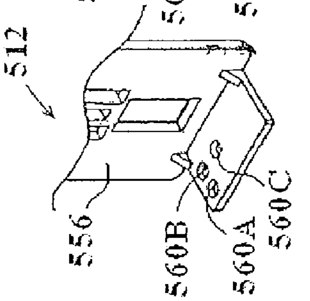
Figure 91C:
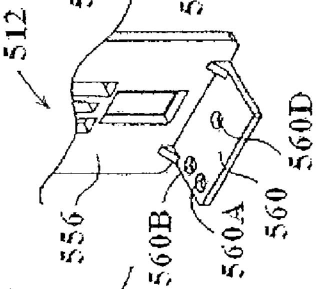
Figure 91D:
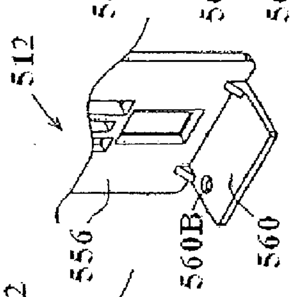
Figure 91E:
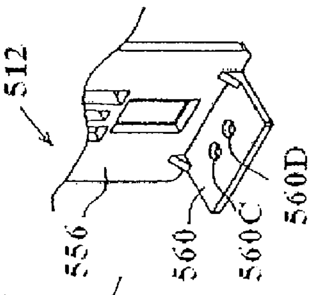

As thus described, the type of the tag tape 503A or the normal tape 503A' mounted on the tape spindle member 503 or 503' can be indicated by a 4-bit code (in other words, 16 types can be distinguished) by relating the detection result of whether or not the four sensor holes 560A to 560D are present to the four sensors S1 to S4 and associating the presence of individual sensor holes with "1" or "0". FIGS. 91A to 91E each illustrate an example of the 16 types, with FIG. 91A illustrating the case in which all the sensor holes 560A, 560B, 560C and 560D are present and a detection signal "1,1,1,1" is output, FIG. 91B illustrating the case in which sensor holes 560A, 560B and 560C are present and a detection signal "1,1,1,0" is output, FIG. 91C illustrating the case in which sensor holes 560A, 560B and 560D are present and a detection signal "1,1,0,1" is output, FIG. 91D illustrating the case in which sensor hole 560B is present and a detection signal "0,1,0,0" is output, and FIG. 91E illustrating the case in which sensor holes 560C and 560D are present and a detection signal "0,0,1,1" is output.

In the manner described above, the type of the tag tape 503A or the normal tape 503A' mounted on the tape spindle member 503 or 503' can be detected by inserting the tape discriminating part 560 provided at the lower end edge inside the positioning member 512 into the discrimination recess 504B and detecting the presence of the sensor holes 560A to 560D by the sensors S1 to S4. Although it suffices to discriminate at least two types, i.e. the tag tape 503A and the normal tape 503A' in the present embodiment, preparing four sensors S1 to S4 as shown in FIG. 91 to enable discrimination of 16 types of tape can cope with increase in the types of tapes, and discrimination of more than 16 types of tape is possible by further increasing the number of sensors.

Figure 92A:
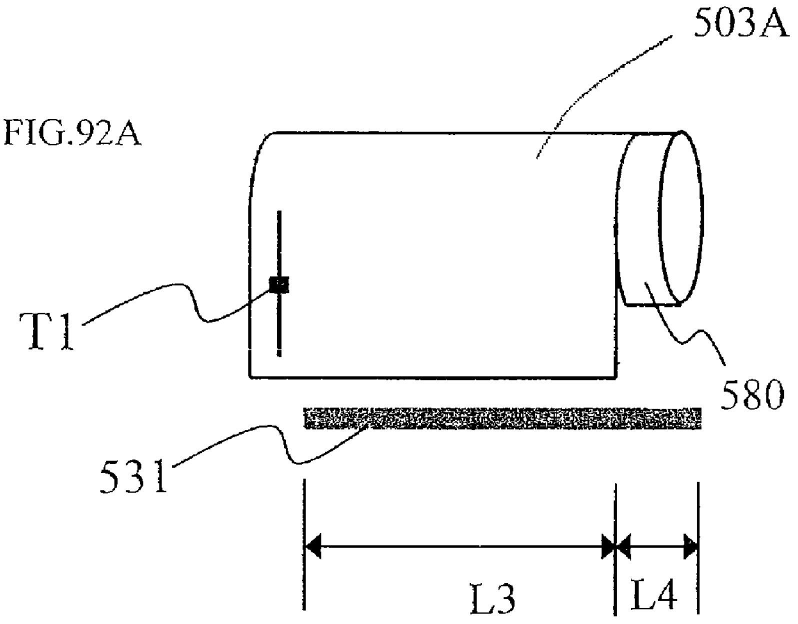
FIG. 92A is a schematic view illustrating a relative relation between a tape position and a print head in the case of being provided with the tag tape.
Figure 92B:
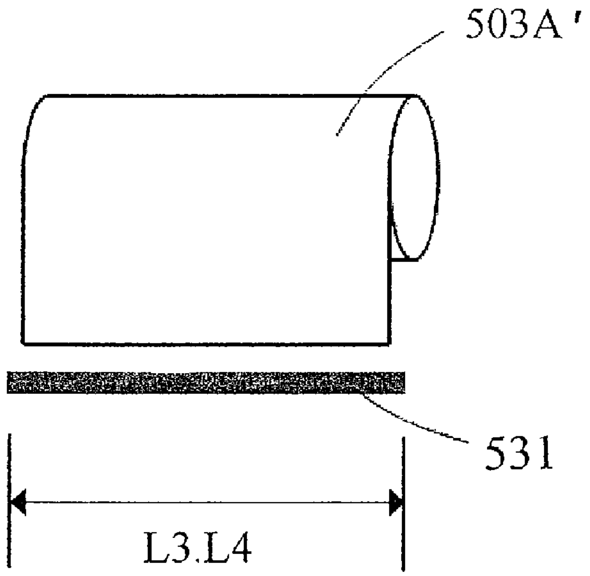
FIG. 92B is a schematic view in the case of being provided with the normal tape.

FIGS. 92A and 92B are schematic diagrams illustrating the relative relationship between the tape position and the position of the print head 531, for the case in which the tape spindle member 503 containing the tag tape 503A is mounted on the tape spindle member receptacle 504, and the case in which the tape spindle member 503' containing the normal tape 503A' is mounted.

With the apparatus 501 for communicating with a RFID tag of the present embodiment, when the tape spindle member 503 containing the tag tape 503A is mounted on the tape spindle member receptacle 504 that, as shown in FIG. 92A, the position of the tag tape 503A is located at further left side of the page sheet by the spacer part 580 so that the print head 531 does not overlap with the RFID circuit element T1 located at one end in the width direction of the tag tape 503A (not to contact a portion of the RFID circuit element T1). The above arrangement eliminates the need of power supply to the part of the print head 531 on the right side of the page sheet indicated by L4 in the diagram, hence it turns out that only the part of the print head 531 indicated by L3 in the diagram needs to be power-supplied by controlling the print-head driving circuit 705 (in other words, the print drive area has a length of L3).

On the other hand, when the tape spindle member 503' containing the normal tape 503A' is mounted on the tape spindle member receptacle 504, it is arranged, as shown in FIG. 92B, that the position of the normal tape 503A' is located at further right side of the page sheet so that the print head 531 faces the entire tape 503A'. In this case, the part of the print head 531 indicated by L3+L4 in the diagram is power-supplied by controlling the print-head driving circuit 705 (in other words, the print drive area has a length of L3+L4).

Figure 93:
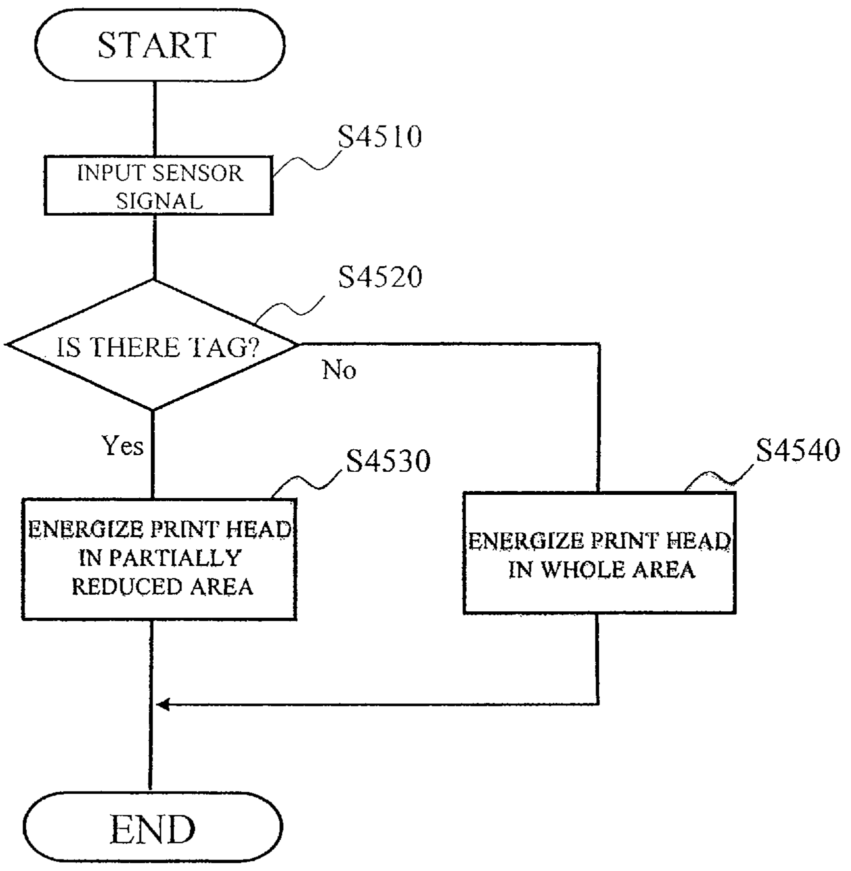
FIG. 93 is a flowchart illustrating an energization control operation of a heater element of the print head in the print-head driving circuit.

FIG. 93 is a flow chart illustrating the energization control operation of the heater element of the print head 531 performed by the control circuit 710 via the print-head driving circuit 705 for the case in which the tape spindle member 503 containing the tag tape 503A is mounted, and the case in which the tape spindle member 503' containing the normal tape 503A' is mounted.

In FIG. 93, the cartridge sensors S1 to S4 first detect in step S4510 the type of tape spindle members 503 and 503', in other words, whether it is the tag tape 503A or the normal tape 503A' as mentioned above, then the sensor signal is input (identified).

Next, in step S4520, it is determined, based on the sensor signal input in step S4510 mentioned above, whether or not a tag is present, in other words, whether it is the tape spindle member 503 containing the tag tape 503A or the tape spindle member 503' containing the normal tape 503A'.

If it is determined to be the tag tape 503A, the operation goes to step S4530, where a control signal is output to the print-head driving circuit 705 so that the type of power supply to the print-head 531 is configured, as shown in FIG. 92A, to be a partially scaled-down power supply in which the L4 part is a power-cut region (=the print-head drive region is only a length of L3) and the flow is finished. If, otherwise, it is determined in step S4520 that the tape is the normal tape 503', the operation goes to step S4540 where a control signal is output to the print-head driving circuit 705 so that energization aspect of the print head 531 is set to be whole area energization in which the entire region of L3+L4 (=print-head drive region is the length of L3+L4) is power-supplied as shown in FIG. 93B and the flow is finished.

As thus described, the control circuit 710 (particularly, steps S4520, S4530 and S4540 of the flow shown in FIG. 93) constitutes the fourth print controller configured to switch the print-head drive region of the printing device, according to whether the tag tape or the normal tape is mounted, based on the detection result of the detecting device.

According to the present embodiment arranged as above, when the tape spindle member 503 containing the tag tape 503A is mounted in the tape spindle member receptacle 504, the position of the tape transport path in the apparatus 501 for communicating with a RFID tag is displaced compared with the case in which the tape spindle member 503' containing the normal tape 503A' is mounted (based on the difference between the mounting positions of the tapes 503A and 503A' due to the presence or absence of the spacer part 580 as shown in FIG. 92). In addition, particularly, the length of the print-head drive region of the print head 531 changes from L3+L4 to L3 according to the difference between the positions. Therefore, it can be arranged such that the print drive region (the part having a length of L3) of the print head 531 does not overlap with the RFID circuit element T1 provided on the tag tape 503A, whereby eliminating the possibility of damaging the RFID circuit element T1 due to heating of the print head 531, as well as eliminating the possibility of developing fading of prints. As a result, convenience for the user can be enhanced, since both the tag-label-with-print T and the normal label T' can be produced on the same apparatus 501 for communicating with a RFID tag, and the soundness of the RFID label T and the quality of the prints can be enhanced. On this occasion, particularly, electric power consumption can be reduced by reducing the length of the print-head drive region of the print head 208 from L3+L4 to L3 and stopping the power supply to the part of length L4 when mounting the tape spindle member 503 containing the tag tape 303 so that unnecessary print drive to the part of length L4 which went out of the tape 503A' is avoided, while preventing the print-head drive region from overlapping with the RFID circuit element T1 as described above.

Note that the present embodiment is not limited to those mentioned above, and various types of modification can be made without deviating from its scope of spirit and technical ideas. Such variations will be described in the following.

(4-1) An Aspect of Mounting the Cartridge to the Apparatus 501 for Communicating with a RFID Tag Although, it is arranged in the fifth embodiment such that both the tape spindle member 503 containing the tag tape 503A and the tape spindle member 503' containing the normal tape 503A' are mounted on the tape spindle member receptacle 504 by inserting the attachment member 513 into the support member 515 while fitting it within the first positioning groove 516 (in other words, by positioning the positioning holder member 512 closer to the support member 515), the invention is not limited to the above embodiment. For example, the tape spindle member 503 containing the tag tape 503A may be positioned closer to the guide part 520 on the opposite side, and the tape spindle member 503' containing the normal tape 503A' may be positioned closer to the support member 515 as discussed above. In this case, it can be realized by displacing the discrimination recess 504B from the center in the width direction (left-back to right-front direction in FIG. 14) of the apparatus 501 for communicating with a RFID tag, and setting the tape discriminating part 560 to oppose the discrimination recess 504B at each of the determined positions of the tape spindle members 503 and 503'. In this case, a similar effect as with the fifth embodiment can be obtained.

(4-2) The Case of Performing Only Energization Control of the Print Head (Control of the Print-head Drive Region)

Although not illustrated, a variation of the fourth and the fifth embodiments may be arranged to perform a switched control when using the tag tape in such a manner that the relative position to the print head is set, without using a spacer, to be a similar relative position as with the normal tape to remain facing the print head, and only the energization of the print head is controlled to stop the power supply to the part corresponding to the RFID circuit element of the previous print-head drive region so that only the part will not be print-driven (in other words, reducing the print-head drive region).

Also with the above variation, as with the fourth and the fifth embodiments, it can be arranged that the print drive region of the print head does not overlap with the RFID circuit element provided on the tag tape, whereby eliminating the possibility of damaging the RFID circuit element due to heating of the print head, as well as eliminating the possibility of developing fading of prints. As a result, convenience for the user can be enhanced, since both the tag-label-with-print T and the normal label T' can be produced on the same apparatus 501 for communicating with a RFID tag, and the soundness of the RFID label T and the quality of the prints can be enhanced. Additionally, electric power consumption can be reduced by reducing the length of the print-head drive region of the print head and stopping the power supply to the part corresponding to the RFID circuit element.

(4-3) Another Aspect of the Tag Tape

In the fourth and the fifth embodiments, a case has been described as an example in which the tag tapes 303 and 503A constitute the rolls 301 and 503B and the rolls 301 and 503B are mounted on the cartridge 300 or the tape spindle member 503 so that the tag tapes 303 and 503A are fed out. However, the invention is not limited to the foregoing. For example, an elongated-planar or strip-shaped tape or sheet (including those formed by feeding out the tape which has been wound into a roll and subsequently cutting it to suitable lengths) having at least a plurality of effective (untorn) RFID circuit elements provided thereon may be stacked in a predetermined receptacle to provide a cartridge which is in turn mounted on the cartridge holder part 202 or tape spindle member receptacle 504 at the side of the apparatus M for communicating with a RFID tag and 501, and the RFID label T (and also label T') may be produced by printing or writing on the tape or sheet being carried or fed out from the receptacle.

Furthermore, without being limited to the cartridge type, an arrangement is also conceivable in which the roll is directly mounted on the apparatus for communicating with a RFID tag, or the elongated-planar or strip-shaped tape or sheet is carried from outside the apparatus for communicating with a RFID tag and fed into the apparatus for communicating with a RFID tag by a predetermined feeder mechanism. Also with these cases, a similar effect as with the foregoing can be obtained.

Here, it is assumed that the terms "Scroll ID" signal, "Scroll All ID" signal, "Erase" signal, "Verify" signal, "Program" signal, etc. conform to the specification defined by the EPC global. EPC global is a nonprofit corporation co-established by the international EAN association which is an international organization of circulating codes and the Uniformed Code Council (UCC) which is an American organization of circulating codes. Note that, signals conforming to other standards may suffice, provided that they perform a similar functionality.

In addition to the foregoing, methods according to the above-mentioned embodiments and variations may be combined as appropriate for use.

Although not described individually, various types of modification may be added and implemented within the scope not deviating from the spirit of the present invention.

What is claimed is:

1. An apparatus for communicating with an RFID tag, comprising:

a communicating device configured to transmit and receive information through a radio communication with said RFID tag which includes an RFID circuit element including an IC circuit part configured to store information and a tag antenna connected to said IC circuit part;

a holder for removably mounting a first tape, said RFID tag being disposed in said first tape;

a driving device configured to provide a driving force for feeding said first tape;

a printing device configured to make a printing on said first tape or a second tape to be bonded thereto; and a cooperative print controller configured to control said printing device in cooperation with a presence/absence of said RFID circuit element or a layout aspect of said RFID circuit element in said first tape, wherein:

said cooperative print controller comprises:

a determining device configured to determine a printable region to be printed by said printing device based on a layout-position information of said RFID circuit element in said first tape; and another print controller configured to control said printing device based on said printable region determined by said determining device configured to determine said printable region, wherein:

said determining device configured to determine said printable region determines said printable region so as to include the layout position of said RFID circuit element in said first tape; and said another print controller controls said printing device such that a print aspect is changed between a portion corresponding to the layout position of said RFID circuit element and another portion in said printable region.

2. The apparatus for communicating with said RFID tag according to claim 1, wherein:

said holder for mounting a tape is a roll holder for said first tape configured to removably hold a roll of tape with said RFID tag wound with said first tape;

said driving device provides a driving force for feeding said first tape;

said printing device makes a print in a predetermined region of said first tape or said second tape to be bonded thereto;

a cutter is provided configured to cut said first tape fed out by said driving device to a predetermined length, and to produce an RFID label including said RFID circuit element; and said cooperative print controller is a first print controller configured to control said printing device so as to be capable of switching between a mode that prints in a forward direction with respect to said predetermined print region and a mode that prints in a rotated layout that is upside-down with respect to said forward direction in said predetermined print region.

3. The apparatus for communicating with said RFID tag according to claim 2, wherein:

said cutter is constructed to be capable of cutting said first tape such that said RFID circuit element is located to be asymmetrical in a label longitudinal direction in said cut RFID label.

4. The apparatus for communicating with said RFID tag according to claim 3, wherein:

said cutter is constructed to be capable of cutting said first tape such that the layout position of said RFID circuit element is in the same asymmetrical relation at all times about a center of said cut RFID label.

5. The apparatus for communicating with said RFID tag according to claim 2, wherein:

said printing device makes a print such that said print region is asymmetrical in the label longitudinal direction in said cut RFID label.

6. The apparatus for communicating with said RFID tag according to claim 5, wherein:

said printing device makes a print such that said print region is located on an opposite side of the label with respect to said RFID circuit element in the label longitudinal direction in said cut RFID label.

7. The apparatus for communicating with said RFID tag according to claim 2, wherein:

said first tape comprises a plurality of said RFID tags, such that a plurality of said RFID circuit elements are located asymmetrically in respective RFID tags in a width direction thereof.

8. The apparatus for communicating with said RFID tag according to claim 7, wherein:

said printing device makes a print such that said print region is asymmetrically located in the label width direction of said cut RFID label.

9. The apparatus for communicating with said RFID tag according to claim 8, wherein:

said printing device makes a print such that said print region is located on the opposite side with respect to said RFID circuit element in the label width direction of said cut RFID label.

10. The apparatus for communicating with said RFID tag according to claim 2, further comprising a print region controller configured to variably control said print region using said printing device.

11. The apparatus for communicating with said RFID tag according to claim 2, wherein:

said printing device makes a print in said print region so as to be in a horizontal writing along a tape longitudinal direction.

12. The apparatus for communicating with said RFID tag according to claim 2, wherein:

said printing device makes a print in said print region so as to be in a vertical writing along a tape longitudinal direction.

13. The apparatus for communicating with said RFID tag according to claim 2, wherein:

said printing device is constructed to be capable of switching a print in said print region so as to be either in the horizontal writing or in the vertical writing along the tape longitudinal direction.

14. The apparatus for communicating with said RFID tag according to claim 2, further comprising an input device configured to input an operation signal relating to a positional relation between said RFID circuit element and said print region in a print label to be produced, said operation signal being input by an operator.

15. The apparatus for communicating with said RFID tag according to claim 14, wherein:

said input device inputs said operation signal relating to a print aspect in said print region in the print label to be produced.

16. The apparatus for communicating with said RFID tag according to claim 15, wherein:

said input device inputs said operation signal relating to whether said RFID circuit element is located asymmetrically on either of the left side and the right side, or either of the upper side and the lower side with respect to a direction of a label for normal reading a print in the produced print label; and said first print controller includes a determining device configured to determine whether to make a print in said forward direction or in said rotation direction according to a layout aspect of said RFID circuit element input by said input device for operation signal.

17. The apparatus for communicating with said an RFID tag according to claim 2, wherein:

said first tape comprises a plurality of said RFID tags;

said roll holder for said first tape removably holds said roll of tape with said RFID tag wound with said first tape including a separation material layer configured to cover an affixing adhesive layer for affixing said RFID circuit element to an object to be affixed; and a first detecting device is provided which can detect an identifier disposed at a position corresponding to a layout position in the width direction or in the longitudinal direction of said RFID circuit element on said separation material layer.

18. The apparatus for communicating with said RFID tag according to claim 2, further comprising a cutter for separation material layer configured to cut said separation material layer of said first tape.

19. The apparatus for communicating with said RFID tag according to claim 1, wherein:

said holder for mounting a tape is a roll holder for said first tape configured to removably hold a roll of tape with said RFID tag wound with said first tape in which said RFID circuit element is disposed;

said driving device provides a driving force for feeding said tape;

said printing device makes a print on said first tape or said second tape to be bonded thereto; and said cooperative print controller is configured to control a mode of said printing device that prints, such that a region in which said RFID circuit element is disposed is visually recognized in said first tape or said second tape to be bonded thereto.

20. The apparatus for communicating with said RFID tag according to claim 19, further comprising an input device for layout-information of said RFID tag configured to input layout-information of said RFID tag regarding a layout position of said RFID circuit element in said first tape, wherein said cooperative print controller controls a mode of said printing device based on said layout-information of [[an]] said RFID tag input by said input device for layout-information of said RFID tag.

21. The apparatus for communicating with said RFID tag according to claim 20, further comprising an input device for print information configured to input print information to be printed on said first tape or said second tape to be bonded thereto by using said printing device, wherein said cooperative print controller controls a mode of said printing device based on said layout-information of said RFID tag and said print information input by said input device for print information.

22. The apparatus for communicating with said RFID tag according to claim 21, further comprising:

a storage device for print data configured to retrieve and to store print information input by said input device for print information in a predetermined storage region for print data; and another storage device for layout-data of said RFID tag configured to develop and to store layout-information of said RFID tag input by said input device for layout-information of said RFID tag in a predetermined storage region for layout-data of said an RFID tag, wherein said print controller generates a driving signal with respect to said printing device based on data stored in said storage device for print data and data stored in said other storage device for layout-data of said RFID tag.

23. The apparatus for communicating with said RFID tag according to claim 22, wherein:

said predetermined storage region stores print data according to the size of a layout region of said RFID circuit element in said first tape.

24. The apparatus for communicating with said RFID tag according to claim 21, further comprising a storage device for print data configured to retrieve and to store print information input by said input device for print information in a predetermined storage region for print data, wherein said cooperative print controller processes the data stored in said storage device for print data by using the layout-information of said RFID tag input by said input device for layout-information of said RFID tag, and generates a driving signal with respect to said printing device.

25. The apparatus for communicating with said RFID tag according to claim 21, further comprising a storage device for layout-data of said RFID tag configured to retrieve and to store layout-information of said RFID tag input by said input device for layout-information of said RFID tag in a predetermined storage region for layout-data of said RFID tag, wherein said cooperative print controller processes the print information input by said input device for print information by using the data stored in said storage device for layout-data of said an RFID tag, and generates a driving signal with respect to said printing device.

26. The apparatus for communicating with said RFID tag according to claim 21, wherein:

said cooperative print controller generates a driving signal with respect to said printing device by using the layout-information of said RFID tag input by said input device for layout-information of said RFID tag and the print information input by said input device for print information.

27. The apparatus for communicating with said RFID tag according to claim 21, wherein:

said cooperative print controller controls a mode of said printing device that prints, such that a print aspect of at least a part of a portion corresponding to a layout region of said RFID circuit element with respect to letters or icons, marks, symbols and the like included in said print information, is different from that at the other portion based on said layout-information of an RFID tag.

28. The apparatus for communicating with said RFID tag according to claim 27, wherein:

said cooperative print controller controls a mode of said printing device that prints, such that thickness of a diagram element at a portion corresponding to a layout region of said RFID circuit element with respect to letters or icons, marks, symbols and the like included in said print information, is made larger or smaller as compared with that at the other portion.

29. The apparatus for communicating with said RFID tag according to claim 27, wherein:

said cooperative print controller controls a mode of said printing device that prints, such that a color of a diagram element at a portion corresponding to a layout region of said RFID circuit element with respect to letters or icons, marks, symbols and the like included in said print information, is changed as compared with that at the other portion.

30. The apparatus for communicating with said RFID tag according to claim 29, wherein:

said cooperative print controller controls a mode of said printing device that prints, such that a contrast between a color of a diagram element and a background color at a portion corresponding to a layout region of said RFID circuit element with respect to letters or icons, marks, symbols and the like included in said print information, is inverted as compared with that at the other portion.

31. The apparatus for communicating with said RFID tag according to claim 21, wherein:

said cooperative print controller controls a mode of said printing device that prints, such that a print aspect of a portion corresponding to a layout region of said RFID circuit element with respect to letters or icons, marks, symbols and the like included in said print information, is different from that at the other portion based on said layout-information of an RFID tag.

32. The apparatus for communicating with said RFID tag according to claim 21, wherein:

said cooperative print controller controls a mode of said printing device that prints, such that an aspect of a background at a portion corresponding to a layout region of said RFID circuit element with respect to letters or icons, marks, symbols and the like included in said print information, is different from that at the other portion.

33. The apparatus for communicating with said RFID tag according to claim 32, wherein:

said cooperative print controller controls a mode of said printing device that prints, such that thickness of a diagram element of a background at a portion corresponding to a layout region of said RFID circuit element with respect to letters or icons, marks, symbols and the like included in said print information is, made larger or smaller as compared with that at the other portion.

34. The apparatus for communicating with said RFID tag according to claim 32, wherein:

said cooperative print controller controls a mode of said printing device that prints, such that a color of a diagram element of a background at a portion corresponding to a layout region of said RFID circuit element with respect to letters or icons, marks, symbols and the like included in said print information, is changed as compared with that at the other portion.

35. The apparatus for communicating with said RFID tag according to claim 21, wherein:

said cooperative print controller controls said printing device such that letters or icons, marks, symbols and the like included in said print information are printed, such that they are extended or reduced so as to be in conformity with a print region corresponding to a layout region of said RFID circuit element.

36. The apparatus for communicating with said RFID tag according to claim 35, wherein:

said cooperative print controller controls said printing device such that letters or icons, marks, symbols and the like are printed, such that they are reduced so as to be in conformity with said print region.

37. The apparatus for communicating with said RFID tag according to claim 20, wherein:

said roll holder for a first tape is a cartridge holder configured to removably hold a cartridge for including at least said RFID tag in which said roll of tape with said RFID tag is contained;

a second detecting device is provided which detects an element to be detected provided at said cartridge for including at least said RFID tag; and said input device for layout-information of said RFID tag inputs said layout-information of an RFID tag included in a detection signal from said second detecting device.

38. The apparatus for communicating with said RFID tag according to claim 1, wherein:

said holder is a roll holder for said first tape configured to removably hold a roll of tape with a plurality of said RFID circuit elements wound with said first tape; and said driving device generates a driving force for feeding out said first tape from said roll of tape with said plurality of said RFID circuit elements.

39. The apparatus for communicating with said RFID tag according to claim 1, wherein:

said roll holder is a cartridge holder configured to removably hold a cartridge for including at least one of said RFID tags in which said roll of tape with a plurality of said RFID circuit elements is contained; and layout-position information of said RFID circuit element is provided at said cartridge for including at least an RFID tag.

40. The apparatus for communicating with said RFID tag according to claim 39, further comprising a detecting device for an identifier of a cartridge provided at said cartridge for including at least said RFID tag, and detecting a cartridge identifier including a layout-position information of said RFID circuit element.

41. The apparatus for communicating with said RFID tag according to claim 39, wherein:

said first tape includes a tape identifier indicating a layout position of said RFID circuit element; and a detecting device for said identifier of a tape, configured to detect said tape identifier, is provided.

42. The apparatus for communicating with said RFID tag according to claim 41, wherein:

said detecting device for an identifier of a tape, which detects said tape identifier provided on a separation material covering an affixing adhesive layer of said first tape.

43. The apparatus for communicating with said RFID tag according to claim 39, wherein:

said layout-position information of the RFID circuit element is obtained by an access to said IC circuit part via said communicating device.

44. The apparatus for communicating with said RFID tag according to claim 1, wherein:

said another print controller controls at least one of a size, the number of lines and a direction of a print letter by said printing device according to at least one of a positional relation between the layout position of said RFID circuit element and said printable region, the size of said layout position of said RFID circuit element, and the size of said printable region.

45. The apparatus for communicating with said RFID tag according to claim 44, wherein:

said another print controller includes a storage device for a minimum value of print configured to set and to store a permitted minimum value with regard to the size of said print letter, and to control said printing device based on said permitted minimum value stored in said storage device.

46. The apparatus for communicating with said RFID tag according to claim 1, further comprising a cutter configured to cut said first tape fed out by said driving device.

47. The apparatus for communicating with said RFID tag according to claim 1, wherein:

said holder for mounting a tape is a selectively mounting holder configured to removably mount a first tape in which said RFID circuit element is disposed in a tape base, and a normal tape in which no said RFID circuit element is disposed in said tape base;

a detecting device is provided which detects whether said first tape is mounted or said normal tape is mounted;

said driving device provides a driving force for feeding said first tape or said normal tape;

said printing device makes a print on said first tape or said normal tape; and said cooperative print controller is configured to switch a print-driving region of said printing device according to whether said first tape is mounted or said normal tape is mounted based on a detection result of said detecting device.

48. The apparatus for communicating with said RFID tag according to claim 47, wherein:

said cooperative print controller, in the case where said first tape is mounted by using said selectively mounting holder, reduces the size of said print-driving region of said printing device as compared with the case where said normal tape is mounted.

49. The apparatus for communicating with said RFID tag according to claim 47, wherein:

positions of a transport path of a tape in the apparatus are arranged to be different between when said first tape is mounted and when said normal tape is mounted, by using said selectively mounting holder.

50. The apparatus for communicating with said RFID tag according to claim 49, wherein:

said selectively mounting holder is constructed such that layout positions of a tape are different between when said first tape is mounted and when said normal tape is mounted.

51. The apparatus for communicating with said RFID tag according to claim 49, wherein:

said selectively mounting holder is constructed such that a position of a tape transport path when mounting said first tape and a position of a tape transport path when mounting said normal tape are shifted in a width direction by a dimension of size substantially equal to or not less than a distance from an end on one side in said width direction of said first tape to an end on the other side in the width direction of said IC circuit part.

52. The apparatus for communicating with said RFID tag according to claim 49, wherein:

said selectively mounting holder is constructed such that a position of an end on one side in a width direction of said normal tape when the normal tape is mounted, is substantially aligned with a position of an end on the other side in said width direction of said IC circuit part of said first tape when said first tape is mounted.

* * * * *